(12) United States Patent
Eda

(10) Patent No.: US 7,742,191 B2
(45) Date of Patent: Jun. 22, 2010

(54) IMAGE INPUT AND OUTPUT APPARATUS SELECTING PROCESSING ACCORDING TO COLORED PATTERN

(75) Inventor: Noriyuki Eda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1121 days.

(21) Appl. No.: 11/226,557

(22) Filed: Sep. 14, 2005

(65) Prior Publication Data

US 2006/0061812 A1    Mar. 23, 2006

(30) Foreign Application Priority Data

Sep. 21, 2004   (JP)   ............................... 2004-274104

(51) Int. Cl.
G06F 15/00 (2006.01)
G06K 1/00 (2006.01)
H04N 1/60 (2006.01)
G06F 3/12 (2006.01)

(52) U.S. Cl. ....................................... 358/1.9; 358/1.15

(58) Field of Classification Search .......... 358/1.9–3.32
See application file for complete search history.

(56) References Cited

U.S. PATENT DOCUMENTS 5,996,026 A * 11/1999 Onodera et al. ................. 710/3
2002/0041386 A1* 4/2002 Suzuki et al. ............... 358/1.13
2004/0008372 A1* 1/2004 Akashi et al. ............... 358/1.15

FOREIGN PATENT DOCUMENTS

JP    2001-320542 A    11/2001

* cited by examiner

*Primary Examiner*—Douglas Q Tran
(74) *Attorney, Agent, or Firm*—Panitch Schwarze Belisario & Nadel LLP

(57) ABSTRACT

An image input and output apparatus such as a facsimile machine or multifunction printer recognizes a colored image pattern on an input document and processes the document according to the color of the image pattern. Information that can be encoded by the color of the image pattern includes an electronic mail address, facsimile number, or file server address to which an image of the document is to be sent, a folder in which the image is to be stored, or a number of copies of the image to be printed. The color recognition capability of the apparatus can thereby be used effectively even in the processing of basically black and white documents. Information may also be encoded by the shape of the colored image pattern.

7 Claims, 82 Drawing Sheets

FIG.3

| IMAGE PATTERN SHAPE | FUNCTION | COLOR DATA | | | | | |
|---|---|---|---|---|---|---|---|
| | | | RED | GREEN | BLUE | ORANGE | PURPLE |
| ■ | E-MAIL | | ai@oki.com | kaki@oki.com | sashi@oki.com | tachi@oki.com | nani@oki.com |
| ★ | FAX | | 03-4567-0001 | 06-5432-0002 | 001-11-6789-003 | 044-33-9876-004 | 056-22-5432-0005 |
| ◄ | COPY | | 1 COPY | 3 COPIES | 5 COPIES | 10 COPIES | 20 COPIES |
| ◆ | FILING | | TOKYO SERVER | OSAKA SERVER | US SERVER | UK SERVER | EURO SERVER |

FIG.17

| COLOR DATA | FUNCTION | IMAGE PATTERN SHAPE | | | | |
|---|---|---|---|---|---|---|
| RED | E-MAIL | ■ ai@oki.com | ★ kaki@oki.com | ◀ sashi@oki.com | ◆ tachi@oki.com | ▶ nani@oki.com |
| YELLOW | FAX | ■ 03-4567-0001 | ★ 06-5432-0002 | ◀ 001-11-6789-003 | ◆ 044-33-9876-004 | ▶ 056-22-5432-0005 |
| GREEN | COPY | ■ 1 COPY | ★ 3 COPIES | ◀ 5 COPIES | ◆ 10 COPIES | ▶ 20 COPIES |
| BLUE | FILING | ■ TOKYO SERVER | ★ OSAKA SERVER | ◀ US SERVER | ◆ UK SERVER | ▶ EURO SERVER |
| PURPLE | PC SCAN | FOLDER A | FOLDER B | FOLDER C | FOLDER D | FOLDER E |

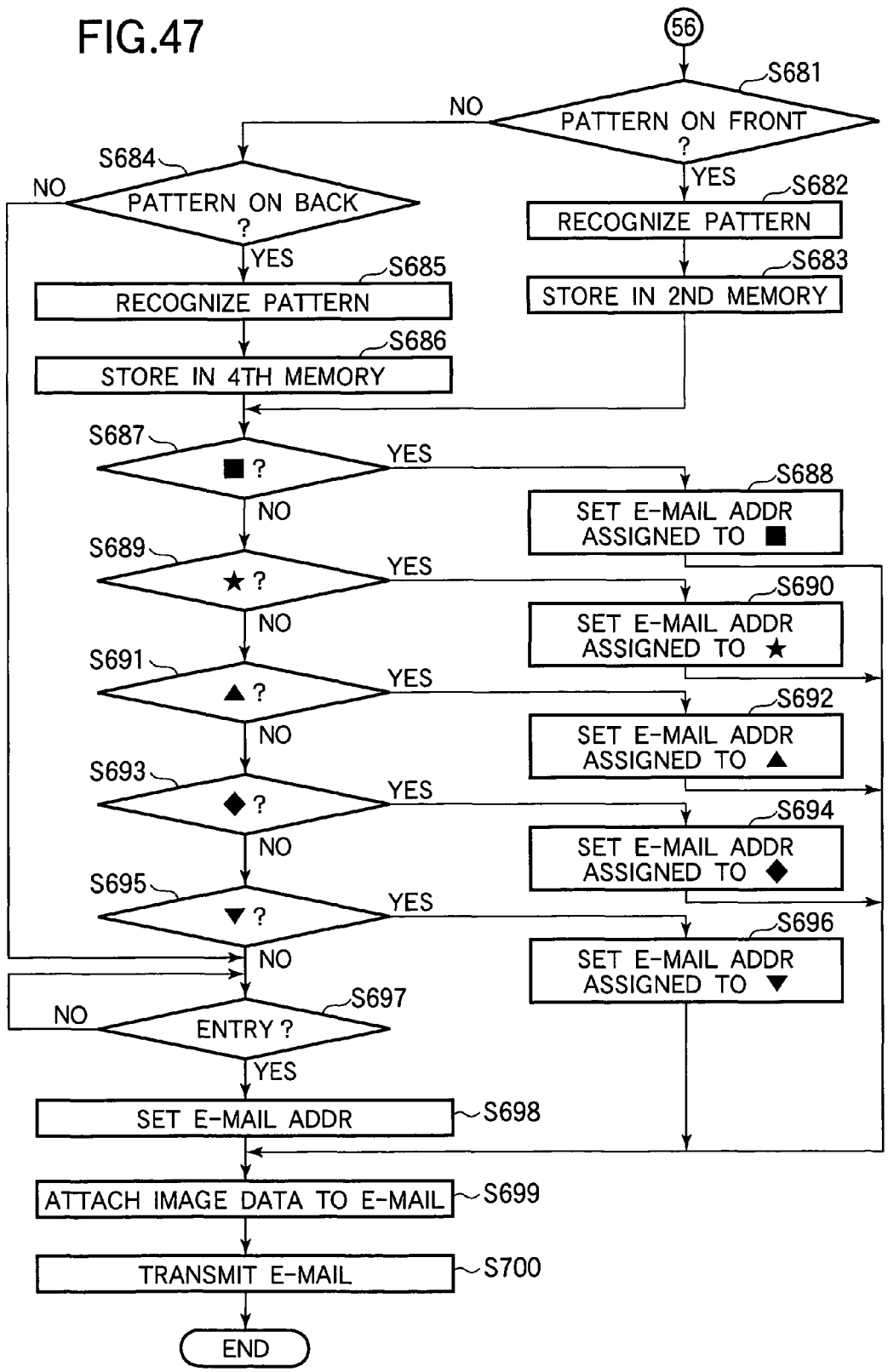

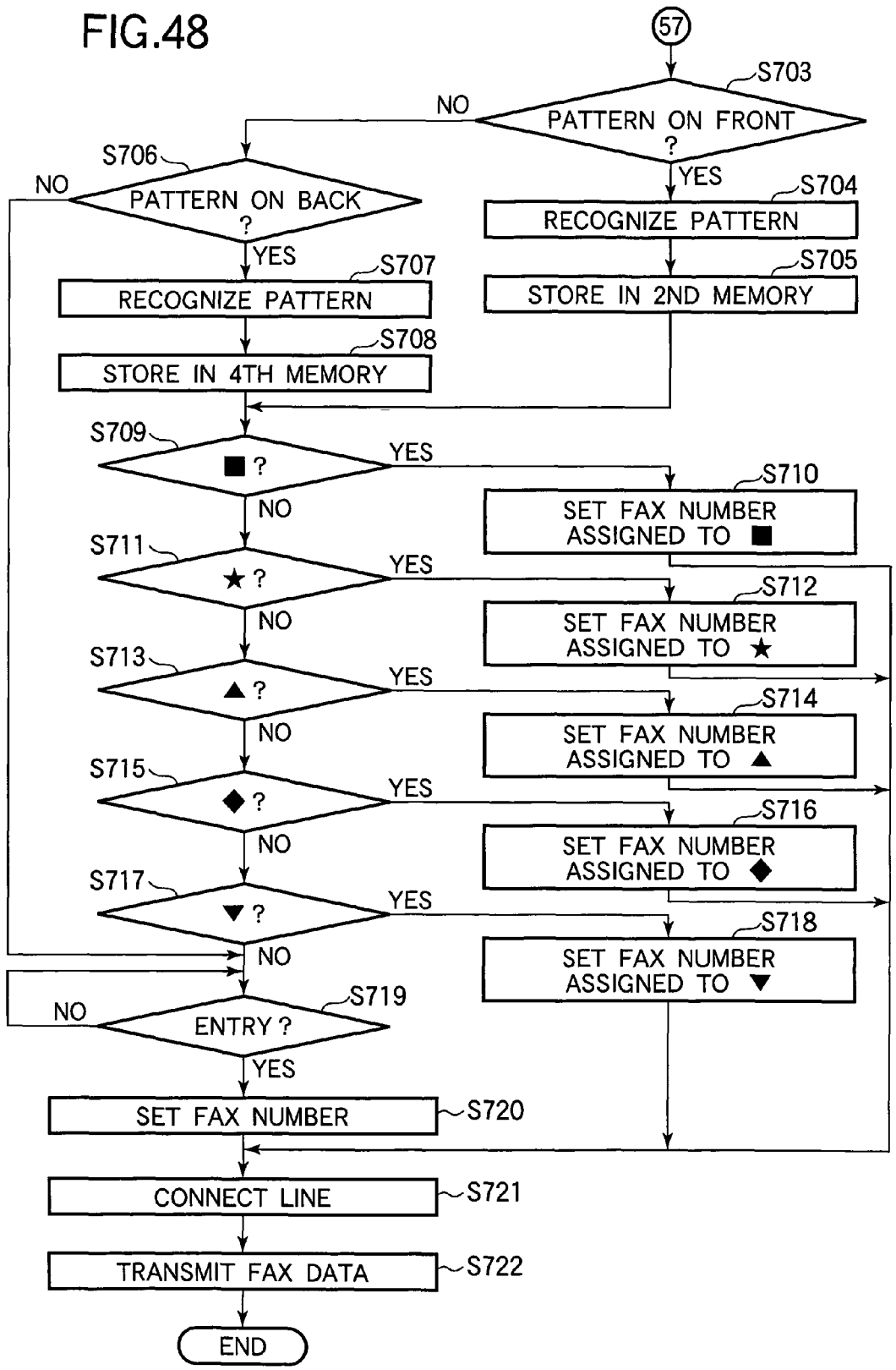

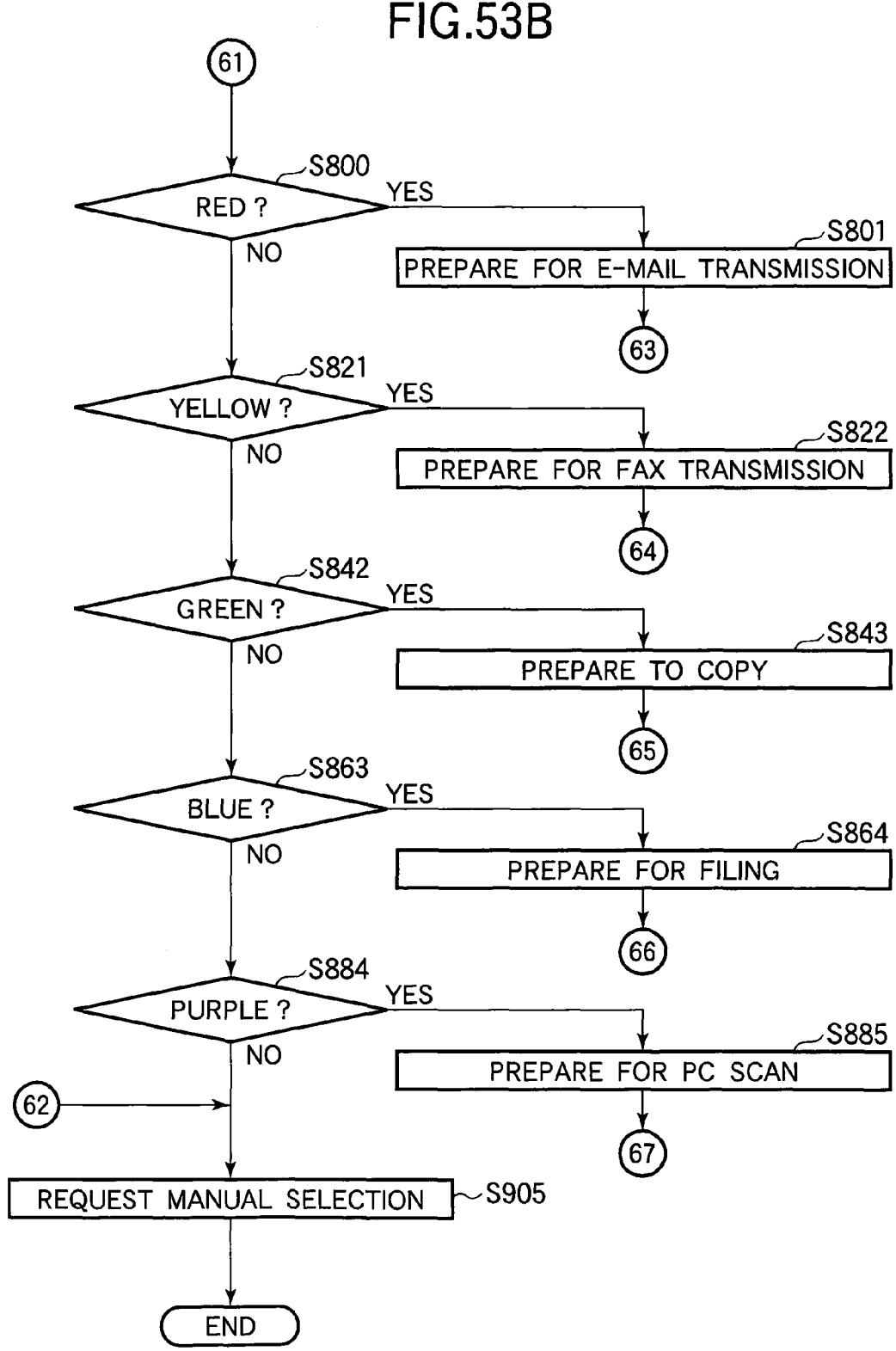

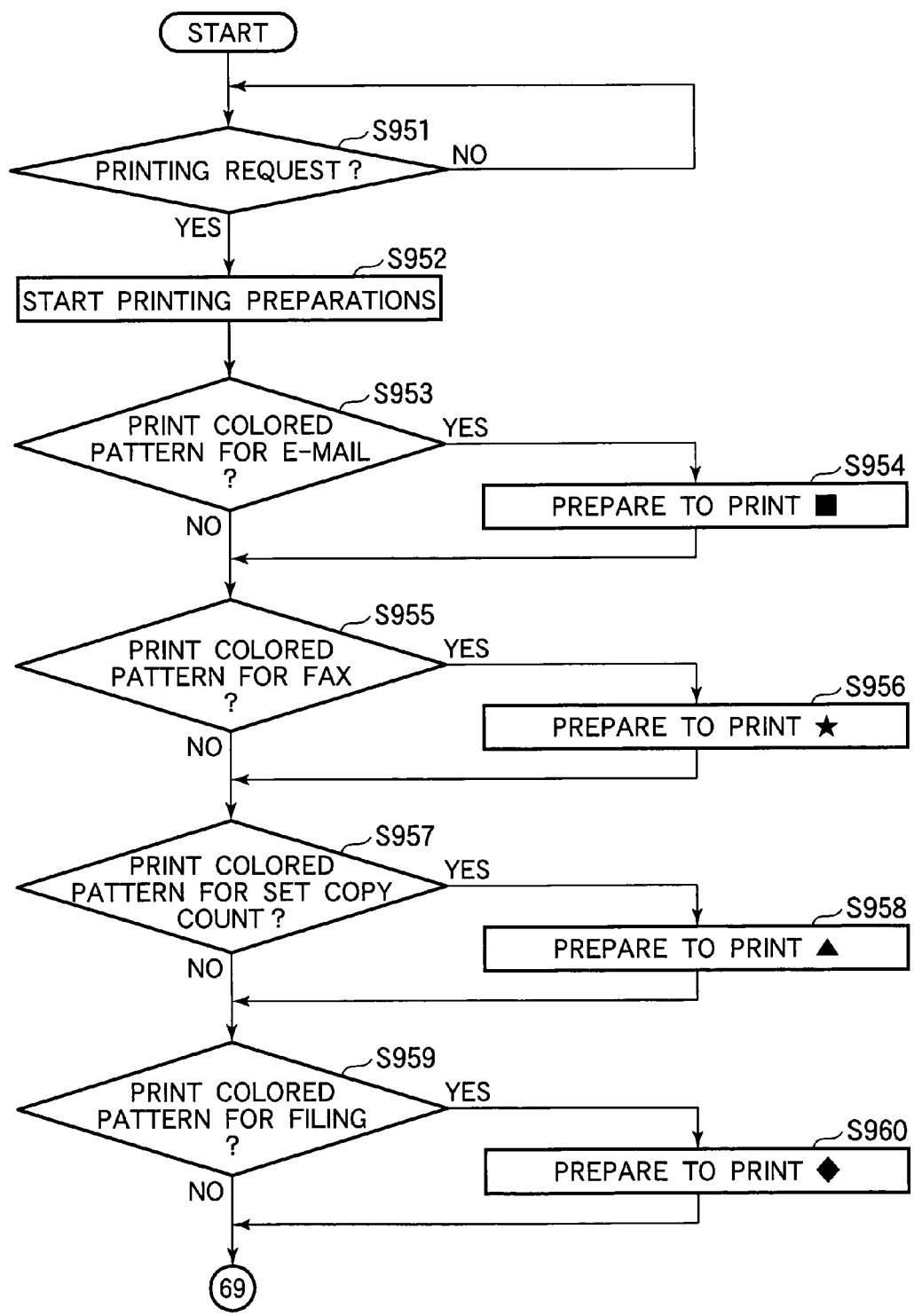

IMAGE INPUT AND OUTPUT APPARATUS SELECTING PROCESSING ACCORDING TO COLORED PATTERN

BACKGROUND OF THE INVENTION

1. Field of the Invention

The present invention relates to an image input and output apparatus such as a facsimile machine or multifunction printer.

2. Description of the Related Art

Image input and output apparatus of this type includes a scanner for scanning a document placed on or fed into the apparatus, and image processing and transmission circuitry for encoding the image data output from the scanner and transmitting the encoded data to a distant location as a facsimile image or by electronic mail. When electronic mail is used, the image data are transmitted as an attached image file. When the image input and output apparatus is a multifunction printer, the transmission may be routed through a host computer connected to the printer.

Japanese Patent Application Publication No. 2001-320542 discloses an image input and output apparatus (an image processor) that can automatically transmit a scanned document to a distant party identified by information placed at, for example, the top of the document. The apparatus has character recognition means for recognizing character information in the scanned document, and a controller. The controller determines, from the content of the recognized character information and its position in the document, whether the information represents a facsimile number or electronic mail address, and initiates the appropriate type of transmission, so that the user does not have to enter the number or address by hand. The controller may also be able to recognize a postal address and use it as a key to retrieve a facsimile number from a database.

A disadvantage of this scheme is the requirement for documents to be formatted with the destination facsimile number or electronic mail address in a predetermined position. The use of optical character recognition, which is expensive and unreliable, is also a disadvantage.

It would be desirable to have a less expensive and more convenient and reliable way to acquire destination information from a document.

SUMMARY OF THE INVENTION

An object of the present invention is to provide an image input and output apparatus that can determine, from color- and pattern-coded information in an input document, how to output the document.

The invented image input and output apparatus has a scanner for scanning a document to obtain image data. The document may include a colored image pattern in a predetermined position, on either the front or back surface of the document. A color recognition unit recognizes the color of the image pattern. An output unit then outputs the image data to a destination corresponding to the recognized color, the destination being obtained from a table of colors and corresponding destinations. Alternatively, the image input and output apparatus may have a plurality of output units, and a controller that directs the image data to an output unit corresponding to the recognized color.

The destination may be, for example, a facsimile number, an electronic mail address, or the address of a computing device such as a file server. The shape of the image pattern may also be used to convey destination information or designate an output unit. If the designated output unit is a printing unit, the color or shape of the image pattern may be used to specify the number of copies to be printed.

The invented image input and output apparatus may also be operable to print documents with colored image patterns having meanings as described above.

BRIEF DESCRIPTION OF THE DRAWINGS

In the attached drawings:

FIG. 3 shows a table of colored image patterns and their meanings in the first and second embodiments;

FIG. 17 shows a table of colored image patterns and their meanings in the third embodiment;

FIGS. 46A, 46B, 47; 48, 49, 50, and 51 are a flowchart illustrating the operation of the seventh embodiment;

FIGS. 53A, 53B, 54, 55, 56, 57, and 58 are a flowchart illustrating the operation of the eighth embodiment;

FIGS. 62A and 62B are a flowchart illustrating a printing procedure in the ninth embodiment;

DETAILED DESCRIPTION OF THE INVENTION

Figure 1:
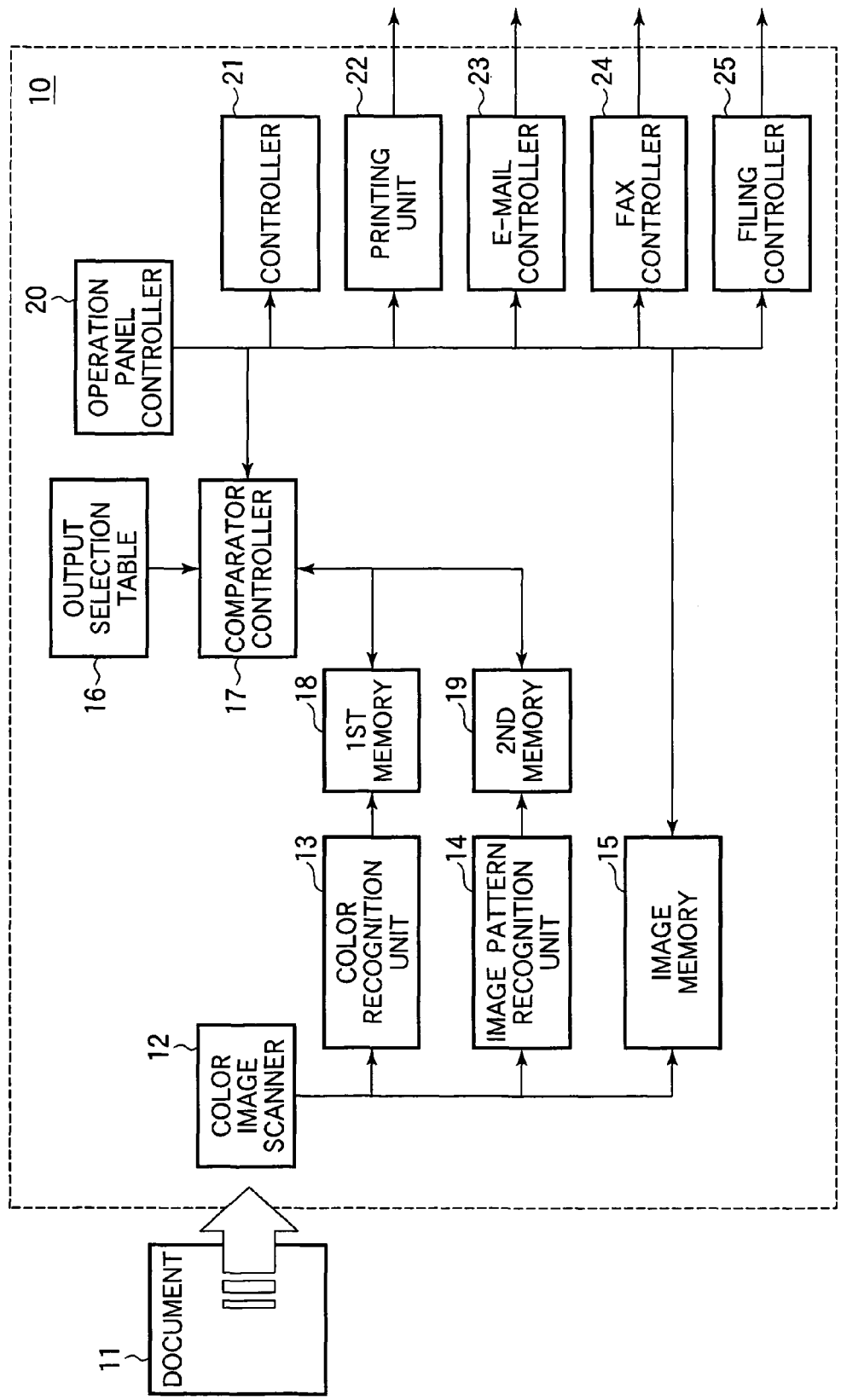
FIG. 1 is a block diagram of an image input and output apparatus according to first and second embodiments of the invention.

Embodiments of the invention will now be described with reference to the attached drawings, in which like elements are indicated by like reference characters.

First Embodiment

Referring to FIG. 1, the image input and output apparatus 10 in the first embodiment is an apparatus such as a facsimile machine, a multifunction printer combining the functions of a printer, a facsimile machine, and a copier, or any other type of apparatus having both image input and output functions. In the following description it will be assumed that the image input and output apparatus is a multifunction printer that can scan and output color images. A color image is input in the form of a document 11 comprising one or more pages.

The image input and output apparatus 10 has a color image scanner 12 that scans an input document 11 to obtain color image data, a color recognition unit 13 that recognizes color information in the image data, an image pattern recognition unit 14 that recognizes image pattern or shape information in the image data, an image memory 15 that stores the image data, an output selection table 16 that stores a table of colored image patterns and their meanings, a comparator controller 17 that compares the color information and image pattern recognized by the color recognition unit 13 and image pattern recognition unit 14 with the information stored in the output selection table 16, a first memory 18 that temporarily holds the color information, a second memory 19 that temporarily holds the image pattern information, an operation panel controller 20 controlling an operation panel (not shown) from which the operator of the image input and output apparatus can enter facsimile numbers, electronic mail addresses, and other information, a controller 21 that controls the operation of the image input and output apparatus 10 as a whole, a printing unit 22 such as an electrophotographic unit, an electronic mail (e-mail) controller 23 for controlling the transmission of the image data by attaching the image data as a file to electronic mail, a facsimile (fax) controller 24 for controlling facsimile transmission of the image data, and a filing controller 25 for controlling transmission of the image data to a file server. The printing unit 22, e-mail controller 23, facsimile controller 24, and filing controller 25 function as image data output units, one of which can be selected according to the information stored in the output selection table 16.

Figure 2:
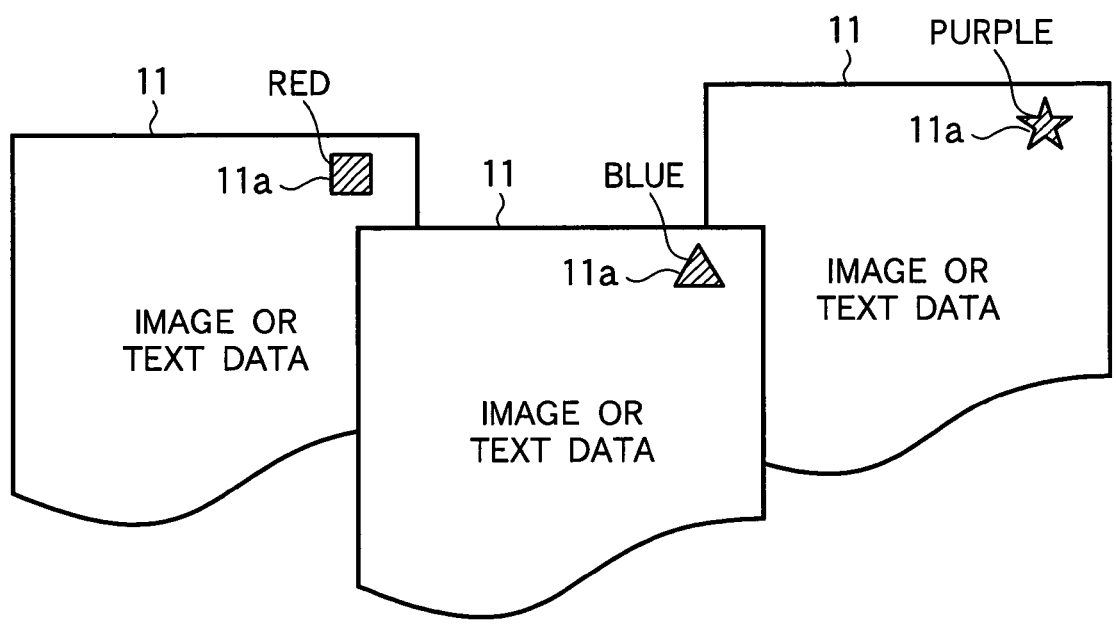
FIG. 2 shows examples of documents with colored image patterns.

As shown in FIG. 2, the document 11 has an image pattern 11a in a predetermined position, preferably near the top or leading edge of the document. The image pattern 11a has one of a several predetermined, readily distinguishable shapes such as the illustrated square, triangle, and star, shapes and other shapes that will be shown later. The image pattern 11a also has one of several predetermined colors. In the following description these colors are red, green, blue, orange, and purple.

Next, the operation of the image input and output apparatus 10 will be described.

As a preliminary procedure, the operator assigns meanings to the colored image patterns by entering facsimile numbers, electronic mail addresses, server addresses, and numbers of copies through the operation panel and operation panel controller 20. FIG. 3 shows an example of the type of information that the operator can enter. The entry procedure is as follows.

First, the operator presses a button or makes a menu selection on the operation panel to begin the entry procedure. The operator is then offered a selection of image pattern shapes and a selection of colors for each shape.

To enter an electronic mail address, the operator selects the square shape. The operator can then enter an electronic mail address to be assigned to one of the predetermined colors (red, green, blue, orange, and purple). In this example, up to five different electronic mail addresses can be entered.

To enter a facsimile number, the operator selects the star shape. The operator can then enter a facsimile number to be assigned to one of the predetermined colors.

For control of copy printing operations, the operator selects the triangle shape and enters a number of copies to be assigned to one of the predetermined colors.

For control of filing operations, the operator selects the diamond shape and enters a server address to be assigned to one of the predetermined colors.

During this procedure, the operator can reselect the various image pattern shapes, check and correct the entered information, and enter additional information as necessary. At the end of the procedure, the operator presses a button or makes a menu selection to indicate that entry of information is completed and the entered information is stored in the output selection table 16.

During this procedure, the image input and output apparatus 10 operates as indicated in FIGS. 4A, 4B, 4C, 5A and 5B.

Figure 4A:
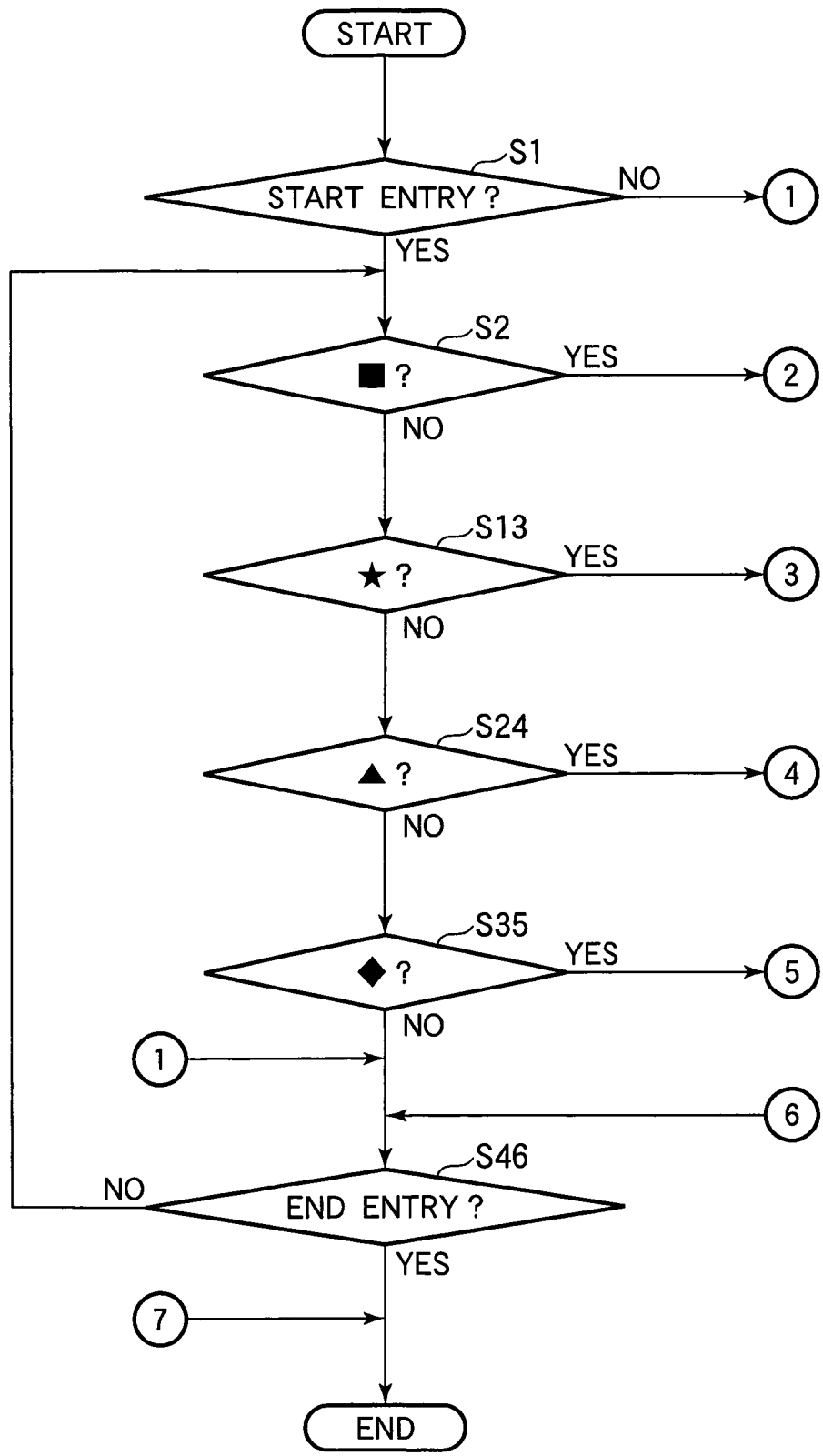
FIGS. 4A, 4B, 4C, 5A, and 5B are a flowchart illustrating a procedure for storing information in the table in the first and second embodiments.

In step S1 in FIG. 4A, the controller 21 decides, by testing the state of a switch in the operation panel, for example, whether to start the entry procedure, and proceeds accordingly to step S2 (to start the entry procedure) or step S46 (to skip the entry procedure).

Step S2 is a decision step that tests for selection of the square image pattern. Processing proceeds to step S3 in FIG. 4B if the square image pattern is selected and to step S13 otherwise.

Figure 4B:
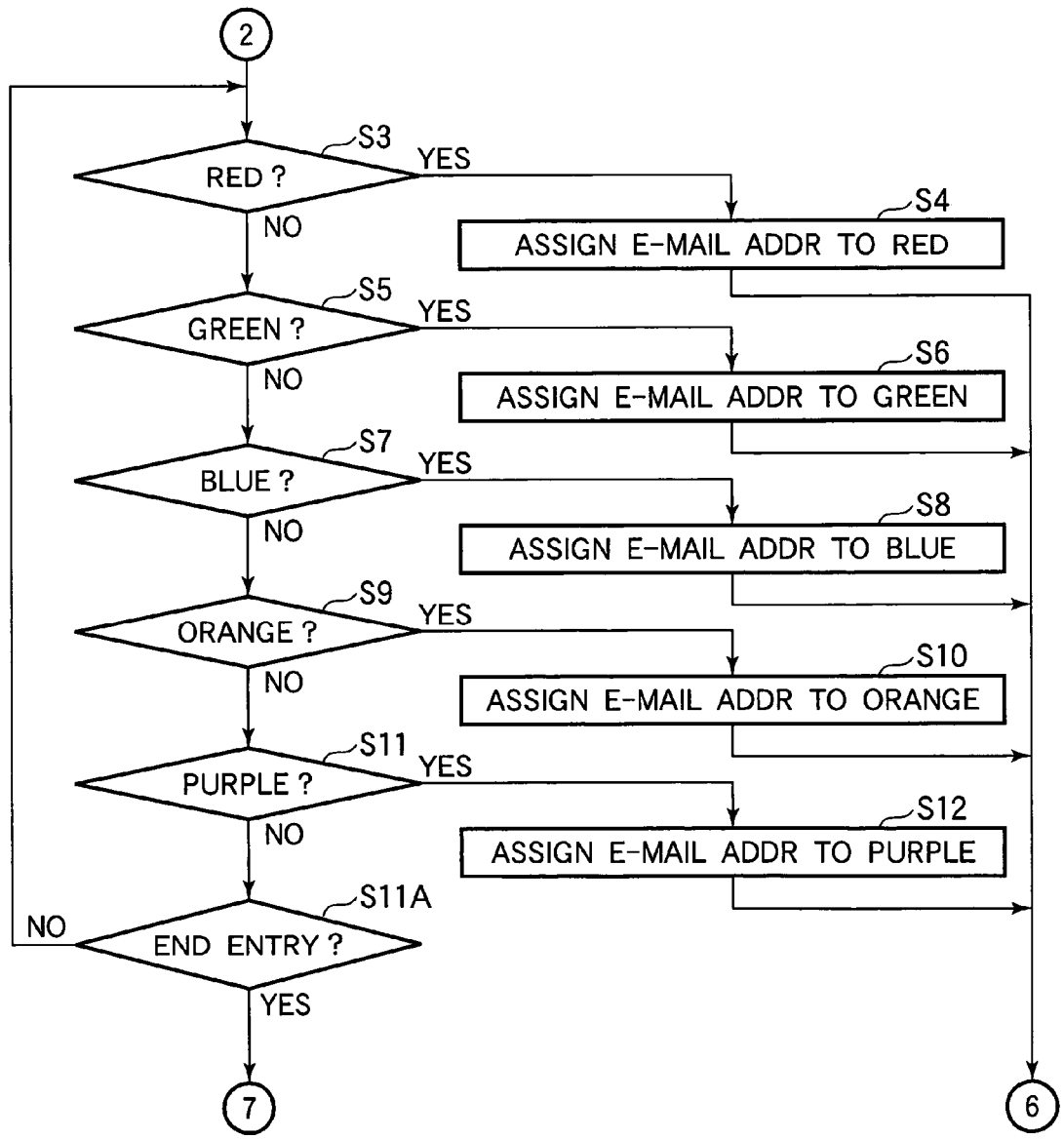

Step S3 in FIG. 4B is a decision step that tests for selection of the color red. Processing proceeds to step S4 if red is selected and to step S5 otherwise.

In step S4, an electronic mail address (ADDR) is entered for assignment to the color red.

Step S5 is a decision step that tests for selection of the color green. Processing proceeds to step S6 if green is selected and to step S7 otherwise.

In step S6, an electronic mail address is entered for assignment to the color green.

Step S7 is a decision step that tests for selection of the color blue. Processing proceeds to step S8 if blue is selected and to step S9 otherwise.

In step S8, an electronic mail address is entered for assignment to the color blue.

Step S9 is a decision step that tests for selection of the color orange. Processing proceeds to step S10 if orange is selected and to step S11 otherwise.

In step S10, an electronic mail address is entered for assignment to the color orange.

Step S11 is a decision step that tests for selection of the color purple. Processing proceeds to step S12 if purple is selected and to step S11A otherwise.

Step S11A is a termination decision step. Processing ends or returns to step S3 according to, for example, the state of a switch in the operation panel.

In step S12, an electronic mail address is entered for assignment to the color purple.

Following step S4, S6, S8, S10, or S12, processing proceeds to step S46 in FIG. 4A.

Step S13 in FIG. 4A is a decision step that tests for selection of the star image pattern. Processing proceeds to step S14 in FIG. 4C if the star image pattern is selected and to step S24 otherwise.

Figure 4C:
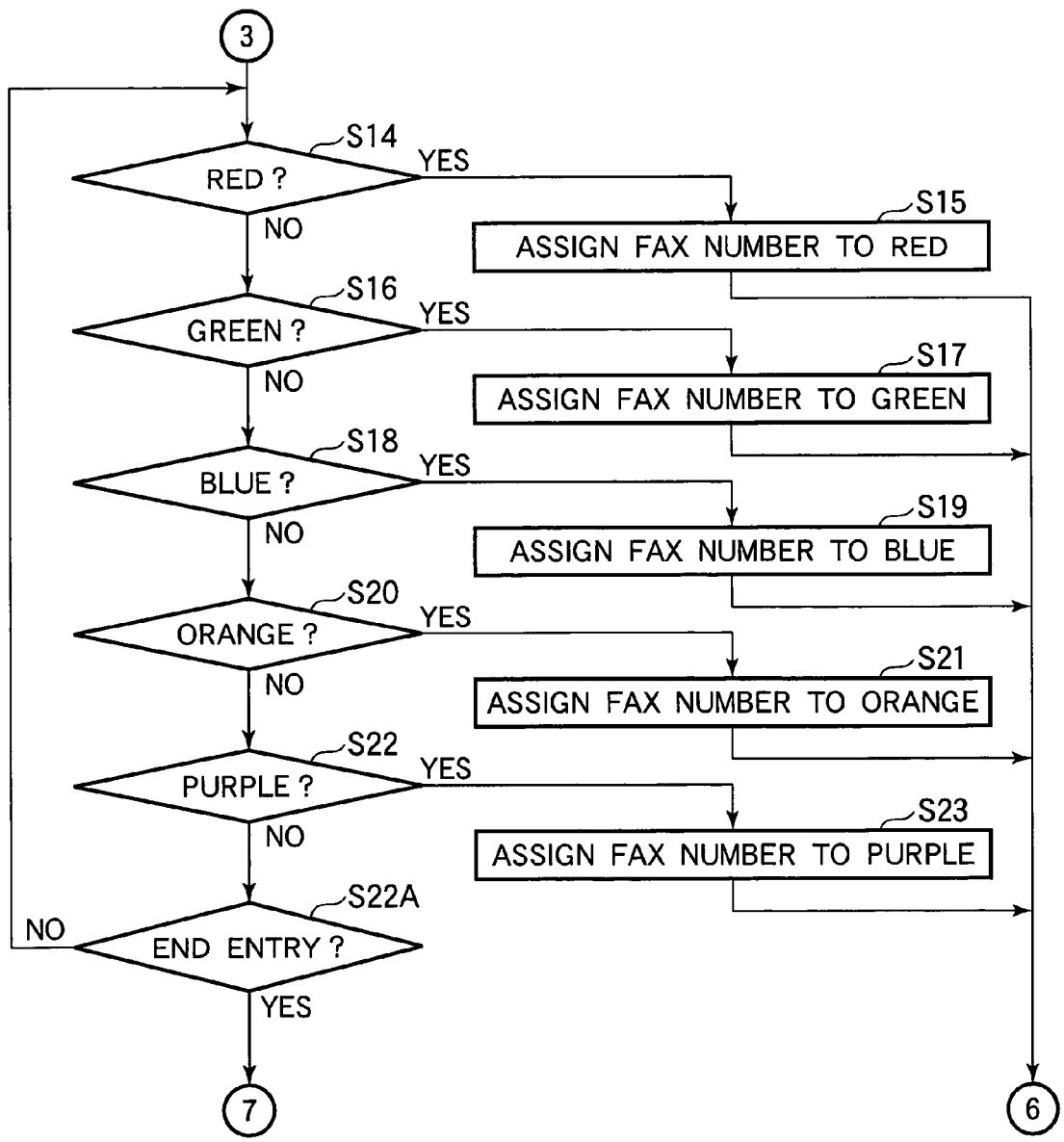

Step S14 in FIG. 4C is a decision step that tests for selection of the color red. Processing proceeds to step S15 if red is selected and to step S16 otherwise.

In step S15, a facsimile number is entered for assignment to the color red.

Step S16 is a decision step that tests for selection of the color green. Processing proceeds to step S17 if green is selected and to step S18 otherwise.

In step S17, a facsimile number is entered for assignment to the color green.

Step S18 is a decision step that tests for selection of the color blue. Processing proceeds to step S19 if blue is selected and to step S20 otherwise.

In step S19, a facsimile number is entered for assignment to the color blue.

Step S20 is a decision step that tests for selection of the color orange. Processing proceeds to step S21 if orange is selected and to step S22 otherwise.

In step S21, a facsimile number is entered for assignment to the color orange.

Step S22 is a decision step that tests for selection of the color purple. Processing proceeds to step S23 if purple is selected and to step S22A otherwise.

Step S22A is a termination decision step. Processing ends or returns to step S14 according to, for example, the state of a switch in the operation panel.

In step S23, a facsimile number is entered for assignment to the color purple.

Following step S15, S17, S19, S21, or S23, processing proceeds to step S46 in FIG. 4A.

Step S24 in FIG. 4A is a decision step that tests for selection of the triangle image pattern. Processing proceeds to step S25 in FIG. 5A if the triangle image pattern is selected and to step S36 in FIG. 5B otherwise.

Figure 5A:
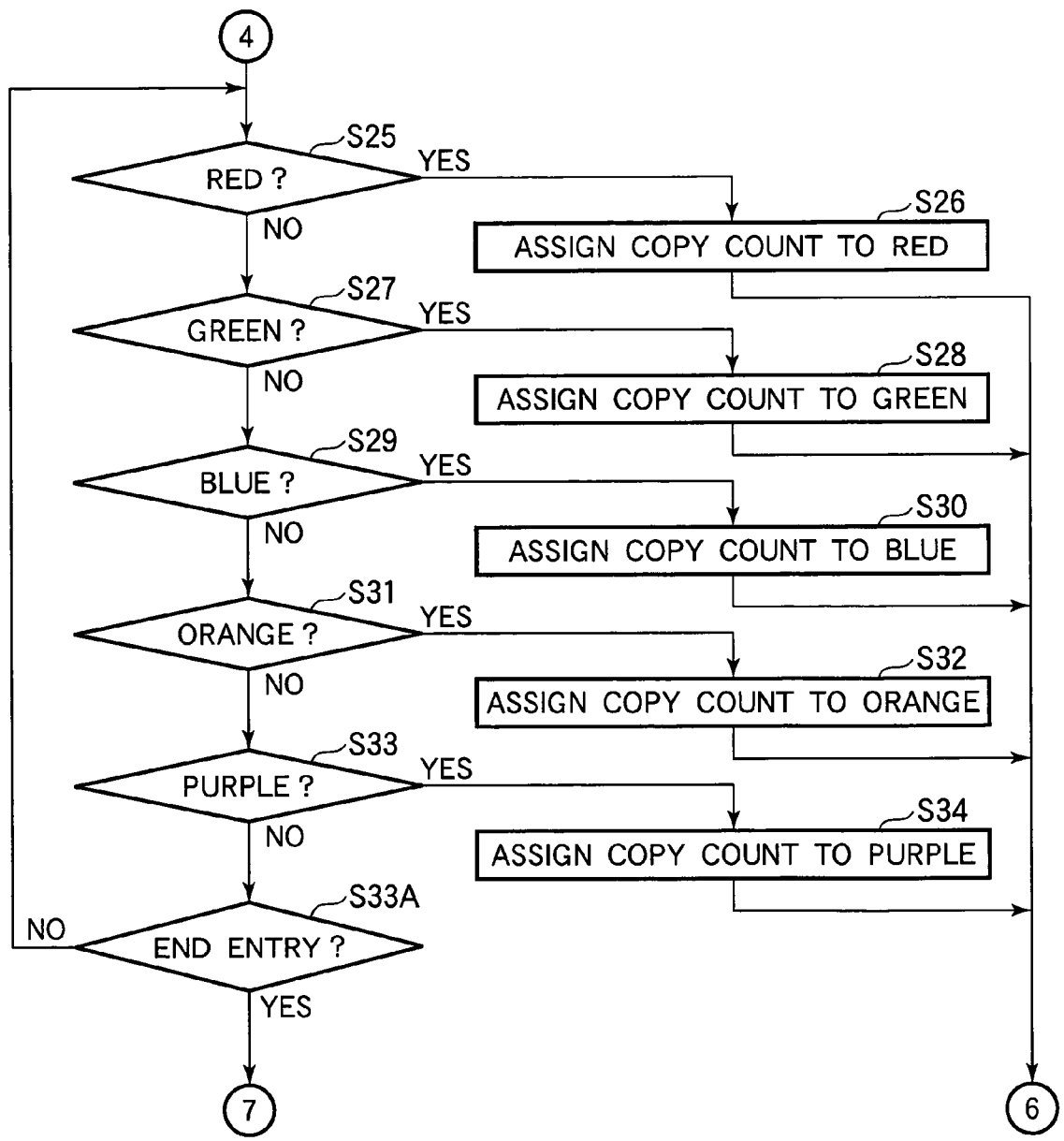
Figure 5B:
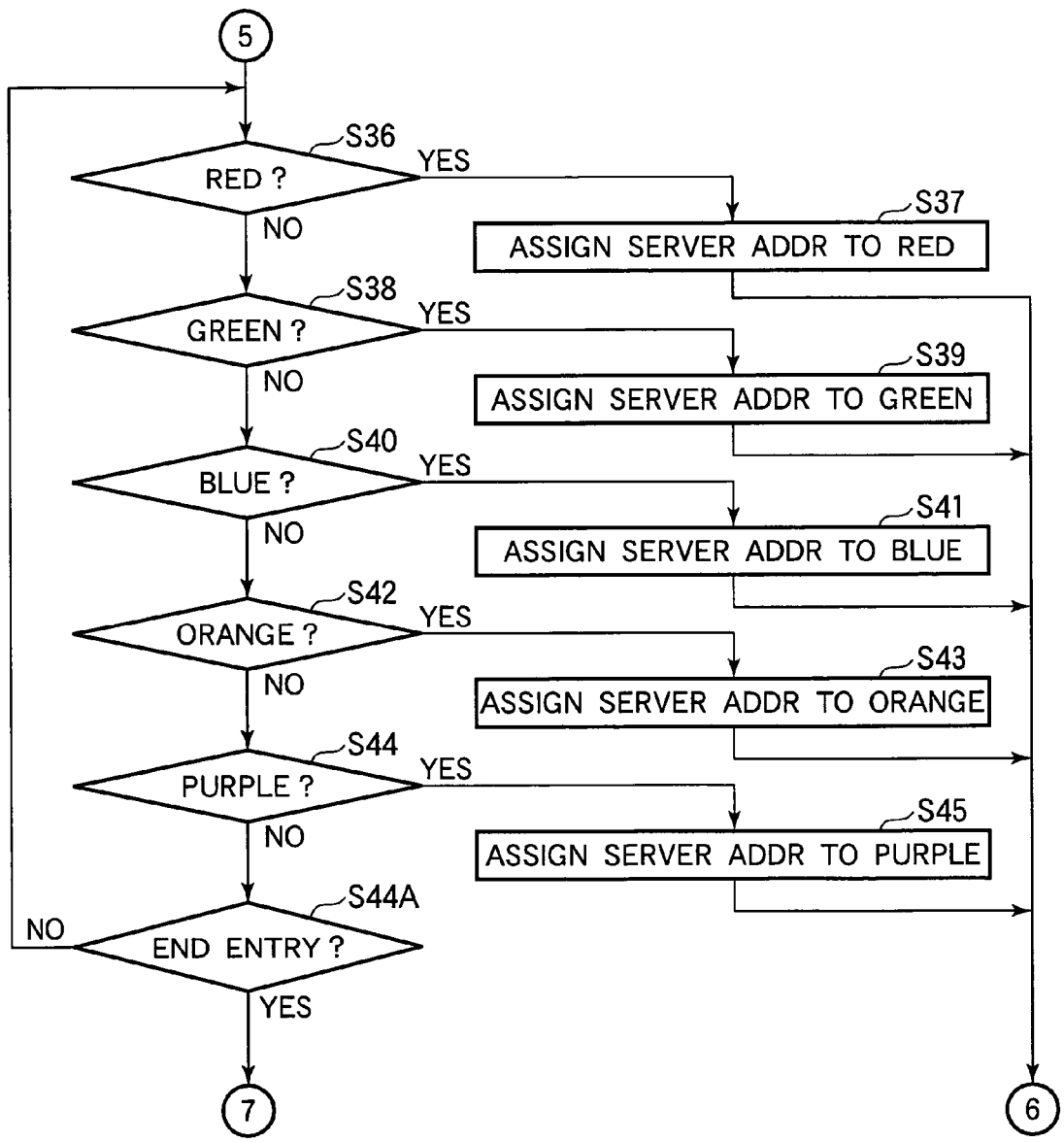

Step S25 in FIG. 5A is a decision step that tests for selection of the color red. Processing proceeds to step S26 if red is selected and to step S27 otherwise.

In step S26, a number of copies is entered for assignment to the color red.

Step S27 is a decision step that tests for selection of the color green. Processing proceeds to step S28 if green is selected and to step S29 otherwise.

In step S28, a number of copies is entered for assignment to the color green.

Step S29 is a decision step that tests for selection of the color blue. Processing proceeds to step S30 if blue is selected and to step S31 otherwise.

In step S30, a number of copies is entered for assignment to the color blue.

Step S31 is a decision step that tests for selection of the color orange. Processing proceeds to step S32 if orange is selected and to step S33 otherwise.

In step S32, a number of copies is entered for assignment to the color orange.

Step S33 is a decision step that tests for selection of the color purple. Processing proceeds to step S34 if purple is selected and to step S33A otherwise.

Step S33A is a termination decision step. Processing ends or returns to step S23 in FIG. 4C according to, for example, the state of a switch in the operation panel.

In step S34, a number of copies is entered for assignment to the color purple.

Following step S26, S28, S30, S32, or S34, processing proceeds to step S46 in FIG. 4A.

Step S35 in FIG. 4A is a decision step that tests for selection of the diamond image pattern. Processing proceeds to step S36 in FIG. 5B if the diamond image pattern is selected and to step S46 otherwise.

Step S36 is a decision step that tests for selection of the color red. Processing proceeds to step S37 if red is selected and to step S38 otherwise.

In step S37, a server address is entered for assignment to the color red.

Step S38 is a decision step that tests for selection of the color green. Processing proceeds to step S39 if green is selected and to step S40 otherwise.

In step S39, a server address is entered for assignment to the color green.

Step S40 is a decision step that tests for selection of the color blue. Processing proceeds to step S41 if blue is selected and to step S42 otherwise.

In step S41, a server address is entered for assignment to the color blue.

Step S42 is a decision step that tests for selection of the color orange. Processing proceeds to step S43 if orange is selected and to step S44 otherwise.

In step S43, a server address is entered for assignment to the color orange.

Step S44 is a decision step that tests for selection of the color purple. Processing proceeds to step S45 if purple is selected and to step S44A otherwise.

Step S44A is a termination decision step. Processing ends or returns to step S36 according to, for example, the state of a switch in the operation panel.

In step S45, a server address is entered for assignment to the color purple.

Following step S37, S39, S41, S43, or S45, processing proceeds to step S46 in FIG. 4A.

Step S46 in FIG. 4A is another termination decision step. Processing ends or returns to step S2 according to, for example, the state of a switch in the operation panel.

The procedure above may also be carried out on a host computer connected to the image input and output apparatus 10, the entered information being transferred to the image input and output apparatus 10 at the end of the procedure.

After information entered by the procedure above has been stored in the output selection table 16, when a document 11 is scanned, the image input and output apparatus 10 operates as follows.

When a sensor (not shown) senses that a document 11 has been set, the color image scanner 12 begins scanning the document 11 from its top or leading edge. If an image pattern 11a is present in the predetermined position near this edge, the image pattern recognition unit 14 recognizes the shape of the image pattern 11a and stores information indicating the shape in the second-memory 19. The comparator controller 17, which constantly monitors the presence of information in the first and second memories 18, 19, compares the information indicating the shape of the image pattern 11a with the shape information in the output selection table 16. If the shape information indicating the shape of the image pattern 11a matches any of the shape information in the output selection table 16, the color recognition unit 13 recognizes the color of the image pattern 11a and stores information indicating the color of the image pattern 11a in the first memory 18, and the comparator controller 17 compares this information with the color information in the output selection table 16.

If the information indicating the shape and color of the image pattern 11a both match information in the output selection table 16, the color image scanner 12 continues scanning the document, obtaining image data that are stored in the image memory 15, and the output unit designated by the shape information is activated for output of the image data as indicated by the color information. If the image pattern 11a has a square shape, the e-mail controller 23 is activated to send the image data to the electronic mail address indicated by the color information. If the image pattern 11a has a star shape, the facsimile controller 24 is activated to send the image data to the facsimile number indicated by the color information. If the image pattern 11a has a triangle shape, the printing unit 22 is activated to print the number of copies of the image data indicated by the color information. If the image pattern 11a has a diamond shape, the filing controller 25 is activated to send the image data to the server indicated by the color information. The operation ends when the sending or printing of the image data is completed.

If either the shape or color of the image pattern 11a does not match any of the information in the output selection table 16, or if no destination has been designated for the shape and color combination of the image pattern 11a, the scanning operation halts, the document 11 is ejected, and the image input and output apparatus 10 is reset to the standby state. A similar halt, ejection, and reset take place if the image pattern recognition unit 14 is unable to recognize the shape of the image pattern 11a, or the color recognition unit 13 is unable to recognize the color of the image pattern 11a.

During this procedure, given that destination information or number-of-copies information has been entered for all combinations of shapes and colors in the output selection table 16, the image input and output apparatus 10 operates as indicated in FIGS. 6A, 6B, and 7-10.

Figure 6A:
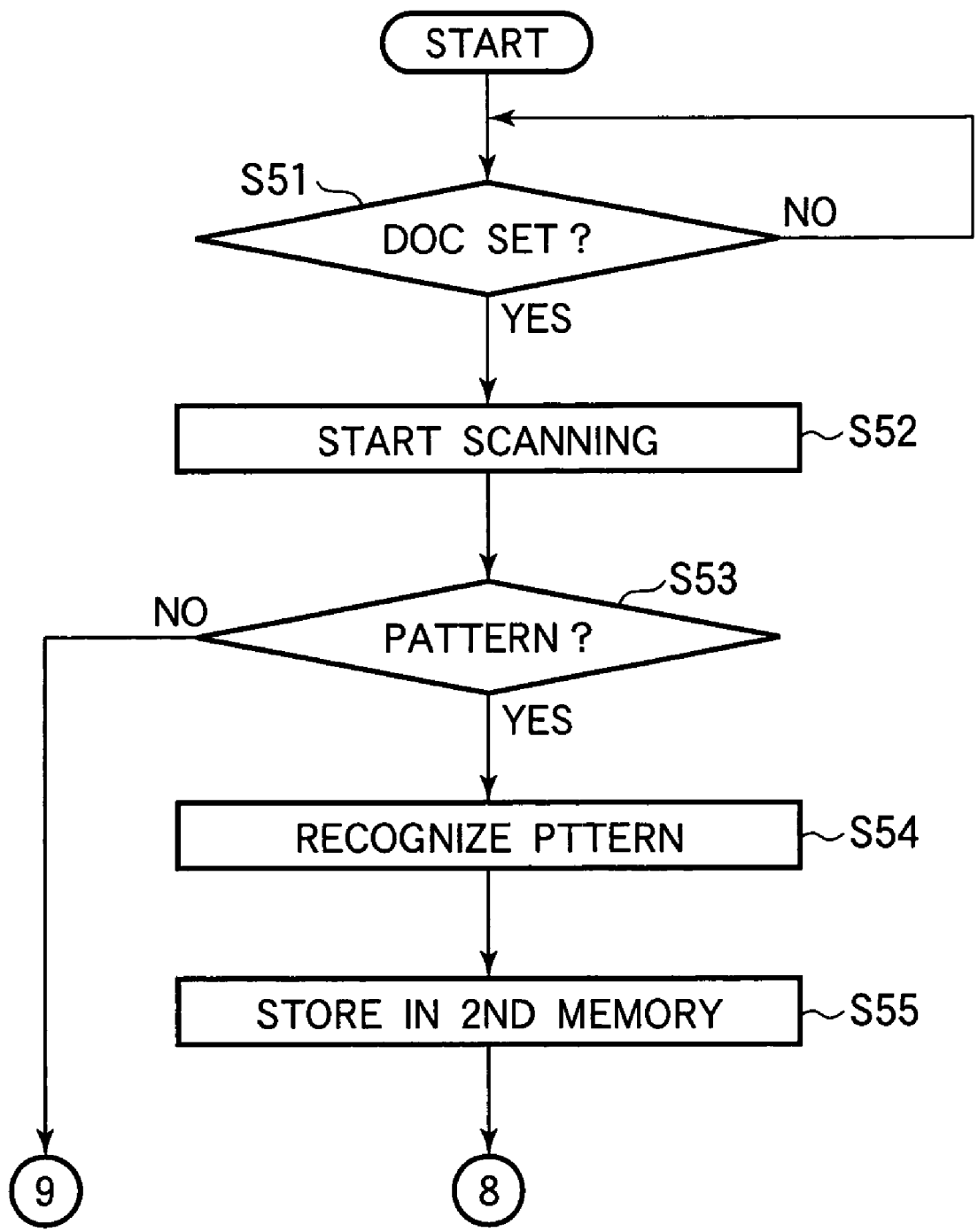
FIGS. 6A, 6B, 7, 8, 9, and 10 are a flowchart illustrating the operation of the first embodiment.

In step S51 in FIG. 6A, the image input and output apparatus 10 waits for a document (doc) to be set in the color image scanner 12.

When a document is set, the color image scanner 12 begins scanning it in step S52.

Step S53 is a decision step that tests for the presence of an image pattern in the predetermined position. Processing proceeds to step S54 if an image pattern is present, and to step S124 in FIG. 6B otherwise.

In step S54, the image pattern recognition unit 14 recognizes the shape of the image pattern.

In step S55, the image pattern recognition unit 14 stores information indicating the shape of the image pattern in the second memory 19.

Figure 6B:
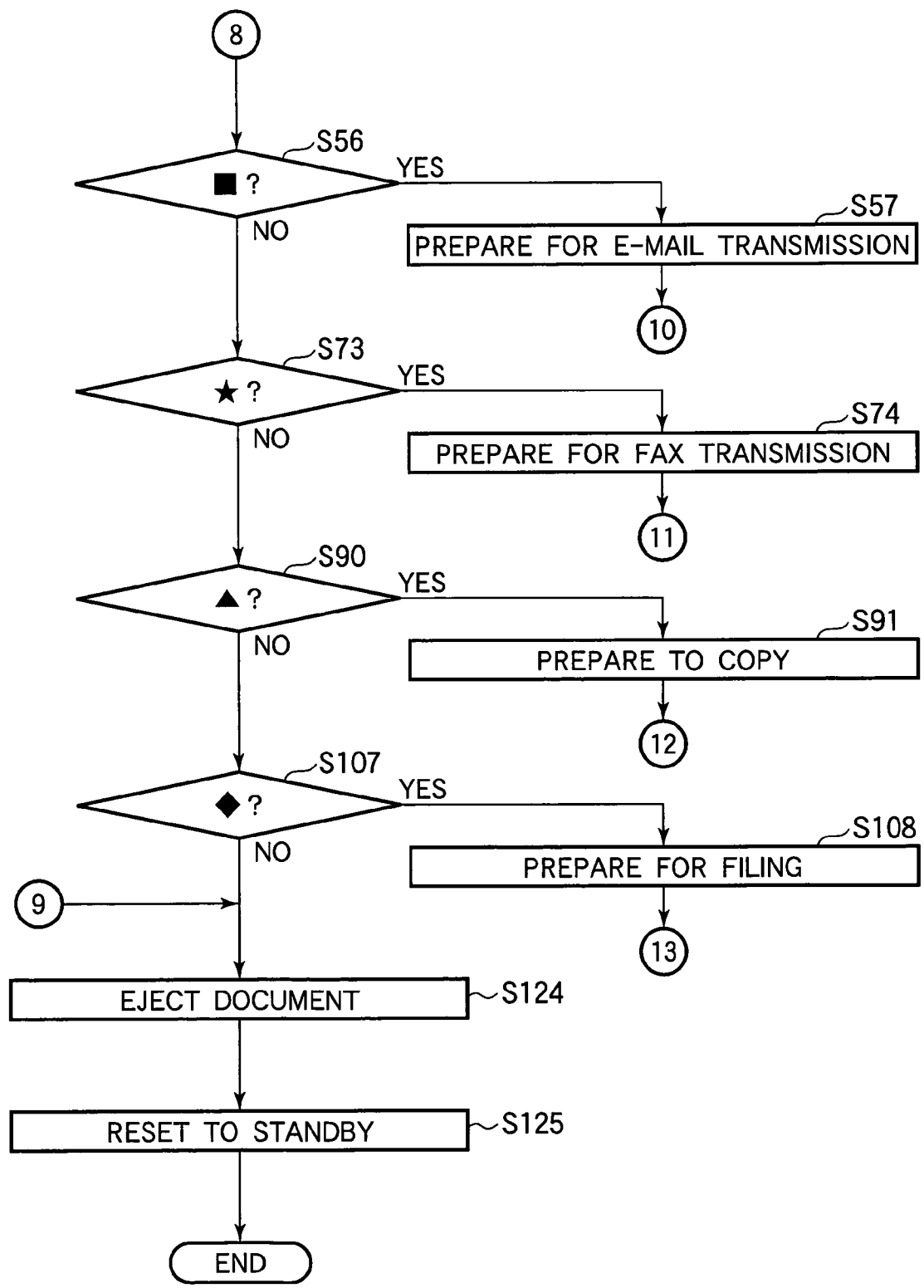

Steps S56, S73, S90, and S107 in FIG. 6B are decision steps that test the shape of the image pattern.

Figure 7:
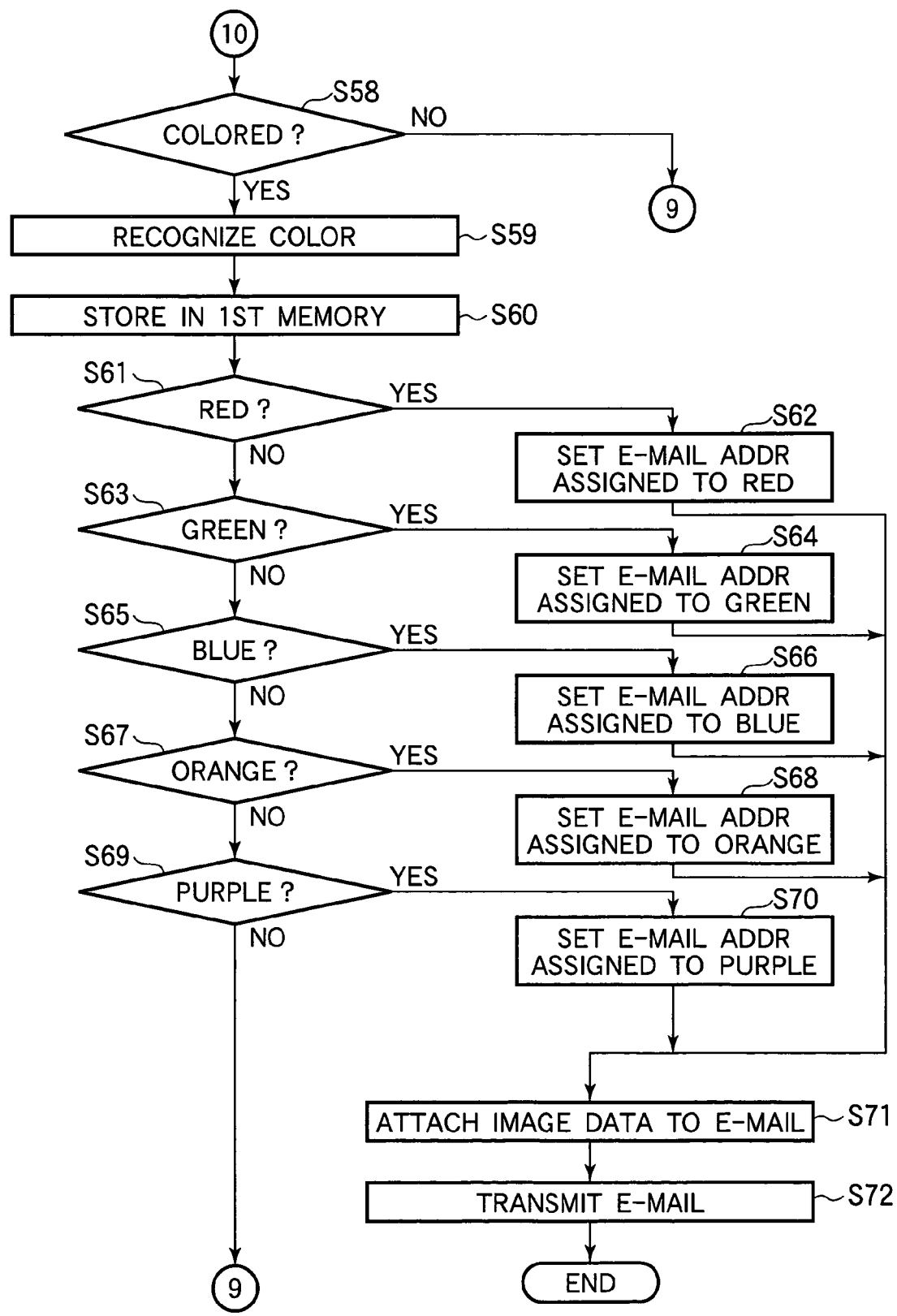

If the image pattern has a square shape ('Yes' in step S56), the e-mail controller 23 is activated in step S57, and processing proceeds to step S58 in FIG. 7.

Figure 8:
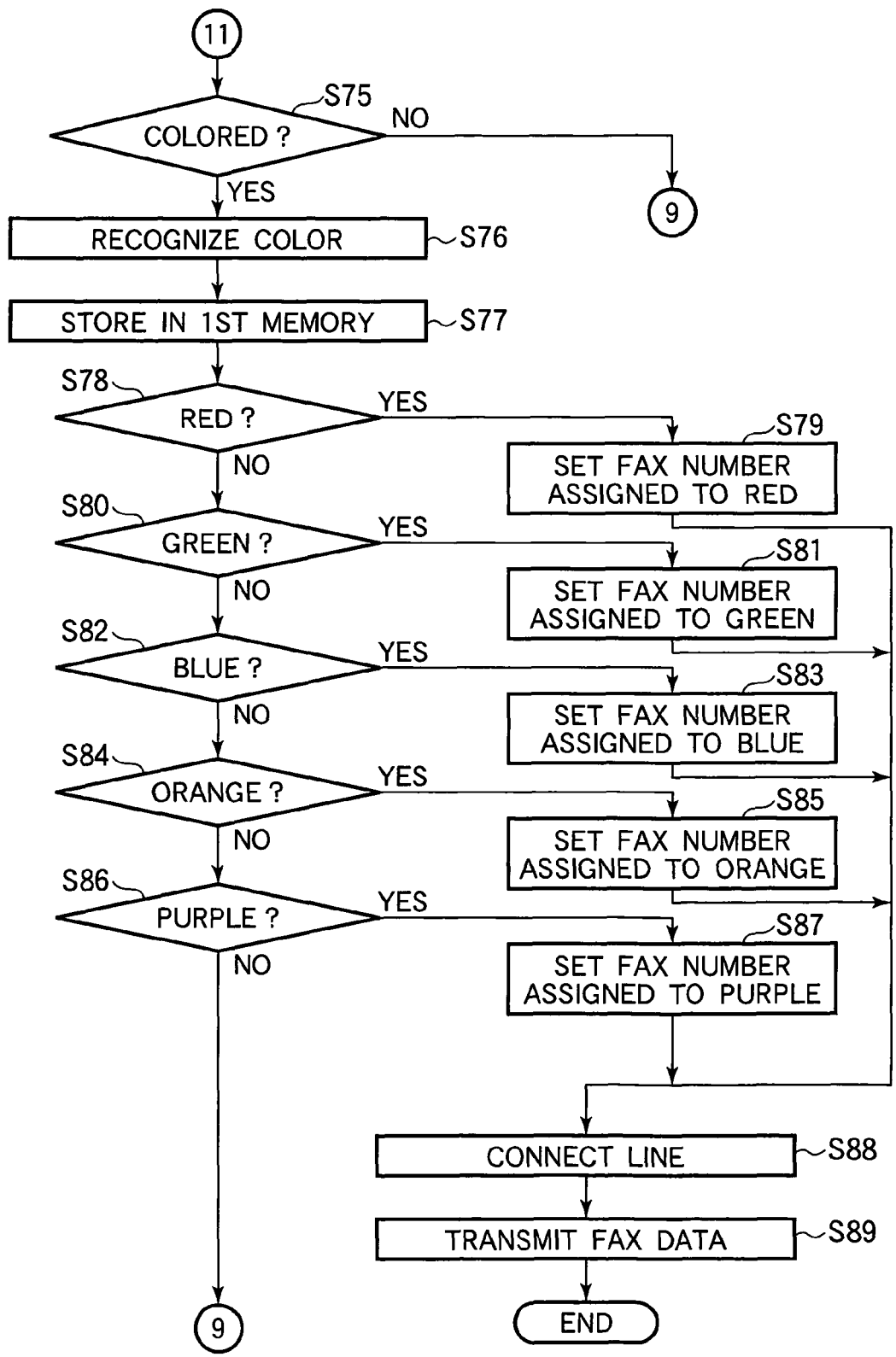

If the image pattern has a star shape ('Yes' in step S73), the facsimile controller 24 is activated in step S74, and processing proceeds to step S75 in FIG. 8.

Figure 9:
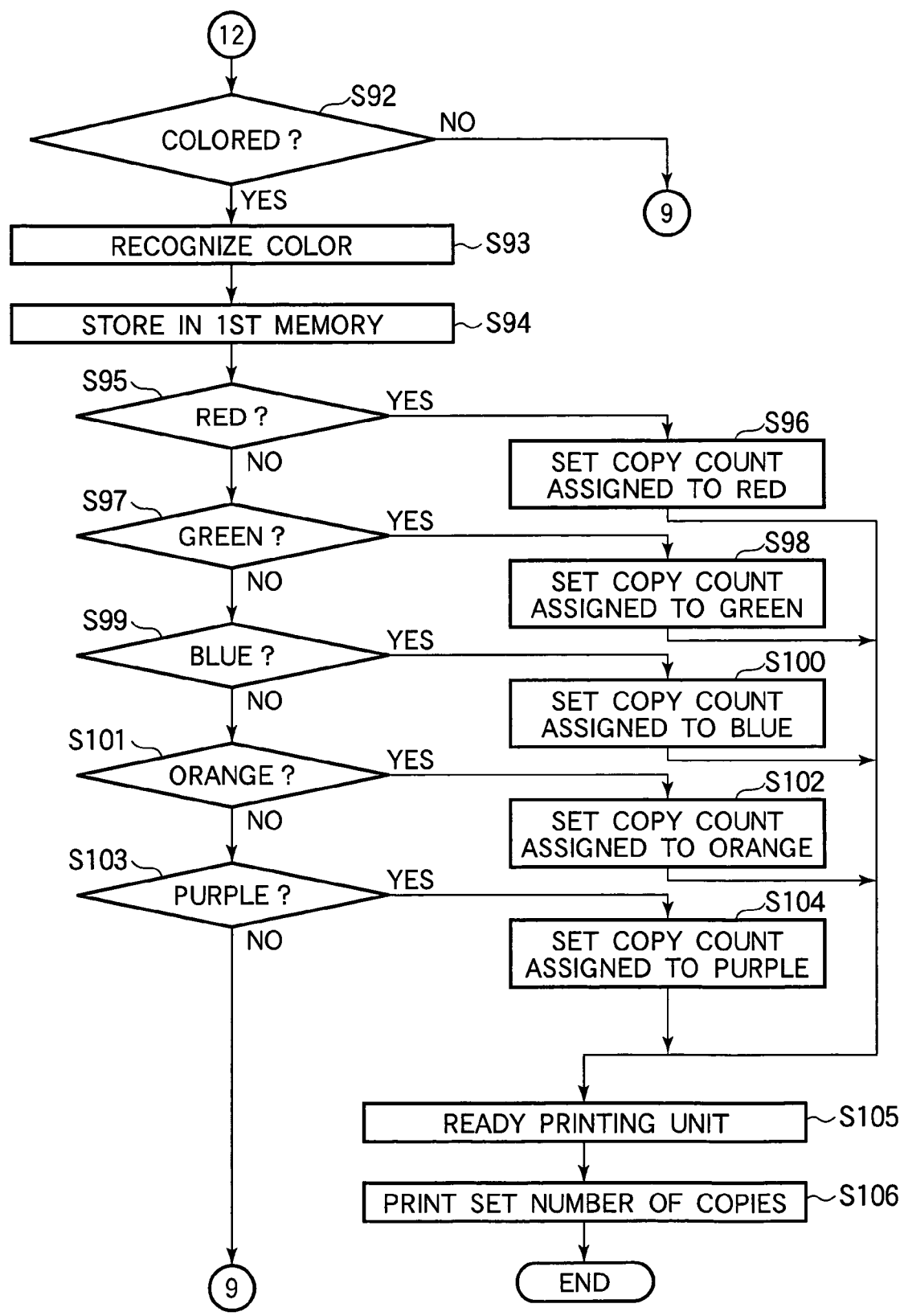

If the image pattern has a triangle shape ('Yes' in step S90), the printing unit 22 is activated in step S91, and processing proceeds to step S92 in FIG. 9.

Figure 10:
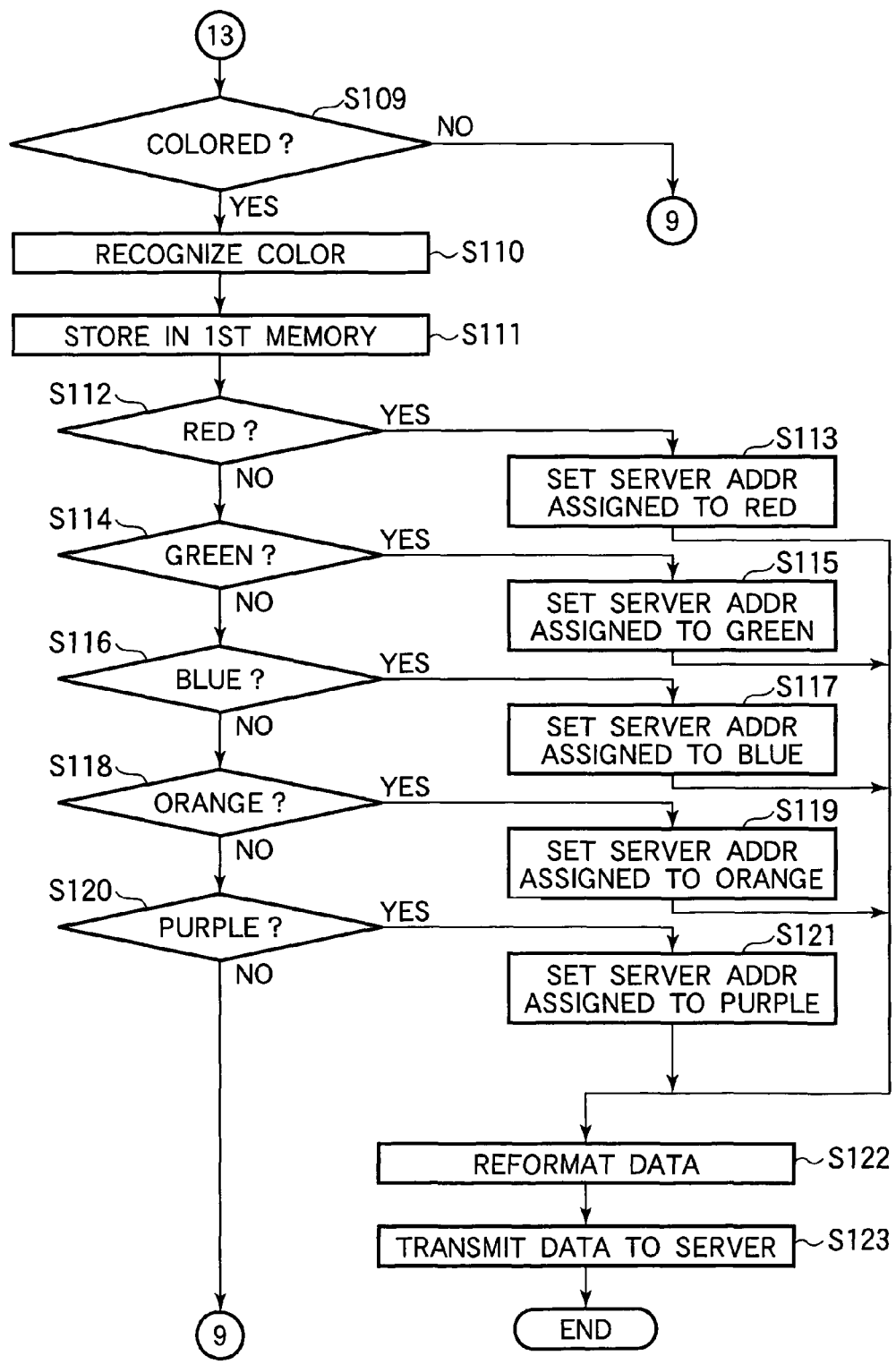

If the image pattern has a diamond shape ('Yes' in step S107), the filing controller 25 is activated in step S108, and processing proceeds to step S109 in FIG. 10.

If the image pattern does not have any of these shapes ('No' in all of steps S56, S73, S90, and S107), processing proceeds to step S124.

In step S124, the document 11 is ejected. Next, in step S125, the image input and output apparatus 10 is reset to the standby state and the procedure ends.

FIG. 7 illustrates the electronic mail part of the procedure.

Step S58 tests whether the image pattern 11a is colored. Processing proceeds to step S59 if the image pattern 11a is colored, and to step S124 in FIG. 6B otherwise.

The color recognition unit 13 recognizes the color of the image pattern 11a in step S59, and stores information indicating the color in the first memory 18 in step S60.

Steps S61, S63, S65, S67, and S69 are decision steps that test the color of the image pattern.

If the image pattern is red ('Yes' in step S61), the electronic mail address (e-mail addr) assigned to the color red is set in the e-mail controller 23 in step S62, and processing proceeds to step S71.

If the image pattern is green ('Yes' in step S63), the electronic mail address assigned to the color green is set in the e-mail controller 23 in step S64, and processing proceeds to step S71.

If the image pattern is blue ('Yes' in step S65), the electronic mail address assigned to the color blue is set in the e-mail controller 23 in step S66, and processing proceeds to step S71.

If the image pattern is orange ('Yes' in step S67), the electronic mail address assigned to the color orange is set in the e-mail controller 23 in step S68, and processing proceeds to step S71.

If the image pattern is purple ('Yes' in step S69), the electronic mail address assigned to the color purple is set in the e-mail controller 23 in step S70, and processing proceeds to step S71.

If the image pattern does not have any of these colors ('No' in all of steps S61, S63, S65, S67 and S69), processing proceeds to step S124 in FIG. 6B.

In step S71 in FIG. 7, the image data obtained by the color image scanner 12 are attached as an image data file to an electronic mail message, which is transmitted to the address set in the e-mail controller 23 in step S72. The procedure then ends.

FIG. 8 illustrates the facsimile transmission part of the procedure.

Step S75 in FIG. 8 tests whether the image pattern 11a is colored. Processing proceeds to step S76 if the image pattern 11a is colored, and to step S124 in FIG. 6B otherwise.

The color recognition unit 13 recognizes the color of the image pattern 11a in step S76, and stores information indicating the color in the first memory 18 in step S77.

Steps S78, S80, S82, S84, and S86 are decision steps that test the color of the image pattern.

If the image pattern is red ('Yes' in step S78), the facsimile number assigned to the color red is set in the facsimile controller 24 in step S79, and processing proceeds to step S88.

If the image pattern is green ('Yes' in step S80), the facsimile number assigned to the color green is set in the facsimile controller 24 in step S81, and processing proceeds to step S88.

If the image pattern is blue ('Yes' in step S82), the facsimile number assigned to the color blue is set in the facsimile controller 24 in step S83, and processing proceeds to step S88.

If the image pattern is orange ('Yes' in step S84), the facsimile number assigned to the color orange is set in the facsimile controller 24 in step S85, and processing proceeds to step S88.

If the image pattern is purple ('Yes' in step S86), the facsimile number assigned to the color purple is set in the facsimile controller 24 in step S87, and processing proceeds to step S88.

If the image pattern does not have any of these colors ('No' decisions in all of steps S78, S80, S82, S84 and S86), processing proceeds to step S124 in FIG. 6B.

In step S88 in FIG. 8, a facsimile call is originated to the facsimile number set in the facsimile controller 24. The color image scanner 12 continues to scan the document 11, and the image data obtained by the color image scanner 12 are transmitted as facsimile data in step S89. The procedure then ends.

FIG. 9 illustrates the copy printing part of the procedure.

Step S92 in FIG. 9 tests whether the image pattern 11a is colored. Processing proceeds to step S93 if the image pattern 11a is colored, and to step S124 in FIG. 6B otherwise.

The color recognition unit 13 recognizes the color of the image pattern 11a in step S93, and stores information indicating the color in the first memory 18 in step S94.

Steps S95, S97, S99, S101, and S103 are decision steps that test the color of the image pattern.

If the image pattern is red ('Yes' in step S95), the number of copies assigned to the color red is set in the printing unit 22 in step S96, and processing proceeds to step S105.

If the image pattern is green ('Yes' in step S97), the number of copies assigned to the color green is set in the printing unit 22 in step S98, and processing proceeds to step S105.

If the image pattern is blue ('Yes' in step S99), the number of copies assigned to the color blue is set in the printing unit 22 in step S100, and processing proceeds to step S105.

If the image pattern is orange ('Yes' in step S101), the number of copies assigned to the color orange is set in the printing unit 22 in step S102, and processing proceeds to step S105.

If the image pattern is purple ('Yes' in step S103), the number of copies assigned to the color purple is set in the facsimile controller 24 in step S104, and processing proceeds to step S105.

If the image pattern does not have any of these colors ('No' decisions in all of steps S95, S97, S99, S101 and S103), processing proceeds to step S124 in FIG. 6B.

In step S105 in FIG. 9, the printing unit 22 is readied for printing as the color image scanner 12 continues to scan the document 11. The printing unit 22 prints the set number of copies of the image data in step S106, after which the procedure ends.

FIG. 10 illustrates the filing part of the procedure.

Step S109 tests whether the image pattern 11a is colored. Processing proceeds to step S110 if the image pattern 11a is colored, and to step S124 in FIG. 6B otherwise.

The color recognition unit 13 recognizes the color of the image pattern 11a in step S110, and stores information indicating the color in the first memory 18 in step S111.

Steps S112, S114, S116, S118, and S120 are decision steps that test the color of the image pattern.

If the image pattern is red ('Yes' in step S112), the server address assigned to the color red is set in the filing controller 25 in step S113, and processing proceeds to step S122.

If the image pattern is green ('Yes' in step S114), the server address assigned to the color green is set in the filing controller 25 in step S115, and processing proceeds to step S122.

If the image pattern is blue ('Yes' in step S116), the server address assigned to the color blue is set in the filing controller 25 in step S117, and processing proceeds to step S122.

If the image pattern is orange ('Yes' in step S118), the server address assigned to the color orange is set in the filing controller 25 in step S119, and processing proceeds to step S122.

If the image pattern is purple ('Yes' in step S120), the server address assigned to the purple orange is set in the filing controller 25 in step S121, and processing proceeds to step S122.

If the image pattern does not have any of these colors ('No' in all of steps S112, S114, S116, S118 and S120), processing proceeds to step S124 in FIG. 6B.

In step S122 in FIG. 10, the image data obtained by the color image scanner 12 and stored in the image memory 15 are reformatted for filing. In step S123, the filing controller 25 accesses the designated server through a communication network to which both the server and the image input and output apparatus 10 are connected, and transmits the reformatted image data to be stored in the server. The procedure then ends.

The first embodiment enables document image data to be sent to a designated destination without requiring the electronic mail address, facsimile number, or server address of the destination to be recognizably printed in a predetermined position on the document. Instead, the destination is encoded in a simple colored image pattern, which can be easily added to a document and easily recognized by the image input and output apparatus, even if the colored image pattern is overlaid on other printing.

Besides being easy to add and recognize, the image pattern of the present invention has the advantage of protecting the confidentiality of the destination, since a third party seeing the image pattern will not be able to learn the electronic mail address, facsimile number, or server address from it.

In addition, when the image input and output apparatus 10 is used as a copier, the image pattern can be used to indicate that the document is to be copied, and the color of the image pattern can be used to designate the desired number of copies.

In a variation of the first embodiment, only the color of the image pattern is significant. The operator selects electronic mail transmission, facsimile transmission, filing, or copying by a manual operation on the operation panel, and the color of the image pattern designates the destination or number of copies. Alternatively, the image input and output apparatus 10 may be a facsimile machine and the color of the image pattern may always indicate a facsimile number.

Second Embodiment

The configuration of the image input and output apparatus 10 and the preliminary procedure in the second embodiment are the same as in the first embodiment. The operation of the image input and output apparatus 10 in the second embodiment is almost the same as in the first embodiment. The differences will be pointed out below.

When a sensor (not shown) senses that a document 11 has been set, the color image scanner 12 begins scanning the document 11 from its top or leading edge. Depending on the shape of the image pattern 11a, the printing unit 22, the e-mail controller 23, the facsimile controller 24, or the filing controller 25 is activated as in the first embodiment. If the color of the image pattern 11a can be recognized and matches information stored in the output selection table 16, the image input and output apparatus 10 operates according to this information as in the first embodiment.

If the shape of the image pattern 11a cannot be recognized or does not match any of the information in the output selection table 16, however, then instead of being reset to the standby state as in the first embodiment, the image input and output apparatus 10 displays a message prompting the operator to use the operation panel to select whether to send the image data to a specified electronic mail address, facsimile number, or file server address or to print a specified number of copies.

If the shape of the image pattern 11a can be recognized but its color cannot be recognized or does not match any of the information in the output selection table 16, then instead of being reset as in the first embodiment, the image input and output apparatus 10 prompts the operator to enter the necessary destination information or number-of-copies information from the operation panel. When the operator enters the necessary information, the image input and output apparatus 10 operates according to the entered information.

The entire operation is illustrated by the flowcharts in FIGS. 11A, 11B, and 12-15.

Figure 11A:
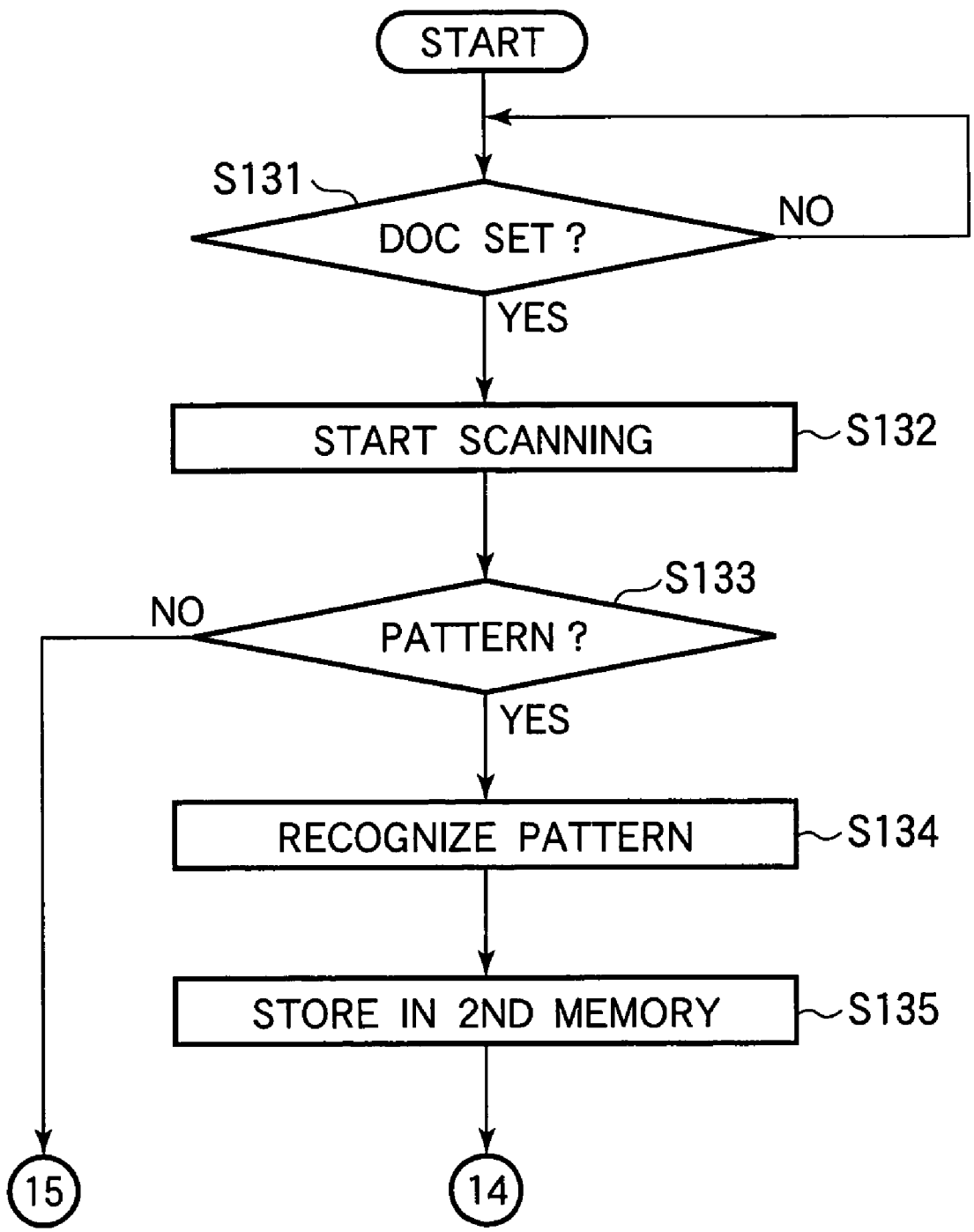
FIGS. 11A, 11B, 12, 13, 14, and 15 are a flowchart illustrating the operation of the second embodiment.

In step S131 in FIG. 11A, the image input and output apparatus 10 waits for a document to be set in the color image scanner 12.

When a document is set, the color image scanner 12 begins scanning it in step S132.

Step S133 is a decision step that tests for the presence of an image pattern near the leading edge. Processing proceeds to step S134 if an image pattern is present, and to step S212 in FIG. 11B otherwise.

In step S134, the image pattern recognition unit 14 recognizes the shape of the image pattern.

In step S135, the image pattern recognition unit 14 stores information indicating the shape of the image pattern in the second memory 19.

Figure 11B:
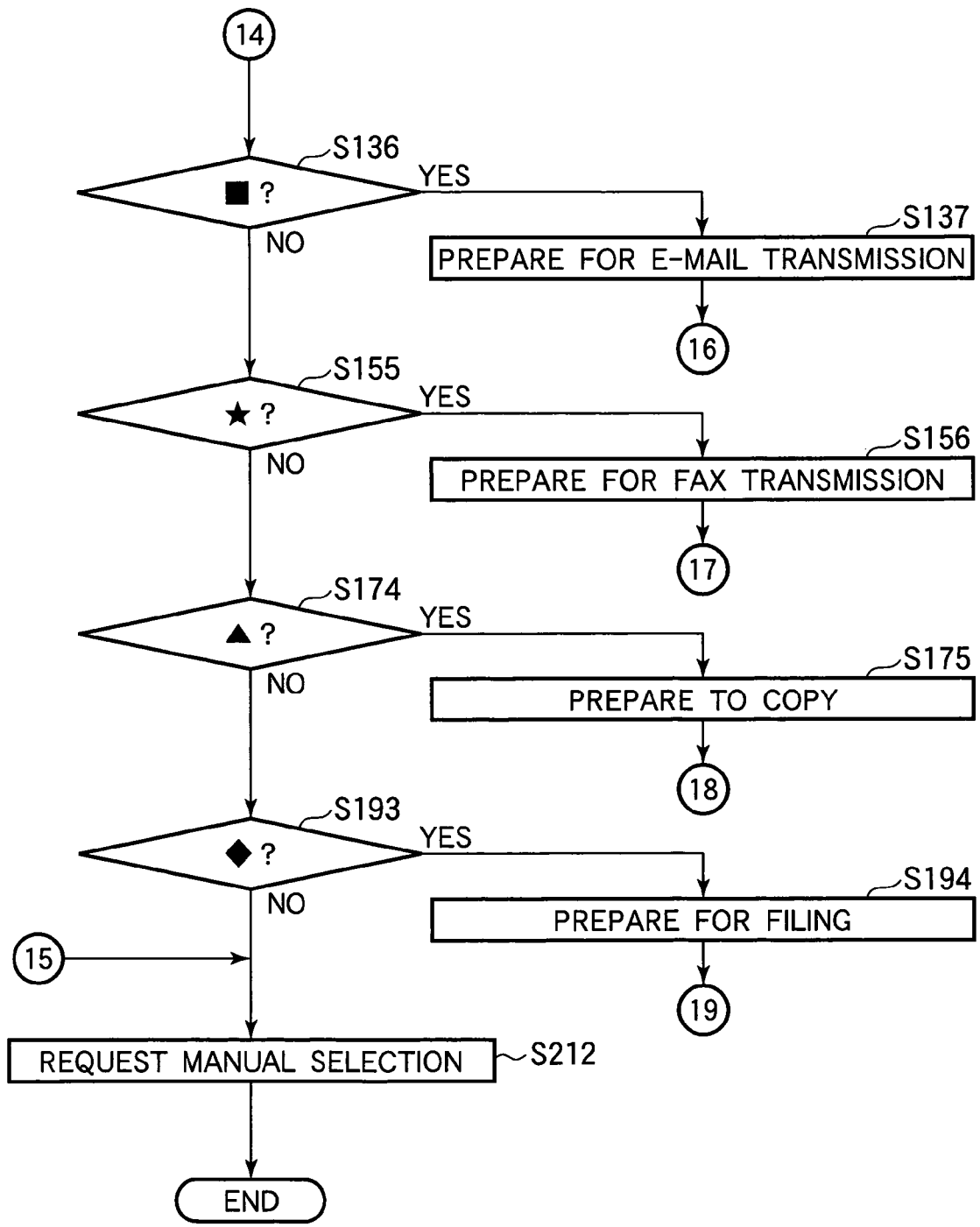

Steps S136, S155, S174, and S193 in FIG. 11B are decision steps that test the shape of the image pattern.

Figure 12:
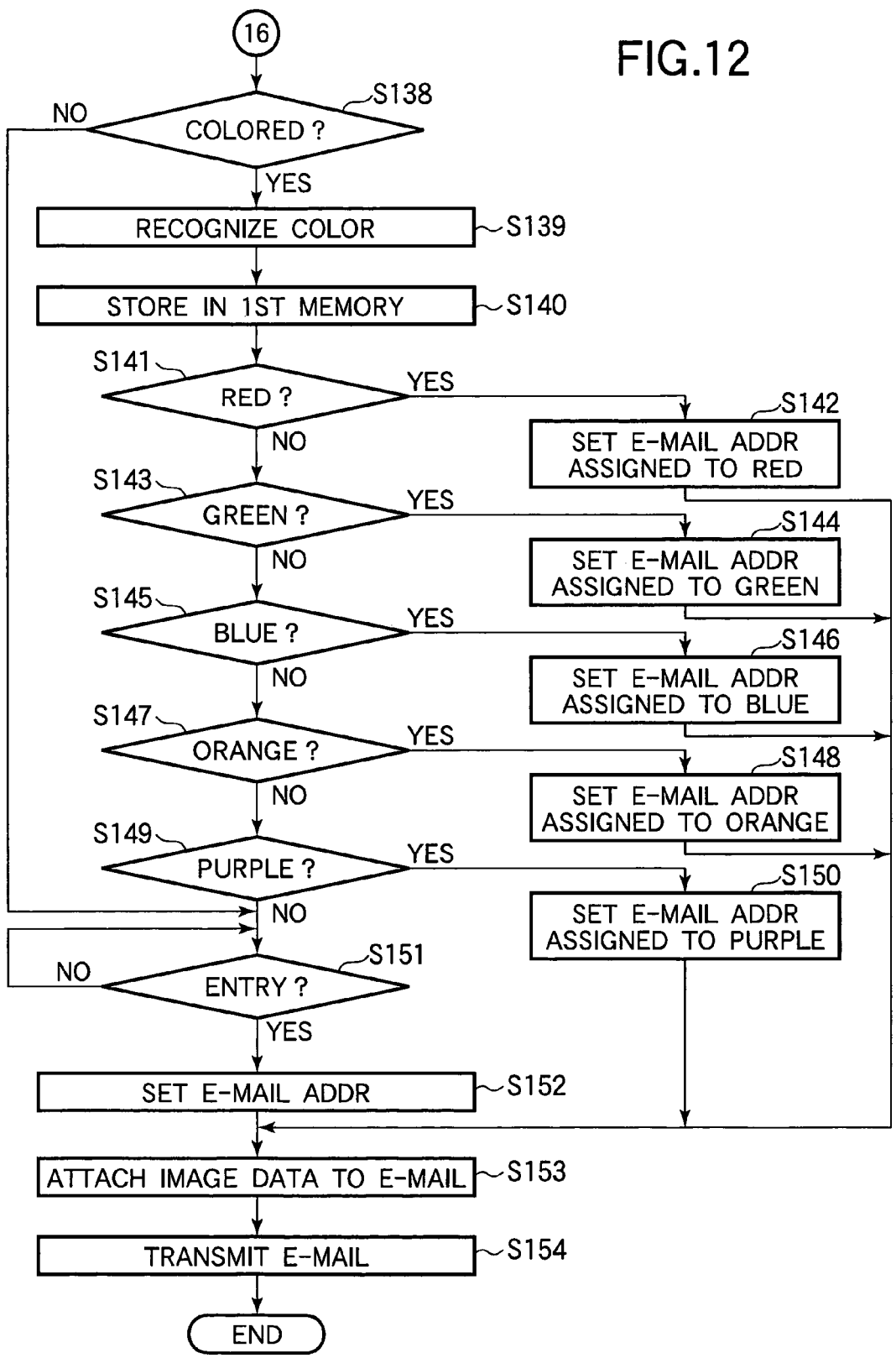

If the image pattern has a square shape ('Yes' in step S136), the e-mail controller 23 is activated in step S137, and processing proceeds to step S138 in FIG. 12.

Figure 13:
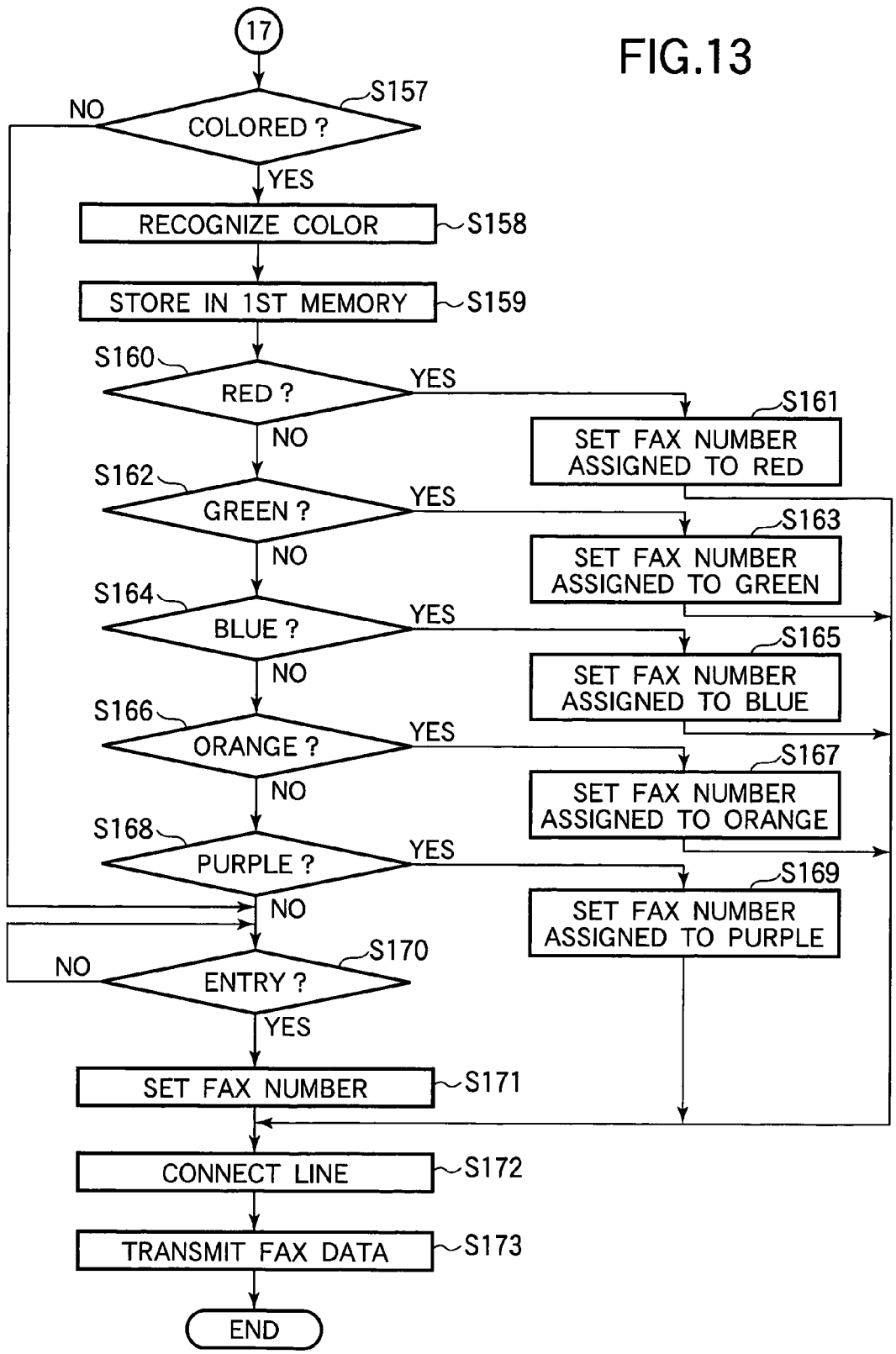

If the image pattern has a star shape ('Yes' in step S155), the facsimile controller 24 is activated in step S156, and processing proceeds to step S157 in FIG. 13.

Figure 14:
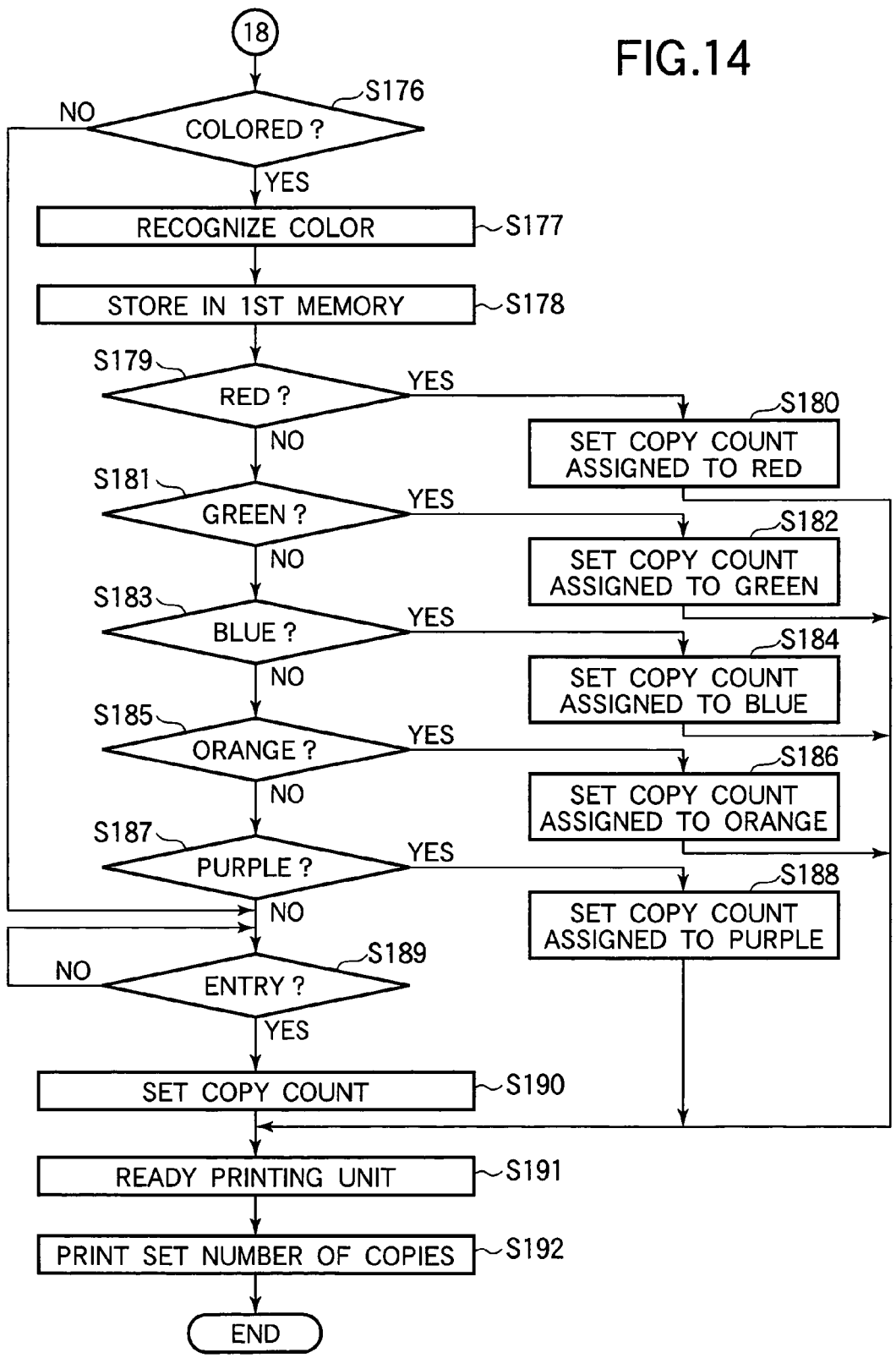

If the image pattern has a triangle shape ('Yes' in step S174), the printing unit 22 is activated in step S175, and processing proceeds to step S176 in FIG. 14.

Figure 15:
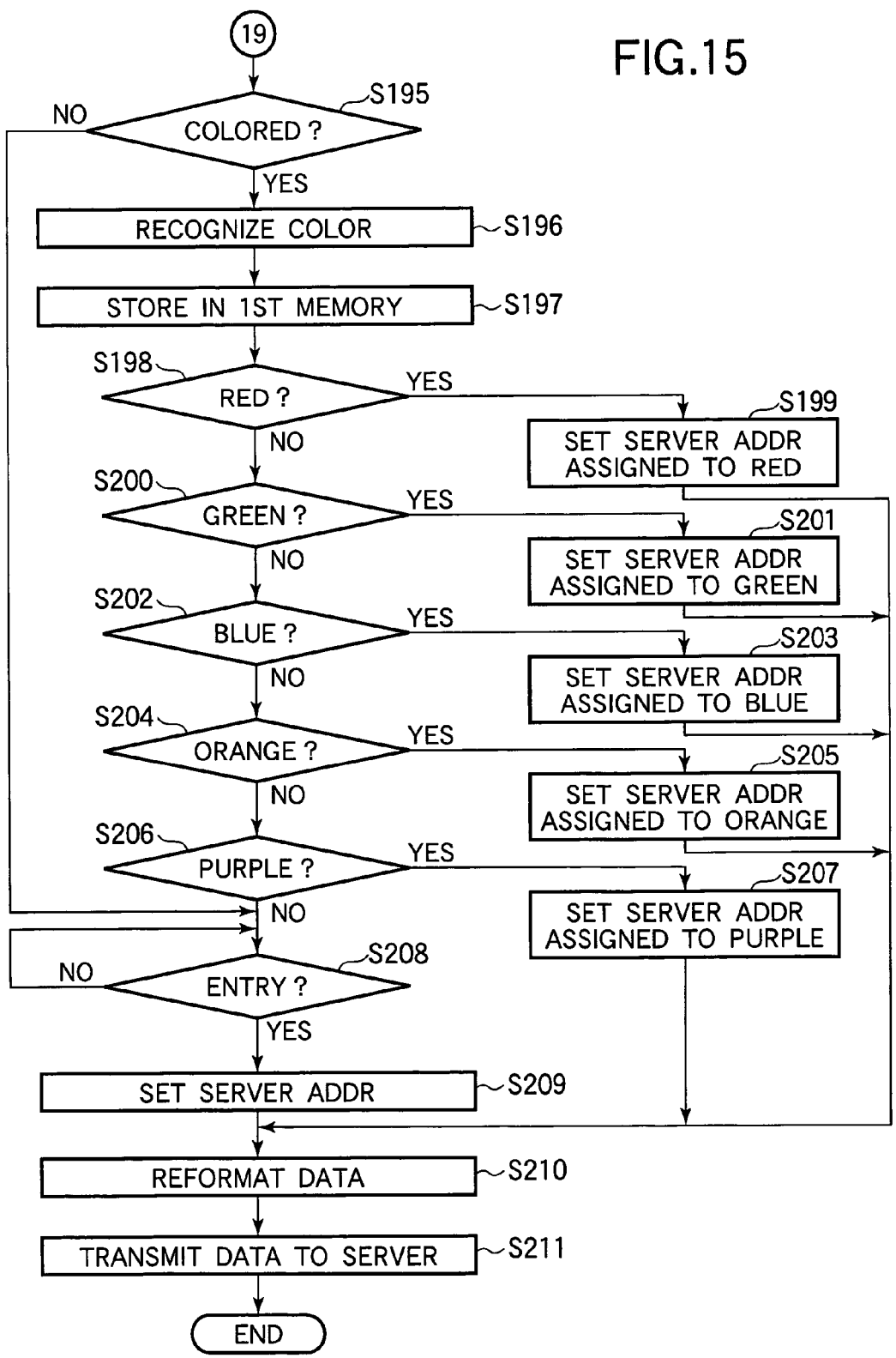

If the image pattern has a diamond shape ('Yes' in step S193), the filing controller 25 is activated in step S194, and processing proceeds to step S195 in FIG. 15.

If the image pattern does not have any of these shapes ('No' in all of steps S136, S155, S174, and S193 in FIG. 11B), processing proceeds to step S212 in FIG. 11B.

In step S212, the image input and output apparatus 10 requests manual selection of a function and terminates the procedure.

FIG. 12 illustrates the electronic mail part of the procedure.

Step S138 tests whether the image pattern 11a is colored. Processing proceeds to step S139 if the image pattern 11a is colored, and to step S151 otherwise.

The color recognition unit 13 recognizes the color of the image pattern 11a in step S139, and stores information indicating the color in the first memory 18 in step S140.

Steps S141, S143, S145, S147, and S149 are decision steps that test the color of the image pattern.

If the image pattern is red ('Yes' in step S141), the electronic mail address assigned to the color red is set in the e-mail controller 23 in step S142, and processing proceeds to step S153.

If the image pattern is green ('Yes' in step S143), the electronic mail address assigned to the color green is set in the e-mail controller 23 in step S144, and processing proceeds to step S153.

If the image pattern is blue ('Yes' in step S145), the electronic mail address assigned to the color blue is set in the e-mail controller 23 in step S146, and processing proceeds to step S153.

If the image pattern is orange ('Yes' in step S147), the electronic mail address assigned to the color orange is set in the e-mail controller 23 in step S148, and processing proceeds to step S153.

If the image pattern is purple ('Yes' in step S149), the electronic mail address assigned to the color purple is set in the e-mail controller 23 in step S150, and processing proceeds to step S153.

If the image pattern does not have any of these colors ('No' decisions in all of steps S141, S143, S145, S147, and S149), then in step S151, the image input and output apparatus 10 waits for the operator to enter an electronic mail address. When an electronic mail address is entered, the electronic mail address is set in the e-mail controller 23 in step S152, and processing proceeds to step S153.

In step S153, the image data are attached as an image data file to an electronic mail message, which is transmitted to the address set in the e-mail controller 23 in step S154. The procedure then ends.

FIG. 13 illustrates the facsimile transmission part of the procedure.

Step S157 tests whether the image pattern 11a is colored. Processing proceeds to step S158 if the image pattern 11a is colored, and to step S170 otherwise.

The color recognition unit 13 recognizes the color of the image pattern 11a in step S158, and stores information indicating the color in the first memory 18 in step S159.

Steps S160, S162, S164, S166, and S168 are decision steps that test the color of the image pattern.

If the image pattern is red ('Yes' in step S160), the facsimile number assigned to the color red is set in the facsimile controller 24 in step S161, and processing proceeds to step S172.

If the image pattern is green ('Yes' in step S162), the facsimile number assigned to the color green is set in the facsimile controller 24 in step S163, and processing proceeds to step S172.

If the image pattern is blue ('Yes' in step S164), the facsimile number assigned to the color blue is set in the facsimile controller 24 in step S165, and processing proceeds to step S172.

If the image pattern is orange ('Yes' in step S166), the facsimile number assigned to the color orange is set in the facsimile controller 24 in step S167, and processing proceeds to step S172.

If the image pattern is purple ('Yes' in step S168), the facsimile number assigned to the color purple is set in the facsimile controller 24 in step S169, and processing proceeds to step S172.

If the image pattern does not have any of these colors ('No' decisions in all of steps S160, S162, S164, S166, and S168), then in step S170, the image input and output apparatus 10 waits for the operator to enter a facsimile number. When a facsimile number is entered, the facsimile number is set in the facsimile controller 24 in step S171, and processing proceeds to step S172.

In step S172, a facsimile call is originated to the facsimile number set in the facsimile controller 24. The image data are transmitted as facsimile data in step S173. The procedure then ends.

FIG. 14 illustrates the copy printing part of the procedure.

Step S176 tests whether the image pattern 11a is colored. Processing proceeds to step S177 if the image pattern 11a is colored, and to step S189 otherwise.

The color recognition unit 13 recognizes the color of the image pattern 11a in step S177, and stores information indicating the color in the first memory 18 in step S178.

Steps S179, S181, S183, S185, and S187 are decision steps that test the color of the image pattern.

If the image pattern is red ('Yes' in step S179), the number of copies assigned to the color red is set in the printing unit 22 in step S180, and processing proceeds to step S191.

If the image pattern is green ('Yes' in step S181), the number of copies assigned to the color green is set in the printing unit 22 in step S182, and processing proceeds to step S191.

If the image pattern is blue ('Yes' in step S183), the number of copies assigned to the color blue is set in the printing unit 22 in step S184, and processing proceeds to step S191.

If the image pattern is orange ('Yes' in step S185), the number of copies assigned to the color orange is set in the printing unit 22 in step S186, and processing proceeds to step S191.

If the image pattern is purple ('Yes' in step S187), the number of copies assigned to the color purple is set in the printing unit 22 in step S188, and processing proceeds to step S191.

If the image pattern does not have any of these colors ('No' decisions in all of steps S179, S181, S183, S185, and S187), then in step S189, the image input and output apparatus 10 waits for the operator to enter a number of copies. When a number of copies is entered, the number of copies is set in the printing unit 22 in step S190, and processing proceeds to step S191.

In step S191, the printing unit 22 is readied for printing. The printing unit 22 prints the set number of copies of the image data in step S192, after which the procedure ends.

FIG. 15 illustrates the filing part of the procedure.

Step S195 tests whether the image pattern 11a is colored. Processing proceeds to step S196 if the image pattern 11a is colored, and to step S208 otherwise.

The color recognition unit 13 recognizes the color of the image pattern 11a in step S196, and stores information indicating the color in the first memory 18 in step S197.

Steps S198, S200, S202, S204, and S206 are decision steps that test the color of the image pattern.

If the image pattern is red ('Yes' in step S198), the server address assigned to the color red is set in the filing controller 25 in step S199, and processing proceeds to step S210.

If the image pattern is green ('Yes' in step S200), the server address assigned to the color green is set in the filing controller 25 in step S201, and processing proceeds to step S210.

If the image pattern is blue ('Yes' in step S202), the server address assigned to the color blue is set in the filing controller 25 in step S203, and processing proceeds to step S210.

If the image pattern is orange ('Yes' in step S204), the server address assigned to the color orange is set in the filing controller 25 in step S205, and processing proceeds to step S210.

If the image pattern is purple ('Yes' in step S206), the server address assigned to the color purple is set in the filing controller 25 in step S207, and processing proceeds to step S210.

If the image pattern does not have any of these colors ('No' in all of steps S198, S200, S202, S204, and S206), processing proceeds to step S208.

The image input and output apparatus 10 waits for the operator to enter a server address in step S208. When a server address is entered, the server address is set in the filing controller 25 in step S209, and processing proceeds to step S210.

In step S210, the image data are reformatted for filing. In step S211, the filing controller 25 accesses the designated server and transmits the reformatted image data to be stored in the server. The procedure then ends.

The second embodiment has the same advantages as the first embodiment. In addition, if the shape or color of the image pattern 11a cannot be recognized in the second embodiment, the image input and output apparatus 10 is not reset to the standby state but prompts the operator to enter an instruction. In this case, the second embodiment enables document image data to be transmitted or copied more quickly than the first embodiment.

Third Embodiment

Figure 16:
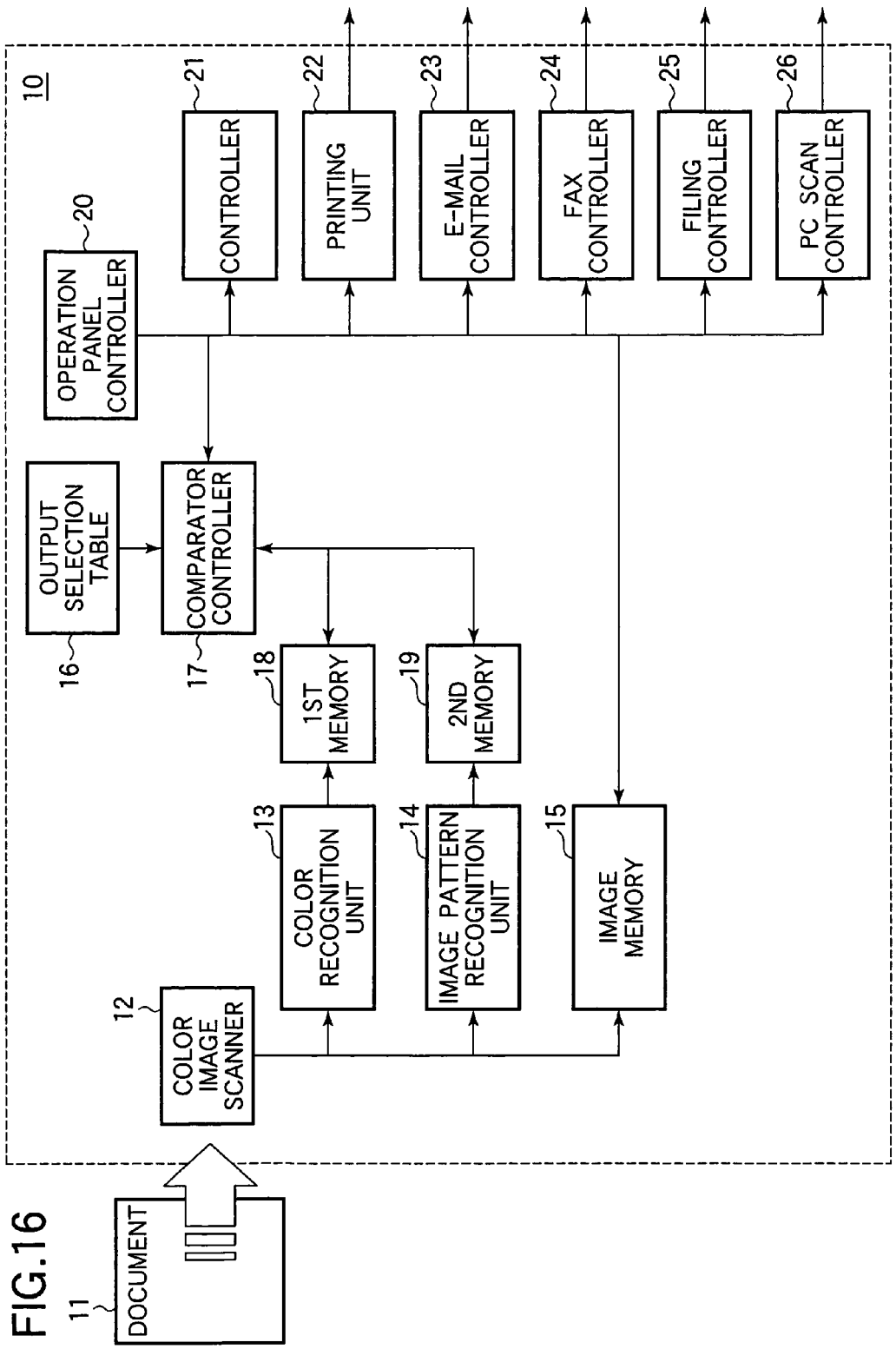
FIG. 16 is a block diagram of an image input and output apparatus according to a third embodiment of the invention.

Referring to FIG. 16, the image input and output apparatus 10 in the third embodiment has a PC scan controller 26 for transferring the image data obtained by the color image scanner 12 as scan data to a personal computer (PC, not shown) and saving the data in a specified folder in the personal computer. The personal computer may be a local personal computer connected directly to the image input and output apparatus 10, or a personal computer connected to the image input and output apparatus 10 through a local area network (LAN). The other components in FIG. 16 are the same as in the first embodiment.

Next, the operation of the image input and output apparatus 10 will be described.

As a preliminary procedure, the operator assigns meanings to the shapes of colored image patterns by entering facsimile numbers, electronic mail addresses, server addresses, numbers of copies, and PC folder names through the operation panel and operation panel controller 20. FIG. 17 shows an example of the type of information that the operator can enter. The entry procedure is as follows.

First, the operator presses a button or makes a menu selection on the controller 21 to begin the entry procedure. The operator is then offered a selection of colors and a selection of image patterns for each color.

To enter an electronic mail address, the operator selects the color red. The operator can then enter an electronic mail address to be assigned to one of the predetermined shapes (square, star, triangle, diamond, and inverted triangle). In this example, up to five different electronic mail addresses can be entered.

To enter a facsimile number, the operator selects the color yellow. The operator can then enter a facsimile number to be assigned to one of the predetermined shapes.

For control of copy printing operations, the operator selects the color green and enters a number of copies to be assigned to one of the predetermined shapes.

For control of filing operations, the operator selects the color blue and enters a server address to be assigned to one of the predetermined shapes.

For control of saving, the operator selects the color purple and enters a (preliminary) PC folder name to be assigned to one of the predetermined shapes.

During this procedure, the operator can reselect the various colors, check and correct the entered information, and enter additional information as necessary. At the end of the procedure, the operator presses a button or makes a menu selection to indicate that entry of information is completed and the entered information is stored in the comparator controller 17.

During this procedure, the image input and output apparatus 10 operates as indicated in FIGS. 18A, 18B, 18C, 19A, 19B and 19C.

Figure 18A:
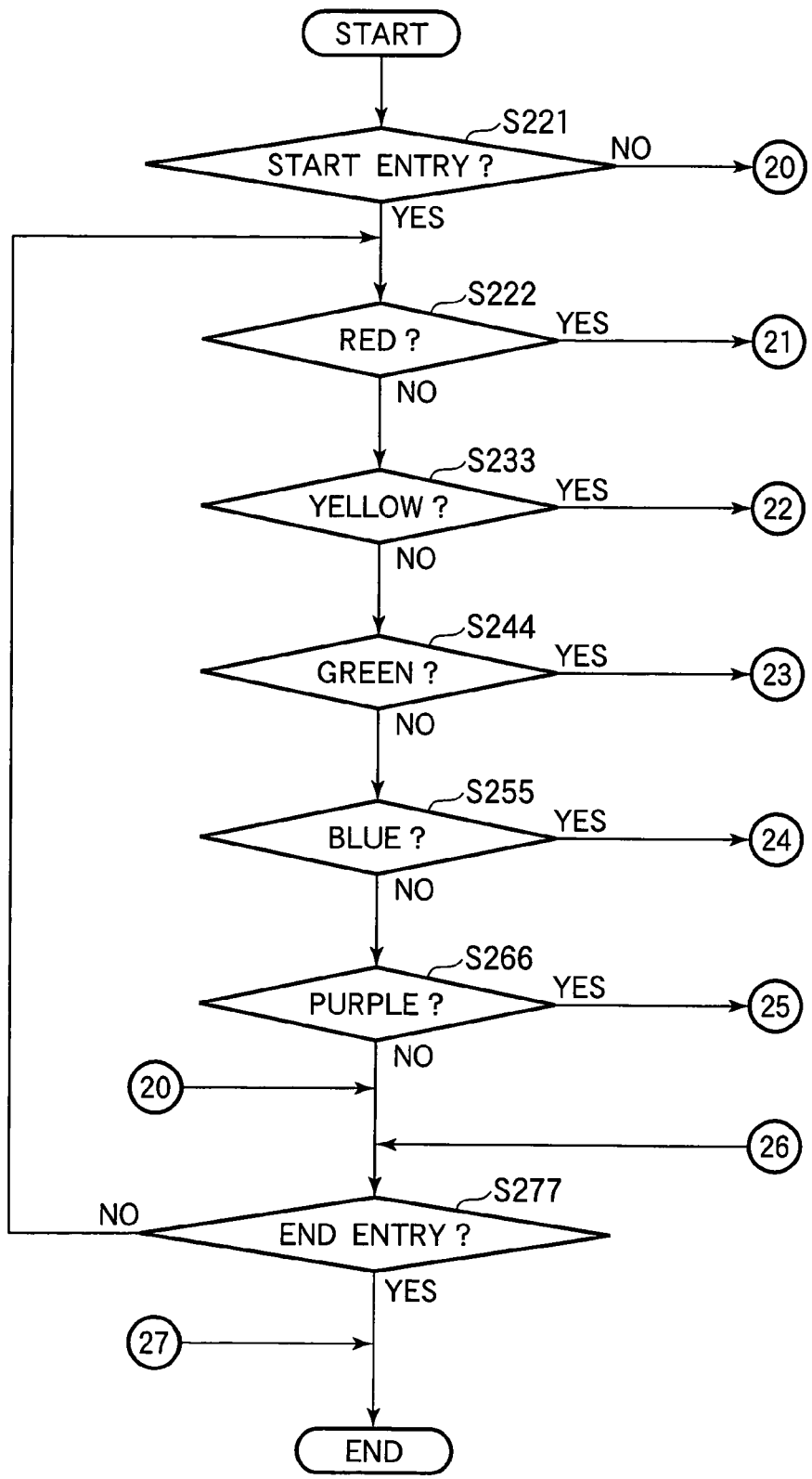
FIGS. 18A, 18B, 18C, 19A, 19B, and 19C are a flowchart illustrating a procedure for storing information in the table in the third embodiment.

In step S221 in FIG. 18A, the controller 21 decides, by testing the state of a switch in the operation panel, for example, whether to start the entry procedure, and proceeds accordingly to step S222 (to start the entry procedure) or step S277 (to skip the entry procedure).

Step S222 is a decision step that tests for selection of the color red. Processing proceeds to step S223 in FIG. 18B if red is selected and to step S233 otherwise.

Figure 18B:
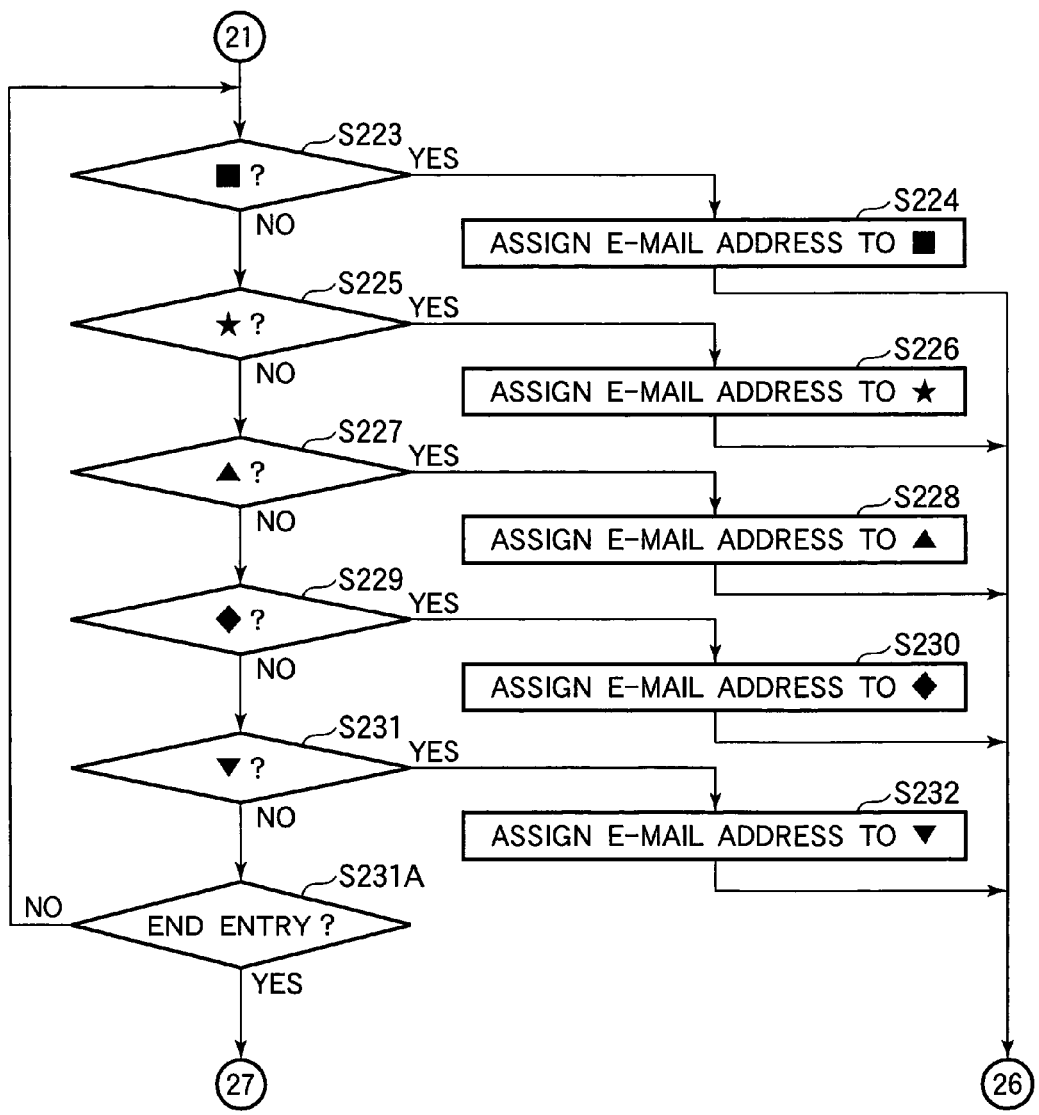

Step S223 in FIG. 18B is a decision step that tests for selection of a square image pattern. Processing proceeds to step S224 if the square shape is selected, and to step S225 otherwise.

In step S224, an electronic mail address is entered for assignment to the square shape.

Step S225 is a decision step that tests for selection of a star image pattern. Processing proceeds to step S226 if the star shape is selected, and to step S227 otherwise.

In step S226, an electronic mail address is entered for assignment to the star shape.

Step S227 is a decision step that tests for selection of a triangle image pattern. Processing proceeds to step S228 if the triangle shape is selected, and to step S229 otherwise.

In step S228, an electronic mail address is entered for assignment to the triangle shape.

Step S229 is a decision step that tests for selection of a diamond image pattern. Processing proceeds to step S230 if the diamond shape is selected, and to step S231 otherwise.

In step S230, an electronic mail address is entered for assignment to the diamond shape.

Step S231 is a decision step that tests for selection of an inverted triangle image pattern. Processing proceeds to step S232 if the inverted triangle shape is selected, and to step S231A otherwise.

Step S231A is a termination decision step. Processing ends or returns to step S223 according to, for example, the state of a switch in the operation panel.

In step S232, an electronic mail address is entered for assignment to the inverted triangle shape.

Following step S224, S226, S228, S230, or S232, processing proceeds to step S277 in FIG. 18A.

Step S233 in FIG. 18A is a decision step that tests for selection of the color yellow. Processing proceeds to step S234 in FIG. 18C if yellow is selected, and to step S244 otherwise.

Figure 18C:
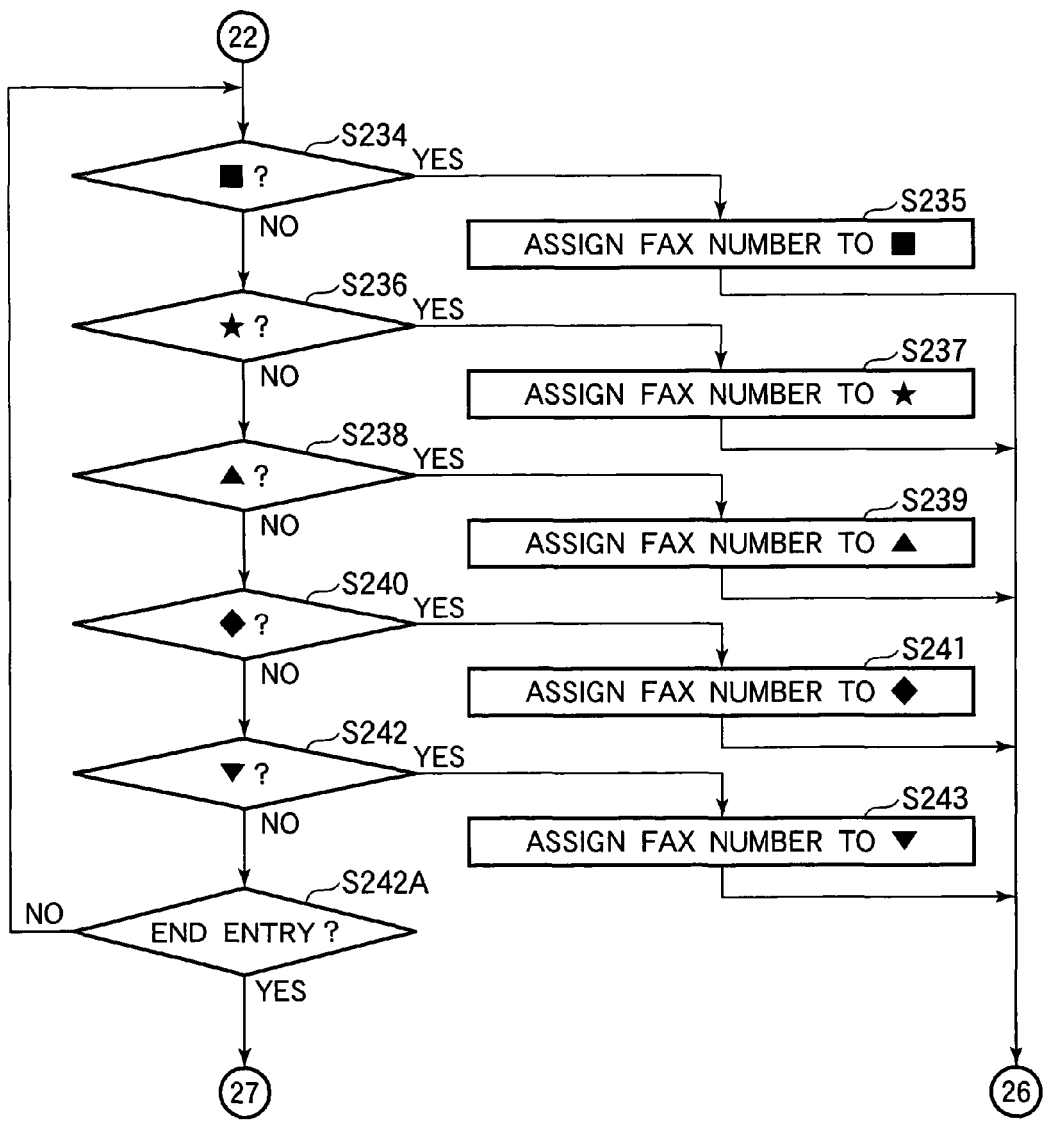

Step S234 in FIG. 18C is a decision step that tests for selection of a square image pattern. Processing proceeds to step S235 if the square shape is selected, and to step S236 otherwise.

In step S235, a facsimile number is entered for assignment to the square shape.

Step S236 is a decision step that tests for selection of a star image pattern. Processing proceeds to step S237 if the star shape is selected, and to step S238 otherwise.

In step S237, a facsimile number is entered for assignment to the star shape.

Step S238 is a decision step that tests for selection of a triangle image pattern. Processing proceeds to step S239 if the triangle shape is selected, and to step S240 otherwise.

In step S239, a facsimile number is entered for assignment to the triangle shape.

Step S240 is a decision step that tests for selection of a diamond image pattern. Processing proceeds to step S241 if the diamond shape is selected, and to step S242 otherwise.

In step S241, a facsimile number is entered for assignment to the diamond shape.

Step S242 is a decision step that tests for selection of an inverted triangle image pattern. Processing proceeds to step S243 if the inverted triangle shape is selected, and to step S242A otherwise.

Step S242A is a termination decision step. Processing ends or returns to step S234 according to, for example, the state of a switch in the operation panel.

In step S243, a facsimile number is entered for assignment to the inverted triangle shape.

Following step S235, S237, S238, S241, or S243, processing proceeds to step S277 in FIG. 18A.

Step S244 in FIG. 18A is a decision step that tests for selection of the color green. Processing proceeds to step S245 in FIG. 19A if green is selected, and to step S255 in FIG. 18A otherwise.

Figure 19A:
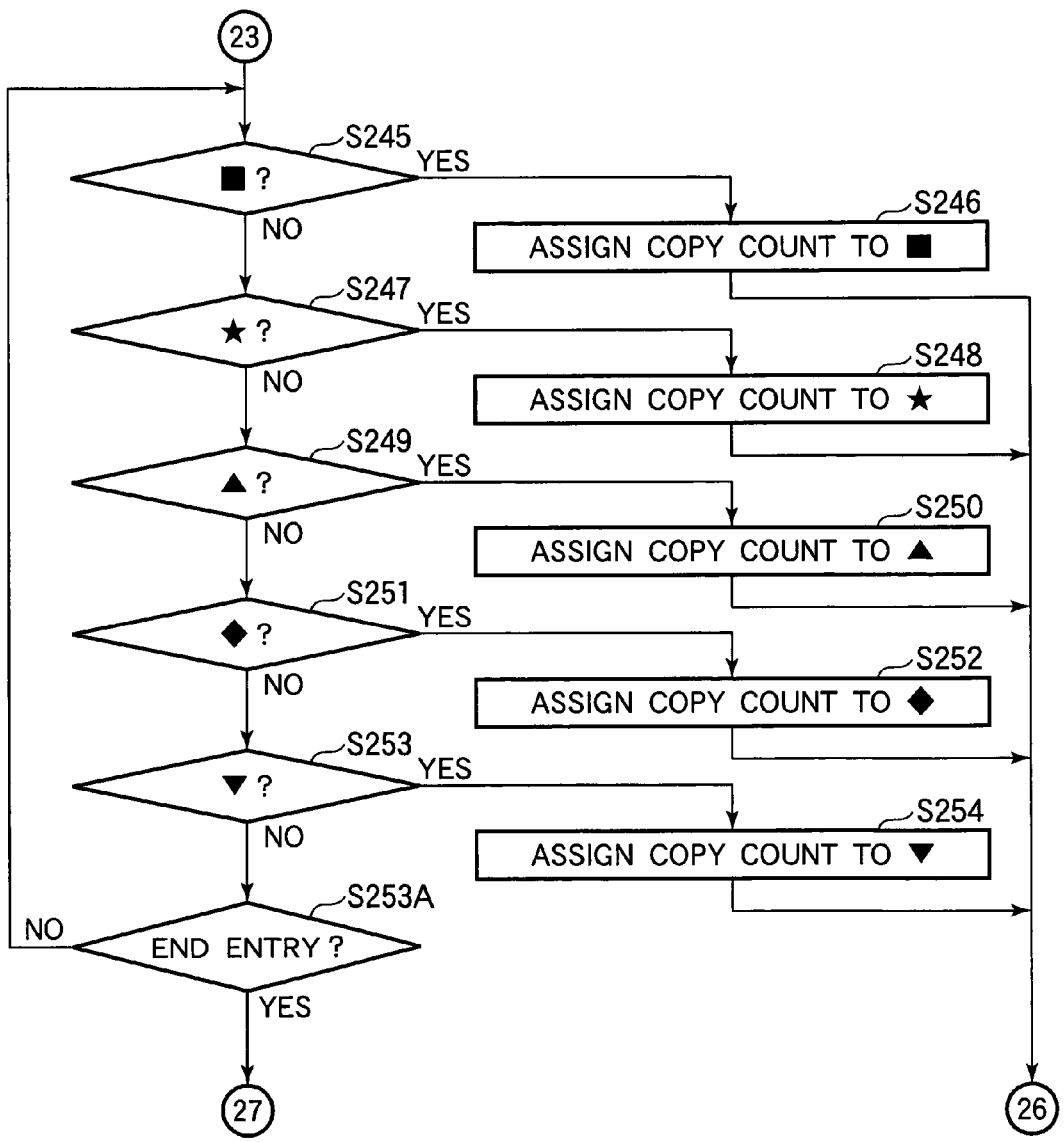

Step S245 in FIG. 19A is a decision step that tests for selection of a square image pattern. Processing proceeds to step S246 if the square shape is selected, and to step S247 otherwise.

In step S246, a number of copies is entered for assignment to the square shape.

Step S247 is a decision step that tests for selection of a star image pattern. Processing proceeds to step S248 if the star shape is selected, and to step S249 otherwise.

In step S248, a number of copies is entered for assignment to the star shape.

Step S249 is a decision step that tests for selection of a triangle image pattern. Processing proceeds to step S250 if the triangle shape is selected, and to step S251 otherwise.

In step S250, a number of copies is entered for assignment to the triangle shape.

Step S251 is a decision step that tests for selection of a diamond image pattern. Processing proceeds to step S252 if the diamond shape is selected, and to step S253 otherwise.

In step S252, a number of copies is entered for assignment to the diamond shape.

Step S253 is a decision step that tests for selection of an inverted triangle image pattern. Processing proceeds to step S254 if the inverted triangle shape is selected, and to step S253A otherwise.

Step S253A is a termination decision step. Processing ends or returns to step S245 according to, for example, the state of a switch in the operation panel.

In step S254, a number of copies is entered for assignment to the inverted triangle shape.

Following step S246, S248, S250, S252, or S254, processing proceeds to step S277 in FIG. 18A.

Step S255 in FIG. 18A is a decision step that tests for selection of the color blue. Processing proceeds to step S256 in FIG. 19B if blue is selected, and to step S266 in FIG. 18A otherwise.

Figure 19B:
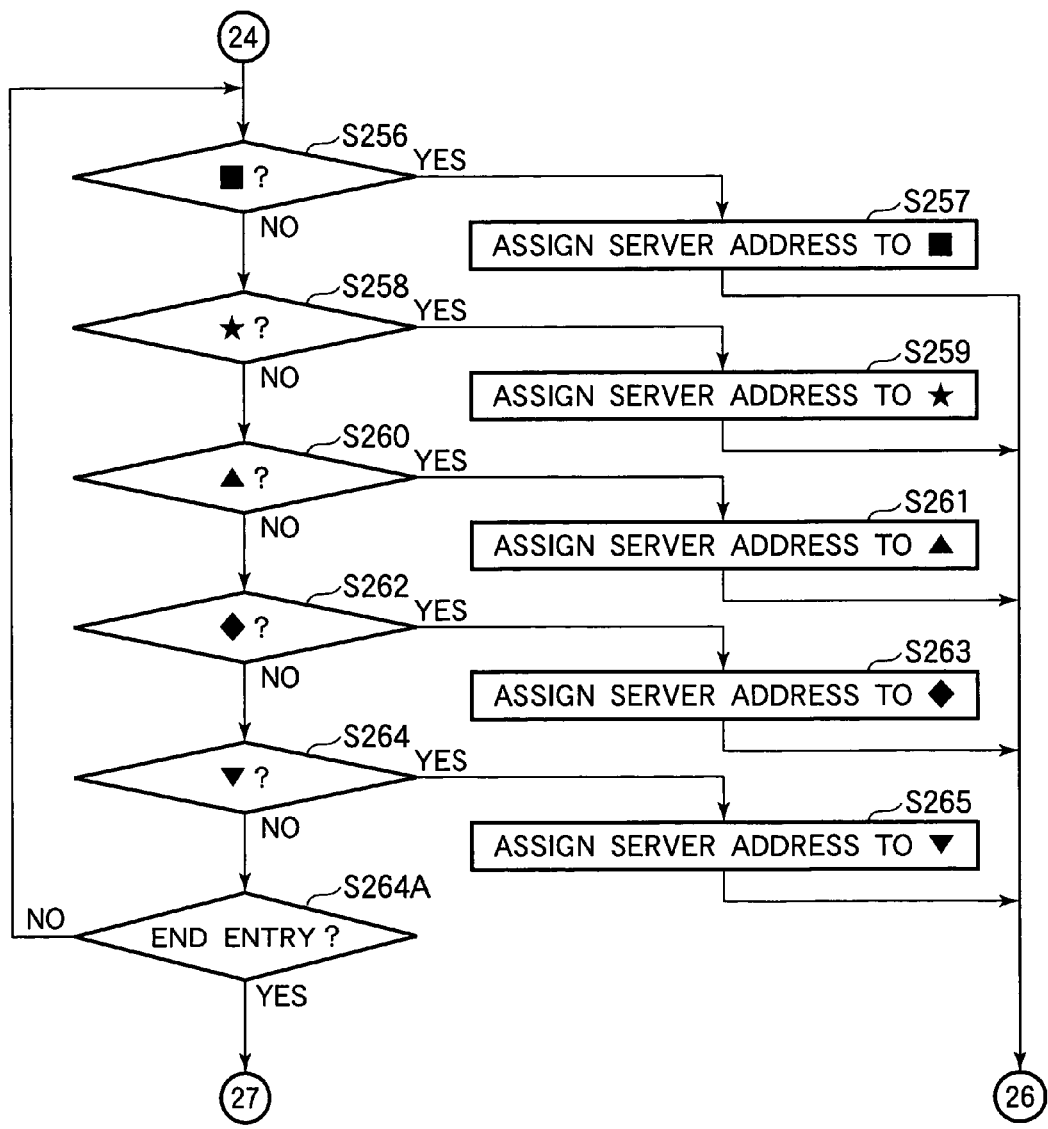

Step S256 in FIG. 19B is a decision step that tests for selection of a square image pattern. Processing proceeds to step S257 if the square shape is selected, and to step S258 otherwise.

In step S257, a server address is entered for assignment to the square shape.

Step S258 is a decision step that tests for selection of a star image pattern. Processing proceeds to step S259 if the star shape is selected, and to step S260 otherwise.

In step S259, a server address is entered for assignment to the star shape.

Step S260 is a decision step that tests for selection of a triangle image pattern. Processing proceeds to step S261 if the triangle shape is selected, and to step S262 otherwise.

In step S261, a server address is entered for assignment to the triangle shape.

Step S262 is a decision step that tests for selection of a diamond image pattern. Processing proceeds to step S263 if the diamond shape is selected, and to step S264 otherwise.

In step S263, a server address is entered for assignment to the diamond shape.

Step S264 is a decision step that tests for selection of an inverted triangle image pattern. Processing proceeds to step S265 if the inverted triangle shape is selected, and to step S264A otherwise.

Step S264A is a termination decision step. Processing ends or returns to step S256 according to, for example, the state of a switch in the operation panel.

In step S265, a server address is entered for assignment to the inverted triangle shape.

Following step S257, S259, S261, S263, or S265, processing proceeds to step S277 in FIG. 18A.

Step S266 in FIG. 18A is a decision step that tests for selection of the color purple. Processing proceeds to step S267 in FIG. 19C if purple is selected, and to step S277 in FIG. 18A otherwise.

Figure 19C:
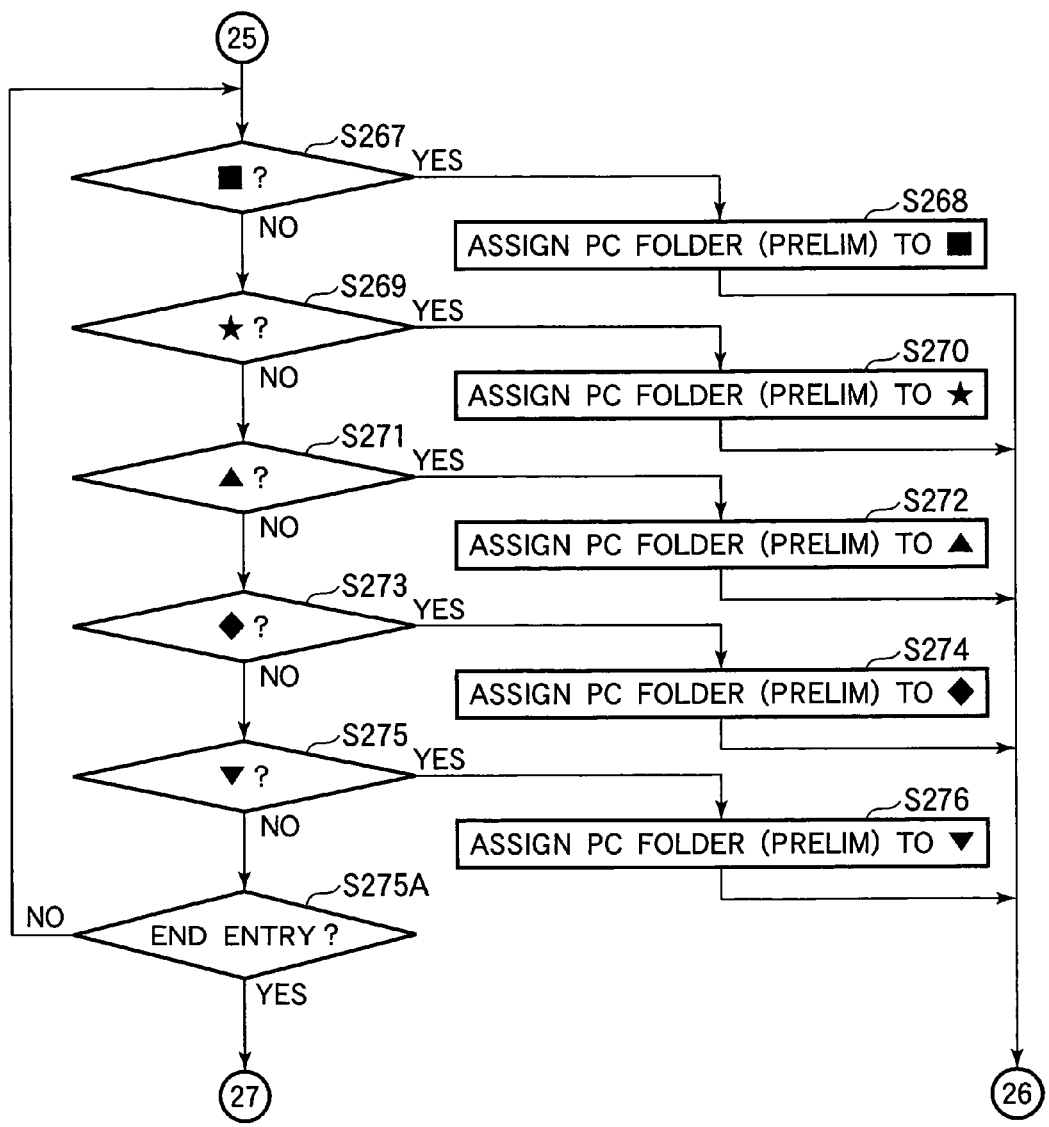

Step S267 in FIG. 19C is a decision step that tests for selection of a square image pattern. Processing proceeds to step S268 if the square shape is selected, and to step S269 otherwise.

In step S268, a (preliminary) PC folder name is entered for assignment to the square shape.

Step S269 is a decision step that tests for selection of a star image pattern. Processing proceeds to step S270 if the star shape is selected, and to step S271 otherwise.

In step S270, a (preliminary) PC folder name is entered for assignment to the star shape.

Step S271 is a decision step that tests for selection of a triangle image pattern. Processing proceeds to step S272 if the triangle shape is selected, and to step S273 otherwise.

In step S272, a (preliminary) PC folder name is entered for assignment to the triangle shape.

Step S273 is a decision step that tests for selection of a diamond image pattern. Processing proceeds to step S274 if the diamond shape is selected, and to step S275 otherwise.

In step S274, a (preliminary) PC folder name is entered for assignment to the diamond shape.

Step S275 is a decision step that tests for selection of an inverted triangle image pattern. Processing proceeds to step S276 if the inverted triangle shape is selected, and to step S275A otherwise.

Step S275A is a termination decision step. Processing ends or returns to step S267 according to, for example, the state of a switch in the operation panel.

In step S276, a (preliminary) PC folder name is entered for assignment to the inverted triangle shape.

Following step S268, S270, S272, S274, or S276, processing proceeds to step S277 in FIG. 18A.

Step S277 in FIG. 18A is another termination decision step. Processing ends or returns to step S222 according to, for example, the state of a switch in the operation panel.

After information entered by the procedure above has been stored in the output selection table 16, when a document 11 is scanned, the image input and output apparatus 10 operates as follows.

When a sensor (not shown) senses that a document 11 has been set, the color image scanner 12 begins scanning the document 11 from its top or leading edge. If a colored image pattern 11a is present near this edge, the color recognition unit 13 recognizes the color of the image pattern 11a and stores information indicating the color in the first memory 18. The comparator controller 17 compares the information indicating the color of the image pattern 11a with the color information in the output selection table 16. If the color information indicating the color of the image pattern 11a matches any of the color information in the output selection table 16, the image pattern recognition unit 14 recognizes the shape of the image pattern 11a and stores information indicating the shape of the image pattern 11a in the second memory 19, and the comparator controller 17 compares this information with the shape information in the output selection table 16.

If the information indicating the color and shape of the image pattern 11a both match information in the output selection table 16, the color image scanner 12 continues scanning the document, obtaining image data that are stored in the image memory 15, and the output unit indicated by the color information is activated for output of the image data according to the shape information.

If the image pattern 11a is red, the e-mail controller 23 is activated to send the image data to the electronic mail address indicated by the shape information. If the image pattern 11a is yellow, the facsimile controller 24 is activated to send the image data to the facsimile number indicated by the shape information. If the image pattern 11a is green, the printing unit 22 is activated to print the number of copies of the image data indicated by the shape information. If the image pattern 11a is blue, the filing controller 25 is activated to send the image data to the server indicated by the shape. If the image pattern 11a is purple, the PC scan controller 26 is activated to save the image data in the PC folder indicated by the shape. The operation ends when the sending, printing, or saving of the image data is completed.

If the color of the image pattern 11a cannot be recognized or does not match any of the information in the output selection table 16, the image input and output apparatus 10 displays a message prompting the operator to use the operation panel to select whether to send the image data to a specified electronic mail address, facsimile number, or file server address, to print a specified number of copies, or to save the data to a folder.

If the color of the image pattern 11a can be recognized but its shape cannot be recognized or does not match any of the information in the output selection table 16, the image input and output apparatus 10 prompts the operator to enter the necessary destination information or number-of-copies information from the operation panel. When the operator enters the necessary information, the image input and output apparatus 10 operates according to the entered information.

The entire operation is illustrated by the flowcharts in FIGS. 20A, 20B, and 21-25.

Figure 20A:
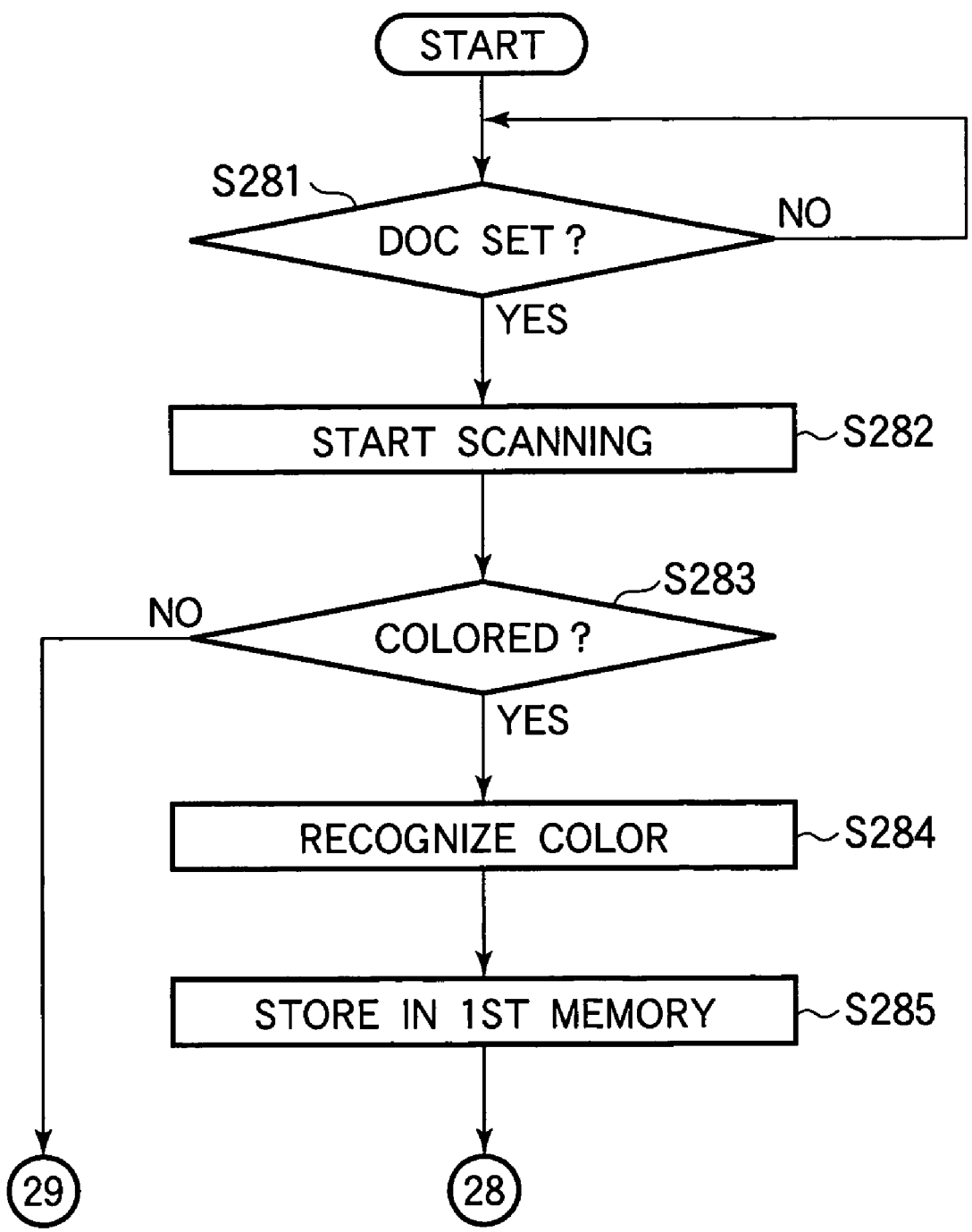
FIGS. 20A, 20B, 21, 22, 23, 24, and 25 are a flowchart illustrating the operation of the third embodiment.

In step S281 in FIG. 20A, the image input and output apparatus 10 waits for a document to be set in the color image scanner 12.

When a document is set, the color image scanner 12 begins scanning it in step S282.

Step S283 is a decision step that tests for the presence of color near the leading edge. Processing proceeds to step S284 if color is present, and to step S381 in FIG. 20B otherwise.

In step S284, the color recognition unit 13 recognizes the color.

In step S285, the color recognition unit 13 stores information indicating the recognized color in the first memory 18.

Figure 20B:
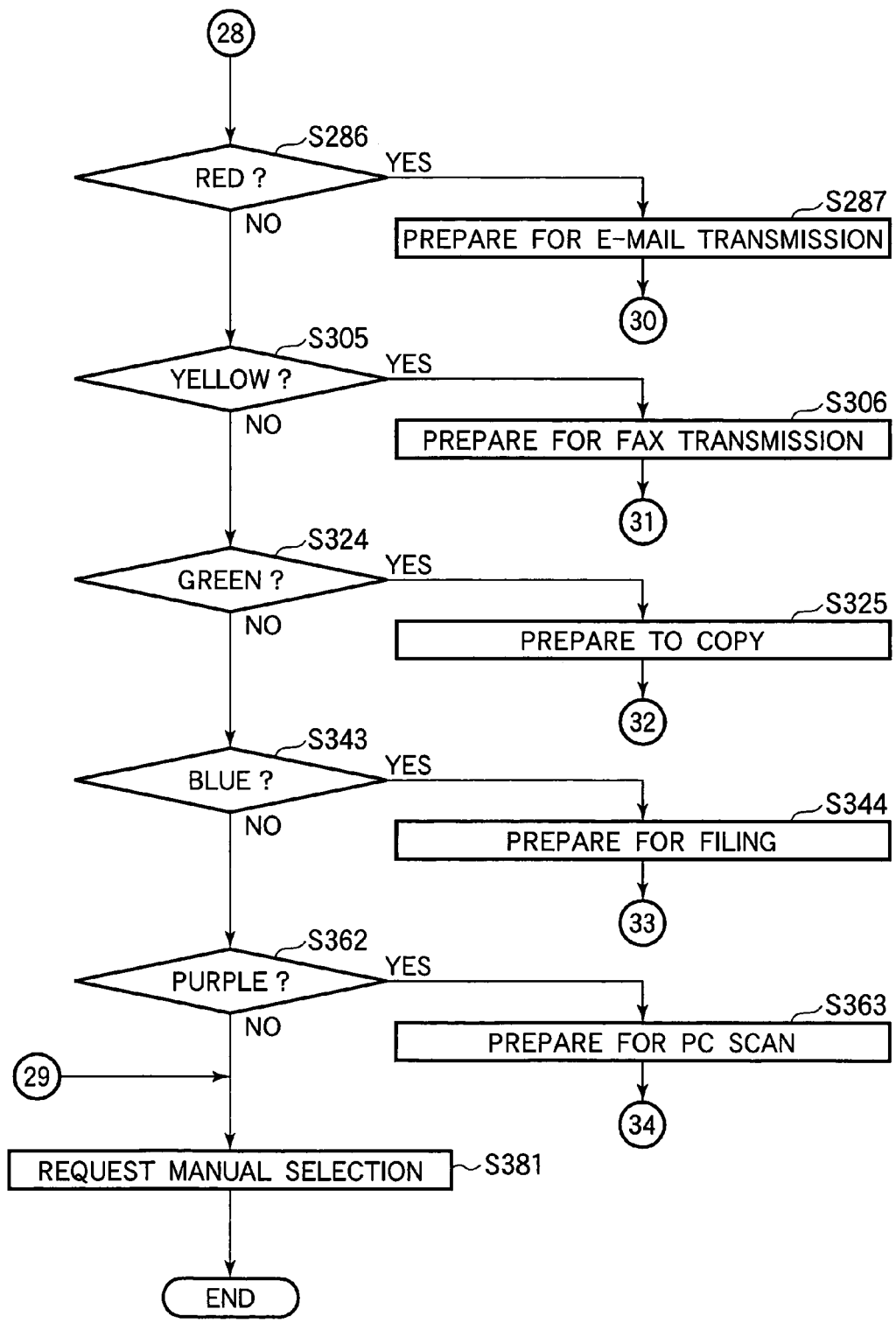

Steps S286, S305, S324, S343, and S362 in FIG. 20B are decision steps that test the recognized color.

Figure 21:
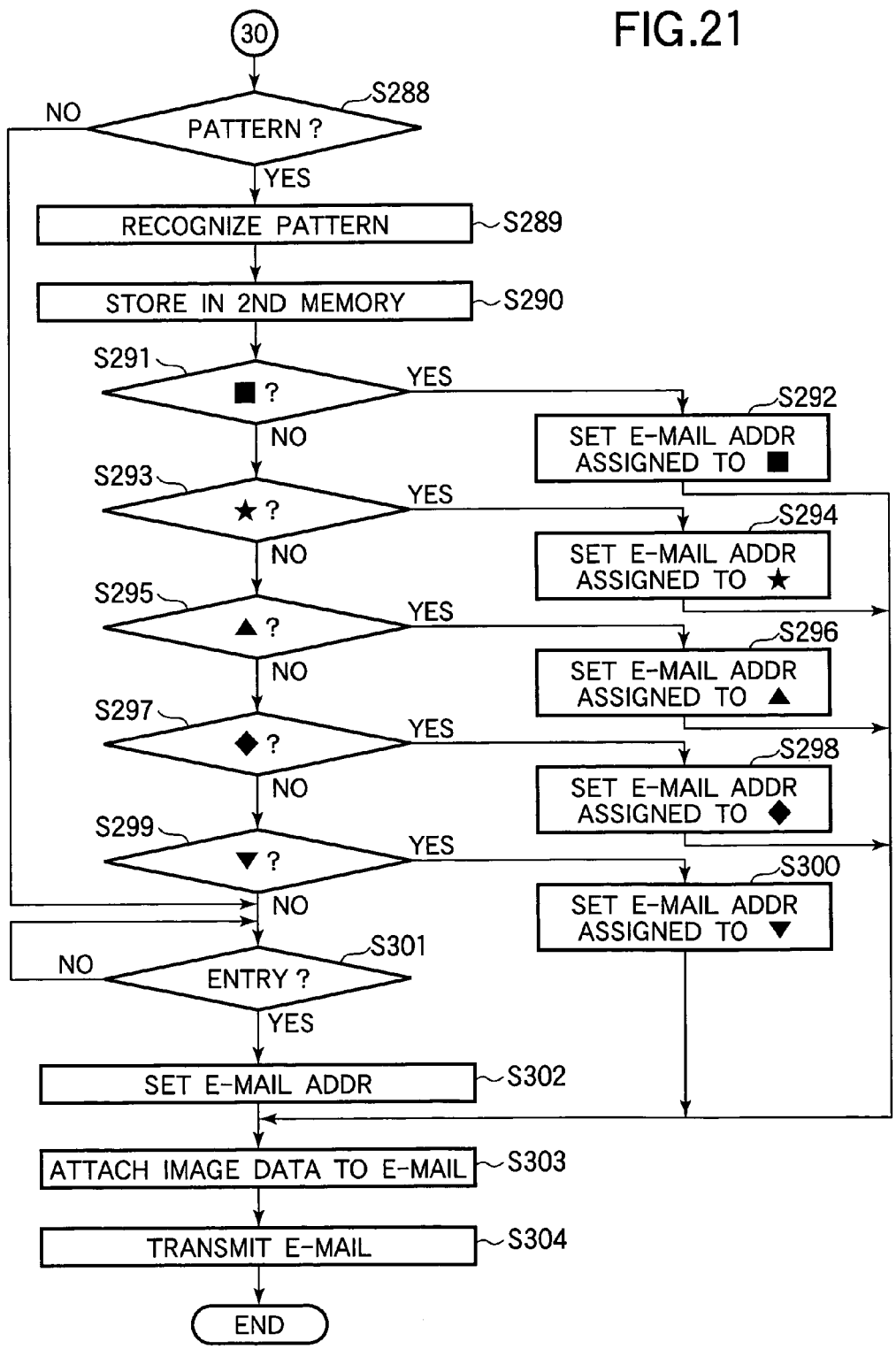

If the color is red ('Yes' in step S286), the e-mail controller 23 is activated in step S287, and processing proceeds to step S288 in FIG. 21.

Figure 22:
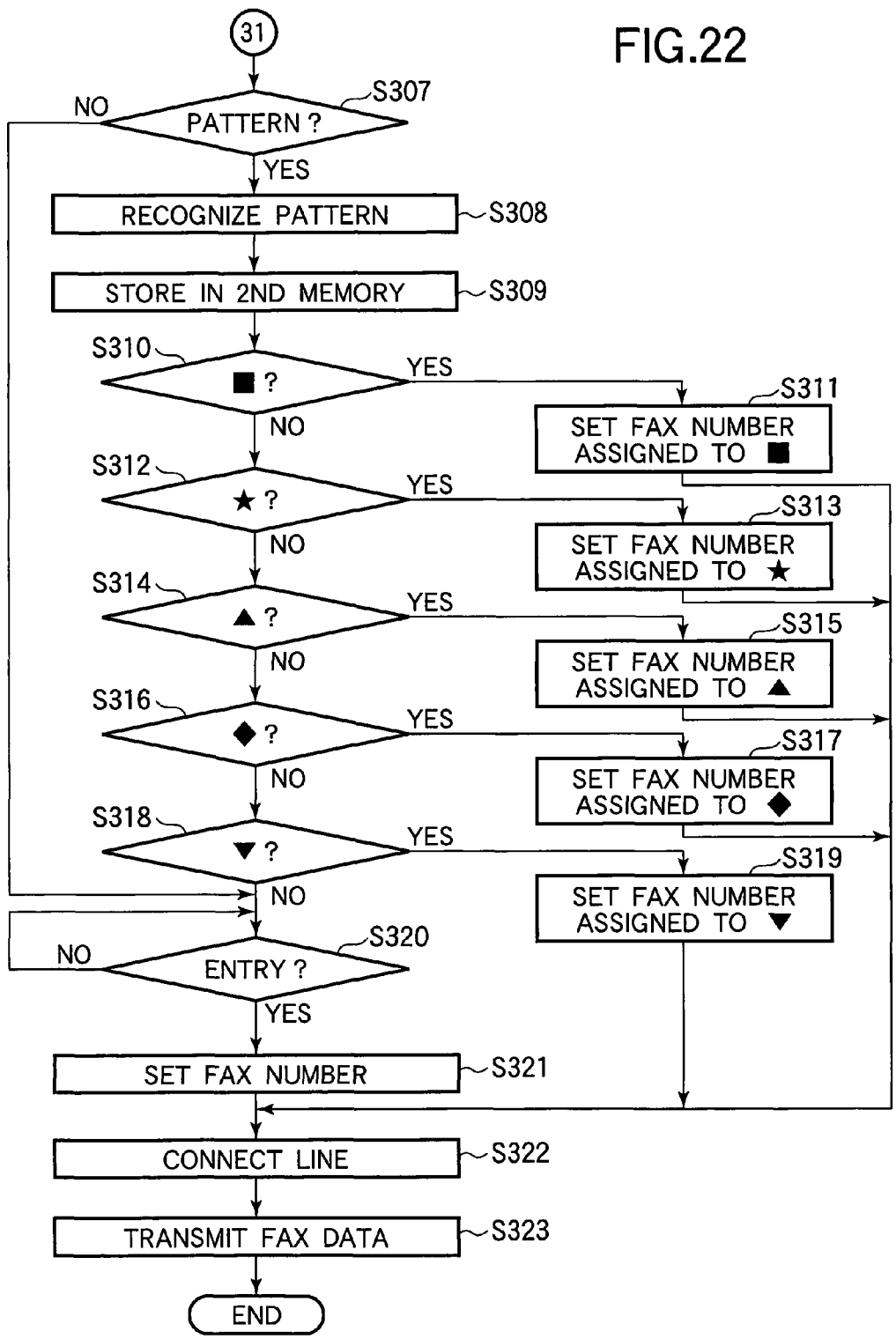

If the color is yellow ('Yes' in step S305), the facsimile controller 24 is activated in step S306, and processing proceeds to step S307 in FIG. 22.

Figure 23:
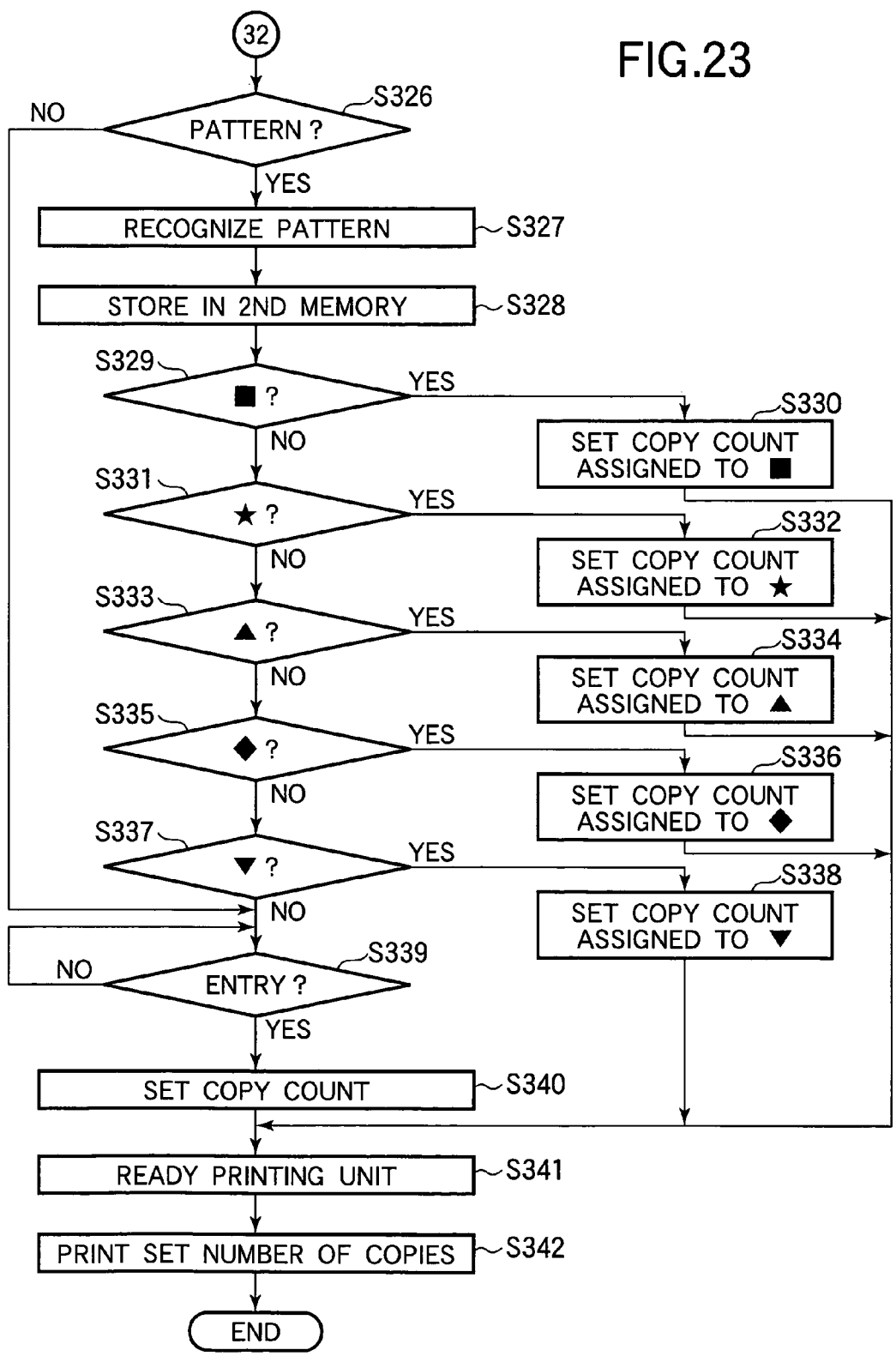

If the color is green ('Yes' in step S324), the printing unit 22 is activated in step S325, and processing proceeds to step S326 in FIG. 23.

Figure 24:
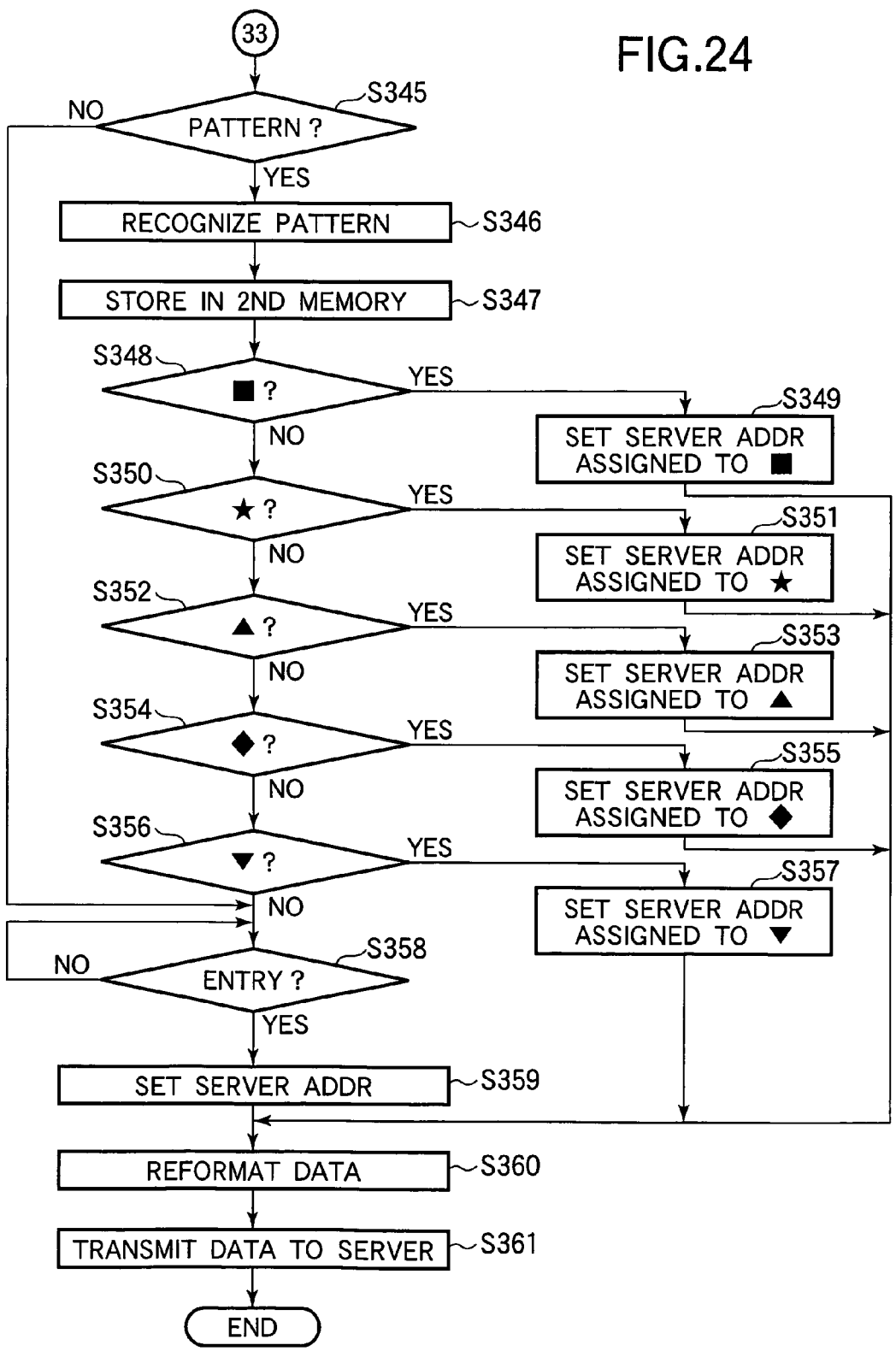

If the color is blue ('Yes' in step S343), the filing controller 25 is activated in step S344, and processing proceeds to step S345 in FIG. 24.

Figure 25:
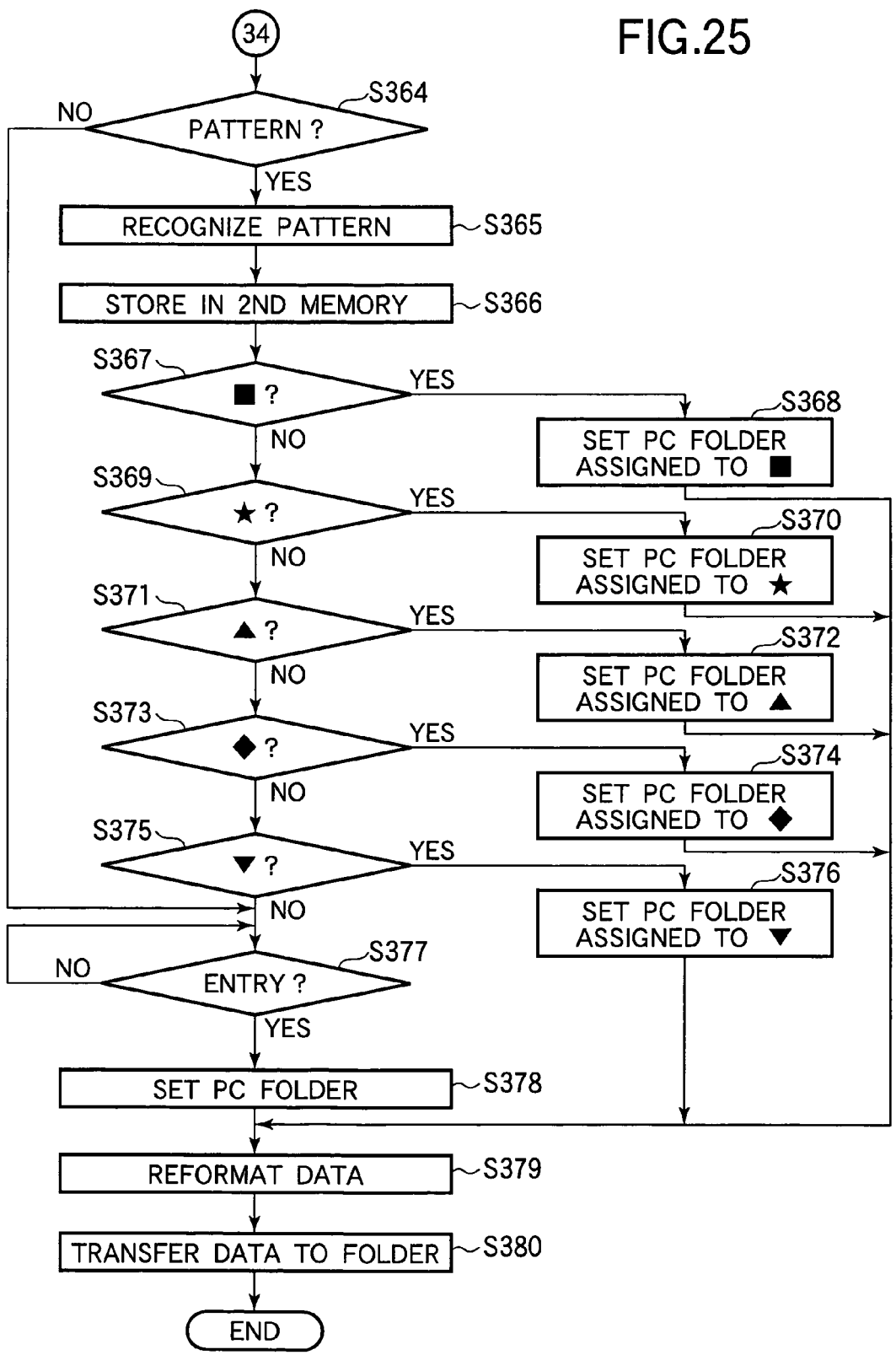

If the image pattern is purple ('Yes' in step S362), the PC scan controller 26 is activated in step S363, and processing proceeds to step S364 in FIG. 25.

If the recognized color is not any of these colors ('No' in all of steps S286, S305, S324, S343, and S362 in FIG. 20B), processing proceeds to step S381 in FIG. 20B.

In step S381, the image input and output apparatus 10 requests manual selection of a function and terminates the procedure.

FIG. 21 illustrates the electronic mail part of the procedure.

Step S288 tests the colored image data for an image pattern 11a. Processing proceeds to step S289 if an image pattern 11a is present, and to step S301 otherwise.

The image pattern recognition unit 14 recognizes the shape of the colored image pattern 11a in step S289, and stores information indicating the shape in the second memory 19 in step S290.

Steps S291, S293, S295, S297, and S299 are decision steps that test the shape of the image pattern.

If the image pattern has a square shape ('Yes' in step S291), the electronic mail address assigned to the square shape is set in the e-mail controller 23 in step S292, and processing proceeds to step S303.

If the image pattern has a star shape ('Yes' in step S293), the electronic mail address assigned to the star shape is set in the e-mail controller 23 in step S294, and processing proceeds to step S303.

If the image pattern has a triangle shape ('Yes' in step S295), the electronic mail address assigned to the triangle shape is set in the e-mail controller 23 in step S296, and processing proceeds to step S303.

If the image pattern has a diamond shape ('Yes' in step S297), the electronic mail address assigned to the diamond shape is set in the e-mail controller 23 in step S298, and processing proceeds to step S303.

If the image pattern has an inverted triangle shape ('Yes' in step S299), the electronic mail address assigned to the inverted triangle shape is set in the e-mail controller 23 in step S300, and processing proceeds to step S303.

If the image pattern does not have any of these shapes ('No' decisions in all of steps S291, S293, S295, S297, and S299), then in step S301, the image input and output apparatus 10 waits for the operator to enter an electronic mail address. When an electronic mail address is entered, the electronic mail address is set in the e-mail controller 23 in step S302, and processing proceeds to step S303.

In step S303, the image data are attached as an image data file to an electronic mail message, which is transmitted to the address set in the e-mail controller 23 in step S304. The procedure then ends.

FIG. 22 illustrates the facsimile transmission part of the procedure.

Step S307 tests the colored image data for an image pattern 11a. Processing proceeds to step S308 if an image pattern 11a is present, and to step S320 otherwise.

The image pattern recognition unit 14 recognizes the shape of the image pattern 11a in step S308, and stores information indicating the shape in the second memory 19 in step S309.

Steps S310, S312, S314, S316, and S318 are decision steps that test the shape of the image pattern.

If the image pattern has a square shape ('Yes' in step S310), the facsimile number assigned to the square shape is set in the facsimile controller 24 in step S311, and processing proceeds to step S322.

If the image pattern has a star shape ('Yes' in step S312), the facsimile number assigned to the star shape is set in the facsimile controller 24 in step S313, and processing proceeds to step S322.

If the image pattern has a triangle shape ('Yes' in step S314), the facsimile number assigned to the triangle shape is set in the facsimile controller 24 in step S315, and processing proceeds to step S322.

If the image pattern has a diamond shape ('Yes' in step S316), the facsimile number assigned to the diamond shape is set in the facsimile controller 24 in step S317, and processing proceeds to step S322.

If the image pattern has an inverted triangle shape ('Yes' in step S318), the facsimile number assigned to the inverted triangle shape is set in the facsimile controller 24 in step S319, and processing proceeds to step S322.

If the image pattern does not have any of these shapes ('No' decisions in all of steps S310, S312, S314, S316, and S318), then in step S320, the image input and output apparatus 10 waits for the operator to enter a facsimile number. When a facsimile number is entered, the facsimile number is set in the facsimile controller 24 in step S321, and processing proceeds to step S322.

In step S322, a facsimile call is originated to the facsimile number set in the facsimile controller 24. The image data are transmitted as facsimile data in step S323. The procedure then ends.

FIG. 23 illustrates the copy printing part of the procedure.

Step S326 tests the colored image data for an image pattern 11a. Processing proceeds to step S327 if an image pattern 11a is present, and to step S339 otherwise.

The image pattern recognition unit 14 recognizes the shape of the image pattern 11a in step S327, and stores information indicating the shape in the second memory 19 in step S328.

Steps S329, S331, S333, S335, and S337 are decision steps that test the shape of the image pattern.

If the image pattern has a square shape ('Yes' in step S329), the number of copies assigned to the square shape is set in the printing unit 22 in step S330, and processing proceeds to step S341.

If the image pattern has a star shape ('Yes' in step S331), the number of copies assigned to the star shape is set in the printing unit 22 in step S332, and processing proceeds to step S341.

If the image pattern has a triangle shape ('Yes' in step S333), the number of copies assigned to the triangle shape is set in the printing unit 22 in step S334, and processing proceeds to step S341.

If the image pattern has a diamond shape ('Yes' in step S335), the number of copies assigned to the diamond shape is set in the printing unit 22 in step S336, and processing proceeds to step S341.

If the image pattern has an inverted triangle shape ('Yes' in step S337), the number of copies assigned to the inverted triangle shape is set in the printing unit 22 in step S338, and processing proceeds to step S341.

If the image pattern does not have any of these shapes ('No' decisions in all of steps S329, S331, S333, S335, and S337), then in step S339, the image input and output apparatus 10 waits for the operator to enter a number of copies. When a number of copies is entered, the number of copies is set in the printing unit 22 in step S340, and processing proceeds to step S341.

In step S341, the printing unit 22 is readied for printing. The printing unit 22 prints the set number of copies of the image data in step S342, after which the procedure ends.

FIG. 24 illustrates the filing part of the procedure.

Step S345 tests the colored image data for an image pattern 11*a*. Processing proceeds to step S346 if an image pattern 11*a* is present, and to step S358 otherwise.

The image pattern recognition unit 14 recognizes the shape of the image pattern 11*a* in step S346, and stores information indicating the shape in the second memory 19 in step S347.

Steps S348, S350, S352, S354, and S356 are decision steps that test the shape of the image pattern.

If the image pattern has a square shape ('Yes' in step S348), the server address assigned to the square shape is set in the filing controller 25 in step S349, and processing proceeds to step S360.

If the image pattern has a star shape ('Yes' in step S350), the server address assigned to the star shape is set in the filing controller 25 in step S351, and processing proceeds to step S360.

If the image pattern has a triangle shape ('Yes' in step S352), the server address assigned to the triangle shape is set in the filing controller 25 in step S353, and processing proceeds to step S360.

If the image pattern has a diamond shape ('Yes' in step S354), the server address assigned to the diamond shape is set in the filing controller 25 in step S355, and processing proceeds to step S360.

If the image pattern has an inverted triangle shape ('Yes' in step S356), the server address assigned to the inverted triangle shape is set in the filing controller 25 in step S357, and processing proceeds to step S360.

If the image pattern does not have any of these shapes ('No' decisions in all of steps S348, S350, S352, S354, and S356), the image input and output apparatus 10 waits for the operator to enter a server address in step S358. When a server address is entered, the server address is set in the filing controller 25 in step S359, and processing proceeds to step S360.

In step S360, the image data are reformatted for filing. In step S361, the filing controller 25 accesses the designated server and transmits the reformatted image data to be stored in the server. The procedure then ends.

FIG. 25 illustrates the saving part of the procedure.

Step S364 tests the colored image data for an image pattern 11*a*. Processing proceeds to step S365 if an image pattern 11*a* is present, and to step S377 otherwise.

The image pattern recognition unit 14 recognizes the shape of the image pattern 11*a* in step S365, and stores information indicating the shape in the second memory 19 in step S366.

Steps S367, S369, S371, S373, and S375 are decision steps that test the shape of the image pattern.

If the image pattern has a square shape ('Yes' in step S367), the PC folder name assigned to the square shape is set in the PC scan controller 26 in step S368, and processing proceeds to step S379.

If the image pattern has a star shape ('Yes' in step S369), the PC folder name assigned to the star shape is set in the PC scan controller 26 in step S370, and processing proceeds to step S379.

If the image pattern has a triangle shape ('Yes' in step S371), the PC folder name assigned to the triangle shape is set in the PC scan controller 26 in step S372, and processing proceeds to step S379.

If the image pattern has a diamond shape ('Yes' in step S373), the PC folder name assigned to the diamond shape is set in the PC scan controller 26 in step S374, and processing proceeds to step S379.

If the image pattern has an inverted triangle shape ('Yes' in step S375), the PC folder name assigned to the inverted triangle shape is set in the PC scan controller 26 in step S376, and processing proceeds to step S379.

If the image pattern does not have any of these shapes ('No' decisions in all of steps S367, S369, S371, S373, and S375), the image input and output apparatus 10 waits for the operator to enter a PC folder name in step S377. When a PC folder name is entered, the PC folder name is set in the PC scan controller 26 in step S378, and processing proceeds to step S379.

In step S379, the image data are reformatted for saving in the PC. In step S380, the PC scan controller 26 accesses the designated PC folder and transmits the reformatted image data to be stored in the folder. The procedure then ends.

The third embodiment provides the same effects as the second embodiment, with the additional effect of enabling images of scanned documents to be saved automatically to designated folders in a personal computer.

As in the second embodiment, if the shape or color of the image pattern 11*a* cannot be recognized, the image input and output apparatus 10 accepts input from the operator instead.

As in the first and second embodiments, the image pattern has the advantage of protecting the confidentiality of the destination.

The printing unit 22, e-mail controller 23, facsimile controller 24, filing controller 25, and PC scan controller 26 of the third embodiment are automatically activated. In a variation of the third embodiment, the operator can specify electronic mail transmission, facsimile transmission, filing, copying, or saving by a manual operation on the operation panel.

Fourth Embodiment

Figure 26:
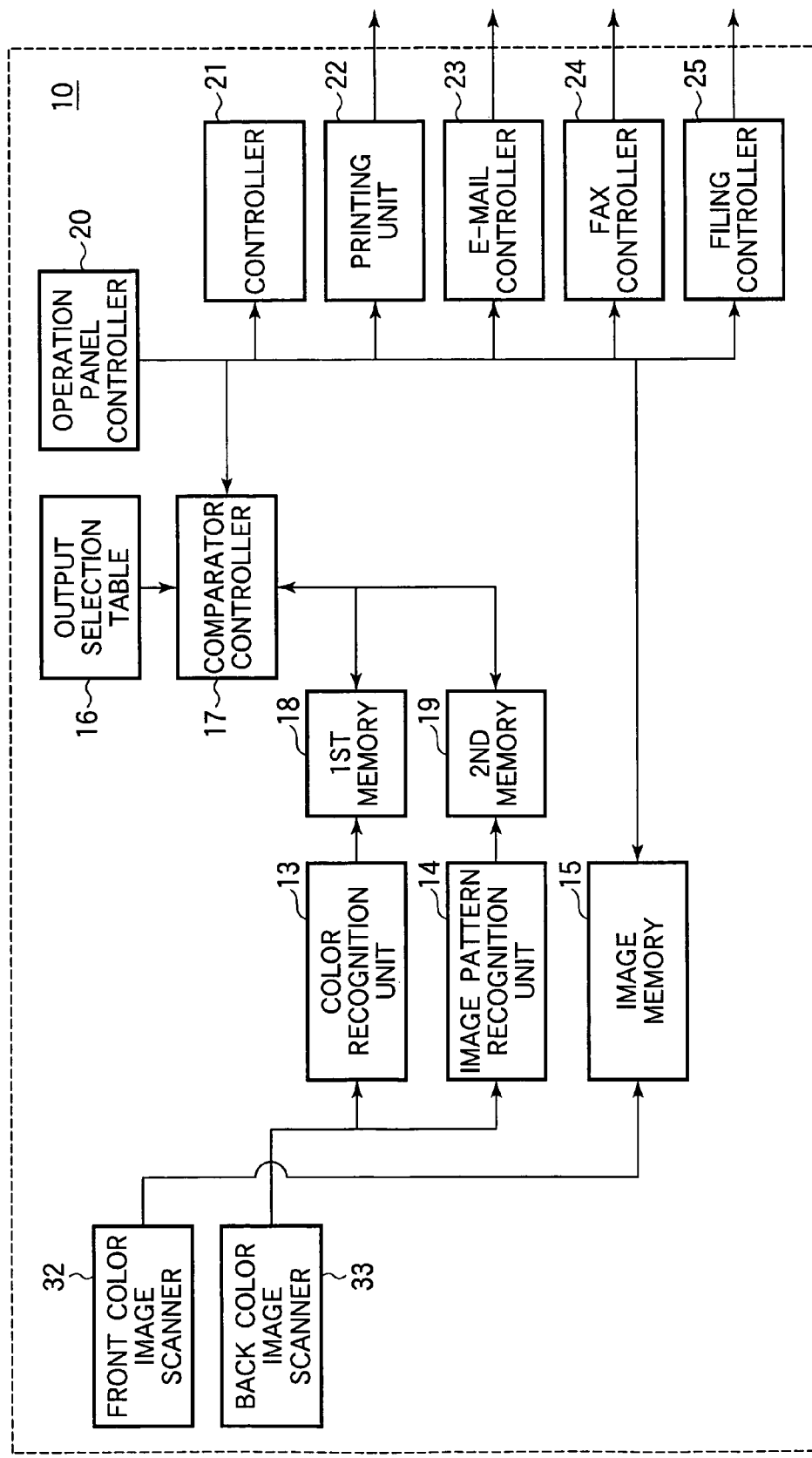
FIG. 26 is a block diagram of an image input and output apparatus according to fourth and fifth embodiments of the invention.

Referring to FIG. 26, the image input and output apparatus 10 of the fourth embodiment has a front color image scanner 32 that scans the front side of an input document 11 to obtain image data and a back color image scanner 33 that scans the back side of the document 11. A color recognition unit 13 recognizes color information in the image data obtained from the back side, and an image pattern recognition unit 14 recognizes image pattern (shape) information in the image data on the back side. An image memory 15 stores the image data obtained from the front side. The other components are the same as in the first embodiment.

Figure 27:
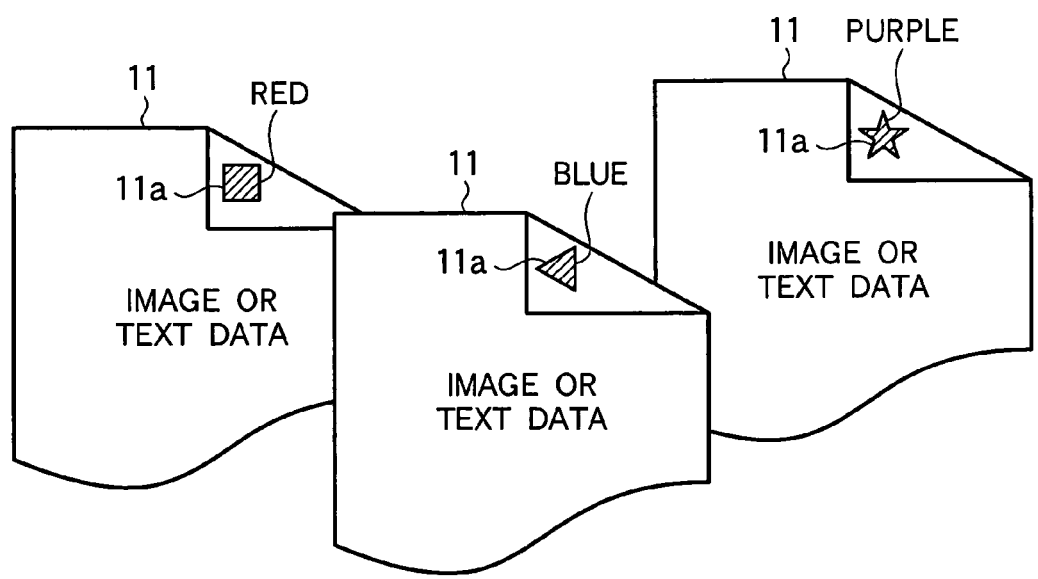
FIG. 27 shows examples of documents with colored image patterns on the back surface.

The image input and output apparatus 10 of the fourth embodiment can process a document 11 having an image pattern 11*a* on its back side, as shown in FIG. 27. The image pattern 11*a* is located in a predetermined position, preferably near the top or leading edge of the back side of document.

The preliminary procedure in the fourth embodiment is the same as in the first embodiment. Aside from the different location of the image pattern, the subsequent operation of the image input and output apparatus 10 in the fourth embodiment is largely the same as in the first embodiment.

When a sensor (not shown) senses that a document 11 has been set, the front color image scanner 32 and back color image scanner 33 begin scanning both sides of the document 11 from its top or leading edge. If the back color image scanner 33 detects an image pattern 11*a* in the predetermined position near this edge on the back side, the image pattern recognition unit 14 recognizes the shape of the image pattern 11*a* and stores information indicating the shape in the second memory 19.

If the shape information matches information in the output selection table 16, and if the image pattern 11*a* is colored, the color recognition unit 13 recognizes the color of the image pattern 11*a* and stores indicating the color in the first memory 18. The front color image scanner 32 continues scanning the front side of the document, obtaining image data that are stored in the image memory 15, and the output unit designated by the shape information is activated for output of the image data to the destination indicated by the color information, as in the first embodiment.

If either the shape or color of the image pattern 11*a* on the back side does not match any of the information in the output selection table 16, or if no destination has been designated for the shape and color combination of the image pattern 11*a*, the scanning operation halts, the document 11 is ejected, and the image input and output apparatus 10 is reset to the standby state. A similar halt, ejection, and reset take place if the image pattern recognition unit 14 is unable to recognize the shape of the image pattern 11*a*, or the color recognition unit 13 is unable to recognize the color of the image pattern 11*a*.

During this procedure, the image input and output apparatus 10 operates as indicated in FIGS. 28A, 28B, and 29-32.

Figure 28A:
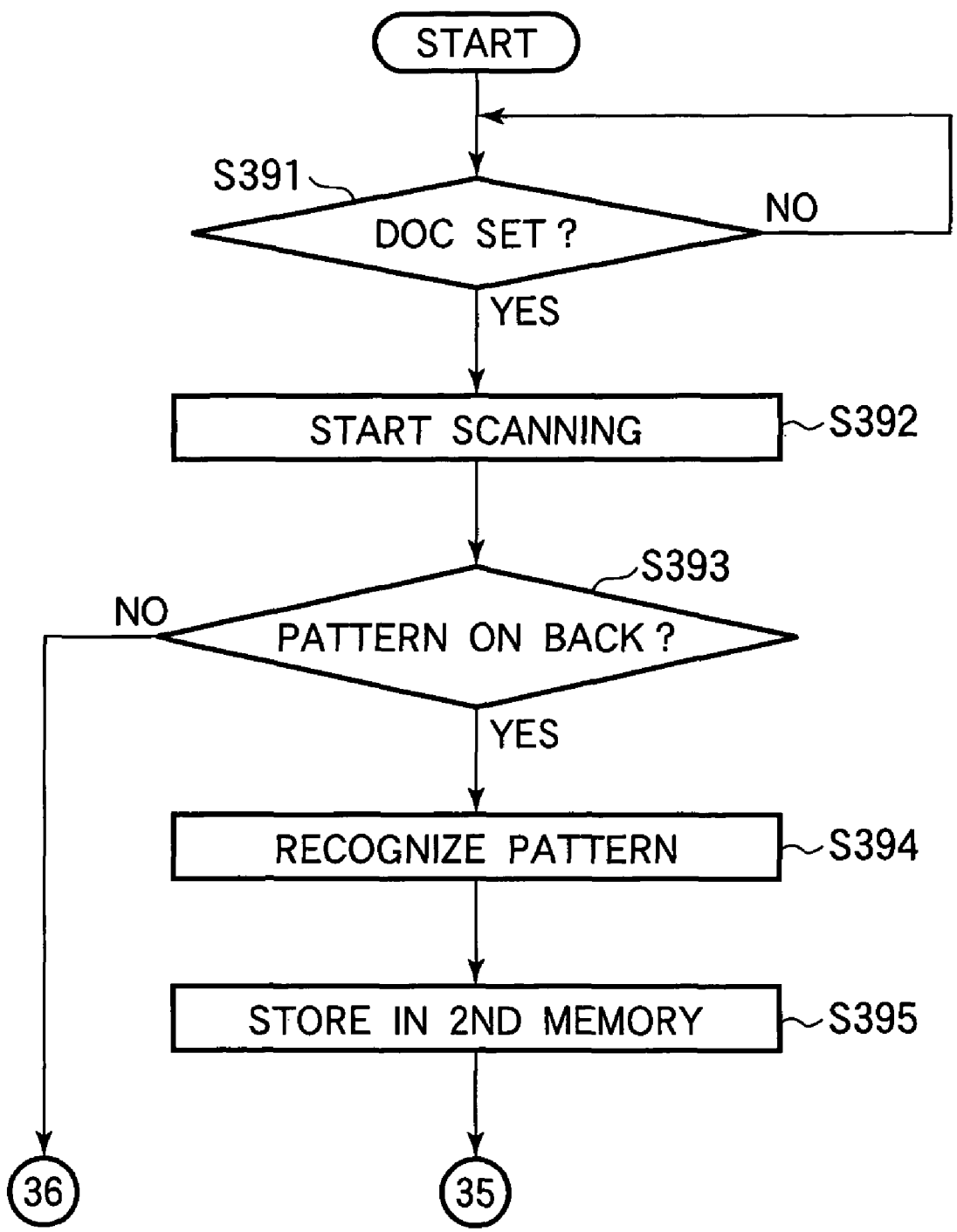
FIGS. 28A, 28B, 29, 30, 31, and 32 are a flowchart illustrating the operation of the fourth embodiment.

In step S391 in FIG. 28A, the image input and output apparatus 10 waits for a document to be set.

When a document is set, the front color image scanner 32 and back color image scanner 33 begin scanning it in step S392.

Step S393 is a decision step that tests for the presence of an image pattern 11*a* on the back side of the document. Processing proceeds to step S394 if an image pattern is present, and to step S464 in FIG. 28B otherwise.

In step S394 in FIG. 28A, the image pattern recognition unit 14 recognizes the shape of the image pattern.

In step S395, the image pattern recognition unit 14 stores information indicating the shape of the image pattern in the second memory 19.

Figure 28B:
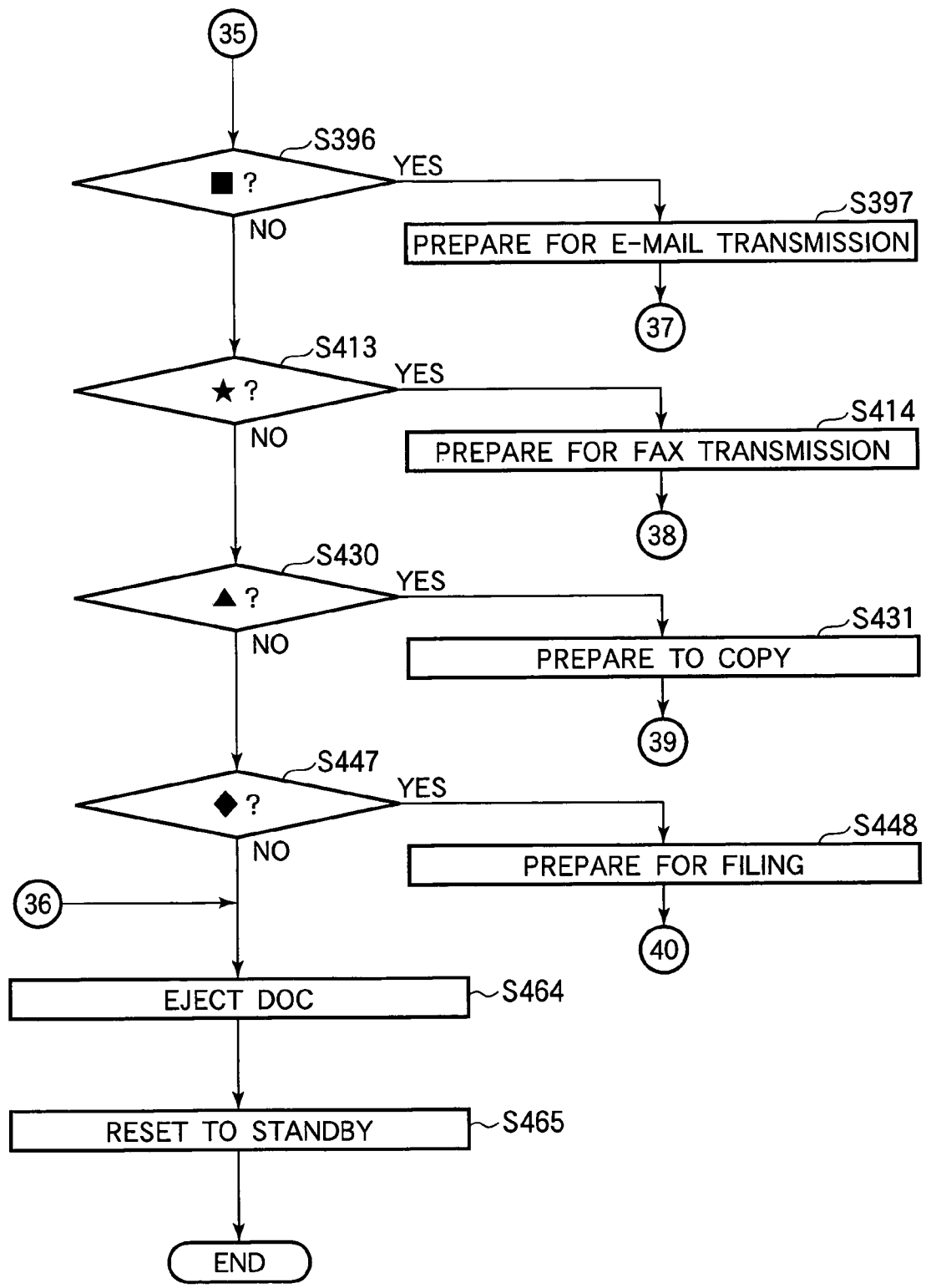

Steps S396, S413, S430, and S447 in FIG. 28B are decision steps that test the shape of the image pattern.

Figure 29:
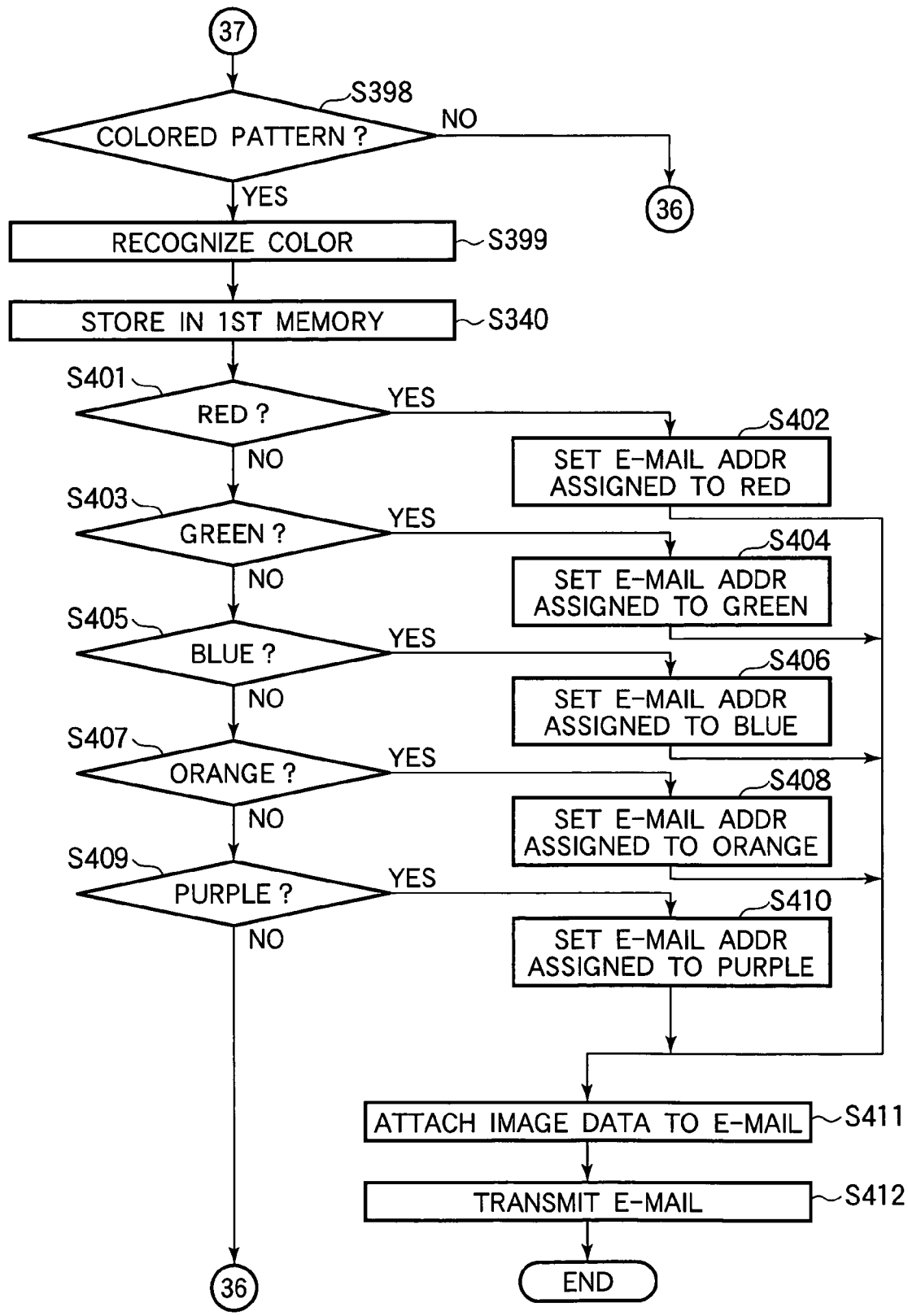

If the image pattern has a square shape ('Yes' in step S396), the e-mail controller 23 is activated in step S397, and processing proceeds to step S398 in FIG. 29.

Figure 30:
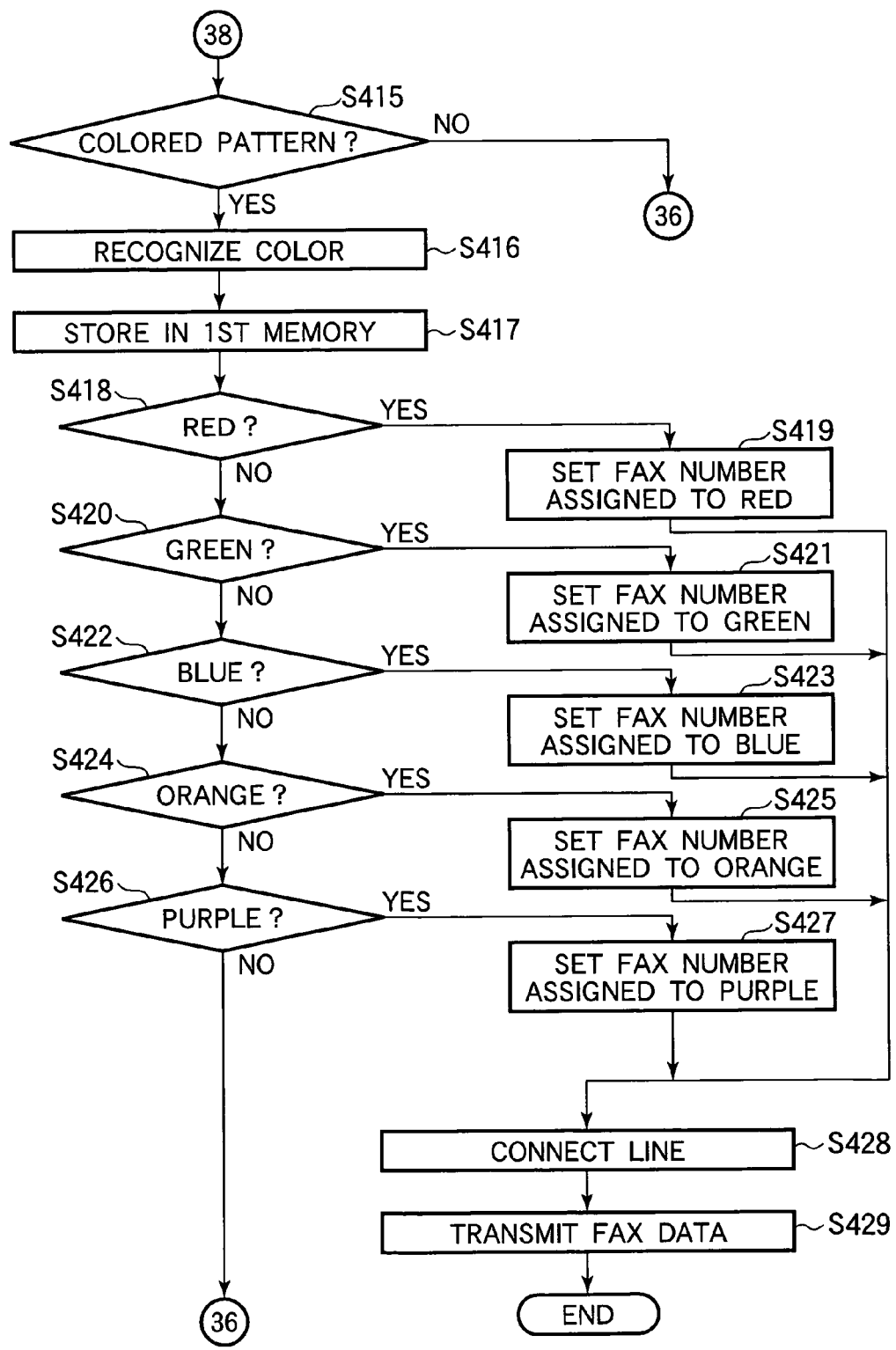

If the image pattern has a star shape ('Yes' in step S413), the facsimile controller 24 is activated in step S414, and processing proceeds to step S415 in FIG. 30.

Figure 31:
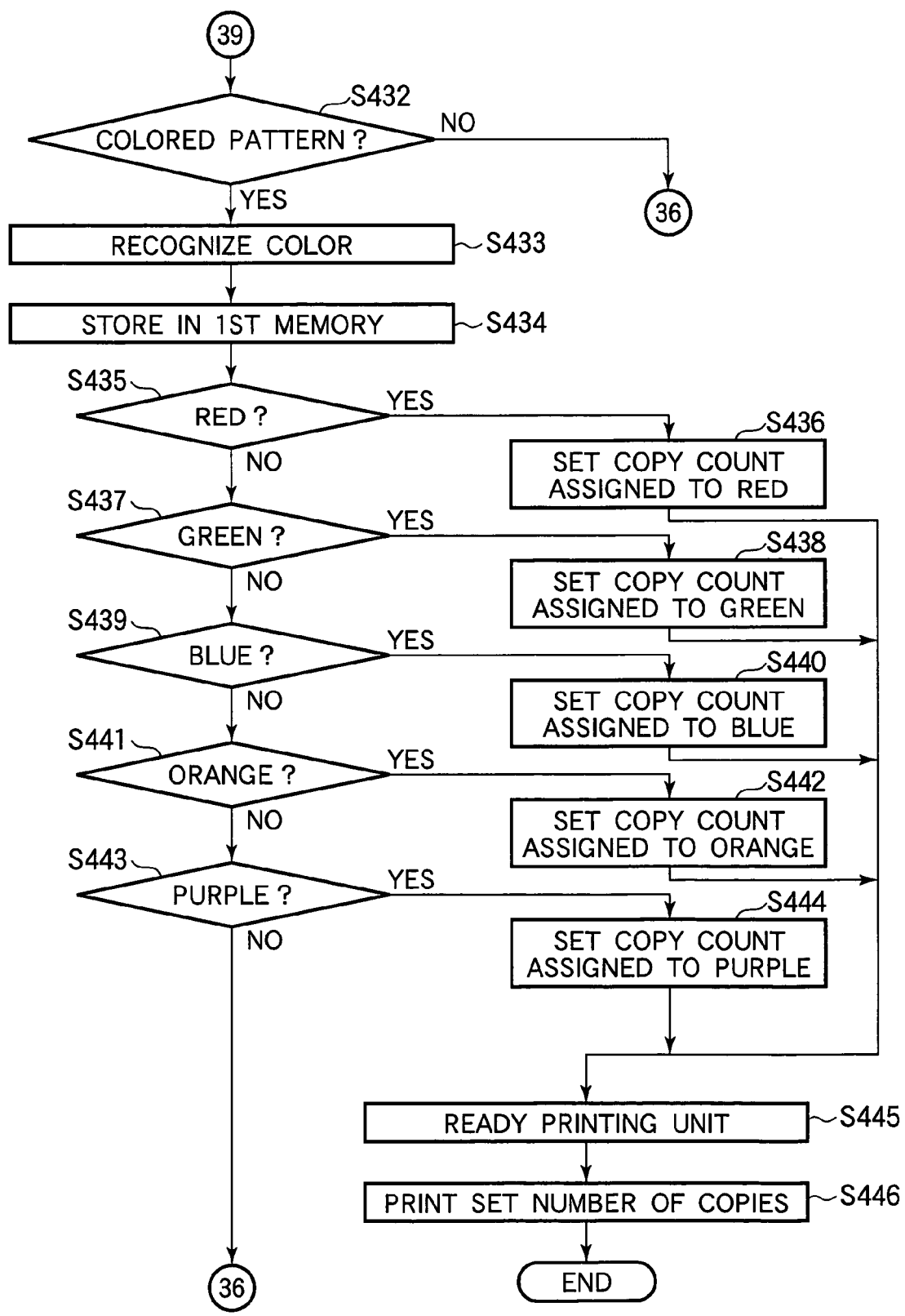

If the image pattern has a triangle shape ('Yes' in step S430), the printing unit 22 is activated in step S431, and processing proceeds to step S432 in FIG. 31.

Figure 32:
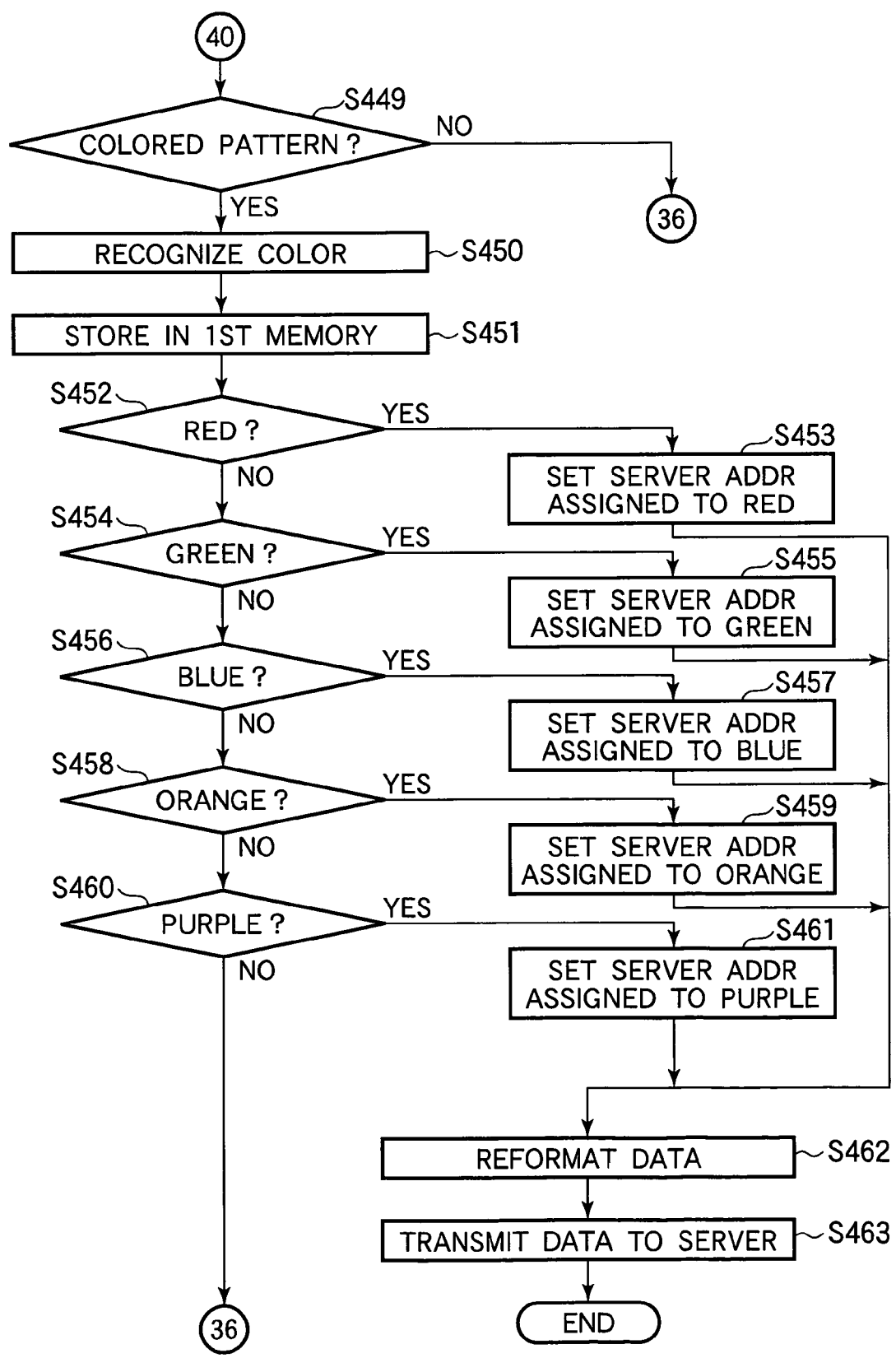

If the image pattern has a diamond shape ('Yes' in step S447), the filing controller 25 is activated in step S448, and processing proceeds to step S449 in FIG. 32.

If the image pattern does not have any of these shapes ('No' in all of steps S396, S413, S430, and S447), processing proceeds to step S464.

In step S464, the document 11 is ejected. Next, in step S465, the image input and output apparatus 10 is reset to the standby state and the procedure ends.

FIG. 29 illustrates the electronic mail part of the procedure.

Step S398 tests whether the image pattern 11*a* on the back side is colored. Processing proceeds to step S399 if the image pattern 11*a* is colored, and to step S464 in FIG. 28B otherwise.

The color recognition unit 13 recognizes the color of the image pattern 11*a* in step S399, and stores information indicating the color in the first memory 18 in step S400.

Steps S401, S403, S405, S407, and S409 are decision steps that test the color of the image pattern.

If the image pattern is red ('Yes' in step S401), the electronic mail address assigned to the color red is set in the e-mail controller 23 in step S402, and processing proceeds to step S411.

If the image pattern is green ('Yes' in step S403), the electronic mail address assigned to the color green is set in the e-mail controller 23 in step S404, and processing proceeds to step S411.

If the image pattern is blue ('Yes' in step S405), the electronic mail address assigned to the color blue is set in the e-mail controller 23 in step S406, and processing proceeds to step S411.

If the image pattern is orange ('Yes' in step S407), the electronic mail address assigned to the color orange is set in the e-mail controller 23 in step S408, and processing proceeds to step S411.

If the image pattern is purple ('Yes' in step S409), the electronic mail address assigned to the color purple is set in the e-mail controller 23 in step S410, and processing proceeds to step S411.

If the image pattern does not have any of these colors ('No' in all of steps S401, S403, S405, S407 and S409), processing proceeds to step S464 in FIG. 28B.

In step S411 in FIG. 29, the image data obtained by the front color image scanner 32 are attached as an image data file to an electronic mail message, which is transmitted to the address set in the e-mail controller 23 in step S412. The procedure then ends.

FIG. 30 illustrates the facsimile transmission part of the procedure.

Step S415 in FIG. 30 tests whether the image pattern 11*a* on the back side is colored. Processing proceeds to step S416 if the image pattern 11*a* is colored, and to step S464 in FIG. 28B otherwise.

The color recognition unit 13 recognizes the color of the image pattern 11*a* in step S416, and stores information indicating the color in the first memory 18 in step S417.

Steps S418, S420, S422, S424, and S426 are decision steps that test the color of the image pattern.

If the image pattern is red ('Yes' in step S418), the facsimile number assigned to the color red is set in the facsimile controller 24 in step S419, and processing proceeds to step S428.

If the image pattern is green ('Yes' in step S420), the facsimile number assigned to the color green is set in the facsimile controller 24 in step S421, and processing proceeds to step S428.

If the image pattern is blue ('Yes' in step S422), the facsimile number assigned to the color blue is set in the facsimile controller 24 in step S423, and processing proceeds to step S428.

If the image pattern is orange ('Yes' in step S424), the facsimile number assigned to the color orange is set in the facsimile controller 24 in step S425, and processing proceeds to step S428.

If the image pattern is purple ('Yes' in step S426), the facsimile number assigned to the color purple is set in the facsimile controller 24 in step S427, and processing proceeds to step S428.

If the image pattern does not have any of these colors ('No' decisions in all of steps S418, S420, S422, S424 and S426), processing proceeds to step S464 in FIG. 28B.

In step S428 in FIG. 30, a facsimile call is originated to the facsimile number set in the facsimile controller 24. The front color image scanner 32 continues to scan the front side of the document 11, and the image data obtained by the front color image scanner 32 are transmitted as facsimile data in step S429. The procedure then ends.

FIG. 31 illustrates the copy printing part of the procedure.

Step S432 in FIG. 31 tests whether the image pattern 11a on the back side is colored. Processing proceeds to step S433 if the image pattern 11a is colored, and to step S464 in FIG. 28B otherwise.

The color recognition unit 13 recognizes the color of the image pattern 11a in step S433, and stores information indicating the color in the first memory 18 in step S434.

Steps S435, S437, S439, S441, and S443 are decision steps that test the color of the image pattern.

If the image pattern is red ('Yes' in step S435), the number of copies assigned to the color red is set in the printing unit 22 in step S436, and processing proceeds to step S445.

If the image pattern is green ('Yes' in step S437), the number of copies assigned to the color green is set in the printing unit 22 in step S438, and processing proceeds to step S445.

If the image pattern is blue ('Yes' in step S439), the number of copies assigned to the color blue is set in the printing unit 22 in step S440, and processing proceeds to step S445.

If the image pattern is orange ('Yes' in step S441), the number of copies assigned to the color orange is set in the printing unit 22 in step S442, and processing proceeds to step S445.

If the image pattern is purple ('Yes' in step S443), the number of copies assigned to the color purple is set in the printing unit 22 in step S444, and processing proceeds to step S445.

If the image pattern does not have any of these colors ('No' decisions in all of steps S435, S437, S439, S441 and S443), processing proceeds to step S464 in FIG. 28B.

In step S445 in FIG. 9, the printing unit 22 is readied for printing as the front color image scanner 32 continues to scan the front side of the document 11. The printing unit 22 prints the set number of copies of the image data in step S446, after which the procedure ends.

FIG. 32 illustrates the filing part of the procedure.

Step S449 tests whether the image pattern 11a on the back side is colored. Processing proceeds to step S450 if the image pattern 11a is colored, and to step S464 in FIG. 28B otherwise.

The color recognition unit 13 recognizes the color of the image pattern 11a in step S450, and stores information indicating the color in the first memory 18 in step S451.

Steps S432, S454, S456, S458, and S460 are decision steps that test the color of the image pattern.

If the image pattern is red. ('Yes' in step S452), the server address assigned to the color red is set in the filing controller 25 in step S453, and processing proceeds to step S462.

If the image pattern is green ('Yes' in step S454), the server address assigned to the color green is set in the filing controller 25 in step S455, and processing proceeds to step S462.

If the image pattern is blue ('Yes' in step S456), the server address assigned to the color blue is set in the filing controller 25 in step S457, and processing proceeds to step S462.

If the image pattern is orange ('Yes' in step S458), the server address assigned to the color orange is set in the filing controller 25 in step S459, and processing proceeds to step S462.

If the image pattern is purple ('Yes' in step S460), the server address assigned to the color purple is set in the filing controller 25 in step S461, and processing proceeds to step S462.

If the image pattern does not have any of these colors ('No' in all of steps S452, S454, S456, S458, and S460), processing proceeds to step S464 in FIG. 28B.

In step S462 in FIG. 32, the image data obtained by the front color image scanner 32 and stored in the image memory 15 are reformatted for filing. In step S463, the filing controller 25 accesses the designated server and transmits the reformatted image data to be stored in the server. The procedure then ends.

By placing the colored image pattern 11a on the back of the document 11, while providing the same effects as the first embodiment, the fourth embodiment avoids possible confusion of the colored image pattern with the main document image.

Fifth Embodiment

The configuration of the image input and output apparatus 10 in the fifth embodiment is the same as in the fourth embodiment, and the preliminary procedure in the fifth embodiment is the same as in the first embodiment. The operation of scanning a document 11 in the fifth embodiment is almost the same as in the fourth embodiment. The differences will be pointed out below.

When a sensor (not shown) senses that a document 11 has been set, the front color image scanner 32 and back color image scanner 33 begin scanning the front side and the back side of the document 11 from its top or leading edge. Depending on the shape of an image pattern 11a on the back side of the document 11, the printing unit 22, e-mail controller 23, facsimile controller 24, or filing controller 25 is activated as in the fourth embodiment. If the color of the image pattern 11a can be recognized and matches information stored in the output selection table 16, the image input and output apparatus 10 operates according to this information as in the fourth embodiment.

If the shape of the image pattern 11a cannot be recognized or does not match any of the information in the output selection table 16, however, then instead of being reset to the standby state as in the fourth embodiment, the image input and output apparatus 10 displays a message prompting the operator to use the operation panel to select whether to send the image data to a specified electronic mail address, facsimile number, or file server address or to print a specified number of copies.

If the shape of the image pattern 11a can be recognized but its color cannot be recognized or does not match any of the information in the output selection table 16, then instead of being reset as in the fourth embodiment, the image input and output apparatus 10 prompts the operator to enter the necessary destination information or number-of-copies information from the operation panel.

The above operation is illustrated by the flowcharts in FIGS. 33A, 33B, and 34-37.

Figure 33A:
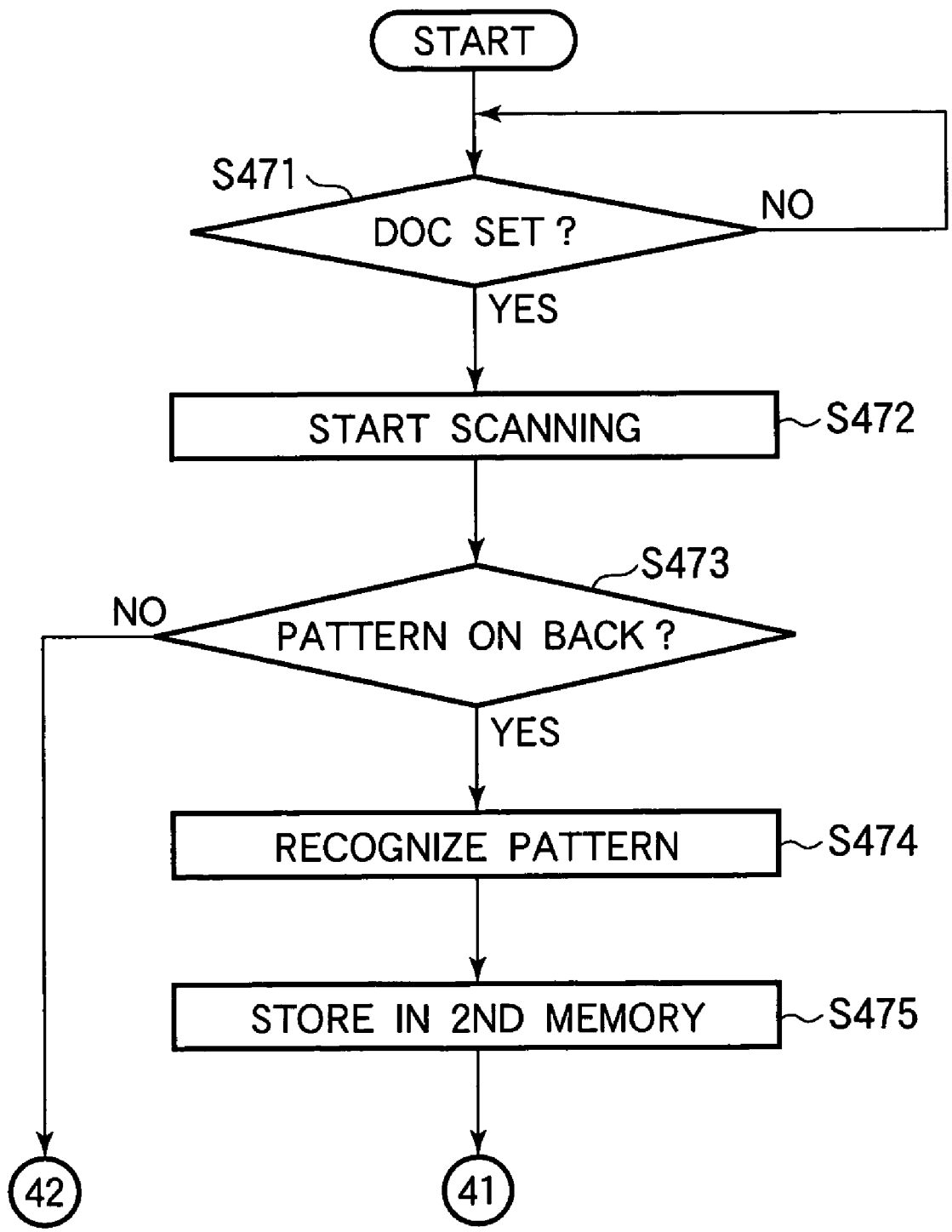
FIGS. 33A, 33B, 34, 35, 36, and 37 are a flowchart illustrating the operation of the fifth embodiment.

In step S471 in FIG. 33A, the image input and output apparatus 10 waits for a document to be set.

When a document is set, the front color image scanner 32 and back color image scanner 33 begin scanning it in step S472.

Step S473 is a decision step that tests for the presence of an image pattern 11a on the back side of the document. Processing proceeds to step S474 if an image pattern is present, and to step S552 in FIG. 33B otherwise.

In step S474, the image pattern recognition unit 14 recognizes the shape of the image pattern.

In step S475, the image pattern recognition unit 14 stores information indicating the shape of the image pattern in the second memory 19.

Steps S476, S495, S514, and S533 are decision steps that test the shape of the image pattern.

Figure 34:
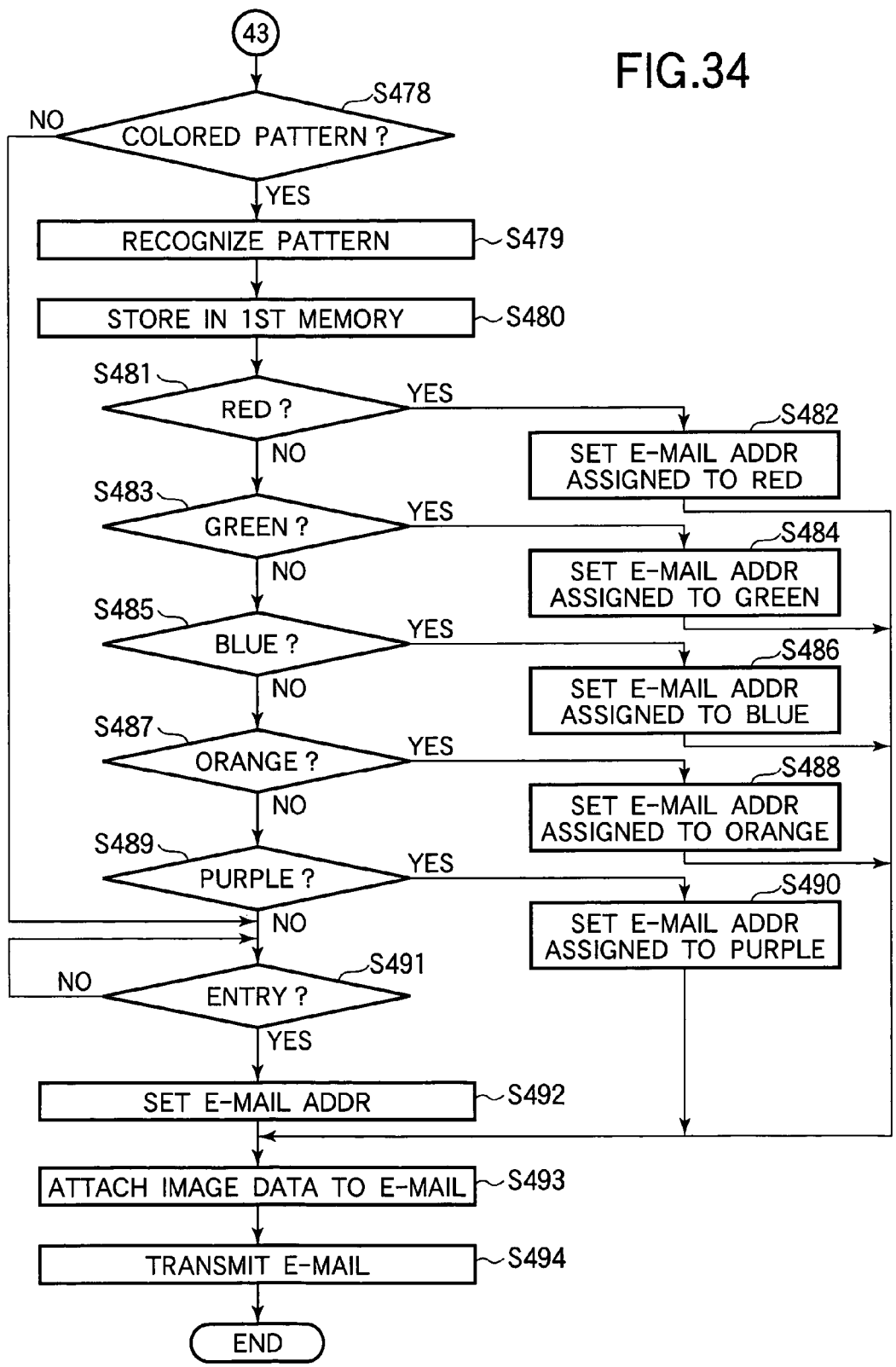

If the image pattern has a square shape ('Yes' in step S476), the e-mail controller 23 is activated in step S477, and processing proceeds to step S478 in FIG. 34.

Figure 35:
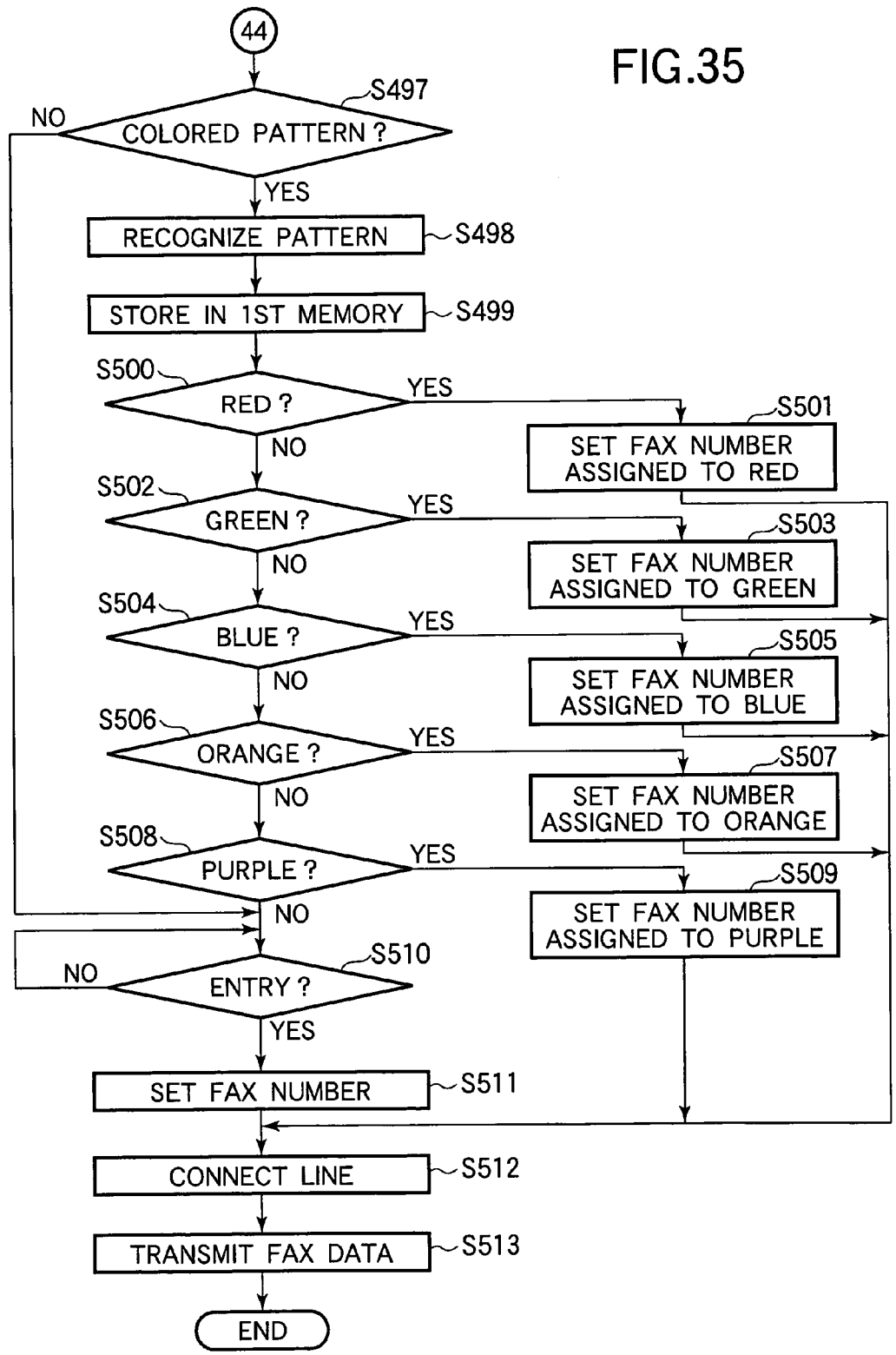

If the image pattern has a star shape ('Yes' in step S495), the facsimile controller 24 is activated in step S496, and processing proceeds to step S497 in FIG. 35.

Figure 36:
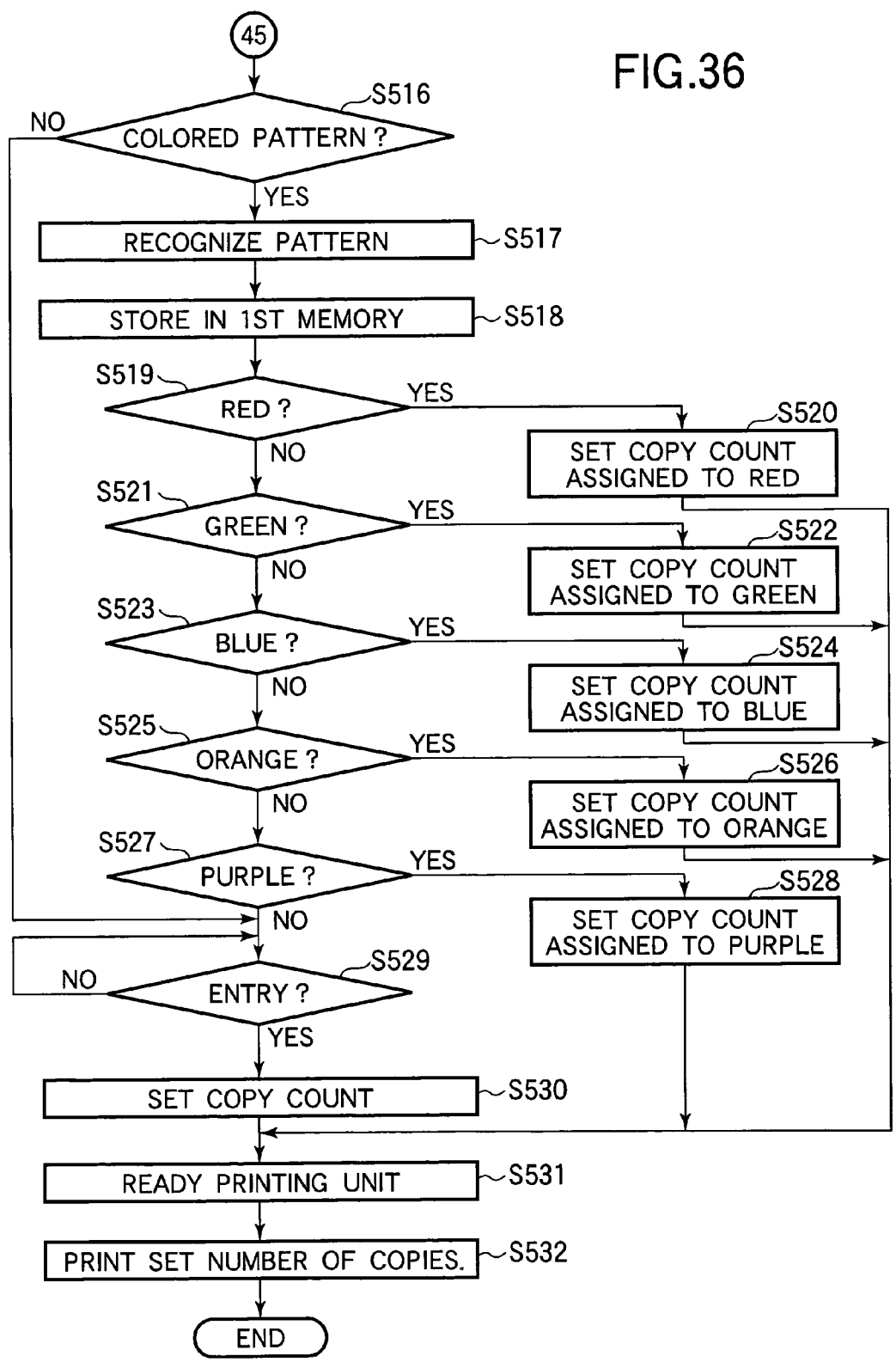

If the image pattern has a triangle shape ('Yes' in step S514), the printing unit 22 is activated in step S515, and processing proceeds to step S516 in FIG. 36.

Figure 37:
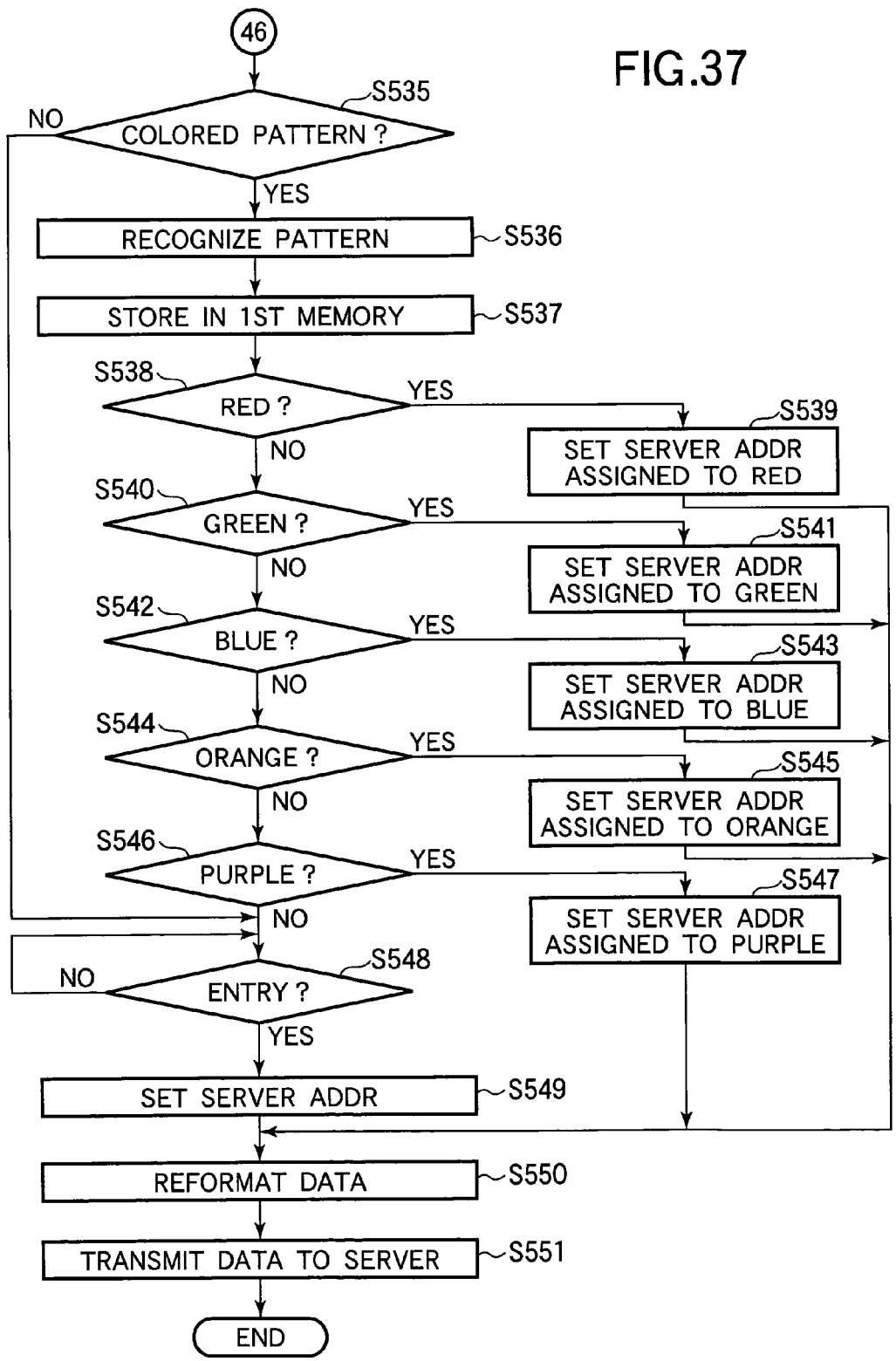

If the image pattern has a diamond shape ('Yes' in step S533), the filing controller 25 is activated in step S534, and processing proceeds to step S535 in FIG. 37.

Figure 33B:
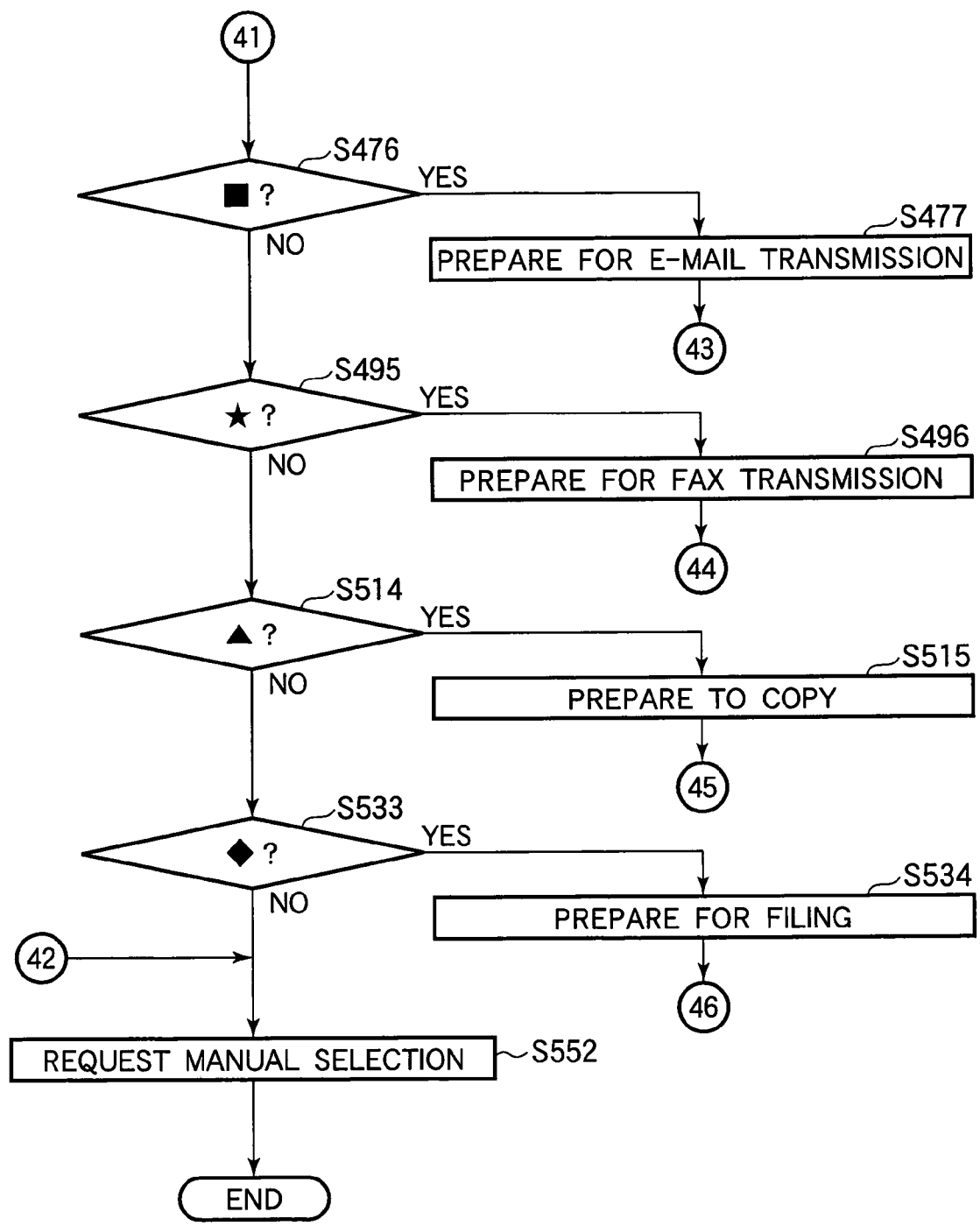

If the image pattern does not have any of these shapes ('No' in all of steps S476, S495, S514, and S533), processing proceeds to step S552 in FIG. 33B.

In step S552, the image input and output apparatus 10 requests manual selection of a function and terminates the procedure.

FIG. 34 illustrates the electronic mail part of the procedure.

Step S478 tests whether the image pattern 11a on the back side is colored. Processing proceeds to step S479 if the image pattern 11a is colored, and to step S491 otherwise.

The color recognition unit 13 recognizes the color of the image pattern 11a in step S479, and stores information indicating the color in the first memory 18 in step S490.

Steps S481, S483, S485, S487, and S489 are decision steps that test the color of the image pattern.

If the image pattern is red ('Yes' in step S481), the electronic mail address assigned to the color red is set in the e-mail controller 23 in step S482, and processing proceeds to step S493.

If the image pattern is green ('Yes' in step S483), the electronic mail address assigned to the color green is set in the e-mail controller 23 in step S484, and processing proceeds to step S493.

If the image pattern is blue ('Yes' in step S485), the electronic mail address assigned to the color blue is set in the e-mail controller 23 in step S486, and processing proceeds to step S493.

If the image pattern is orange ('Yes' in step S487), the electronic mail address assigned to the color orange is set in the e-mail controller 23 in step S488, and processing proceeds to step S493.

If the image pattern is purple ('Yes' in step S489), the electronic mail address assigned to the color purple is set in the e-mail controller 23 in step S490, and processing proceeds to step S493.

If the image pattern does not have any of these colors ('No' decisions in all of steps S481, S483, S485, S487, and S489), then in step S491, the image input and output apparatus 10 waits for the operator to enter an electronic mail address. When an electronic mail address is entered, the electronic mail address is set in the e-mail controller 23 in step S492, and processing proceeds to step S493.

In step S493, the image data obtained by the front color image scanner 32 are attached as an image data file to an electronic mail message, which is transmitted to the address set in the e-mail controller 23 in step S494. The procedure then ends.

FIG. 35 illustrates the facsimile transmission part of the procedure.

Step S497 tests whether the image pattern 11a on the back side is colored. Processing proceeds to step S498 if the image pattern 11a is colored, and to step S510 otherwise.

The color recognition unit 13 recognizes the color of the image pattern 11a in step S498, and stores information indicating the color in the first memory 18 in step S499.

Steps S500, S502, S504, S506, and S508 are decision steps that test the color of the image pattern.

If the image pattern is red ('Yes' in step S500), the facsimile number assigned to the color red is set in the facsimile controller 24 in step S501, and processing proceeds to step S512.

If the image pattern is green ('Yes' in step S502), the facsimile number assigned to the color green is set in the facsimile controller 24 in step S503, and processing proceeds to step S512.

If the image pattern is blue ('Yes' in step S504), the facsimile number assigned to the color blue is set in the facsimile controller 24 in step S505, and processing proceeds to step S512.

If the image pattern is orange ('Yes' in step S506), the facsimile number assigned to the color orange is set in the facsimile controller 24 in step S507, and processing proceeds to step S512.

If the image pattern is purple ('Yes' in step S508), the facsimile number assigned to the color purple is set in the facsimile controller 24 in step S509, and processing proceeds to step S512.

If the image pattern does not have any of these colors ('No' decisions in all of steps S500, S502, S504, S506, and S508), then in step S510, the image input and output apparatus 10 waits for the operator to enter a facsimile number. When a facsimile number is entered, the facsimile number is set in the facsimile controller 24 in step S511, and processing proceeds to step S512.

In step S512, a facsimile call is originated to the facsimile number set in the facsimile controller 24. The image data obtained by the front color image scanner 32 are transmitted as facsimile data in step S513. The procedure then ends.

FIG. 36 illustrates the copy printing part of the procedure.

Step S516 tests whether the image pattern 11a on the back side is colored. Processing proceeds to step S517 if the image pattern 11a is colored, and to step S529 otherwise.

The color recognition unit 13 recognizes the color of the image pattern 11a in step S517, and stores information indicating the color in the first memory 18 in step S518.

Steps S519, S521, S523, S525, and S527 are decision steps that test the color of the image pattern.

If the image pattern is red ('Yes' in step S519), the number of copies assigned to the color red is set in the printing unit 22 in step S520, and processing proceeds to step S531.

If the image pattern is green ('Yes' in step S521), the number of copies assigned to the color green is set in the printing unit 22 in step S522, and processing proceeds to step S531.

If the image pattern is blue ('Yes' in step S523), the number of copies assigned to the color blue is set in the printing unit 22 in step S524, and processing proceeds to step S531.

If the image pattern is orange ('Yes' in step S525), the number of copies assigned to the color orange is set in the printing unit 22 in step S526, and processing proceeds to step S531.

If the image pattern is purple ('Yes' in step S527), the number of copies assigned to the color purple is set in the printing unit 22 in step S528, and processing proceeds to step S531.

If the image pattern does not have any of these colors ('No' decisions in all of steps S519, S521, S523, S525, and S527), then in step S529, the image input and output apparatus 10 waits for the operator to enter a number of copies. When a number of copies is entered, the number of copies is set in the printing unit 22 in step S530, and processing proceeds to step S531.

In step S531, the printing unit 22 is readied for printing the image data obtained from the front side. The printing unit 22 prints the set number of copies of the image data in step S532, after which the procedure ends.

FIG. 37 illustrates the filing part of the procedure.

Step S535 tests whether the image pattern 11a on the back side is colored. Processing proceeds to step S536 if the image pattern 11a is colored, and to step S548 otherwise.

The color recognition unit 13 recognizes the color of the image pattern 11a in step S536, and stores information indicating the color in the first memory 18 in step S537.

Steps S538, S540, S542, S544, and S546 are decision steps that test the color of the image pattern.

If the image pattern is red ('Yes' in step S538), the server address assigned to the color red is set in the filing controller 25 in step S539, and processing proceeds to step S550.

If the image pattern is green ('Yes' in step S540), the server address assigned to the color green is set in the filing controller 25 in step S541, and processing proceeds to step S550.

If the image pattern is blue ('Yes' in step S542), the server address assigned to the color blue is set in the filing controller 25 in step S543, and processing proceeds to step S550.

If the image pattern is orange ('Yes' in step S544), the server address assigned to the color orange is set in the filing controller 25 in step S545, and processing proceeds to step S550.

If the image pattern is purple ('Yes' in step S546), the server address assigned to the color purple is set in the filing controller 25 in step S547, and processing proceeds to step S550.

If the image pattern does not have any of these colors ('No' in all of steps S538, S540, S542, S544, and S546), processing proceeds to step S548.

The image input and output apparatus 10 waits for the operator to enter a server address in step S548. When a server address is entered, the server address is set in the filing controller 25 in step S549, and processing proceeds to step S550.

In step S550, the image data obtained from the front side are reformatted for filing. In step S551, the filing controller 25 accesses the designated server and transmits the reformatted image data to be stored in the server. The procedure then ends.

The fifth embodiment combines the effects and advantages of the second and fourth embodiments.

Sixth Embodiment

Figure 38:
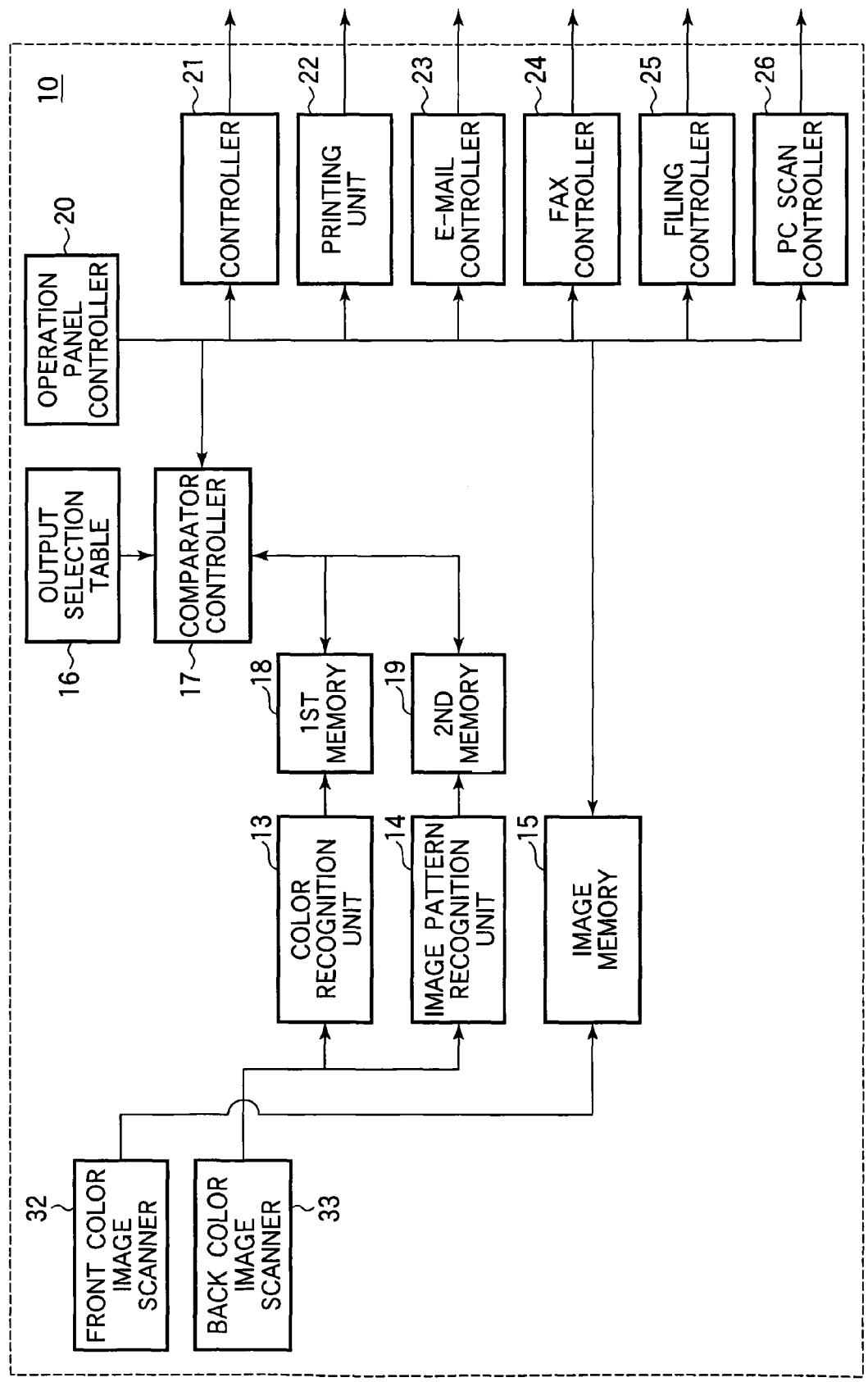
FIG. 38 is a block diagram of an image input and output apparatus according to a sixth embodiment of the invention.

Referring to FIG. 38, the image input and output apparatus 10 in the sixth embodiment has a PC scan controller 26 for transferring scanned image data to a local personal computer or a personal computer connected to a local area network and saving the data in a specified folder in the personal computer. The other components are the same as in the fourth embodiment.

Next, the operation of the image input and output apparatus 10 will be described.

The preliminary procedure in the sixth embodiment is the same as in the third embodiment. The operation of scanning a document 11 is substantially the same as in the fifth embodiment, except that the color of the image pattern designates the output function, and the shape designates the output destination, as in the third embodiment (FIG. 17).

When a sensor (not shown) senses that a document 11 has been set, the front color image scanner 32 and back color image scanner 33 begin scanning the front side and the back side of the document 11 simultaneously from its top or leading edge. If the back color image scanner 33 encounters a colored image on the back side of the document 11 near the leading edge, the color recognition unit 13 recognizes the color of the image and stores information indicating the color in the first memory 18. The comparator controller 17, which constantly monitors the presence of information in the first memory 18 and second memory 19, compares the information indicating the color of the image with the color information in the output selection table 16. If the information indicating the color of the image matches any of the color information in the output selection table 16, the image pattern recognition unit 14 recognizes the colored image pattern by recognizing its shape. Information indicating the recognized shape is stored in the second memory 19. The comparator controller 17 compares this information with the shape information in the output selection table 16.

If the information indicating the color and shape of the image pattern 11a both match information in the output selection table 16, the front color image scanner 32 continues scanning the document, obtaining image data that are stored in the image memory 15, and the output unit indicated by the color information is activated for output of the image data to the destination indicated by the shape information (for copy printing, the shape information indicates the number of copies).

As in the third embodiment, if the color of the image pattern 11a cannot be recognized or does not match any of the information in the output selection table 16, the image input and output apparatus 10 displays a message prompting the operator to use the operation panel to select whether to send the image data to a specified electronic mail address, facsimile number, or file server address, to print a specified number of copies, or to save the data. If the shape of the image pattern 11a cannot be recognized or does not match any of the information in the output selection table 16, the input and output apparatus 10 prompts the operator to enter a destination or designate a number of copies.

The entire operation is illustrated by the flowcharts in FIGS. 39A, 39B, and 40-44.

Figure 39A:
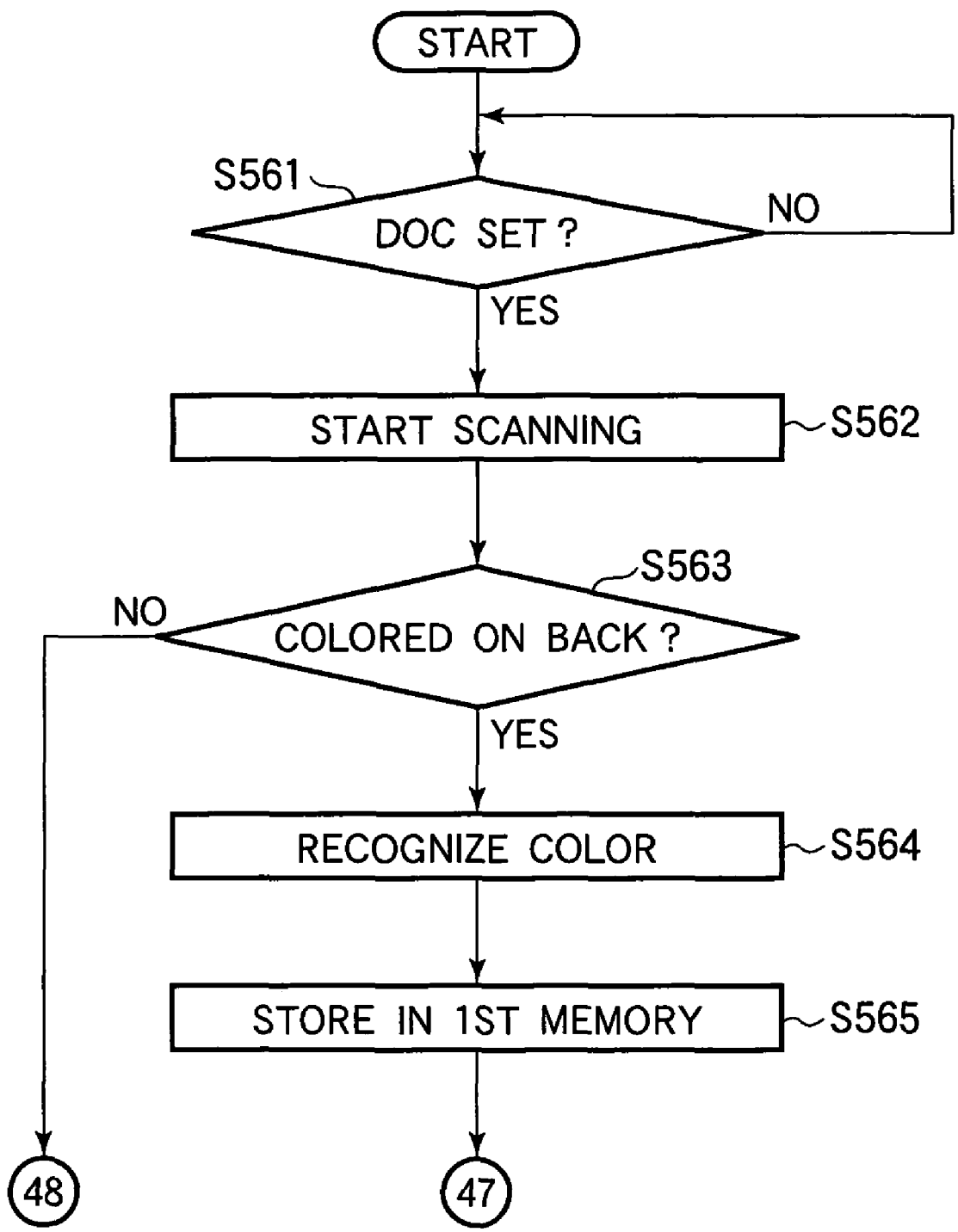
FIGS. 39A, 39B, 40, 41, 42, 43, and 44 are a flowchart illustrating the operation of the sixth embodiment.

In step S561 in FIG. 39A, the image input and output apparatus 10 waits for a document to be set.

When a document is set, the front color image scanner 32 and back color image scanner 33 begin scanning it in step S562.

Step S563 is a decision step that tests for the presence of color on the back side of the document. Processing proceeds to step S564 if color is present, and to step S661 in FIG. 39B otherwise.

In step S564, the color recognition unit 13 recognizes the color.

In step S565, the color recognition unit 13 stores information indicating the recognized color.

Figure 39B:
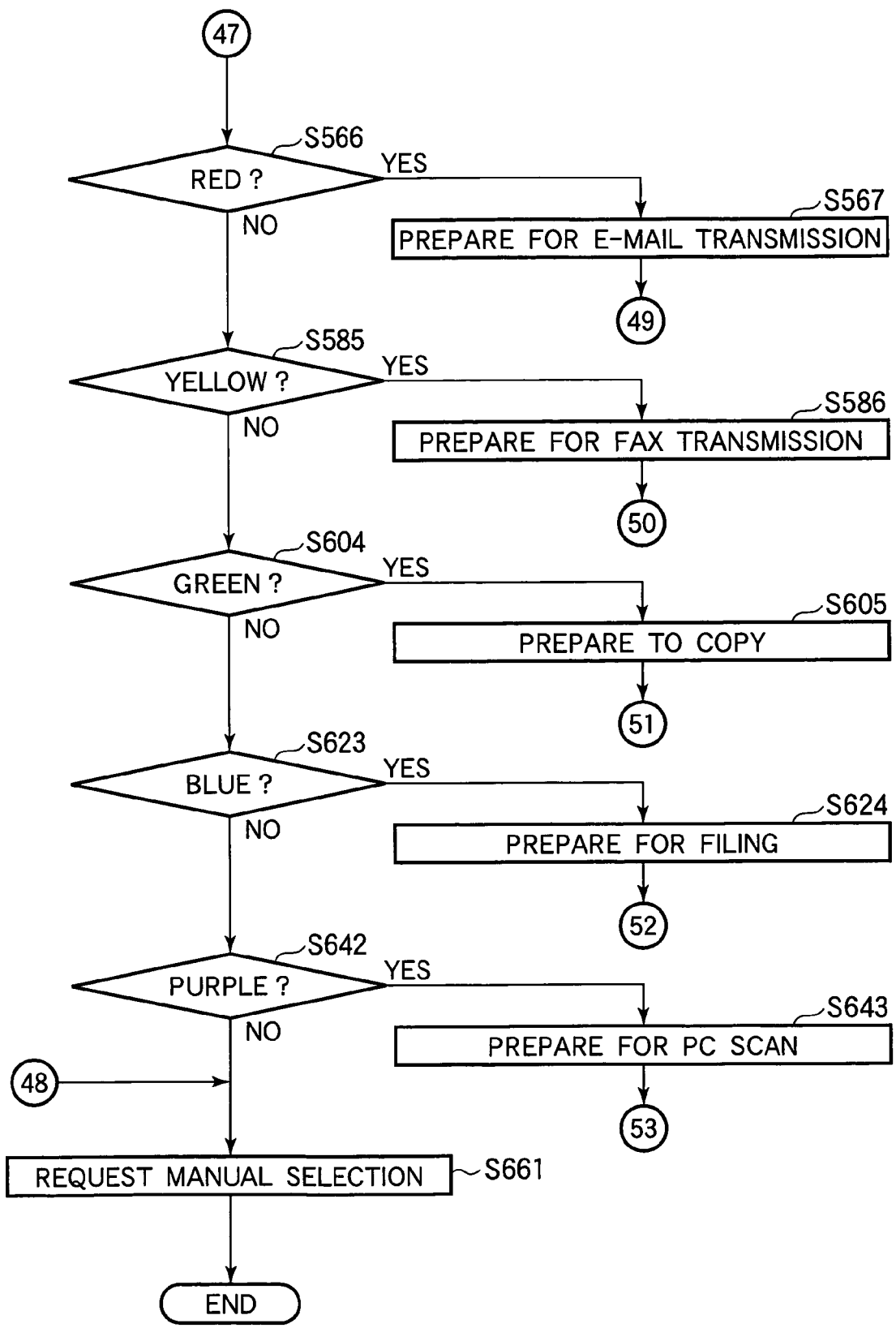

Steps S566, S585, S604, S623, and S642 in FIG. 39B are decision steps that test the recognized color.

Figure 40:
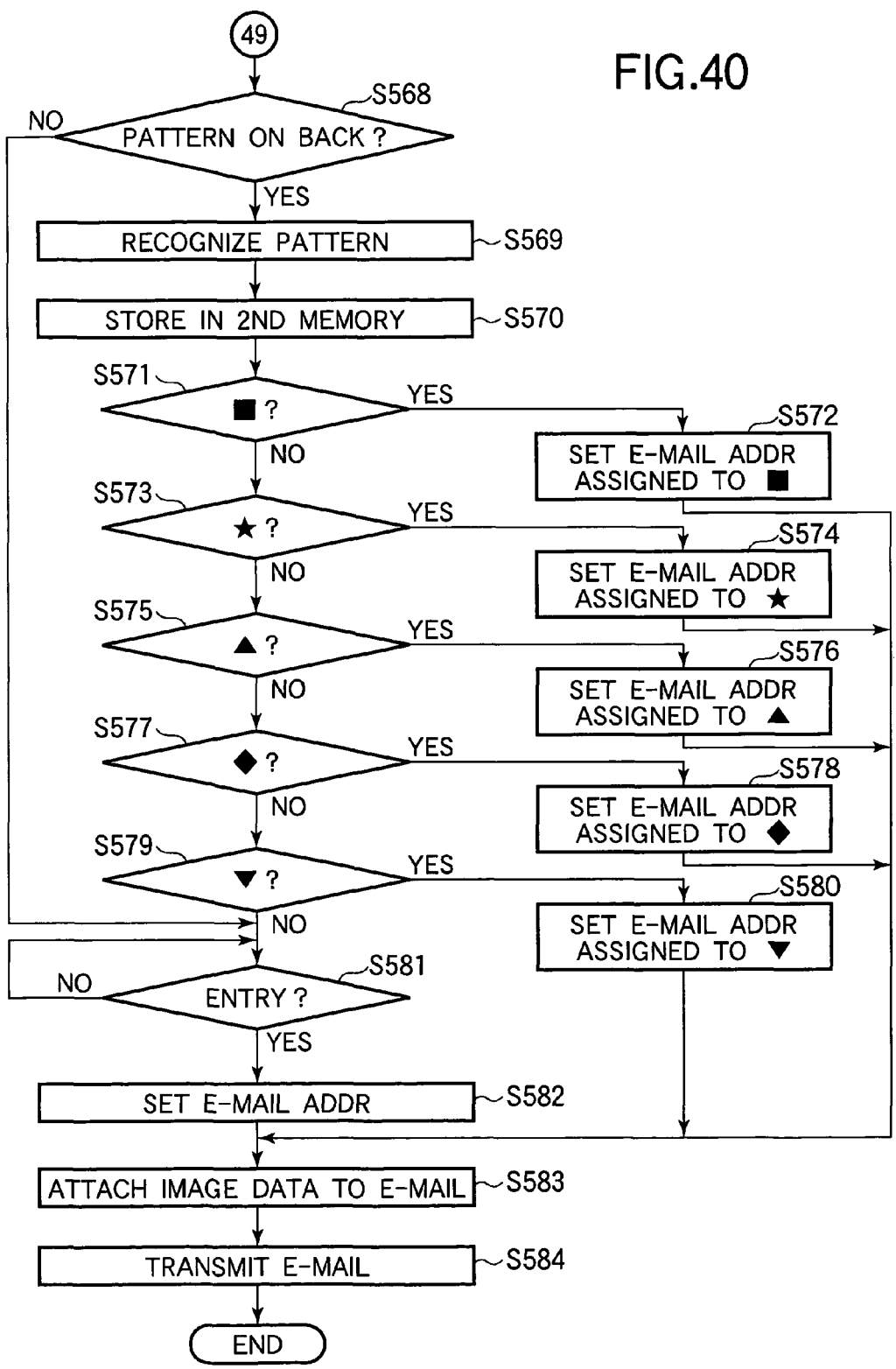

If the color is red ('Yes' in step S566), the e-mail controller 23 is activated in step S567, and processing proceeds to step S568 in FIG. 40.

Figure 41:
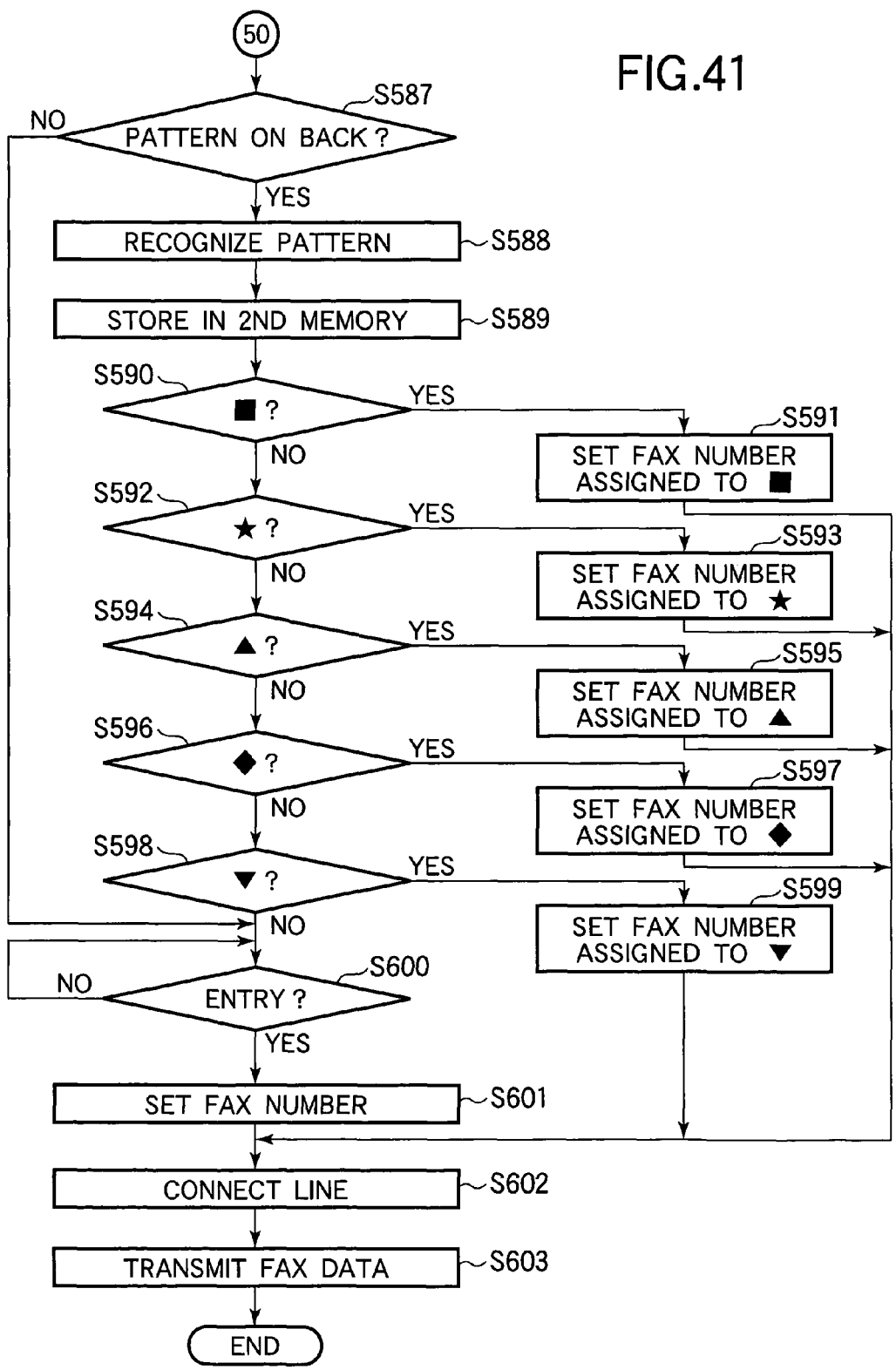

If the color is yellow ('Yes' in step S585), the facsimile controller 24 is activated in step S586, and processing proceeds to step S587 in FIG. 41.

Figure 42:
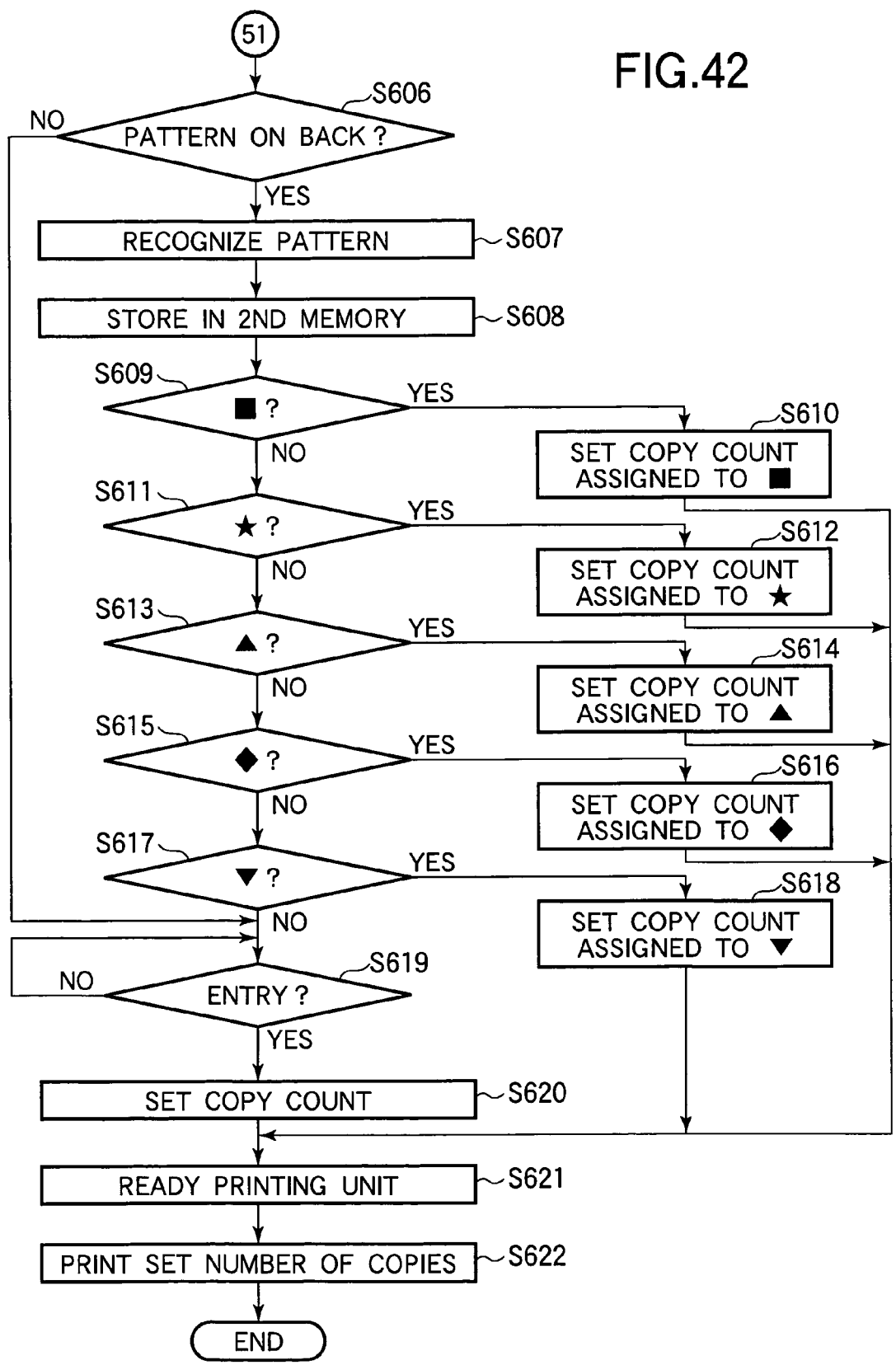

If the color is green ('Yes' in step S604), the printing unit 22 is activated in step S605, and processing proceeds to step S606 in FIG. 42.

Figure 43:
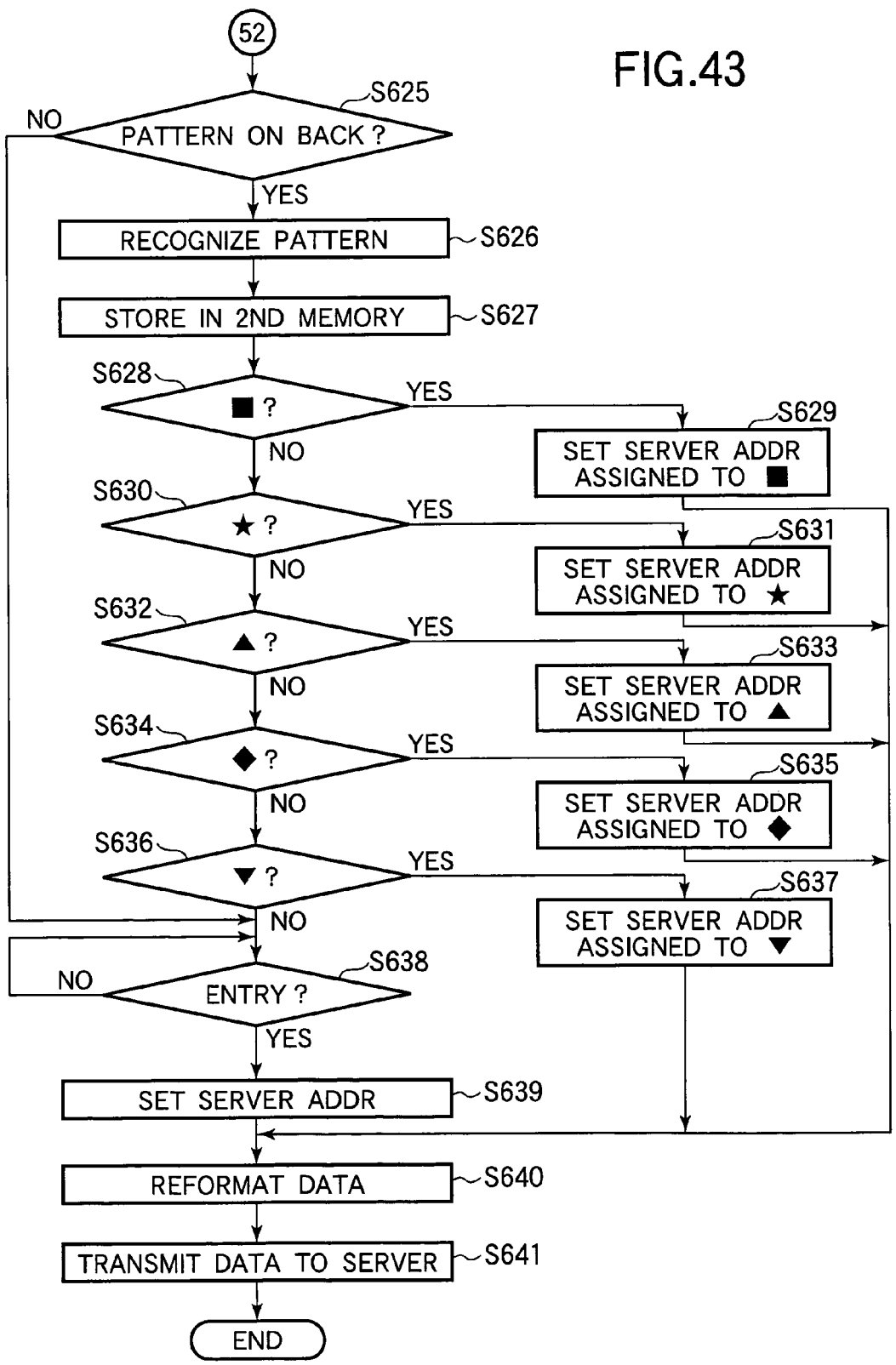

If the color is blue ('Yes' in step S623), the filing controller 25 is activated in step S624, and processing proceeds to step S625 in FIG. 43.

Figure 44:
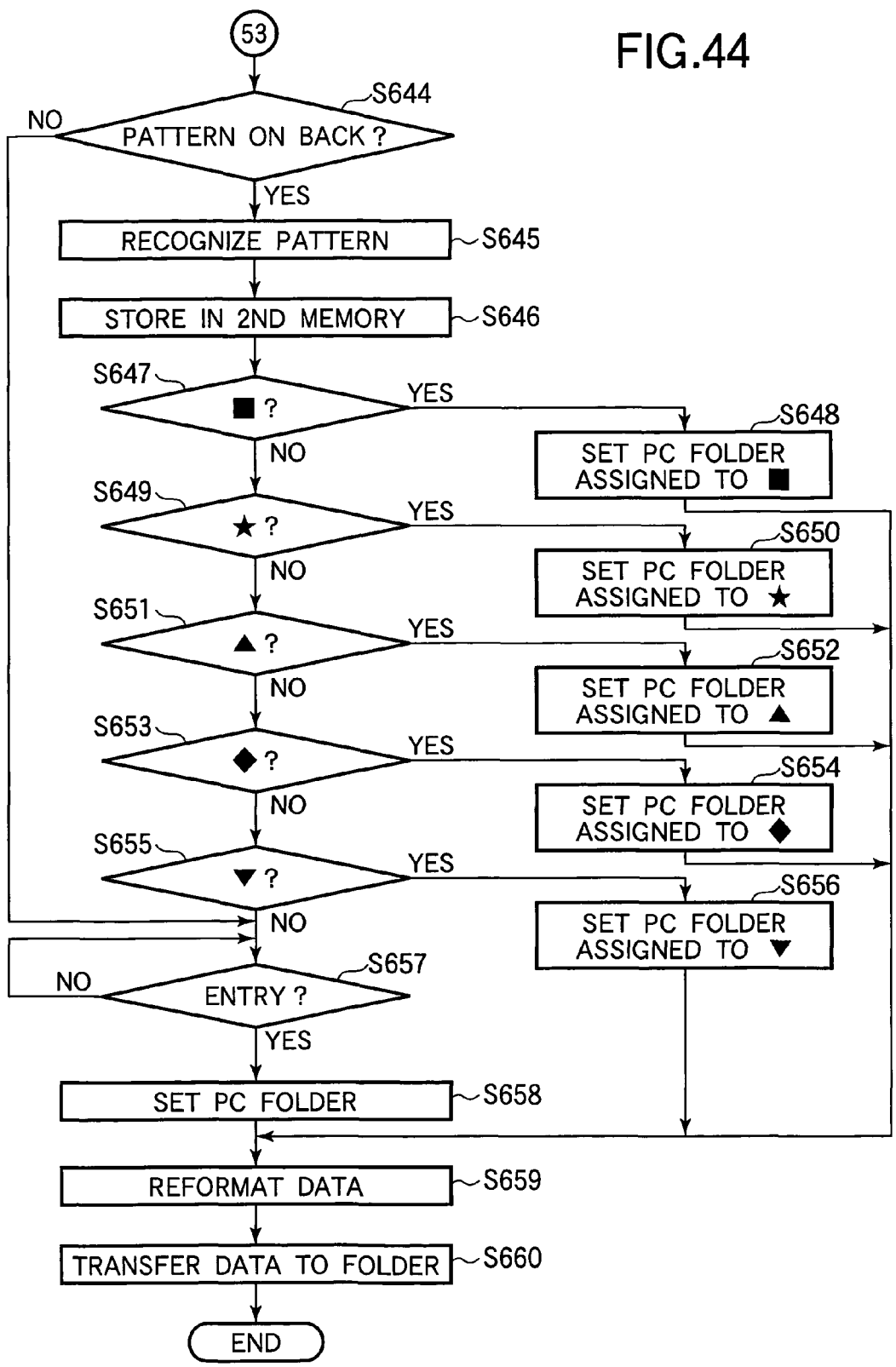

If the color is purple ('Yes' in step S642), the PC scan controller 26 is activated in step S643, and processing proceeds to step S644 in FIG. 44.

If the recognized color is not any of these colors ('No' in all of steps S566, S585, S604, S623, and S642), processing proceeds to step S661 in FIG. 39B.

In step S661 in FIG. 39B, the image input and output apparatus 10 requests manual selection of a function and terminates the procedure.

FIG. 40 illustrates the electronic mail part of the procedure.

Step S568 tests whether the document 11 has an image pattern 11a on its back side. Processing proceeds to step S569 if an image pattern 11a is present, and to step S581 otherwise.

The image pattern recognition unit 14 recognizes the shape of the image pattern 11a in step S569, and stores information indicating the shape in the second memory 19 in step S570.

Steps S571, S573, S575, S577, and S579 are decision steps that test the shape of the image pattern.

If the image pattern has a square shape ('Yes' in step S571), the electronic mail address assigned to the square shape is set in the e-mail controller 23 in step S572, and processing proceeds to step S583.

If the image pattern has a star shape ('Yes' in step S573), the electronic mail address assigned to the star shape is set in the e-mail controller 23 in step S574, and processing proceeds to step S583.

If the image pattern has a triangle shape ('Yes' in step S575), the electronic mail address assigned to the triangle shape is set in the e-mail controller 23 in step S576, and processing proceeds to step S583.

If the image pattern has a diamond shape ('Yes' in step S577), the electronic mail address assigned to the diamond shape is set in the e-mail controller 23 in step S578, and processing proceeds to step S583.

If the image pattern has an inverted triangle shape ('Yes' in step S579), the electronic mail address assigned to the inverted triangle shape is set in the e-mail controller 23 in step S580, and processing proceeds to step S583.

If the image pattern does not have any of these shapes ('No' decisions in all of steps S571, S573, S575, S577, and S579), then in step S581, the image input and output apparatus 10 waits for the operator to enter an electronic mail address. When an electronic mail address is entered, the electronic mail address is set in the e-mail controller 23 in step S582, and processing proceeds to step S583.

In step S583, the image data obtained by the front color image scanner 32 are attached as an image data file to an electronic mail message, which is transmitted to the address set in the e-mail controller 23 in step S584. The procedure then ends.

FIG. 41 illustrates the facsimile transmission part of the procedure.

Step S587 tests whether the document 11 has an image pattern 11a on its back side. Processing proceeds to step S588 if an image pattern 11a is present, and to step S600 otherwise.

The image pattern recognition unit 14 recognizes the shape of the image pattern 11a in step S588, and stores information indicating the shape in the second memory 19 in step S589.

Steps S590, S592, S594, S596, and S598 are decision steps that test the shape of the image pattern.

If the image pattern has a square shape ('Yes' in step S590), the facsimile number assigned to the square shape is set in the facsimile controller 24 in step S591, and processing proceeds to step S602.

If the image pattern has a star shape ('Yes' in step S592), the facsimile number assigned to the star shape is set in the facsimile controller 24 in step S593, and processing proceeds to step S602.

If the image pattern has a triangle shape ('Yes' in step S594), the facsimile number assigned to the triangle shape is set in the facsimile controller 24 in step S595, and processing proceeds to step S602.

If the image pattern has a diamond shape ('Yes' in step S596), the facsimile number assigned to the diamond shape is set in the facsimile controller 24 in step S597, and processing proceeds to step S602.

If the image pattern has an inverted triangle shape ('Yes' in step S598), the facsimile number assigned to the inverted triangle shape is set in the facsimile controller 24 in step S599, and processing proceeds to step S602.

If the image pattern does not have any of these shapes ('No' decisions in all of steps S590, S592, S594, S596, and S598), then in step S600, the image input and output apparatus 10 waits for the operator to enter a facsimile number. When a facsimile number is entered, the facsimile number is set in the facsimile controller 24 in step S601, and processing proceeds to step S602.

In step S602, a facsimile call is originated to the facsimile number set in the facsimile controller 24. The image data obtained by the front color image scanner 32 are transmitted as facsimile data in step S603. The procedure then ends.

FIG. 42 illustrates the copy printing part of the procedure.

Step S606 tests whether the document 11 has an image pattern 11a on its back side. Processing proceeds to step S607 if an image pattern 11a is present, and to step S619 otherwise.

The image pattern recognition unit 14 recognizes the shape of the image pattern 11a in step S607, and stores information indicating the shape in the second memory 19 in step S608.

Steps S609, S611, S613, S615, and S617 are decision steps that test the shape of the image pattern.

If the image pattern has a square shape ('Yes' in step S609), the number of copies assigned to the square shape is set in the printing unit 22 in step S610, and processing proceeds to step S621.

If the image pattern has a star shape ('Yes' in step S611), the number of copies assigned to the star shape is set in the printing unit 22 in step S612, and processing proceeds to step S621.

If the image pattern has a triangle shape ('Yes' in step S613), the number of copies assigned to the triangle shape is set in the printing unit 22 in step S614, and processing proceeds to step S621.

If the image pattern has a diamond shape ('Yes' in step S615), the number of copies assigned to the diamond shape is set in the printing unit 22 in step S616, and processing proceeds to step S621.

If the image pattern has an inverted triangle shape ('Yes' in step S617), the number of copies assigned to the inverted triangle shape is set in the printing unit 22 in step S618, and processing proceeds to step S621.

If the image pattern does not have any of these shapes ('No' decisions in all of steps S609, S611, S613, S615, and S617), then in step S619, the image input and output apparatus 10 waits for the operator to enter a number of copies. When a number of copies is entered, the number of copies is set in the printing unit 22 in step S620, and processing proceeds to step S621.

In step S621, the printing unit 22 is readied for printing the image data obtained by the front color image scanner 32. The printing unit 22 prints the set number of copies of the image data in step S622, after which the procedure ends.

FIG. 43 illustrates the filing part of the procedure.

Step S625 tests whether the document 11 has an image pattern 11a on its back side. Processing proceeds to step S626 if an image pattern 11a is present, and to step S638 otherwise.

The image pattern recognition unit 14 recognizes the shape of the image pattern 11a in step S626, and stores information indicating the shape in the second memory 19 in step S627.

Steps S628, S630, S632, S634, and S636 are decision steps that test the shape of the image pattern.

If the image pattern has a square shape ('Yes' in step S628), the server address assigned to the square shape is set in the filing controller 25 in step S629, and processing proceeds to step S640.

If the image pattern has a star shape ('Yes' in step S630), the server address assigned to the star shape is set in the filing controller 25 in step S631, and processing proceeds to step S640.

If the image pattern has a triangle shape ('Yes' in step S632), the server address assigned to the triangle shape is set in the filing controller 25 in step S633, and processing proceeds to step S640.

If the image pattern has a diamond shape ('Yes' in step S634), the server address assigned to the diamond shape is set in the filing controller 25 in step S635, and processing proceeds to step S640.

If the image pattern has an inverted triangle shape ('Yes' in step S636), the server address assigned to the inverted triangle shape is set in the filing controller 25 in step S637, and processing proceeds to step S640.

If the image pattern does not have any of these shapes ('No' decisions in all of steps S628, S630, S632, S634, and S636), the image input and output apparatus 10 waits for the operator to enter a server address in step S638. When a server address is entered, the server address is set in the filing controller 25 in step S639, and processing proceeds to step S640.

In step S640, the image data obtained by the front color image scanner 32 are reformatted for filing. In step S641, the filing controller 25 accesses the designated server and transmits the reformatted image data to be stored in the server. The procedure then ends.

FIG. 44 illustrates the saving part of the procedure.

Step S644 tests whether the document 11 has an image pattern 11a on its back side. Processing proceeds to step S645 if an image pattern 11a is present, and to step S657 otherwise.

The image pattern recognition unit 14 recognizes the shape of the image pattern 11a in step S645, and stores information indicating the shape in the second memory 19 in step S646.

Steps S647, S649, S651, S653, and S655 are decision steps that test the shape of the image pattern.

If the image pattern has a square shape ('Yes' in step S647), the PC folder name assigned to the square shape is set in the PC scan controller 26 in step S648, and processing proceeds to step S659.

If the image pattern has a star shape ('Yes' in step S649), the PC folder name assigned to the star shape is set in the PC scan controller 26 in step S650, and processing proceeds to step S659.

If the image pattern has a triangle shape ('Yes' in step S651), the PC folder name assigned to the triangle shape is set in the PC scan controller 26 in step S652, and processing proceeds to step S659.

If the image pattern has a diamond shape ('Yes' in step S653), the PC folder name assigned to the diamond shape is set in the PC scan controller 26 in step S654, and processing proceeds to step S659.

If the image pattern has an inverted triangle shape ('Yes' in step S655), the PC folder name assigned to the inverted triangle shape is set in the PC scan controller 26 in step S656, and processing proceeds to step S659.

If the image pattern does not have any of these shapes ('No' decisions in all of steps S647, S649, S651, S653, and S655), the image input and output apparatus 10 waits for the operator to enter a PC folder name in step S657. When a PC folder name is entered, the PC folder name is set in the PC scan controller 26 in step S658, and processing proceeds to step S659.

In step S659, the image data obtained by the front color image scanner 32 are reformatted for saving in a personal computer. In step S660, the PC scan controller 26 accesses the designated PC folder and transmits the reformatted image data to be stored in the folder. The procedure then ends.

The sixth embodiment combines the effects and advantages of the third and fourth embodiments.

Seventh Embodiment

Figure 45:
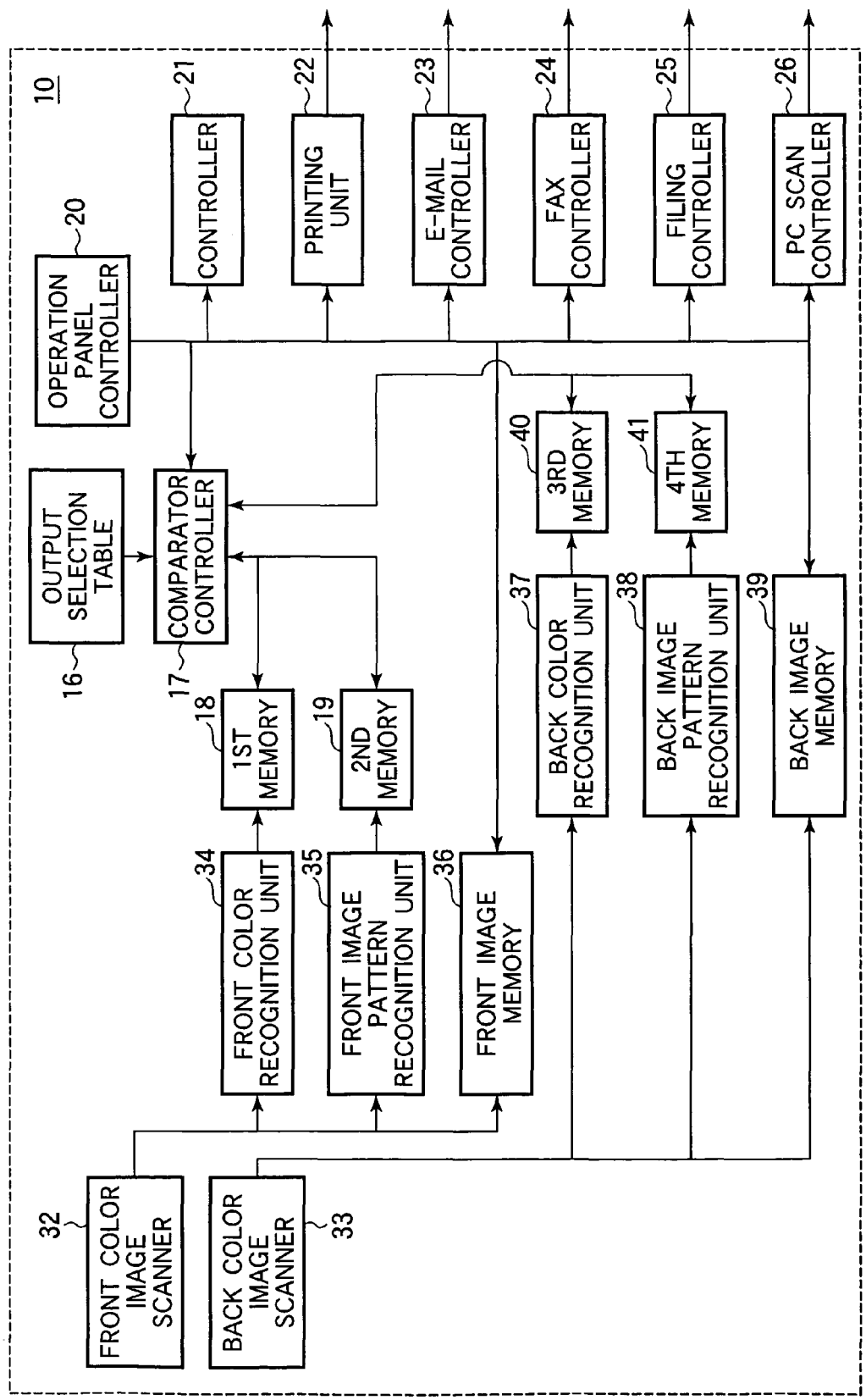
FIG. 45 is a block diagram of an image input and output apparatus according to a seventh embodiment of the invention.

Referring to FIG. 45, the image input and output apparatus 10 in the seventh embodiment has a front color image scanner 32 that scans the front side of a document 11 and a front image memory 36 that stores the image data obtained from the front side. A front color recognition unit 34 recognizes color information in the image data obtained from the front side and a first memory 18 stores this color information. A front image pattern recognition unit 35 recognizes the shape of an image pattern 11a in the image data obtained from the front side and a second memory 19 stores information indicating the recognized shape. A back color image scanner 33 scans the back side of the document 11 and a back image memory 39 stores the image data obtained from the back side. A back color recognition unit 37 recognizes color information in the image data obtained from the back side and a third memory 40 stores this color information. A back image pattern recognition unit 38 recognizes the shape of an image pattern 11a in the image data obtained from the back side and a fourth memory 41 stores information indicating the recognized shape. The other components are the same as in the sixth embodiment.

Next, the operation of the image input and output apparatus 10 will be described.

The preliminary procedure in the seventh embodiment is the same as in the third embodiment. The operation of scanning a document 11 is the same as in the sixth embodiment, except that the image pattern 11a may be on either side of the document 11. In particular, the document 11 may have a colored image pattern 11a on one side and a black-and-white document image on the other side.

When a sensor (not shown) senses that a document 11 has been set, the front color image scanner 32 and back color image scanner 33 begin scanning the front side and the back side of the document 11 simultaneously from its top or leading edge.

If the front color image scanner 32 encounters a colored image on the front side of the document near the leading edge, the front color recognition unit 34 recognizes the color of the image and stores information indicating the color in the first memory 18. If the front color image scanner 32 does not encounter a colored image near the leading edge on the front side, the image data obtained by the back color image scanner 33 are checked. If a colored image is detected near the leading edge on the back side of the document, the back color recognition unit 37 recognizes the detected color and stores information indicating the color in the third memory 40.

If a colored image is detected near the leading edge on either side of the document, the comparator controller 17, which constantly monitors the presence of information in the first memory 18, the second memory 19, the third memory 40, and the fourth memory 41, compares the information indicating the color of the image with the color information in the output selection table 16.

If the information indicating the color of the image matches any of the color information in the output selection table 16, the output unit designated by the color information is readied for output the image data, and the front image pattern recognition unit 35 or back image pattern recognition unit 38 recognizes the colored image pattern by recognizing its shape. Information indicating the recognized shape is stored in the second memory 19 or fourth memory 41. The comparator controller 17 compares this information with the shape information in the output selection table 16. If the shape information indicating the shape of the colored image pattern matches any of the shape information in the output selection table 16, the image data is sent to or saved in the destination designated by the shape information, or the number of copies designated by the shape information is printed. The image data to be sent, saved, or copied may be read from either the front image memory 36 or the back image memory 39, or from both memories 36, 39.

If no colored image is recognized near the leading edge on either side of the document, or the image has a color that does not match any of the information in the output selection table 16, the image input and output apparatus 10 displays a message prompting the operator to use the operation panel to select whether to send the image data to a specified electronic mail address, facsimile number, or file server address, to print a specified number of copies, or to save the data.

If a colored image is recognized but its shape cannot be recognized or does not match any of the information in the output selection table 16, the image input and output apparatus 10 prompts the operator to enter the necessary destination information or number-of-copies information from the operation panel. When the operator enters the necessary information, the image input and output apparatus 10 operates according to the entered information.

The entire operation is illustrated by the flowcharts in FIGS. 46A, 46B, and 47-51. The procedure given in these flowcharts also allows for cases in which the document 11 is colored near its leading edge on one side and has a black-and-white image pattern near the leading edge on the other side, or has a colored image pattern on the same side as the main document image.

Figure 46A:
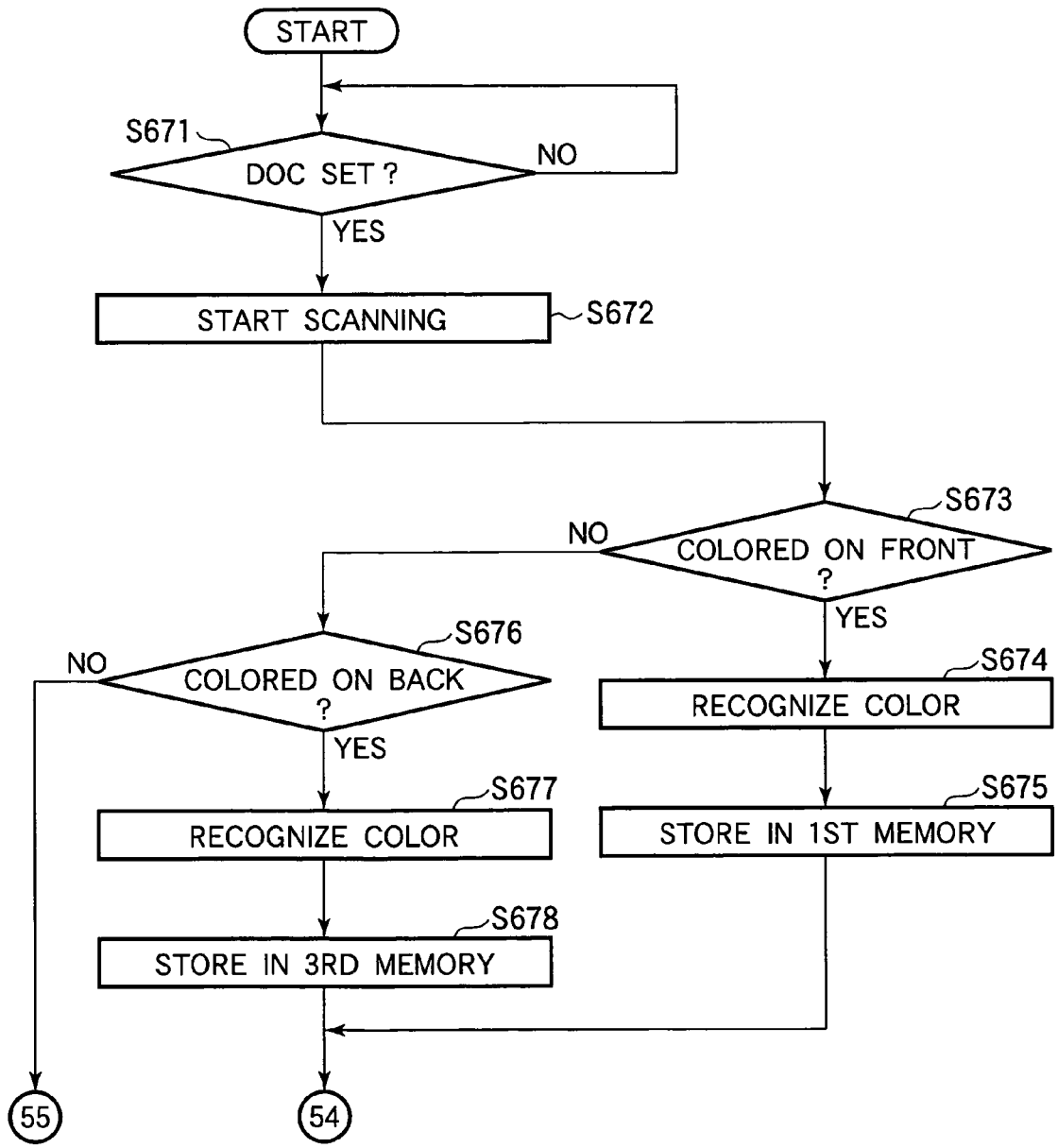

In step S671 in FIG. 46A, the image input and output apparatus 10 waits for a document to be set.

When a document is set, the front color image scanner 32 and back color image scanner 33 begin scanning it in step S672.

Step S673 is a decision step that tests for the presence of color on the front side. Processing proceeds to step S674 if color is present, and to step S676 otherwise.

In step S674, the front color recognition unit 34 recognizes the color.

In step S675, the front color recognition unit 34 stores information indicating the color in the first memory 18, and processing proceeds to step S679.

Step S676 is a decision step that tests for the presence of color on the back side. Processing proceeds to step S677 if color is present, and to step S789 in FIG. 46B otherwise.

In step S677, the back color recognition unit 37 recognizes the color.

In step S678, the back color recognition unit 37 stores information indicating the recognized color in the third memory 40, and processing proceeds to step S679.

Figure 46B:
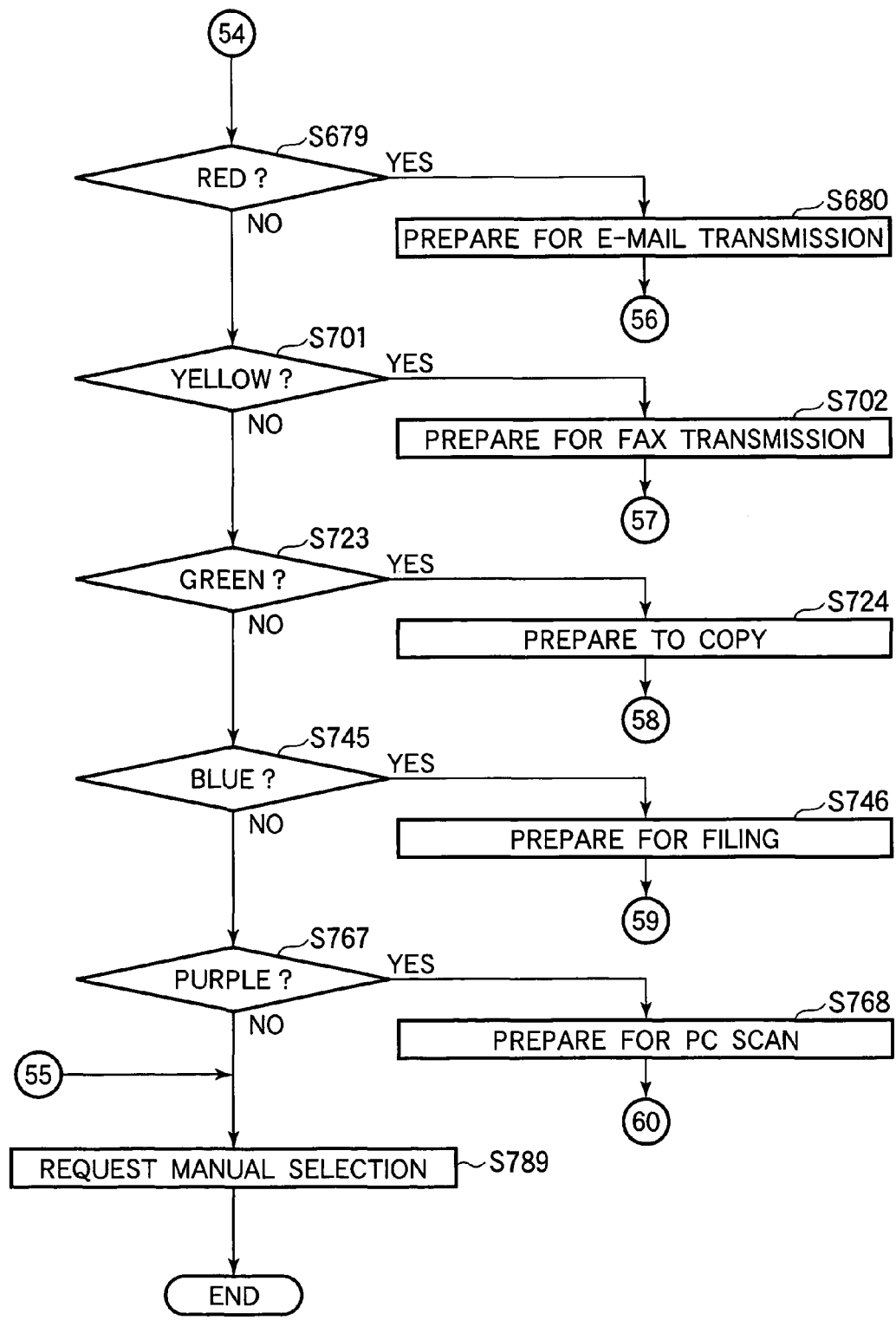

Steps S679, S701, S723, S745, and S767 in FIG. 46B are decision steps that test the recognized color.

If the color is red ('Yes' in step S679), the e-mail controller 23 is activated in step S680 in FIG. 46B, and processing proceeds to step S681 in FIG. 47.

If the color is yellow ('Yes' in step S701), the facsimile controller 24 is activated in step S702, and processing proceeds to step S703 in FIG. 48.

Figure 49:
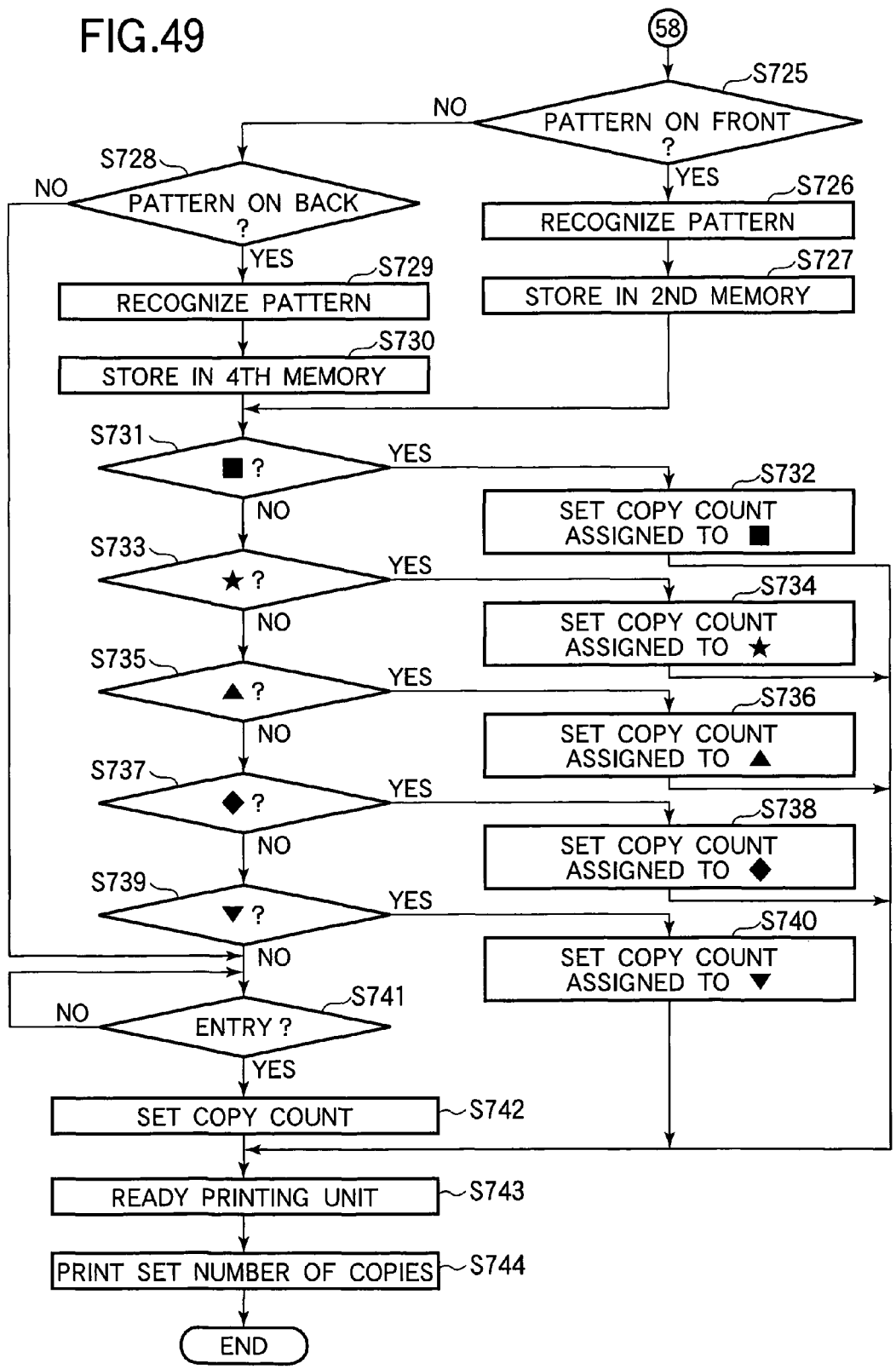

If the color is green ('Yes' in step S723), the printing unit 22 is activated in step S724, and processing proceeds to step S725 in FIG. 49.

Figure 50:
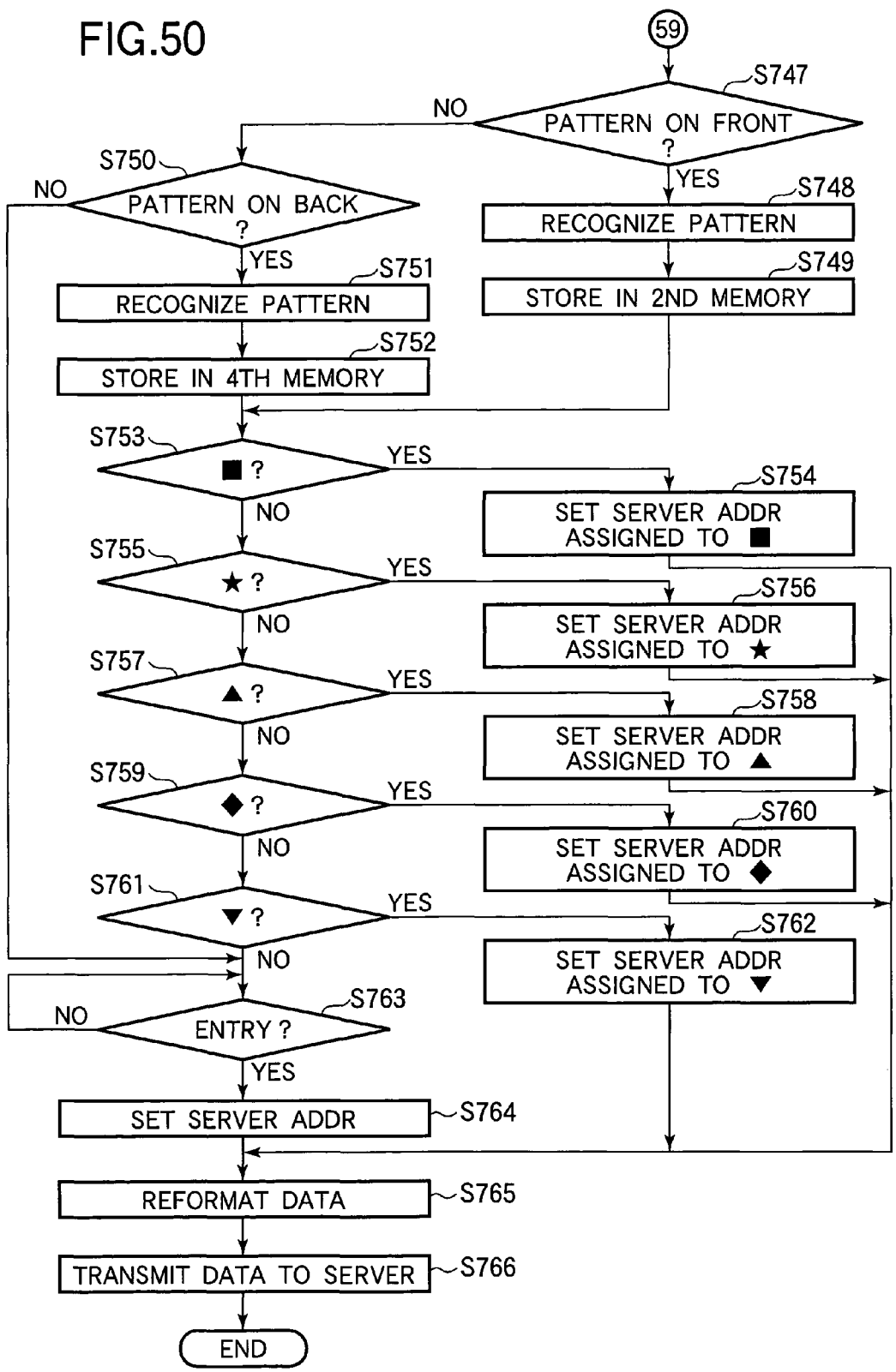

If the color is blue ('Yes' in step S745), the filing controller 25 is activated in step S746, and processing proceeds to step S747 in FIG. 50.

Figure 51:
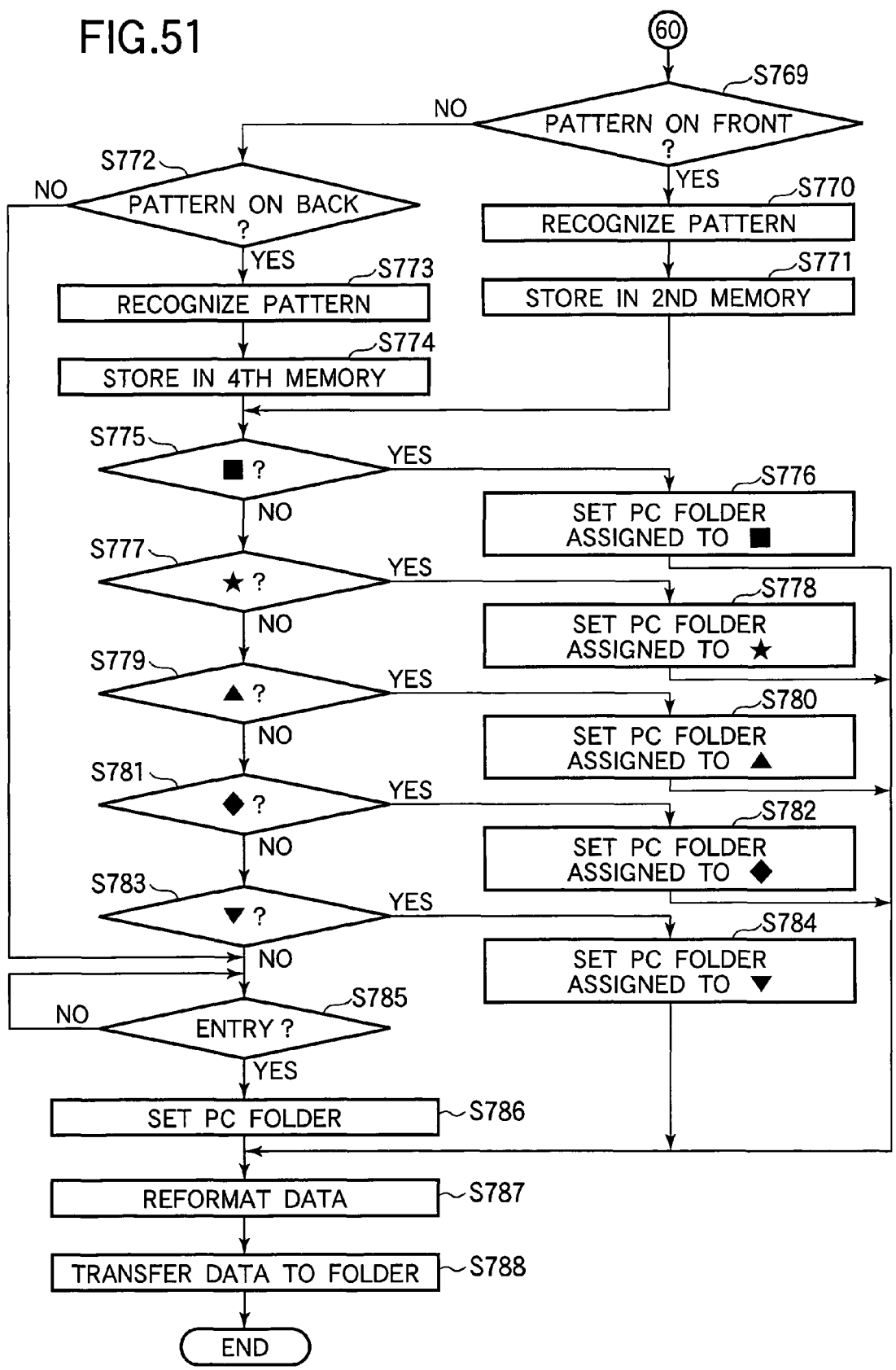

If the color is purple ('Yes' in step S767), the PC scan controller 26 is activated in step S768, and processing proceeds to step S769 in FIG. 51.

If the recognized color is not any of these colors ('No' in all of steps S679, S701, S723, S745, and S767), processing proceeds to step S789 in FIG. 46B.

In step S789 in FIG. 46B, the image input and output apparatus 10 requests manual selection of a function and terminates the procedure.

FIG. 47 illustrates the electronic mail part of the procedure.

Step S681 tests whether the document 11 has an image pattern 11a on its front side. Processing proceeds to step S682 if an image pattern 11a is present, and to step S684 otherwise.

The front image pattern recognition unit 35 recognizes the shape of the image pattern 11a in step S682, and stores information indicating the shape in the second memory 19 in step S683, after which processing proceeds to step S687.

Step S684 tests whether the document 11 has an image pattern 11a on its back side. Processing proceeds to step S685 if an image pattern 11a is present, and to step S697 otherwise.

The back image pattern recognition unit 38 recognizes the shape of the image pattern 11a in step S685, and stores information indicating the shape in the fourth memory 41 in step S686, and processing proceeds to step S687.

Steps S687, S689, S691, S693, and S695 are decision steps that test the shape of the image pattern.

If the image pattern has a square shape ('Yes' in step S687), the electronic mail address assigned to the square shape is set in the e-mail controller 23 in step S688, and processing proceeds to step S699.

If the image pattern has a star shape ('Yes' in step S689), the electronic mail address assigned to the star shape is set in the e-mail controller 23 in step S690, and processing proceeds to step S699.

If the image pattern has a triangle shape ('Yes' in step S691), the electronic mail address assigned to the triangle shape is set in the e-mail controller 23 in step S692, and processing proceeds to step S699.

If the image pattern has a diamond shape ('Yes' in step S693), the electronic mail address assigned to the diamond shape is set in the e-mail controller 23 in step S694, and processing proceeds to step S699.

If the image pattern has an inverted triangle shape ('Yes' in step S695), the electronic mail address assigned to the inverted triangle shape is set in the e-mail controller 23 in step S696, and processing proceeds to step S699.

If the image pattern does not have any of these shapes ('No' decisions in all of steps S687, S689, S691, S693, and S695), then in step S697, the image input and output apparatus 10 waits for the operator to enter an electronic mail address. When an electronic mail address is entered, the electronic mail address is set in the e-mail controller 23 in step S698, and processing proceeds to step S699.

In step S699, the image data obtained by the front color image scanner 32 or the back color image scanner 33 are attached as an image data file to an electronic mail message, which is transmitted to the address set in the e-mail controller 23 in step S700. The procedure then ends.

FIG. 48 illustrates the facsimile transmission part of the procedure.

Step S703 tests whether the document 11 has an image pattern 11a on its front side. Processing proceeds to step S704 if an image pattern 11a is present, and to step S706 otherwise.

The front image pattern recognition unit 35 recognizes the shape of the image pattern 11a in step S704, and stores information indicating the shape in the second memory 19 in step S705, after which processing proceeds to step S709.

Step S706 tests whether the document 11 has an image pattern 11a on its back side. Processing proceeds to step S707 if an image pattern 11a is present, and to step S719 otherwise.

The back image pattern recognition unit 38 recognizes the shape of the image pattern 11a in step S707, and stores information indicating the shape in the fourth memory 41 in step S708, and processing proceeds to step S709.

Steps S709, S711, S713, S715, and S717 are decision steps that test the shape of the image pattern.

If the image pattern has a square shape ('Yes' in step S709), the facsimile number assigned to the square shape is set in the facsimile controller 24 in step S710, and processing proceeds to step S721.

If the image pattern has a star shape ('Yes' in step S711), the facsimile number assigned to the star shape is set in the facsimile controller 24 in step S712, and processing proceeds to step S721.

If the image pattern has a triangle shape ('Yes' in step S713), the facsimile number assigned to the triangle shape is set in the facsimile controller 24 in step S714, and processing proceeds to step S721.

If the image pattern has a diamond shape ('Yes' in step S715), the facsimile number assigned to the diamond shape is set in the facsimile controller 24 in step S716, and processing proceeds to step S721.

If the image pattern has an inverted triangle shape ('Yes' in step S717), the facsimile number assigned to the inverted triangle shape is set in the facsimile controller 24 in step S718, and processing proceeds to step S721.

If the image pattern does not have any of these shapes ('No' decisions in all of steps S709, S711, S713, S715, and S717), then in step S719, the image input and output apparatus 10 waits for the operator to enter a facsimile number. When a facsimile number is entered, the facsimile number is set in the facsimile controller 24 in step S720, and processing proceeds to step S721.

In step S721, a facsimile call is originated to the facsimile number set in the facsimile controller 24. The image data obtained by the front color image scanner 32 or back color image scanner 33 are transmitted as facsimile data in step S722. The procedure then ends.

FIG. 49 illustrates the copy printing part of the procedure.

Step S725 tests whether the document 11 has an image pattern 11a on its front side. Processing proceeds to step S726 if an image pattern 11a is present, and to step S728 otherwise.

The front image pattern recognition unit 35 recognizes the shape of the image pattern 11a in step S726, and stores information indicating the shape in the second memory 19 in step S727, after which processing proceeds to step S731.

Step S728 tests whether the document 11 has an image pattern 11a on its back side. Processing proceeds to step S729 if an image pattern 11a is present, and to step S741 otherwise.

The back image pattern recognition unit 38 recognizes the shape of the image pattern 11a in step S729, and stores information indicating the shape in the fourth memory 41 in step S730, and processing proceeds to step S731.

Steps S731, S733, S735, S737, and S739 are decision steps that test the shape of the image pattern.

If the image pattern has a square shape ('Yes' in step S731), the number of copies assigned to the square shape is set in the printing unit 22 in step S732, and processing proceeds to step S743.

If the image pattern has a star shape ('Yes' in step S733), the number of copies assigned to the star shape is set in the printing unit 22 in step S734, and processing proceeds to step S743.

If the image pattern has a triangle shape ('Yes' in step S735), the number of copies assigned to the triangle shape is set in the printing unit 22 in step S736, and processing proceeds to step S743.

If the image pattern has a diamond shape ('Yes' in step S737), the number of copies assigned to the diamond shape is set in the printing unit 22 in step S738, and processing proceeds to step S743.

If the image pattern has an inverted triangle shape ('Yes' in step S739), the number of copies assigned to the inverted triangle shape is set in the printing unit 22 in step S740, and processing proceeds to step S743.

If the image pattern does not have any of these shapes ('No' decisions in all of steps S731, S733, S735, S737, and S739), then in step S741, the image input and output apparatus 10 waits for the operator to enter a number of copies. When a number of copies is entered, the number of copies is set in the printing unit 22 in step S742, and processing proceeds to step S743.

In step S743, the printing unit 22 is readied for printing the image data obtained by the front color image scanner 32 or back color image scanner 33. The printing unit 22 prints the set number of copies of the image data in step S744, after which the procedure ends.

FIG. 50 illustrates the filing part of the procedure.

Step S747 tests whether the document 11 has an image pattern 11a on its front side. Processing proceeds to step S748 if an image pattern 11a is present, and to step S750 otherwise.

The front image pattern recognition unit 35 recognizes the shape of the image pattern 11a in step S748, and stores information indicating the shape in the second memory 19 in step S749, after which processing proceeds to step S753.

Step S750 tests whether the document 11 has an image pattern 11a on its back side. Processing proceeds to step S751 if an image pattern 11a is present, and to step S763 otherwise.

The back image pattern recognition unit 38 recognizes the shape of the image pattern 11a in step S751, and stores information indicating the shape in the fourth memory 41 in step S752, and processing proceeds to step S753.

Steps S753, S755, S757, S759, and S761 are decision steps that test the shape of the image pattern.

If the image pattern has a square shape ('Yes' in step S753), the server address assigned to the square shape is set in the filing controller 25 in step S754, and processing proceeds to step S765.

If the image pattern has a star shape ('Yes' in step S755), the server address assigned to the star shape is set in the filing controller 25 in step S756, and processing proceeds to step S765.

If the image pattern has a triangle shape ('Yes' in step S757), the server address assigned to the triangle shape is set in the filing controller 25 in step S758, and processing proceeds to step S765.

If the image pattern has a diamond shape ('Yes' in step S759), the server address assigned to the diamond shape is set in the filing controller 25 in step S760, and processing proceeds to step S765.

If the image pattern has an inverted triangle shape ('Yes' in step S761), the server address assigned to the inverted triangle shape is set in the filing controller 25 in step S762, and processing proceeds to step S765.

If the image pattern does not have any of these shapes ('No' decisions in all of steps S753, S755, S757, S759, and S761), the image input and output apparatus 10 waits for the operator to enter a server address in step S763. When a server address is entered, the server address is set in the filing controller 25 in step S764, and processing proceeds to step S765.

In step S765, the image data obtained by the front color image scanner 32 or back color image scanner 33 are reformatted for filing. In step S766, the filing controller 25 accesses the designated server and transmits the reformatted image data to be stored in the server. The procedure then ends.

FIG. 51 illustrates the saving part of the procedure.

Step S769 tests whether the document 11 has an image pattern 11a on its front side. Processing proceeds to step S770 if an image pattern 11a is present, and to step S772 otherwise.

The front image pattern recognition unit 35 recognizes the shape of the image pattern 11a in step S770, and stores information indicating the shape in the second memory 19 in step S771, after which processing proceeds to step S775.

Step S772 tests whether the document 11 has an image pattern 11a on its back side. Processing proceeds to step S773 if an image pattern 11a is present, and to step S785 otherwise.

The back image pattern recognition unit 38 recognizes the shape of the image pattern 11a in step S773, and stores information indicating the shape in the fourth memory 41 in step S774, and processing proceeds to step S775.

Steps S775, S777, S779, S781, and S783 are decision steps that test the shape of the image pattern.

If the image pattern has a square shape ('Yes' in step S775), the PC folder name assigned to the square shape is set in the PC scan controller 26 in step S776, and processing proceeds to step S787.

If the image pattern has a star shape ('Yes' in step S777), the PC folder name assigned to the star shape is set in the PC scan controller 26 in step S778, and processing proceeds to step S787.

If the image pattern has a triangle shape ('Yes' in step S779), the PC folder name assigned to the triangle shape is set in the PC scan controller 26 in step S780, and processing proceeds to step S787.

If the image pattern has a diamond shape ('Yes' in step S781), the PC folder name assigned to the diamond shape is set in the PC scan controller 26 in step S782, and processing proceeds to step S787.

If the image pattern has an inverted triangle shape ('Yes' in step S783), the PC folder name assigned to the inverted triangle shape is set in the PC scan controller 26 in step S784, and processing proceeds to step S787.

If the image pattern does not have any of these shapes ('No' decisions in all of steps S775, S777, S779, S781, and S783), the image input and output apparatus 10 waits for the operator to enter a PC folder name in step S785. When a PC folder name is entered, the PC folder name is set in the PC scan controller 26 in step S786, and processing proceeds to step S787.

In step S787, the image data obtained by the front color image scanner 32 or back color image scanner 33 are reformatted for saving in the PC. In step S788, the PC scan controller 26 accesses the designated PC folder and transmits the reformatted image data to be stored in the folder. The procedure then ends.

The seventh embodiment combines the effects and advantages of all of the preceding embodiments. A further advantage is that the user can set the document 11 in the apparatus either with either side up.

Eighth Embodiment

Figure 52:
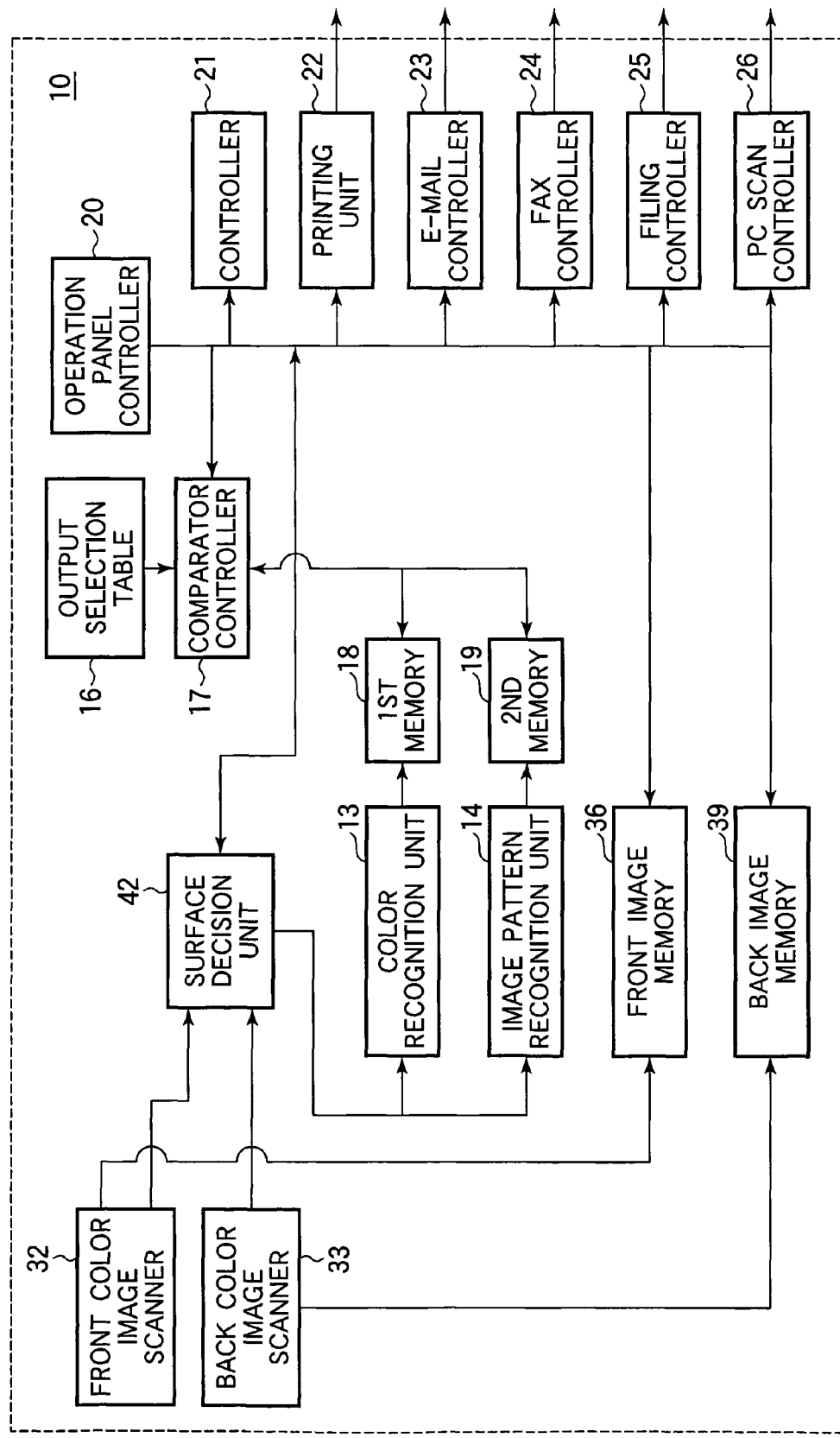
FIG. 52 is a block diagram of an image input and output apparatus according to a eighth embodiment of the invention.

Referring to FIG. 52, the image input and output apparatus 10 in the eighth embodiment has a surface decision unit 42 through which a front color image scanner 32 and a back color image scanner 33 are connected to a color recognition unit 13 and an image pattern recognition unit 14. The front color image scanner 32 and back color image scanner 33 are also connected to a front image memory 36 and a back image memory 39 as in the seventh embodiment. Other components of the image input and output apparatus 10 are the same as in the sixth embodiment.

The surface decision unit 42 includes a flip-flop, register, memory cell, or other memory device that stores a priority bit. When a colored image pattern 11a is found on the front side of a document 11, the priority bit is set to '0', and the back side is scanned to obtain the main image data. When a colored image pattern 11a is found on the back side of the document 11, the priority bit is set to '1', and the front side is scanned to obtain the main image data.

The document 11 is assumed to have a colored image pattern 11a on one side and a document image to be scanned on the other side, as shown in FIG. 27. Unlike the seventh embodiment, the eighth embodiment detects the side with the image pattern 11a and thereby determines which side to continue scanning.

Next, the operation of the image input and output apparatus 10 will be described.

The preliminary procedure in the eighth embodiment is the same as in the third embodiment. The operation of scanning a document 11 is similar to the operation in the seventh embodiment, except that once color is detected near the leading edge of the document on one side, the colored image pattern 11a is assumed to be located on that side and the document image to be scanned and transmitted, copied, filed, or saved is assumed to be located on the opposite side.

When a sensor (not shown) senses that a document 11 has been set, the front color image scanner 32 and back color image scanner 33 begin scanning the front side and the back side of the document 11 simultaneously from its top or leading edge. If the front color image scanner 32 encounters a colored image on the front side of the document near the leading edge, the internal priority bit in the surface decision unit 42 is set to '0'. The color recognition unit 13 recognizes the color encountered on the front side and stores information indicating the color in the first memory 18. If the front color image scanner 32 does not encounter a colored image near the leading edge on the front side, the image data obtained by the back color image scanner 33 are checked. If a colored image is detected near the leading edge on the back side of the document, the internal priority bit of the surface decision unit 42 is set to '1'. The color recognition unit 13 recognizes the color detected on the back side and stores information indicating the color in the first memory 18.

If a colored image is detected near the leading edge on either side of the document, the comparator controller 17, which constantly monitors the presence of information in the first memory 18 and second memory 19, compares the information indicating the color of the image with the color information in the output selection table 16.

If the information indicating the color of the image pattern 11*a* matches color information in the output selection table 16, the output unit designated by the color information is readied for output of the image data. If the priority bit is set to '0', the image pattern recognition unit 14 recognizes the image pattern 11*a* on the front side by recognizing its shape and stores information indicating the shape of the image pattern 11*a* in the second memory 19, and the back color image scanner 33 continues scanning the back side of the document 11 and stores the data in the back image memory 39. If the priority bit is set to '1', the image pattern recognition unit 14 recognizes the image pattern 11*a* on the back side by recognizing its shape and stores information indicating the shape of the image pattern 11*a* in the second memory 19, and the front color image scanner 32 continues scanning the front side of the document 11 and stores the data in the front image memory 36. In either case, the comparator controller 17 compares the shape information stored in the second memory 19 with the shape information in the output selection table 16.

If the shape information stored in the second memory 19 matches color information in the output selection table 16, the output unit indicated by the color information outputs the image data to the destination indicated by the shape information, or prints the number of copies indicated by the shape information.

If no colored image is recognized near the leading edge on either side of the document, or the image has a color that does not match any of the information in the output selection table 16, the image input and output apparatus 10 displays a message prompting the operator to use the operation panel to select whether to send the image data to a specified electronic mail address, facsimile number, or file server address, to print a specified number of copies, or to save the data.

If a colored image is recognized but its shape cannot be recognized or does not match any of the information in the output selection table 16, the image input and output apparatus 10 prompts the operator to enter the necessary destination information or number-of-copies information from the operation panel. When the operator enters the necessary information, the image input and output apparatus 10 operates according to the entered information.

The entire operation is illustrated by the flowcharts in FIGS. 53A, 53B, and 54-58.

Figure 53A:
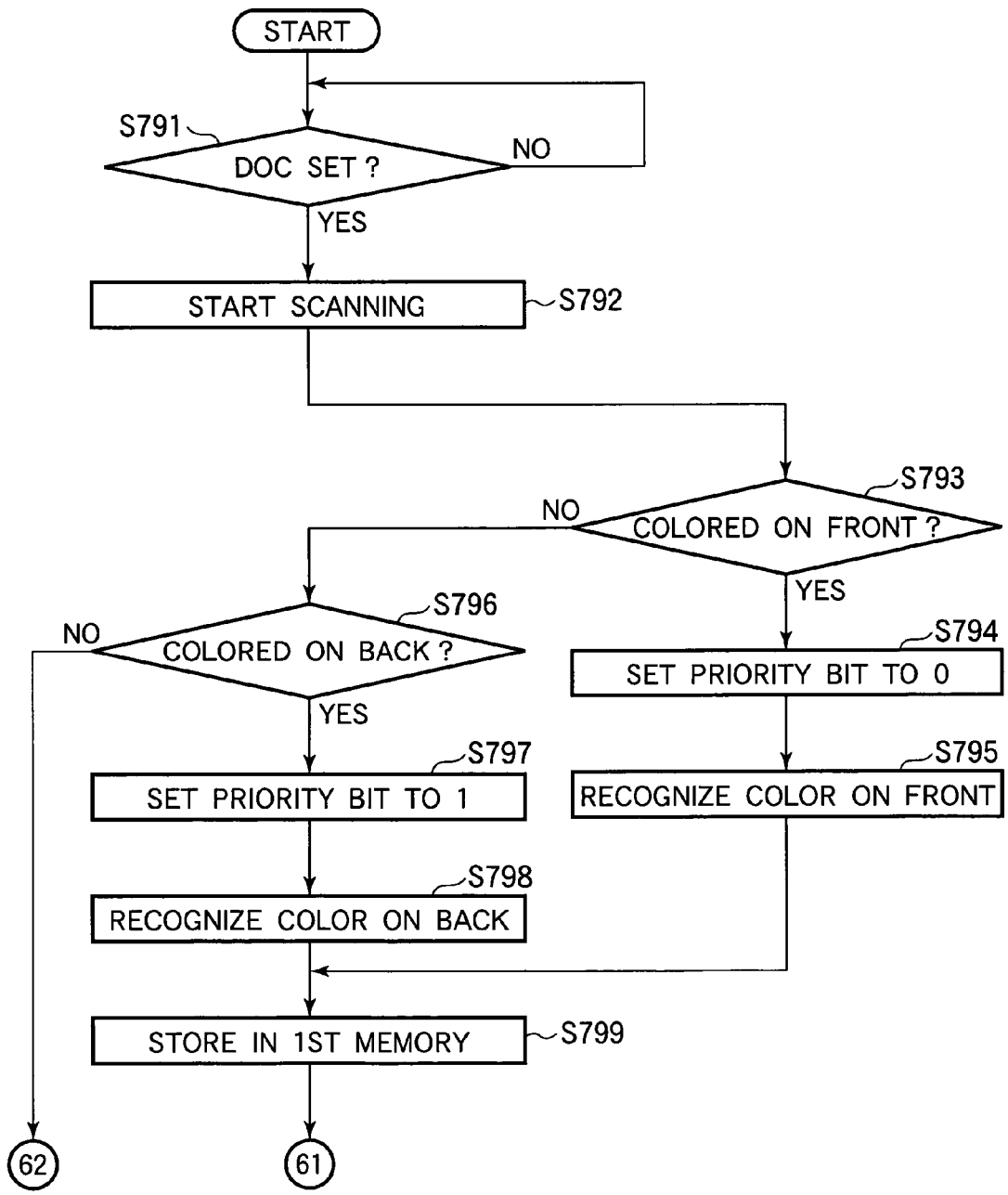

In step S791 in FIG. 53A, the image input and output apparatus 10 waits for a document to be set.

When a document is set, the front color image scanner 32 and back color image scanner 33 begin scanning it in step S792.

Step S793 is a decision step that tests for the presence of color near the leading edge on the front side. Processing proceeds to step S794 if color is present, and to step S796 otherwise.

In step S794, the priority bit of the surface decision unit 42 is set to '0'.

In step S795, the color recognition unit 13 recognizes the color, and processing proceeds to step S799.

Step 5796 is a decision step that tests for the presence of color near the leading edge on the back side. Processing proceeds to step S797 if color is present, and to step S905 in FIG. 53B otherwise.

In step S797, the priority bit of the surface decision unit 42 is set to '1'.

In step S798, the color recognition unit 13 recognizes the color.

In step S799, the color recognition unit 13 stores information indicating the recognized color in the first memory 18.

Steps S800, S821, S842, S863, and S884 in FIG. 53B are decision steps that test the recognized color.

Figure 54:
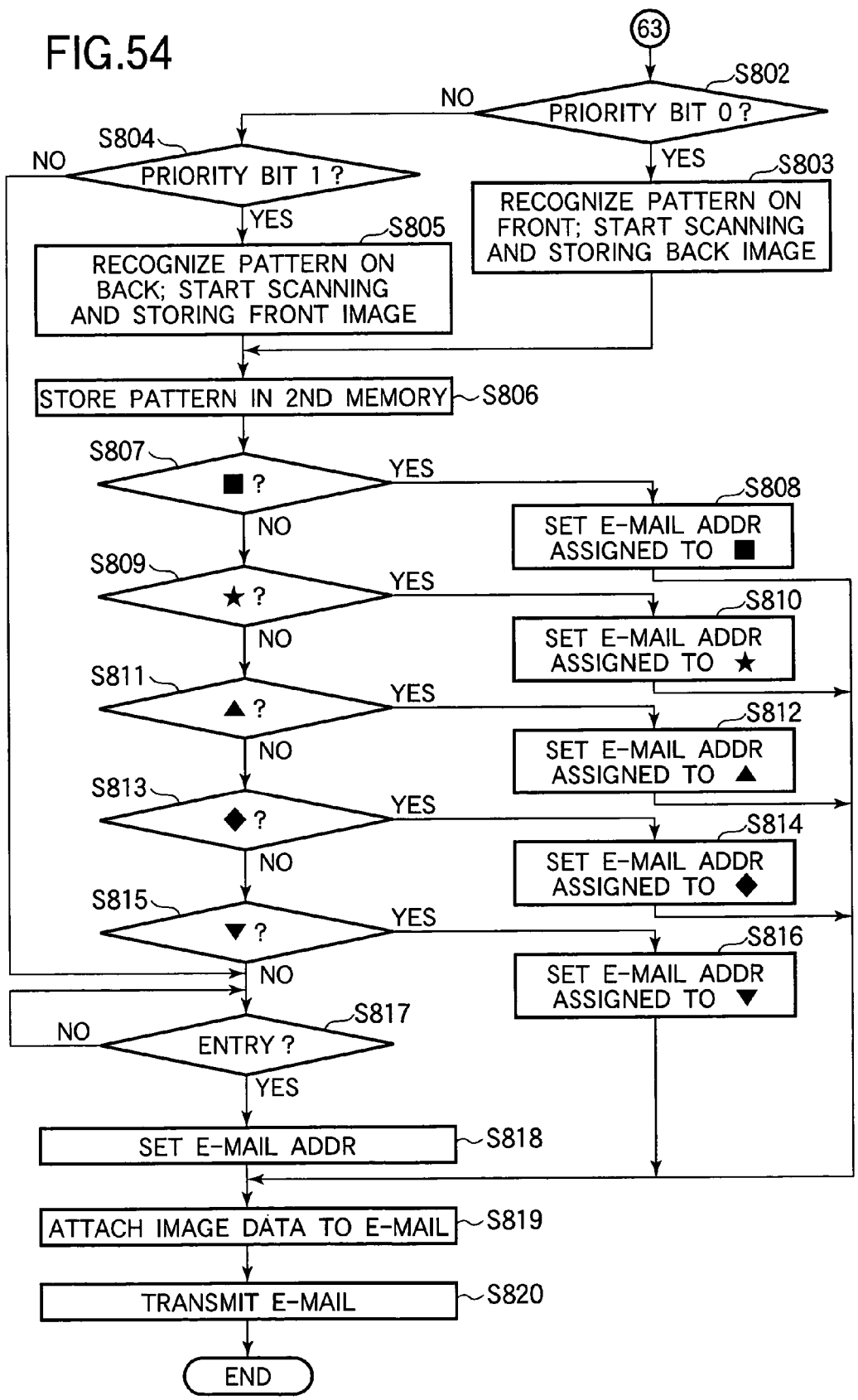

If the color is red ('Yes' in step S800), the e-mail controller 23 is activated in step S801, and processing proceeds to step S802 in FIG. 54.

Figure 55:
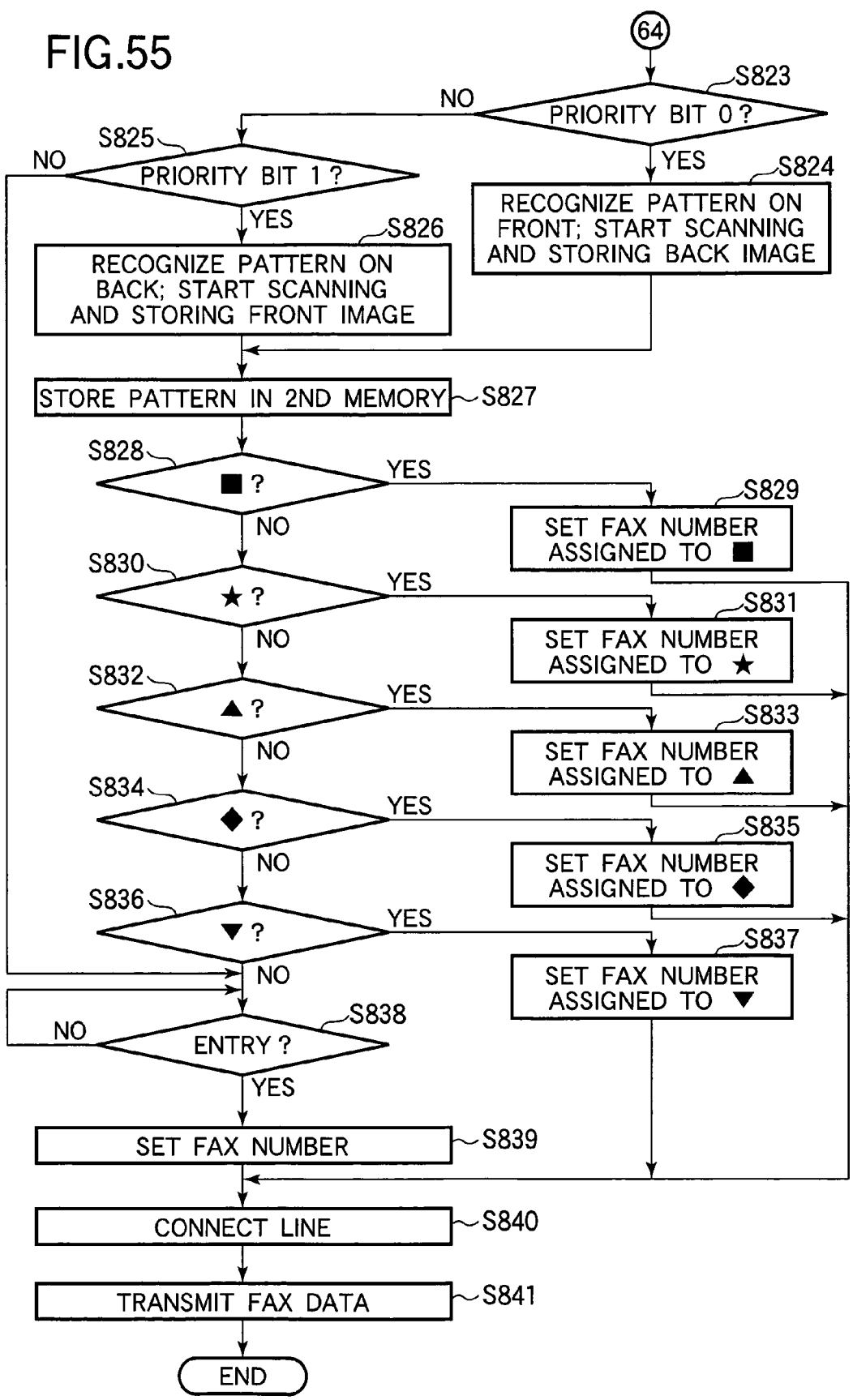

If the color is yellow ('Yes' in step S821), the facsimile controller 24 is activated in step S822, and processing proceeds to step S823 in FIG. 55.

Figure 56:
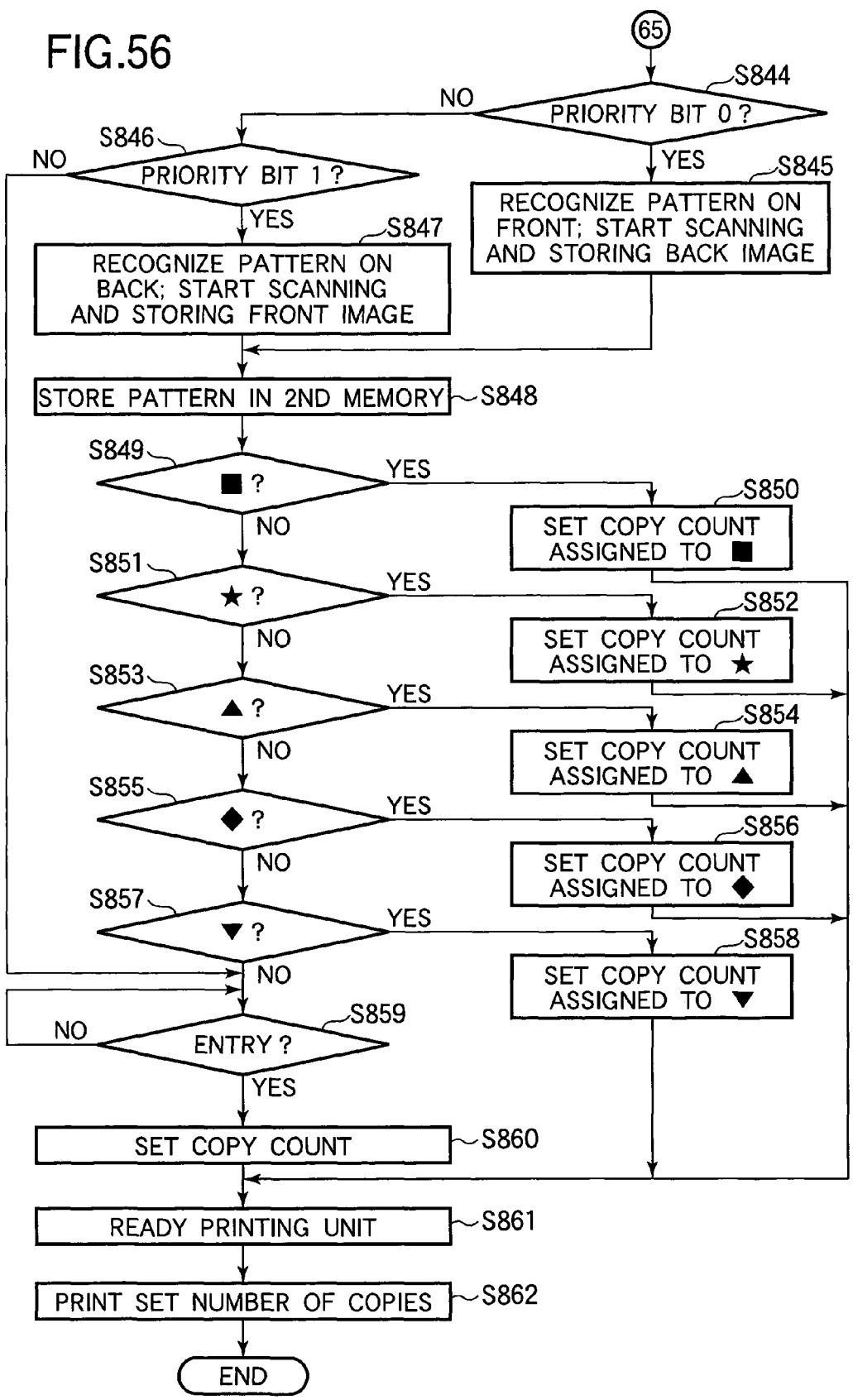

If the color is green ('Yes' in step S842), the printing unit 22 is activated in step S843, and processing proceeds to step S844 in FIG. 56.

Figure 57:
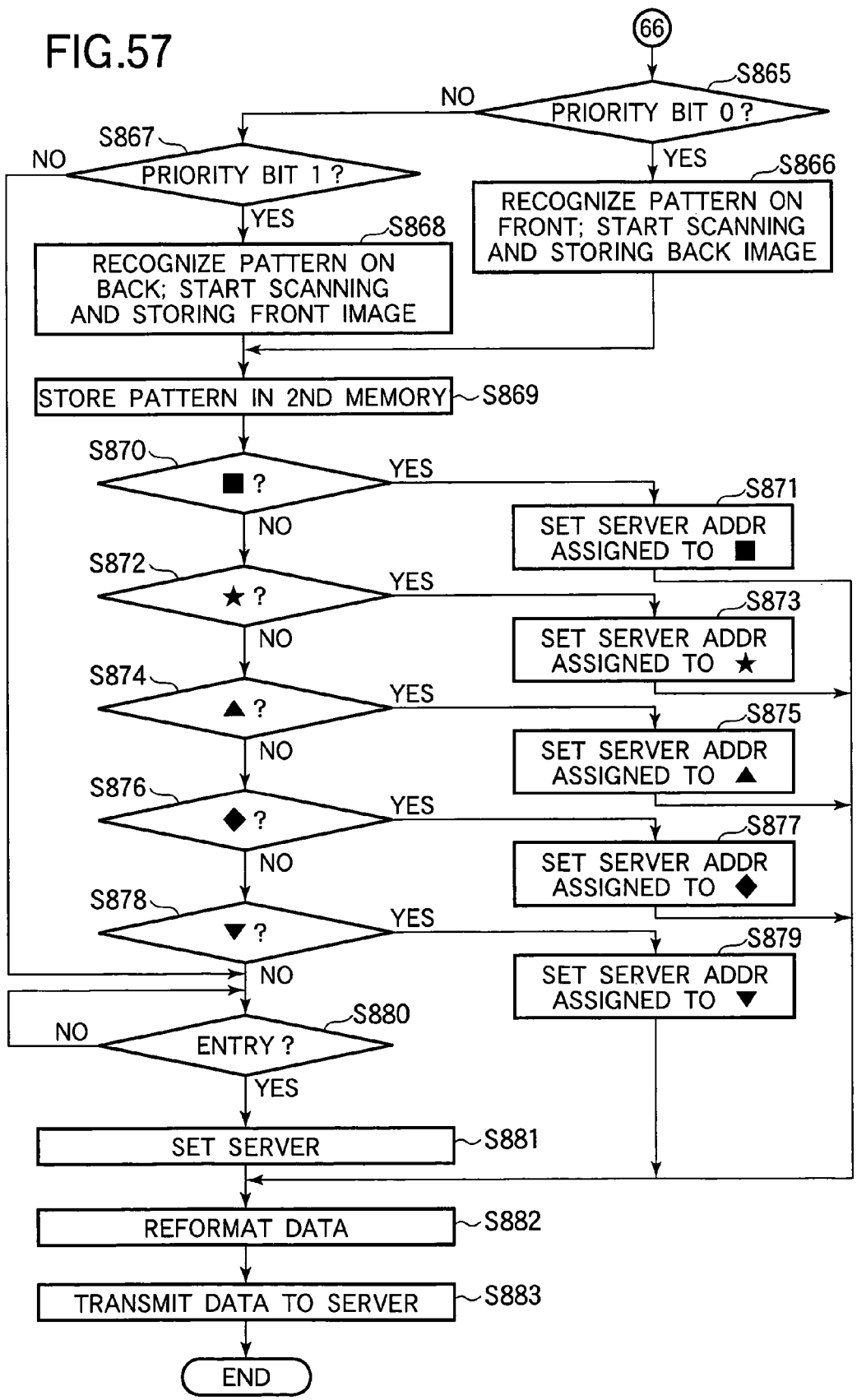

If the color is blue ('Yes' in step S863), the filing controller 25 is activated in step S864, and processing proceeds to step S865 in FIG. 57.

Figure 58:
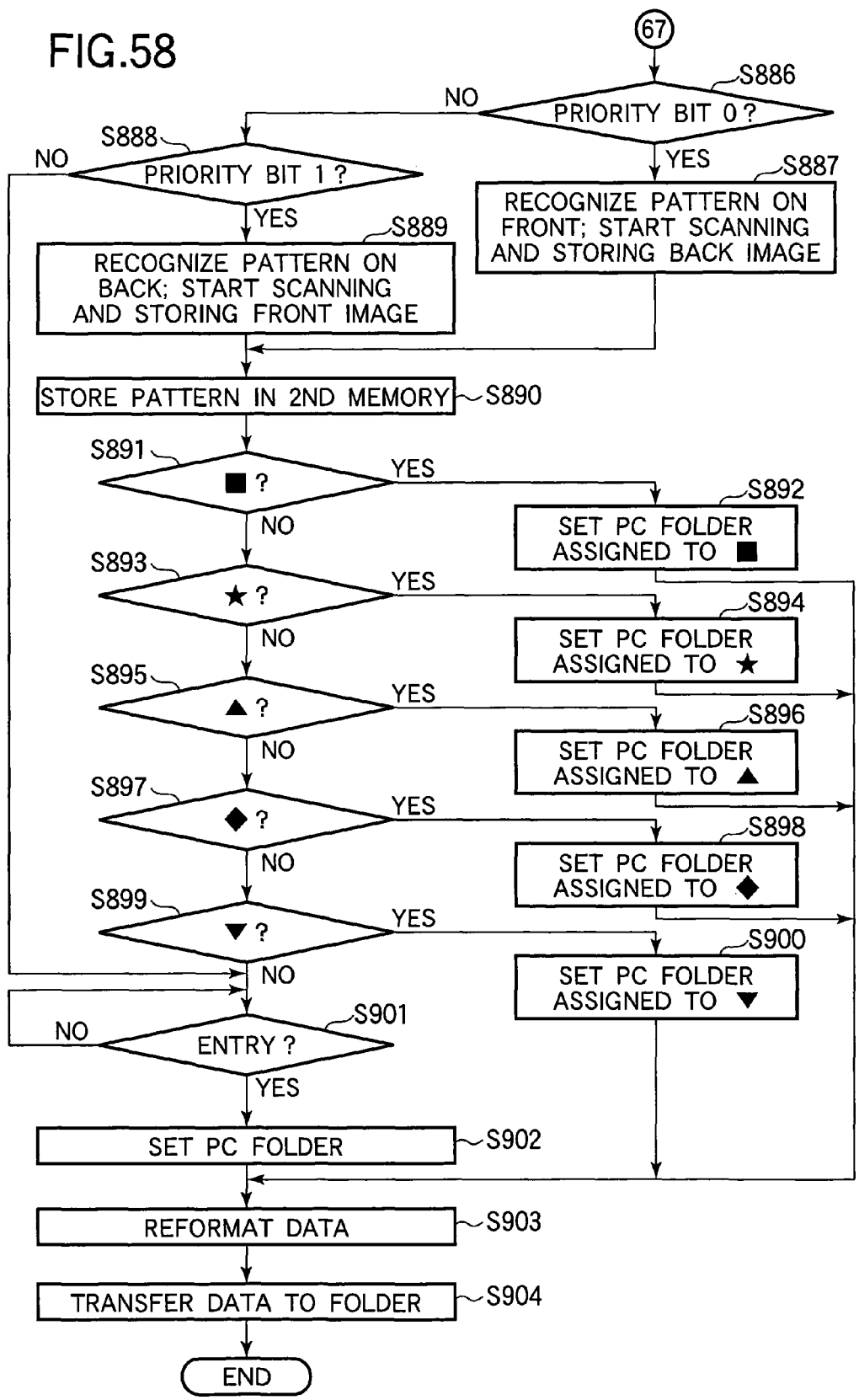

If the color is purple ('Yes' in step S884), the PC scan controller 26 is activated in step S885, and processing proceeds to step S886 in FIG. 58.

If the recognized color is not any of these colors ('No' in all of steps S800, S821, S842, S863, and S884), processing proceeds to step S905.

In step S905 in FIG. 53B, the image input and output apparatus 10 requests manual selection of a function and terminates the procedure.

FIG. 54 illustrates the electronic mail part of the procedure.

Step S802 tests whether the priority bit is set to '0'. Processing proceeds to step S803 if the priority bit is set to '0', and to step S804 otherwise.

In step S803, the image pattern recognition unit 14 recognizes the shape of the image pattern 11*a* on the front side, and the back color image scanner 33 continues scanning the back side of the document 11 and stores the scanned image data in the back image memory 39. Processing proceeds to step S806.

Step S804 tests whether the priority bit is set to '1'. Processing proceeds to step S805 if the priority bit is set to '1', and to step S817 otherwise.

In step S805, the image pattern recognition unit 14 recognizes the shape of the image pattern 11*a* on the back side, and the front color image scanner 32 continues scanning the front side of the document 11 and stores the scanned image data in the front image memory 36. Processing proceeds to S806.

In step S806, the image pattern recognition unit 14 stores information indicating the shape in the second memory 19.

Steps S807, S809, S811, S813, and S815 are decision steps that test the shape of the image pattern.

If the image pattern has a square shape ('Yes' in step S807), the electronic mail address assigned to the square shape is set in the e-mail controller 23 in step S808, and processing proceeds to step S819.

If the image pattern has a star shape ('Yes' in step S809), the electronic mail address assigned to the star shape is set in the e-mail controller 23 in step S810, and processing proceeds to step S819.

If the image pattern has a triangle shape ('Yes' in step S811), the electronic mail address assigned to the triangle shape is set in the e-mail controller 23 in step S812, and processing proceeds to step S819.

If the image pattern has a diamond shape ('Yes' in step S813), the electronic mail address assigned to the diamond shape is set in the e-mail controller 23 in step S814, and processing proceeds to step S819.

If the image pattern has an inverted triangle shape ('Yes' in step S815), the electronic mail address assigned to the inverted triangle shape is set in the e-mail controller 23 in step S816, and processing proceeds to step S819.

If the image pattern does not have any of these shapes ('No' decisions in all of steps S807, S809, S811, S813, and S815), then in step S817, the image input and output apparatus 10 waits for the operator to enter an electronic mail address. When an electronic mail address is entered, the electronic mail address is set in the e-mail controller 23 in step S818, and processing proceeds to step S819.

In step S819, the image data obtained by the front color image scanner 32 or back color image scanner 33 are attached as an image data file to an electronic mail message, which is transmitted to the address set in the e-mail controller 23 in step S820. The procedure then ends.

FIG. 55 illustrates the facsimile transmission part of the procedure.

Step S823 tests whether the priority bit is set to '0'. Processing proceeds to step S824 if the priority bit is set to '0', and to step S825 otherwise.

In step S824, the image pattern recognition unit 14 recognizes the shape of the image pattern 11*a* on the front side, and the back color image scanner 33 continues scanning the back side of the document 11 and stores the scanned image data in the back image memory 39. Processing proceeds to step S827.

Step S825 tests whether the priority bit is set to '1'. Processing proceeds to step S826 if the priority bit is set to '1', and to step S838 otherwise.

In step S826, the image pattern recognition unit 14 recognizes the shape of the image pattern 11*a* on the back side, and the front color image scanner 32 continues scanning the front side of the document 11 and stores the scanned image data in the front image memory 36.

In step S827, the image pattern recognition unit 14 stores information indicating the shape in the second memory 19.

Steps S828, S830, S832, S834, and S836 are decision steps that test the shape of the image pattern.

If the image pattern has a square shape ('Yes' in step S828), the facsimile number assigned to the square shape is set in the facsimile controller 24 in step S829, and processing proceeds to step S840.

If the image pattern has a star shape ('Yes' in step S830), the facsimile number assigned to the star shape is set in the facsimile controller 24 in step S831, and processing proceeds to step S840.

If the image pattern has a triangle shape ('Yes' in step S832), the facsimile number assigned to the triangle shape is set in the facsimile controller 24 in step S833, and processing proceeds to step S840.

If the image pattern has a diamond shape ('Yes' in step S834), the facsimile number assigned to the diamond shape is set in the facsimile controller 24 in step S835, and processing proceeds to step S840.

If the image pattern has an inverted triangle shape ('Yes' in step S836), the facsimile number assigned to the inverted triangle shape is set in the facsimile controller 24 in step S837, and processing proceeds to step S840.

If the image pattern does not have any of these shapes ('No' decisions in all of steps S828, S830, S832, S834, and S836), then in step S838, the image input and output apparatus 10 waits for the operator to enter a facsimile number. When a facsimile number is entered, the facsimile number is set in the facsimile controller 24 in step S839, and processing proceeds to step S840.

In step S840, a facsimile call is originated to the facsimile number set in the facsimile controller 24. The image data obtained by the front color image scanner 32 or back color image scanner 33 are transmitted as facsimile data in step S841. The procedure then ends.

FIG. 56 illustrates the copy printing part of the procedure.

Step S844 tests whether the priority bit is set to '0'. Processing proceeds to step S845 if the priority bit is set to '0', and to step S846 otherwise.

In step S845, the image pattern recognition unit 14 recognizes the shape of the image pattern 11*a* on the front side, and the back color image scanner 33 continues scanning the back side of the document 11 and stores the scanned image data in the back image memory 39. Processing proceeds to step S848.

Step S846 tests whether the priority bit is set to '1'. Processing proceeds to step S847 if the priority bit is set to '1', and to step S859 otherwise.

In step S847, the image pattern recognition unit 14 recognizes the shape of the image pattern 11*a* on the back side, and the front color image scanner 32 continues scanning the front side of the document 11 and stores the scanned image data in the front image memory 36.

In step S848, the image pattern recognition unit 14 stores information indicating the shape in the second memory 19.

Steps S849, S851, S853, S855, and S857 are decision steps that test the shape of the image pattern.

If the image pattern has a square shape ('Yes' in step S849), the number of copies assigned to the square shape is set in the printing unit 22 in step S850, and processing proceeds to step S861.

If the image pattern has a star shape ('Yes' in step S851), the number of copies assigned to the star shape is set in the printing unit 22 in step S852, and processing proceeds to step S861.

If the image pattern has a triangle shape ('Yes' in step S853), the number of copies assigned to the triangle shape is set in the printing unit 22 in step S854, and processing proceeds to step S861.

If the image pattern has a diamond shape ('Yes' in step S855), the number of copies assigned to the diamond shape is set in the printing unit 22 in step S856, and processing proceeds to step S861.

If the image pattern has an inverted triangle shape ('Yes' in step S857), the number of copies assigned to the inverted triangle shape is set in the printing unit 22 in step S858, and processing proceeds to step S861.

If the image pattern does not have any of these shapes ('No' decisions in all of steps S849, S851, S853, S855, and S857), then in step S859, the image input and output apparatus 10 waits for the operator to enter a number of copies. When a number of copies is entered, the number of copies is set in the printing unit 22 in step S860, and processing proceeds to step S861.

In step S861, the printing unit 22 is readied for printing the image data obtained by the front color image scanner 32 or back color image scanner 33. The printing unit 22 prints the set number of copies of the image data in step S862, after which the procedure ends.

FIG. 57 illustrates the filing part of the procedure.

Step S865 tests whether the priority bit is set to '0'. Processing proceeds to step S866 if the priority bit is set to '0', and to step S867 otherwise.

In step S866, the image pattern recognition unit 14 recognizes the shape of the image pattern 11*a* on the front side, and the back color image scanner 33 continues scanning the back side of the document 11 and stores the scanned image data in the back image memory 39. Processing proceeds to step S869.

Step S867 tests whether the priority bit is set to '1'. Processing proceeds to step S868 if the priority bit is set to '1', and to step S880 otherwise.

In step S868, the image pattern recognition unit 14 recognizes the shape of the image pattern 11a on the back side, and the front color image scanner 32 continues scanning the front side of the document 11 and stores the scanned image data in the front image memory 36.

In step S869, the image pattern recognition unit 14 stores information indicating the shape in the second memory 19.

Steps S870, S872, S874, S876, and S878 are decision steps that test the shape of the image pattern.

If the image pattern has a square shape ('Yes' in step S870), the server address assigned to the square shape is set in the filing controller 25 in step S871, and processing proceeds to step S882.

If the image pattern has a star shape ('Yes' in step S872), the server address assigned to the star shape is set in the filing controller 25 in step S873, and processing proceeds to step S882.

If the image pattern has a triangle shape ('Yes' in step S874), the server address assigned to the triangle shape is set in the filing controller 25 in step S875, and processing proceeds to step S882.

If the image pattern has a diamond shape ('Yes' in step S876), the server address assigned to the diamond shape is set in the filing controller 25 in step S877, and processing proceeds to step S882.

If the image pattern has an inverted triangle shape ('Yes' in step S878), the server address assigned to the inverted triangle shape is set in the filing controller 25 in step S879, and processing proceeds to step S882.

If the image pattern does not have any of these shapes ('No' decisions in all of steps S870, S872, S874, S876, and S878), the image input and output apparatus 10 waits for the operator to enter a server address in step S880. When a server address is entered, the server address is set in the filing controller 25 in step S881, and processing proceeds to step S882.

In step S882, the image data obtained by the front color image scanner 32 or back color image scanner 33 are reformatted for filing. In step S883, the filing controller 25 accesses the designated server and transmits the reformatted image data to be stored in the server. The procedure then ends.

FIG. 58 illustrates the saving part of the procedure.

Step S886 tests whether the priority bit is set to '0'. Processing proceeds to step S887 if the priority bit is set to '0', and to step S888 otherwise.

In step S887, the image pattern recognition unit 14 recognizes the shape of the image pattern 11a on the front side, and the back color image scanner 33 continues scanning the back side of the document 11 and stores the scanned image data in the back image memory 39. Processing proceeds to step S890.

Step S888 tests whether the priority bit is set to '1'. Processing proceeds to step S889 if the priority bit is set to '1', and to step S901 otherwise.

In step S889, the image pattern recognition unit 14 recognizes the shape of the image pattern 11a on the back side, and the front color image scanner 32 continues scanning the front side of the document 11 and stores the scanned image data in the front image memory 36.

In step S890, the image pattern recognition unit 14 stores information indicating the shape in the second memory 19.

Steps S891, S893, S895, S897, and S899 are decision steps that test the shape of the image pattern.

If the image pattern has a square shape ('Yes' in step S891), the PC folder name assigned to the square shape is set in the PC scan controller 26 in step S892, and processing proceeds to step S903.

If the image pattern has-a star shape ('Yes' in step S893), the PC folder name assigned to the star shape is set in the PC scan controller 26 in step S894, and processing proceeds to step S903.

If the image pattern has a triangle shape ('Yes' in step S895), the PC folder name assigned to the triangle shape is set in the PC scan controller 26 in step S896, and processing proceeds to step S903.

If the image pattern has a diamond shape ('Yes' in step S897), the PC folder name assigned to the diamond shape is set in the PC scan controller 26 in step S898, and processing proceeds to step S903.

If the image pattern has an inverted triangle shape ('Yes' in step S899), the PC folder name assigned to the inverted triangle shape is set in the PC scan controller 26 in step S900, and processing proceeds to step S903.

If the image pattern does not have any of these shapes ('No' decisions in all of steps S891, S893, S895, S897, and S899), the image input and output apparatus 10 waits for the operator to enter a PC folder name in step S901. When a (preliminary) PC folder name is entered, the PC folder name is set in the PC scan controller 26 in step S902, and processing proceeds to step S903.

In step S903, the image data obtained by the front color image scanner 32 or back color image scanner 33 are reformatted for saving in the PC. In step S904, the PC scan controller 26 accesses the designated PC folder and transmits the reformatted image data to be stored in the folder. The procedure then ends.

The eighth embodiment has the same advantages as the seventh embodiment, but can be implemented at lower cost because the front color recognition unit 34, front image pattern recognition unit 35, back color recognition unit 37, and back image pattern recognition unit 38 are replaced by a single pair of recognition units 13, 14, and the third memory 40 and fourth memory 41 are eliminated. The eighth embodiment also reduces the processing time because the priority bit in the surface decision unit 42 indicates whether the front image memory 36 or back image memory 39 should be read to obtain the document image data.

Ninth Embodiment

The ninth embodiment is an image input and output apparatus 10 that prints a document 11 with an image pattern 11a of the type described above.

Figure 59:
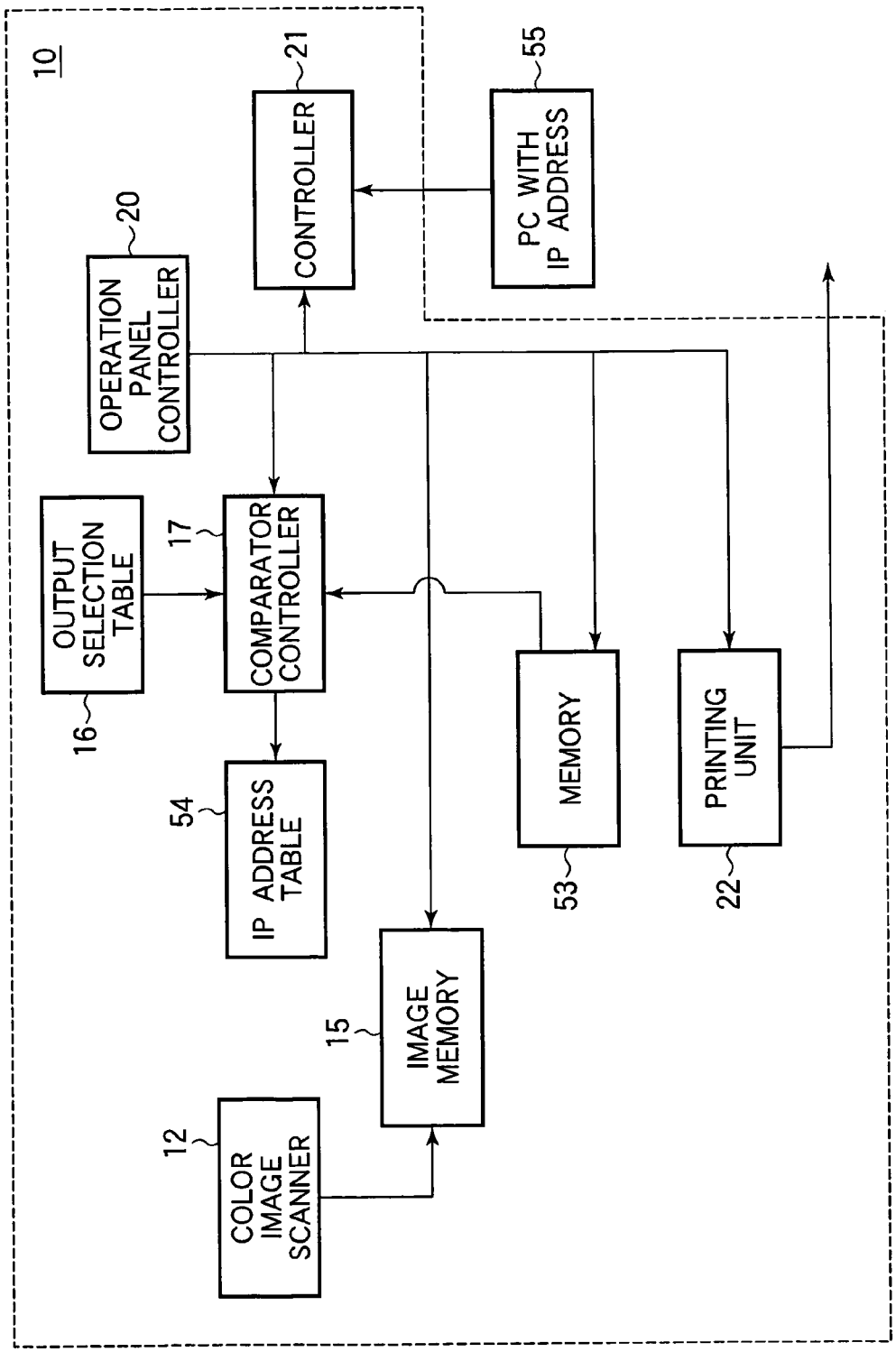
FIG. 59 is a block diagram of an image input and output apparatus according to a ninth embodiment of the invention.

Referring to FIG. 59, the image input and output apparatus 10 in the ninth embodiment has an IP address table 54 that stores a table of predetermined image patterns 11a to which internet protocol (IP) addresses can be assigned, a memory 53 that stores the IP address of a personal computer, and a comparator controller 17 that compares the IP address in the memory 53 with the information stored in the IP address table 54. The image input and output apparatus 10 is connected through a local area network (not fully shown) to a personal computer 55 that has an IP address. The image input and output apparatus 10 also has a color image scanner 12, an image memory 15, an output selection table 16, an operation panel controller 20, a controller 21, and a printing unit 22 as described in the preceding embodiments.

Next, the operation of the image input and output apparatus 10 in the ninth embodiment will be described.

As a preliminary procedure, the operator first assigns meanings to colored image patterns, as in the third embodiment. In a second part of the preliminary procedure, the operator assigns IP addresses to one or more image patterns pre-stored in the IP address table 54. In a third part of the preliminary procedure, the operator enables or disables the printing of the image patterns.

Figure 60:
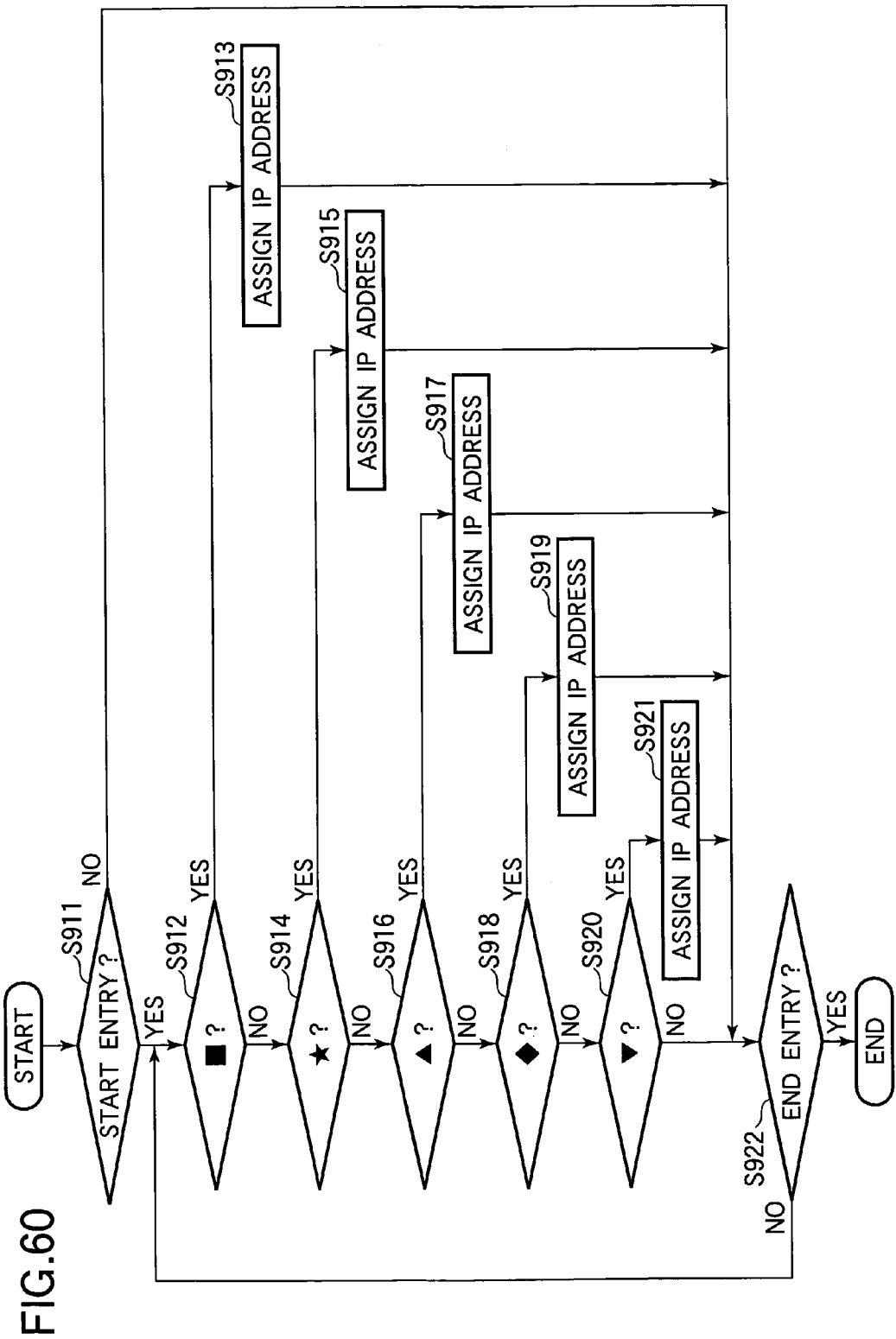
FIG. 60 is a flowchart illustrating a procedure for storing information in the table in the ninth embodiment.

The second part of the preliminary procedure is illustrated by the flowchart in FIG. 60.

In step S911 in FIG. 60, the controller 21 decides, by testing the state of a switch in the operation panel, for example, whether to start the assignment procedure, and proceeds accordingly to step S912 (to start the assignment procedure) or step S922 (to skip the assignment procedure).

Steps S912, S914, S916, S918, and S920 are decision steps that test for selection of a shape.

If the operator selects the square shape ('Yes' in step S912) and enters an IP address, the IP address is assigned to the square shape and stored in the IP address table 54 in step S913, and processing proceeds to step S922.

If the operator selects the star shape ('Yes' in step S914) and enters an IP address, the IP address is assigned to the star shape and stored in the IP address table 54 in step S915, and processing proceeds to step S922.

If the operator selects the triangle shape ('Yes' in step S916) and enters an IP address, the IP address is assigned to the triangle shape and stored in the IP address table 54 in step S917, and processing proceeds to step S922.

If the operator selects the diamond shape ('Yes' in step S918) and enters an IP address, the IP address is assigned to the diamond shape and stored in the IP address table 54 in step S919, and processing proceeds to step S922.

If the operator selects the inverted triangle shape ('Yes' in step S920) and enters an IP address, the IP address is assigned to the inverted triangle shape and stored in the IP address table 54 in step S921, and processing proceeds to step S922.

If the operator does not select any shape ('No' in all of steps S912, S914, S916, S918, and S920), processing proceeds to step S922.

Step S922 is a termination decision step. Processing ends or returns to step S912 according to, for example, the state of a switch in the operation panel.

Figure 61A:
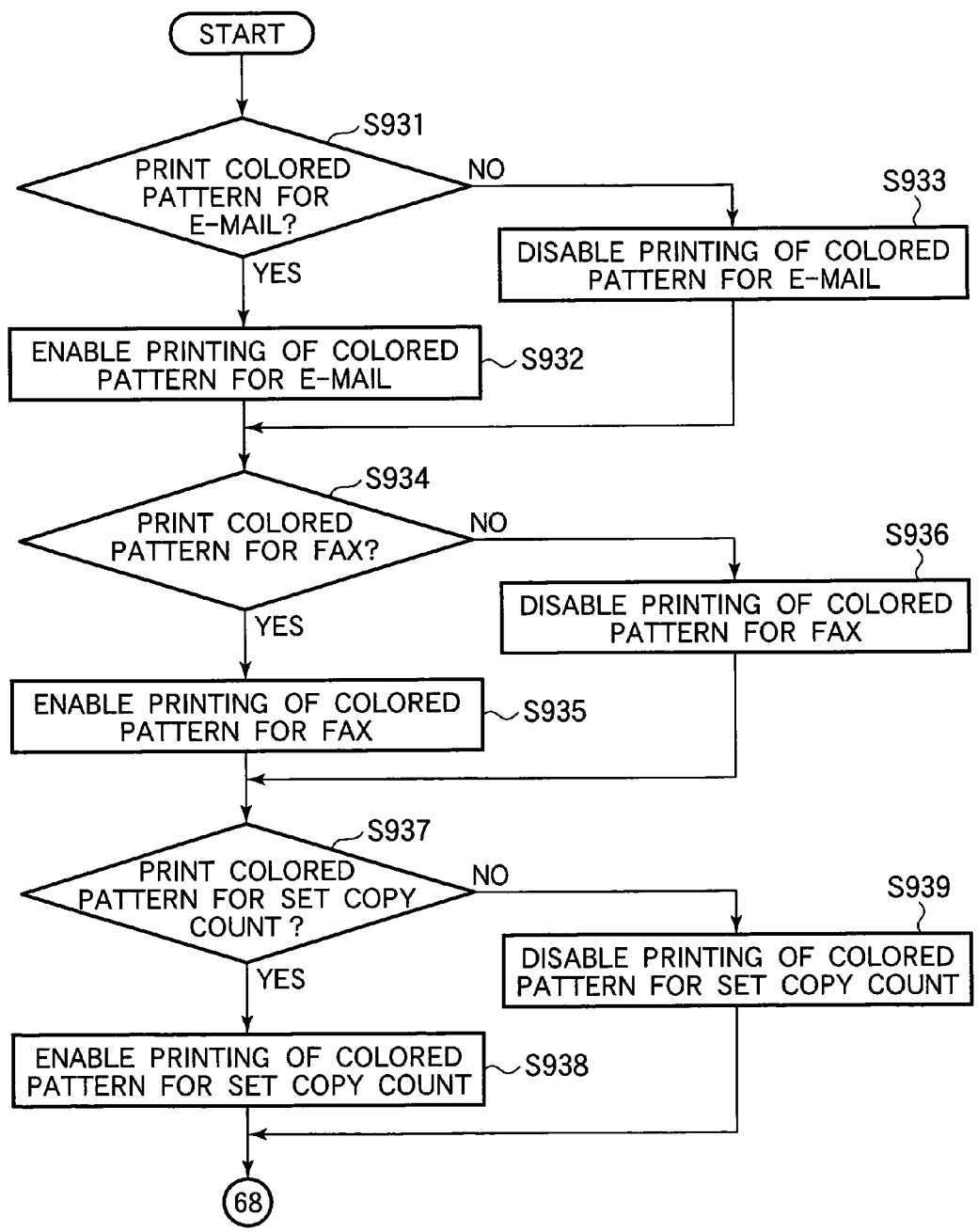
FIGS. 61A and 61B are a flowchart illustrating a procedure for requesting the printing of a colored image pattern in the ninth embodiment.
Figure 61B:
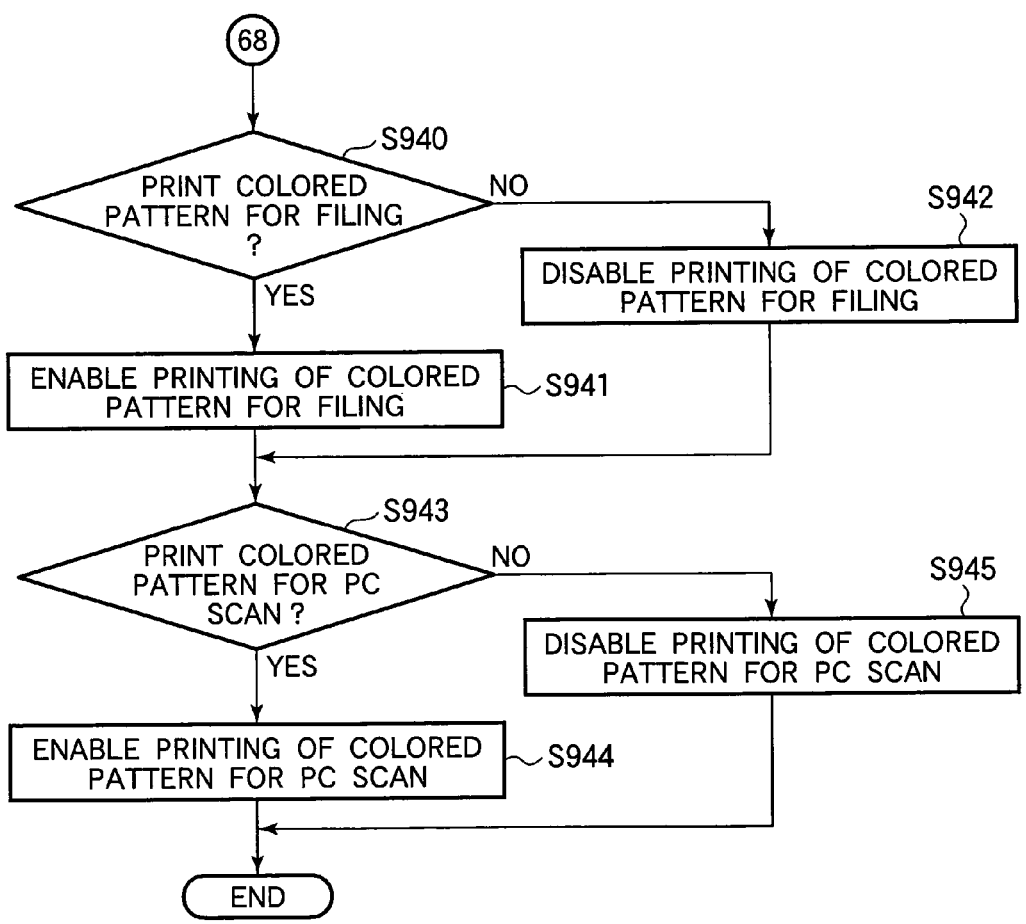

The third part of the preliminary procedure is illustrated by the flowchart in FIGS. 61A and 61B.

In step S931 in FIG. 61A, the operator uses the operation panel, for example, to indicate whether or not to print an image pattern 11a to which an electronic mail transmission function has been assigned. The printing of the image pattern 11a is enabled in step S932 or disabled in step S933, and processing proceeds to step S934.

In step S934, the operator indicates whether or not to print an image pattern 11a to which a facsimile transmission function has been assigned. The printing of the image pattern 11a is enabled in step S935 or disabled in step S936, and processing proceeds to step S937.

In step S937, the operator indicates whether or not to print an image pattern 11a to which a copying function has been assigned. The printing of the image pattern 11a is enabled in step S938 or disabled in step S939, and processing proceeds to step S940 in FIG. 61B.

In step S940, the operator indicates whether or not to print an image pattern 11a to which a filing function has been assigned. The printing of the image pattern 11a is enabled in step S941 or disabled in step S942, and processing proceeds to step S943.

In step S943, the operator indicates whether or not to print an image pattern 11a to which a saving function has been assigned. The printing of the image pattern 11a is enabled in step S944 or disabled in step S945. The procedure then ends.

Next, the printing of the image pattern 11a will be described.

The image input and output apparatus 10 constantly monitors printing requests from the personal computer 55. When a printing request is received, the image input and output apparatus 10 starts preparations for printing. These preparations include the generation of data for printing a square pattern if the printing of an image pattern 11a for electronic mail transmission is enabled, a star pattern if the printing of an image pattern 11a for facsimile transmission is enabled, a triangle pattern if the printing of an image pattern 11a for printing a designated number of copies is enabled, a diamond pattern if the printing of an image pattern 11a for the filing function is enabled, and the printing of an inverted triangle pattern if the printing of an image pattern 11a for the saving function is enabled.

Following these preparations, the controller 21 detects the IP address of the personal computer 55 and stores the IP address in the memory 53. The comparator controller 17 constantly monitors the presence of information in the memory 53, and compares each IP address stored in the memory 53 with the information stored in the IP address table 54. If the IP address in the memory 53 matches any IP address stored in the IP address table 54 and printing of the corresponding colored pattern image is enabled, color information corresponding to the relevant function (electronic mail transmission, facsimile transmission, printing, filing, or saving) and the shape corresponding to the detected IP address are set in the printing unit 22. An image pattern 11a with this color and shape is printed near the leading edge on the front side of a printing medium. The image data accompanying the printing request are printed on the same side, producing a printed document 11 of the type described in the first three embodiments.

If the printing of a colored image pattern 11a is disabled or if the IP address cannot be recognized or does not match any information stored in the IP address table 54, the image input and output apparatus 10 prints just the image data accompanying the printing request on the front side of the printing medium and ends the processing without printing the image pattern 11a.

Figure 62B:
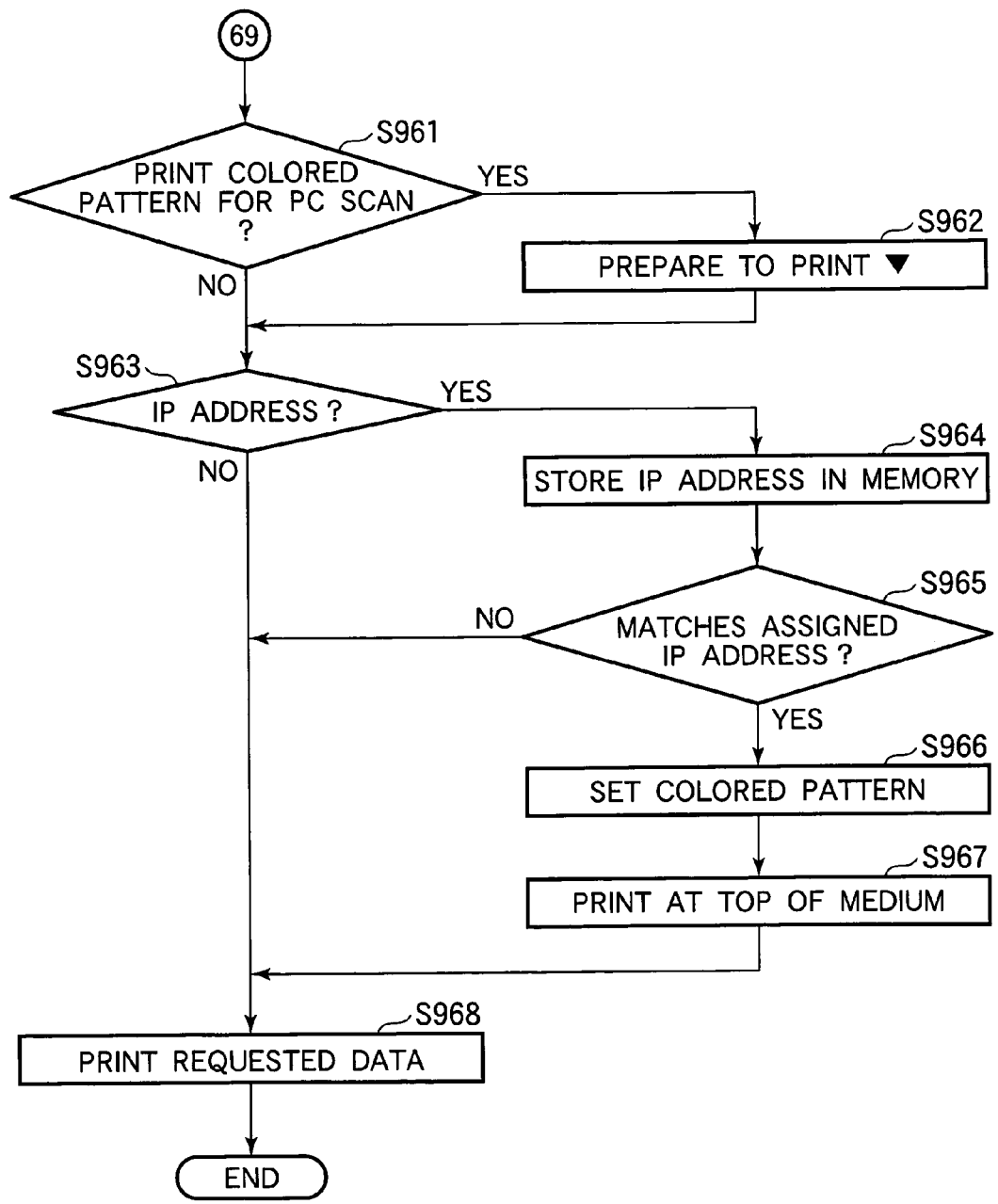

The document printing operation is illustrated by the flowchart in FIGS. 62A and 62B.

In step S951 in FIG. 62A, the image input and output apparatus 10 waits for a printing request. When a printing request arrives, preparations for printing are begun in step S952.

Step S953 tests whether the printing of a colored image pattern 11a for electronic mail transmission is enabled. Processing proceeds to step S954 if so and to step S955 otherwise.

In step S954, preparations are made for printing a square pattern.

Step S955 tests whether the printing of a colored image pattern 11a for facsimile transmission is enabled. Processing proceeds to step S956 if so, and to step S957 otherwise.

In step S956, preparations are made for printing a star pattern.

Step S957 tests whether the printing of a colored image pattern 11a for the printing of a designated number of copies is enabled. Processing proceeds to step S958 if so, and to step S959 otherwise.

In step S958, preparations are made for printing a triangle pattern.

Step S959 tests whether the printing of a colored image pattern 11a for the filing function is enabled. Processing proceeds to step S960 if so, and to step S961 in FIG. 62B otherwise.

In step S960, preparations are made for printing a diamond pattern.

Step S961 tests whether the printing of a colored image pattern 11a for the saving function is enabled. Processing proceeds to step S962 if so, and to step S963 otherwise.

In step S962, preparations are made for printing an inverted triangle pattern.

In step S963 the controller 21 checks whether the personal computer or other host device that requested the printing job has an IP address. If it does, processing proceeds to step S964; otherwise, processing proceeds to step S968.

In step S964, the IP address is stored in the memory 53.

In step S965, the comparator controller 17 compares the IP address stored in the memory 53 with the information stored in the IP address table 54. Processing proceeds to step S966 if the IP address matches any information stored in the IP address table 54, and to step S968 otherwise.

Image data describing the image pattern 11a are sent to the printing unit 22 in step S966 and printed near the leading edge of the front side of the printing medium in step S967.

The image data accompanying the printing request are printed on the front side of the printing medium in step S968, and the procedure ends.

In the ninth embodiment, the image pattern 11a indicating electronic mail transmission, facsimile transmission, the printing of a certain number of copies, the filing function, or the saving function is always printed on the same side of the printing medium as the main image data, regardless of the type of printing request, which may come from, for example, a word processing program, a spreadsheet program, or an electronic mail program.

The ninth embodiment can be combined with the image input and output apparatus 10 of any of the first to third embodiments to provide a simplified way to generate documents with colored image patterns of the type described in those embodiments.

Tenth Embodiment

Figure 63:
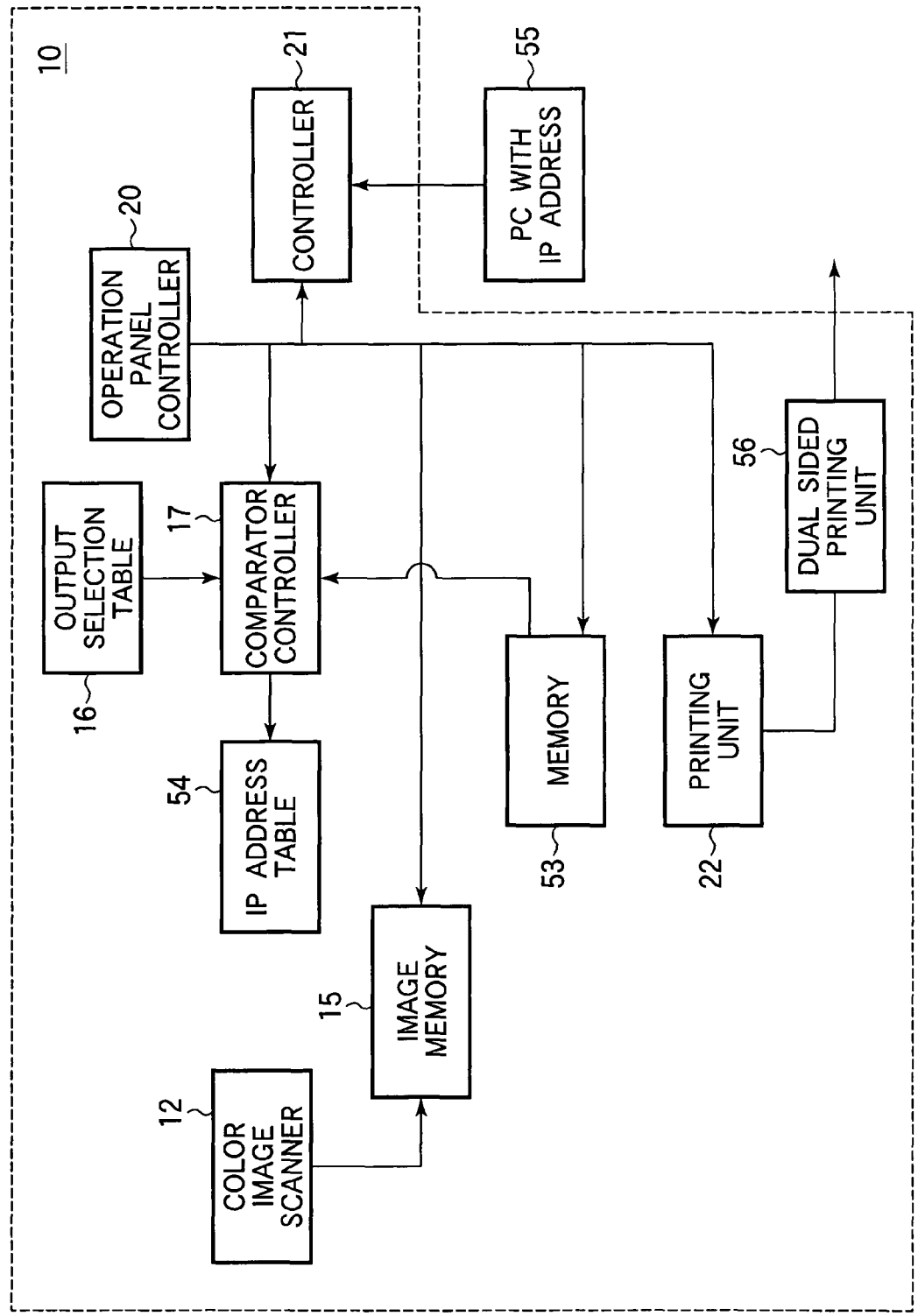
FIG. 63 is a block diagram of an image input and output apparatus according to a tenth embodiment of the invention.

Referring to FIG. 63, the tenth embodiment adds a dual sided printing unit 56 to the structure shown in the ninth embodiment. The dual sided printing unit 56 turns printing media over to enable the printing unit to print on both sides, and ejects the printing media after printing on one or both sides. The other components are the same as in the ninth embodiment.

The image input and output apparatus 10 in the tenth embodiment operates as follows. The operation includes a three-part preliminary procedure which will not be described in detail because the first part is the same as in the third embodiment and the second and third parts are the same as in the ninth embodiment. The operation following a printing request is substantially the same as in the ninth embodiment. Differences will be pointed out below.

After the image data describing a colored image pattern 11a have been sent to the printing unit 22, the image data accompanying the printing request are printed on the front side of the printing medium. The dual sided printing unit 56 now turns the printing medium over, and the printing unit 22 prints a colored image pattern 11a near the leading edge on the back side of the printing medium. Then the procedure ends. As in the ninth embodiment, the image pattern 11a is selected according to the IP address of the personal computer or other host device that requested the printing job. Unlike the ninth embodiment, the tenth embodiment prints the colored image pattern 11a and the main image data on opposite sides of the printing medium, thereby avoiding possible interference between the two.

Figure 64A:
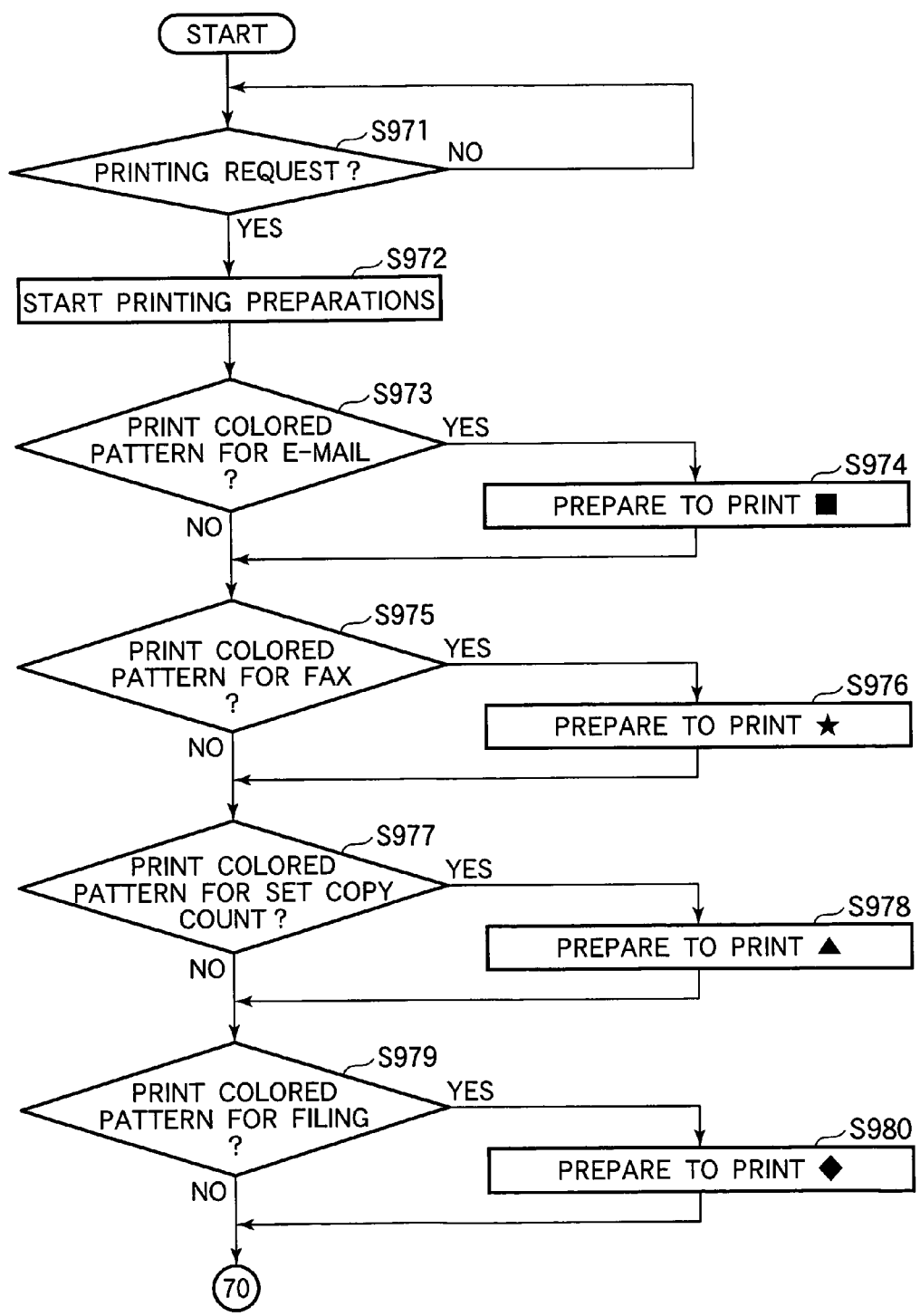
FIGS. 64A and 64B are a flowchart illustrating a printing procedure in the tenth embodiment.
Figure 64B:
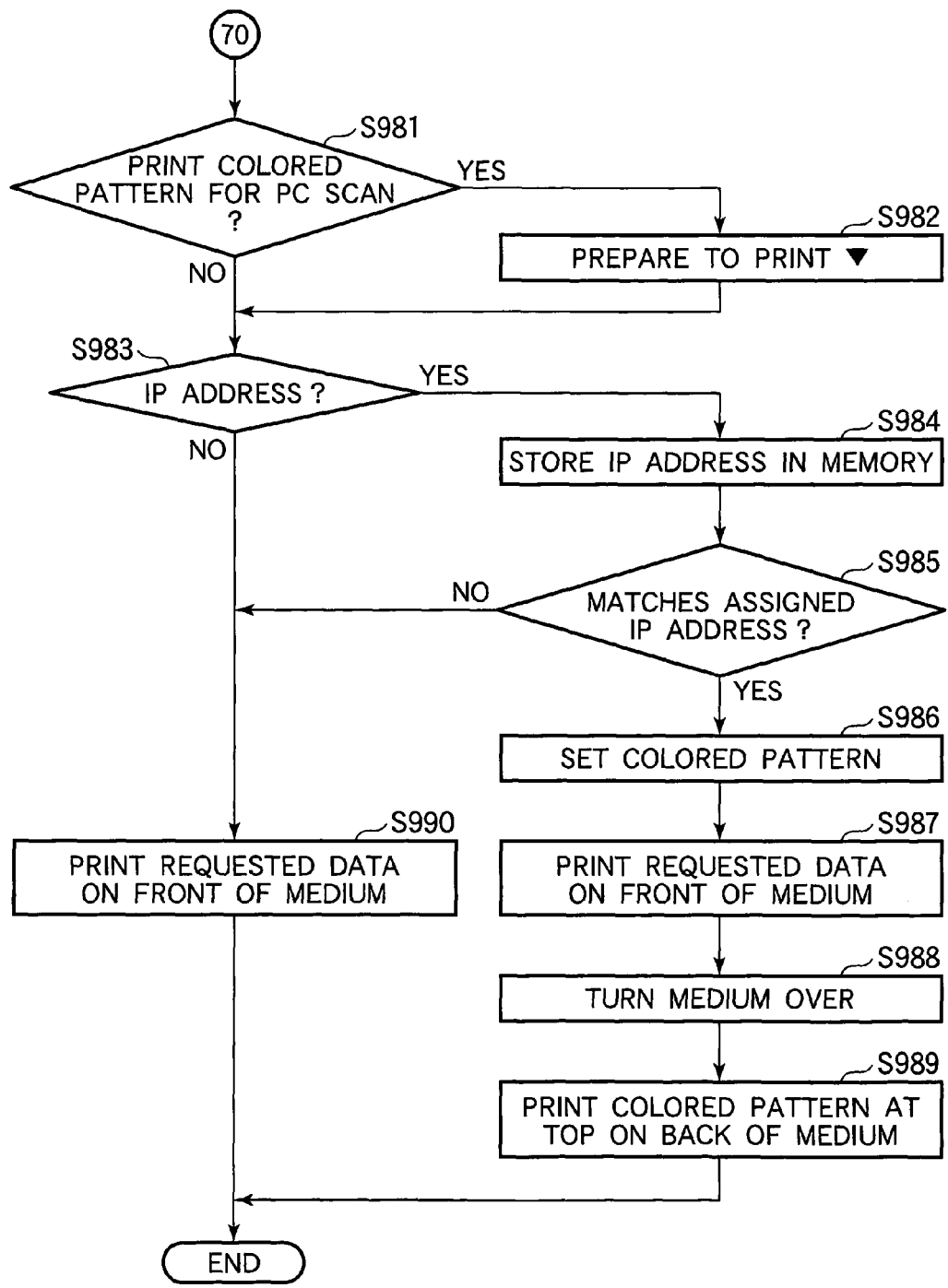

The document printing operation is illustrated by the flow-chart in FIGS. 64A and 64B.

In step S971, the image input and output apparatus 10 waits for a printing request.

When a printing request arrives, preparations for printing are begun in step S972.

Step S973 tests whether the printing of a colored image pattern 11a for electronic mail transmission is enabled. Processing proceeds to step S974 if so, and to step S975 otherwise.

In step S974, preparations are made for printing a square pattern.

Step S975 tests whether the printing of a colored image pattern 11a for facsimile transmission is enabled. Processing proceeds to step S976 if so, and to step S977 otherwise.

In step S976, preparations are made for printing a star pattern.

Step S977 tests whether the printing of a colored image pattern 11a for the printing function of a designated number of copies is enabled. Processing proceeds to step S978 if so, and to step S979 otherwise.

In step S978, preparations are made for printing a triangle pattern.

Step S979 tests whether the printing of a colored image pattern 11a for the filing function is enabled. Processing proceeds to step S980 if so, and to step S981 otherwise.

In step S980, preparations are made for printing a diamond pattern.

Step S981 in FIG. 64B tests whether the printing of a colored image pattern 11a for the saving function is enabled. Processing proceeds to step S982 if so, and to step S983 otherwise.

In step S982, preparations are made for printing an inverted triangle pattern.

In step S983 the controller 21 checks whether the personal computer or other host device that requested the printing job has an IP address. If it does, processing proceeds to step S984; otherwise, processing proceeds to step S990.

In step S984, the IP address is stored in the memory 53.

In step S985, the comparator controller 17 compares the IP address stored in the memory 53 with the information stored in the IP address table 54. Processing proceeds to step S986 if the IP address matches any information stored in the IP address table 54, and to step S990 otherwise.

Image data describing the image pattern 11a are set in the printing unit 22 in step S986.

The image data accompanying the printing request are printed on the front side of the printing medium in step S987.

The dual sided printing unit 56 turns the printing medium over in step S988. The colored image pattern 11a is printed near the leading edge on the back side of the printing medium in step S989, and the procedure ends.

In step S990, the image data accompanying the printing request are printed on the front side of the printing medium and the procedure ends without printing on the back side.

In the tenth embodiment, the image pattern 11a indicating electronic mail transmission, facsimile transmission, the printing of a certain number of copies, the filing function, or the saving function is always printed on the back side of the printing medium while the main image data are printed on the front side, regardless of the type of printing request.

The tenth embodiment can be combined with the image input and output apparatus 10 of any of the fourth to eighth embodiments to provide a simplified way to generate documents with colored image patterns of the type described in those embodiments.

The position, shapes, and colors of the image patterns in the preceding embodiments are not limited to the positions, shapes, and colors shown in the drawings. Although a position near the top or leading edge of the document is generally preferable, the image pattern may be located in any position on the document. The image pattern may have any shape that can be distinguished by the relevant color image scanner and recognized by the image pattern recognition unit. The image pattern may have any color defined in, for example, the Japanese Industrial Standards, the Practical Color Coordinate System used by the Japan Color Enterprise Company, the NBS/ISCC color system devised by the National Bureau of Standards and the Inter-Society Color Council, the Ostwald color system, the Natural Color System designed by the Scandinavian Color Institute, the German DIN (Deutsche Industrie Norm) color chart, the Color Harmony Manual published by the Container Corporation of America, or the XYZ system established by the International Commission on Illumination (CIE, Commission Internationale de l'Eclairage), provided the color image scanner and color recognition unit are capable of distinguishing between the different colors used.

Different image patterns may also be differentiated by texture, provided the color image scanner is capable of distinguishing the different textures.

The colors, shapes, and textures need not be predetermined. The image input and output apparatus may be operable to register and distinguish image patterns with user-defined colors, shapes, or textures.

The colored image pattern may comprise a combination of elementary colored shapes, such as a red diamond paired with a blue star.

The color recognition steps in the third, sixth, seventh, and eighth embodiments (e.g., step S284 in FIG. 20A or steps S673 and S676 in FIG. 46A) may be restricted to the recognition of color at a single location, such as the center of the expected position of the colored image pattern.

The printing unit in the first to tenth embodiments may be any type of color printing unit, such as a tandem electrophotographic printing unit or an inkjet printing unit.

Those skilled in the art will recognize that further variations are possible within the scope of the invention, which is defined in the appended claims.

What is claimed is:

1. An image input and output apparatus comprising:
    a scanner for scanning a document to obtain image data representing an image in a first area of the document and an image pattern in a second area of the document;
    a color recognition unit for recognizing a color of the image pattern;
    a plurality of output units with different functions such that the output units perform their corresponding functions on the image data;
    a storage unit storing a table of colors, each of the colors representing a corresponding one of the output units; and
    a controller for directing the image data obtained by the scanner to the corresponding one of the output units.

2. The image input and output apparatus of claim 1, wherein the different functions include at least two functions selected from among electronic mail transmission, facsimile transmission, printing of a designated number of copies, transmission to a file server, and saving of the image data to a folder in a personal computer.

3. The image input and output apparatus of claim 1, further comprising an image pattern recognition unit for recognizing a shape of the image pattern, wherein the table stored in the storage unit also stores, for at least one output unit among said output units, a plurality of shapes and corresponding output destinations, and the output unit outputs the image data to an output destination corresponding to the recognized shape of the image pattern.

4. The image input and output apparatus of claim 1, further comprising an input unit operable by a human operator to enter information missing from the image pattern, wherein the controller directs the image data to an output unit designated by the operator if the color recognition unit fails to recognize the color of the image pattern.

5. The image input and output apparatus of claim 1, wherein the image data are scanned from one side of the document and the image pattern is scanned from another side of the document.

6. The image input and output apparatus of claim 1, wherein the scanner scans both sides of the document to find the image pattern.

7. The image input and output apparatus of claim 6, wherein after the image pattern has been found, the scanner continues to scan just one side of the document, further comprising a surface decision unit for deciding which side of the document to continue scanning.

* * * * *